US008376922B2

(12) United States Patent
Akama et al.

(10) Patent No.: US 8,376,922 B2
(45) Date of Patent: Feb. 19, 2013

(54) DEVELOPING ROLLER, CHARGING ROLLER, CONDUCTIVE ROLLER AND METHOD FOR PRODUCING THE SAME

(75) Inventors: Shuyou Akama, Saitama (JP); Hiroyuki Anzai, Tokyo (JP); Hiroyuki Kanesugi, Tokyo (JP); Hikaru Ishikawa, Tokyo (JP); Junji Sakata, Tokyo (JP); Koji Takagi, Kanagawa (JP); Takayuki Sugimura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 1402 days.

(21) Appl. No.: 11/629,085

(22) PCT Filed: Jun. 8, 2005

(86) PCT No.: PCT/JP2005/010505

§ 371 (c)(1),
(2), (4) Date: Dec. 11, 2006

(87) PCT Pub. No.: WO2006/001171

PCT Pub. Date: Jan. 5, 2006

(65) Prior Publication Data

US 2008/0292366 A1 Nov. 27, 2008

(30) Foreign Application Priority Data

Jun. 9, 2004 (JP) ................................ 2004-170918
Jun. 10, 2004 (JP) ................................ 2004-172322
Jun. 10, 2004 (JP) ................................ 2004-172365
Jun. 10, 2004 (JP) ................................ 2004-172659
Jun. 10, 2004 (JP) ................................ 2004-172742
Jun. 10, 2004 (JP) ................................ 2004-172845
Jun. 10, 2004 (JP) ................................ 2004-172915

(51) Int. Cl.
*F16C 13/00* (2006.01)
*B21K 1/02* (2006.01)

(52) U.S. Cl. ........ 492/56; 492/53; 29/895.32; 29/895.3; 29/895

(58) Field of Classification Search .................... 492/56, 492/53, 48; 29/895.32, 895.3, 895
See application file for complete search history.

(56) References Cited

U.S. PATENT DOCUMENTS 4,769,676 A * 9/1988 Mukai et al. .................. 399/150
4,820,580 A * 4/1989 Hocker et al. ............. 428/304.4
(Continued)

FOREIGN PATENT DOCUMENTS

JP 62-150367 A 7/1987
JP 4-56881 A 2/1992
(Continued)

OTHER PUBLICATIONS

Japanese Office Actions (2) dated Apr. 13, 2010 (with partial translation) (10 pages).

(Continued)

*Primary Examiner* — Essama Omgba
(74) *Attorney, Agent, or Firm* — Sughrue Mion, PLLC

(57) ABSTRACT

A conductive roller such as a developing roller, a charging roller or the like provided with a resin coating layer on a surface of an elastic layer, and more particularly to a conductive roller having the resin coating layer using an ultraviolet-curing type resin or an electron beam curing type resin and being obtained by contriving a structure of the resin coating layer, rendering the resin coating layer to contain microparticles, controlling the particle size of the microparticles, or forming the resin coating layer after the outer peripheral surface of the elastic layer is subjected to surface treatment.

3 Claims, 3 Drawing Sheets

U.S. PATENT DOCUMENTS

| | | | | | |
|---|---|---|---|---|---|
| 5,471,285 | A * | 11/1995 | Nagase et al. | ................ | 399/168 |
| 5,625,858 | A * | 4/1997 | Hirai et al. | .................... | 399/176 |
| 5,722,026 | A * | 2/1998 | Goto et al. | .................... | 399/333 |
| 5,782,730 | A * | 7/1998 | Kawasaki et al. | ............... | 492/56 |
| 5,819,646 | A * | 10/1998 | Fukunaga | ..................... | 100/176 |
| 5,827,160 | A * | 10/1998 | Ohki et al. | ...................... | 492/56 |
| 5,915,145 | A * | 6/1999 | Shimura et al. | ................. | 399/66 |
| 6,319,181 | B1 * | 11/2001 | Naoi et al. | ...................... | 492/56 |
| 6,390,961 | B1 * | 5/2002 | Nakada et al. | .................. | 492/56 |
| 6,471,628 | B1 * | 10/2002 | Hirayama | ....................... | 492/56 |
| 6,556,797 | B1 * | 4/2003 | Nishigaki et al. | ............. | 399/130 |
| 6,580,892 | B2 * | 6/2003 | Ohuchi | ......................... | 399/286 |
| 6,685,612 | B2 * | 2/2004 | Hirayama | ....................... | 492/56 |
| 6,692,422 | B2 * | 2/2004 | Yamaguchi et al. | ............ | 492/56 |
| 6,696,149 | B2 * | 2/2004 | Kobayashi et al. | ........... | 428/343 |
| 6,703,094 | B2 * | 3/2004 | Kakii et al. | ................ | 428/36.91 |
| 6,709,373 | B2 * | 3/2004 | Park | ................................ | 492/56 |
| 6,739,051 | B2 * | 5/2004 | Park | ......................... | 29/895.213 |
| 6,832,065 | B2 * | 12/2004 | Nakamura et al. | ............ | 399/286 |
| 6,850,729 | B2 * | 2/2005 | Kobayashi et al. | ........... | 399/341 |
| 6,908,419 | B2 * | 6/2005 | Takashima et al. | ............. | 492/56 |
| 6,918,866 | B2 * | 7/2005 | Miyamori et al. | .............. | 492/56 |
| 6,964,813 | B2 * | 11/2005 | Hashimoto | ................... | 428/413 |
| 7,007,384 | B2 * | 3/2006 | Hirayama | .................... | 29/895.3 |
| 7,288,058 | B2 * | 10/2007 | Kaji et al. | ....................... | 492/59 |
| 7,526,239 | B2 * | 4/2009 | Kawano et al. | ............... | 399/286 |
| 7,907,878 | B2 * | 3/2011 | Takagi et al. | ................. | 399/286 |
| 7,912,411 | B2 * | 3/2011 | Takagi et al. | ................. | 399/286 |
| 2002/0031378 | A1 | 3/2002 | Arai et al. | | |
| 2002/0035020 | A1 * | 3/2002 | Yamaguchi et al. | ............ | 492/56 |
| 2002/0086781 | A1 * | 7/2002 | Okuda et al. | .................... | 492/56 |
| 2002/0086783 | A1 * | 7/2002 | Nakada et al. | .................. | 492/59 |
| 2002/0115546 | A1 * | 8/2002 | Park | ................................ | 492/56 |
| 2002/0119324 | A1 * | 8/2002 | Harashima et al. | ........ | 428/423.3 |
| 2002/0128138 | A1 * | 9/2002 | Hirayama | ....................... | 492/56 |
| 2003/0013588 | A1 * | 1/2003 | Hirayama | ....................... | 492/56 |
| 2003/0191000 | A1 * | 10/2003 | Park | ................................ | 492/56 |
| 2004/0019176 | A1 * | 1/2004 | Araki et al. | ................... | 528/242 |
| 2007/0177909 | A1 * | 8/2007 | Takagi et al. | ................. | 399/286 |
| 2007/0197362 | A1 * | 8/2007 | Sakata et al. | ..................... | 492/49 |
| 2008/0085367 | A1 * | 4/2008 | Ikeda et al. | ................... | 427/296 |
| 2008/0146427 | A1 * | 6/2008 | Osaku | ............................. | 492/56 |
| 2008/0220179 | A1 * | 9/2008 | Akama et al. | ................. | 427/508 |
| 2008/0304874 | A1 * | 12/2008 | Takagi et al. | ................. | 399/286 |
| 2008/0318748 | A1 * | 12/2008 | Akama et al. | ................... | 492/56 |
| 2009/0176637 | A1 * | 7/2009 | Suzuki et al. | ................... | 492/56 |
| 2010/0167890 | A1 * | 7/2010 | Suzuki et al. | ................... | 492/56 |

FOREIGN PATENT DOCUMENTS

| | | | |
|---|---|---|---|
| JP | 05201597 | A * | 8/1993 |
| JP | 7-319271 | A | 12/1995 |
| JP | 07319270 | A * | 12/1995 |
| JP | 8-101580 | A | 4/1996 |
| JP | 8-254876 | A | 10/1996 |
| JP | 9-197801 | A | 7/1997 |
| JP | 9-226973 | A | 9/1997 |
| JP | 10282767 | A * | 10/1998 |
| JP | 11-351238 | A | 12/1999 |
| JP | 2000-17031 | A | 1/2000 |
| JP | 2002-40801 | A | 2/2002 |
| JP | 2002-89544 | A | 3/2002 |
| JP | 2002-214876 | A | 7/2002 |
| JP | 2002-214883 | A | 7/2002 |
| JP | 2002-310136 | A | 10/2002 |
| JP | 2003-140420 | A | 5/2003 |
| JP | 2003-316124 | A | 11/2003 |
| JP | 2004191640 | A * | 7/2004 |

OTHER PUBLICATIONS

Japanese Office Action (JP Application No. 2004-172322) dated Sep. 16, 2008 (4 pages).

Japanese Office Action (JP Application No. 2004-172365) dated Sep. 16, 2008 (4 pages).

Japanese Office Action (JP Application No. 2004-172659) dated Sep. 16, 2008 (4 pages).

Japanese Office Action (JP Application No. 2004-172742) dated Sep. 16, 2008 (4 pages).

Japanese Office Action (JP Application No. 2004-172845) dated Sep. 16, 2008 (4 pages).

Japanese Office Action (JP Application No. 2004-172915) dated Sep. 16, 2008 (4 pages).

* cited by examiner

DEVELOPING ROLLER, CHARGING ROLLER, CONDUCTIVE ROLLER AND METHOD FOR PRODUCING THE SAME

TECHNICAL FIELD

This invention relates to a conductive roller such as a developing roller, a charging roller or the like and a method for producing the same, and more particularly to a conductive roller used in an image forming apparatus such as an electrophotographic apparatus, e.g. a copying machine, a printer or the like, an electrostatic recording apparatus and so on.

BACKGROUND ART

In an image forming apparatus of an electro-photographic system such as a copying machine, a printer or the like, a pressurized developing method is known as a developing method in which toners are supplied to a photosensitive drum or the like carrying a latent image thereon and attached to the latent image of the photosensitive drum to visualize the latent image. In the pressurized developing method, for example, development is conducted by charging the photosensitive drum at a constant electric potential, then forming an electrostatic latent image on the photosensitive drum by an exposure machine, contacting a developing roller carrying toners with the photosensitive drum carrying the electrostatic latent image to attach the toners to the electrostatic latent image on the photosensitive drum.

Moreover, a corona discharge system has hitherto been adopted for charging the photosensitive drum. However, it is necessary to apply a high voltage of 6 to 10 kV in the corona discharge system, which is not preferable in view of ensuring the safety of the apparatus and is not also preferable environmentally since harmful substance such as ozone or the like occurs during corona discharge. On the contrary, there is proposed a contact charging system in which a charging roller is contacted with a photosensitive drum and a voltage is applied between the photosensitive drum and the charging roller to charge the photosensitive drum.

Since the developing roller in the pressurized developing method and the charging roller in the contact charging system must be surely held in contact with the photosensitive drum while rotating, they have a structure in which a semi-conductive elastic layer composed of a semi-conductive elastomer obtained by dispersing carbon black or metal powder into an elastomer such as silicone rubber, acrylonitrile-butadiene rubber (NBR), ethylene-propylene-diene rubber (EPDM), epichlorohydrin rubber (ECO) or the like or a foam formed by foaming such an elastomer is formed on the outer periphery of the shaft composed of a conductive material such as a metal or the like. Also, there is some case that a resin coating layer is further formed on the surface of the elastic layer for the purpose of controlling charging and adhesive properties to toner, preventing the elastic layer from contaminating the photosensitive drum and so on.

Furthermore, the conductive roller in which the semi-conductive elastic layer is formed on the outer periphery of the shaft and the resin coating layer is further formed on the surface of the elastic layer is used for a toner feed roller for feeding toners to the developing roller, a transfer roller for transferring toners attached to the latent image on the photosensitive drum to a recording medium, a cleaning roller for removing the remaining toners on the photosensitive drum after transferring and the like as well as the developing roller and the charging roller.

Heretofore, the resin coating layer in the conductive roller is formed by dipping a main body of the conductive roller comprising the shaft and the elastic layer into a solvent-based or a water-based coating liquid or spraying such a coating liquid onto the main body of the roller, and then drying and curing by heat or hot air. In this case, however, it is necessary to dry for a long time, so that its commercial production requires a long drying line. Moreover, although the resin coating layer requires subtle conductivity and surface condition depending on its application, since differences of a temperature distribution, an airflow amount and the like in the drying line have a large effect on the properties of the resin coating layer, there is a problem in quality. On the contrary, there is proposed a technique in which a resin coating layer comprising an ultraviolet-curing type resin is formed on the surface of the elastic layer of the conductive roller (see JP-A-2002-310136).

DISCLOSURE OF THE INVENTION

However, the above conductive roller in which the resin coating layer comprising the ultraviolet-curing type resin is disposed on the outer peripheral surface of the elastic layer has a problem that toners are easily stacked on the surface of the roller under some use conditions because the releasing property of the surface of the roller is low. Therefore, when an image forming apparatus incorporated with such a conductive roller is used for a long time, there is a problem that toner filming occurs on the surface of the conductive roller or surface resistance becomes high to easily cause faulty image.

Moreover, since the resin coating layer comprising the ultraviolet-curing type resin contains unreacted compound which is not cured by ultraviolet ray, it may contaminate the photosensitive drum. Particularly, when a carbon-based electron conductive agent is compounded for controlling an electric resistance of the resin coating layer, since the carbon-based electron conductive agent absorbs ultraviolet rays, there is a problem that the unreacted compound tends to remain.

Furthermore, although the conductive roller is preferable to uniformly hold a predetermined amount of toners on its surface, when a main body of the roller is made by charging a raw material for the elastic layer into a mold in which the shaft is disposed for improving productivity of the conductive roller by skipping a grinding step, the outer peripheral surface of the elastic layer becomes smooth just like a cavity surface of the mold and there is a problem that the resin coating layer formed thereon also becomes smooth.

Still furthermore, although the conductive roller in which the resin coating layer is disposed on the outer peripheral surface of the elastic layer is excellent in charging property to toner as compared with a conductive roller not having the resin coating layer, there is still a room for improvement and a conductive roller which is more excellent in the charging property to toner and can highly improve image quality is required.

Additionally, repellence may be caused between the elastic layer and the resin coating layer in the above-described conductive roller and adhesiveness therebetween may be bad. In this case, the resin coating layer is easily peeled from the elastic layer while the conductive roller is incorporated into a cartridge and driven, so that there is a problem in durability.

It is, therefore, the first object of the invention to provide a developing roller and a charging roller not requiring a long drying line for mass production, hardly causing filming due to toner adhesion or rise of resistance even if it is used for a long time, and being excellent in the durability.

Also, it is the second object of the invention to provide a developing roller and a charging roller not requiring a long drying line for mass production, not contaminating a photosensitive drum, hardly causing toner filming or rise of resistance even if it is used for a long time, and being excellent in durability.

Moreover, it is the third object of the invention to provide a conductive roller such as a developing roller or the like not requiring a long drying line for mass production and grinding step of an elastic layer, and having an adequate micro-unevenness on the surface of the resin coating layer.

Furthermore, it is the fourth object of the invention to provide a conductive roller being capable of skipping or shortening a drying step in mass production, having an improved charging property against toners or a photosensitive drum as compared with a conventional one and being capable of highly improving image quality.

Still furthermore, it is the fifth object of the invention to provide a method for producing a conductive roller by forming a resin coating layer on the surface of the elastic layer through ultraviolet or electron beam irradiation, which is capable of producing a conductive roller having a high durability by improving adhesiveness between the elastic layer and the resin coating layer.

The inventors have made various studies and discovered that the above objects can be achieved in the conductive roller having the resin coating layer disposed on the surface of the elastic layer by using an ultraviolet-curing type resin or an electron beam curing type resin and further devising a structure of the resin coating layer, including fluorine or silicon in the resin coating layer or including microparticles into the resin coating layer, or controlling the particle size of the microparticles, or forming the resin coating layer after the outer peripheral surface of the elastic layer is subjected to surface treatment, and as a result the invention has been accomplished.

That is, the first developing roller according to the invention comprises a shaft, an elastic layer formed on the outer periphery of the shaft and at least one resin coating layer formed on the outer peripheral surface of the elastic layer, and is characterized in that the resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and an ultraviolet-curing type resin.

There are the followings as a preferable embodiment of the first developing roller according to the invention:

(1) The ultraviolet non-curable fluorine-containing resin and/or compound is at least one selected from the group consisting of a fluorine-containing (metha)acrylate-based resin and compound and a fluorine-containing olefin-based resin and compound.

(2) The ultraviolet non-curable silicon-containing resin and/or compound is at least one selected from the group consisting of a silicon-containing (metha)acrylate-based resin and compound and a silicone resin.

(3) The ultraviolet-curing type resin is a fluorine-containing ultraviolet-curing type resin and/or a silicon-containing ultraviolet-curing type resin.

(4) The resin coating layer is formed by applying a coating liquid comprising the ultraviolet non-curable fluorine-containing resin and/or compound and an ultraviolet polymerizable resin and/or compound on the outer peripheral surface of the elastic layer and then curing the ultraviolet polymerizable resin and/or compound by ultraviolet irradiation.

(5) The resin coating layer is formed by applying a coating liquid comprising the ultraviolet non-curable silicon-containing resin and/or compound and an ultraviolet polymerizable resin and/or compound on the outer peripheral surface of the elastic layer and then curing the ultraviolet polymerizable resin and/or compound by ultraviolet irradiation.

(6) The coating liquid comprises a photo-polymerization initiator.

(7) The ultraviolet polymerizable resin and/or compound has an ultraviolet polymerizable carbon-carbon double bond.

(8) The resin and/or compound having the ultraviolet polymerizable carbon-carbon double bond does not contain fluorine and silicon.

(9) The resin and/or compound having the ultraviolet polymerizable carbon-carbon double bond and not containing fluorine and silicon is a (metha)acrylate monomer and/or oligomer.

(10) The resin and/or compound having the ultraviolet polymerizable carbon-carbon double bond contains fluorine and/or silicon.

(11) The resin and/or compound having the ultraviolet polymerizable carbon-carbon double bond and containing fluorine is at least one selected from the group consisting of compounds derived from a fluoroolefin and fluoro (metha) acrylates.

(12) The resin and/or compound having the ultraviolet polymerizable carbon-carbon double bond and containing silicon is at least one selected from the group consisting of both-terminal reactive silicone oils, one-terminal reactive silicone oils and (metha)acryloxy alkylsilanes.

Moreover, optional combinations of the above items (1)-(12) are also preferable embodiments of the first developing roller according to the invention, as far as they are not contradictory.

The second developing roller according to the invention comprises a shaft, an elastic layer formed on the outer periphery of the shaft and at least one microparticle-containing resin coating layer formed on the outer peripheral surface of the elastic layer and cured by ultraviolet irradiation, and is characterized in that a ratio a/b of a maximum particle size a of the microparticles in the microparticle-containing resin coating layer to a thickness b of the microparticle-containing resin coating layer is 1.0 to 5.0.

There are the followings as a preferable embodiment of the second developing roller according to the invention:

(1) The microparticle-containing resin coating layer contains fluorine and/or silicon.

(2) The microparticle-containing resin coating layer cured by ultraviolet irradiation is formed by heating to cure a remaining unreacted compound after the irradiation of ultraviolet ray.

(3) The microparticle-containing resin coating layer cured by ultraviolet irradiation is formed by microwave-heating to cure a remaining unreacted compound after the irradiation of ultraviolet ray.

(4) The microparticles have an average particle size of 1 to 30 μm.

(5) The microparticles have a particle size distribution within a range of 1 to 50 μm.

(6) The content of the microparticles is 0.1 to 100 parts by mass based on 100 parts by mass of the resin in the microparticle-containing resin coating layer.

(7) The thickness b of the microparticle-containing resin coating layer is 1 to 40 μm.

(8) The microparticles are microparticles composed of a rubber or a synthetic resin.

(9) The microparticles are at least one selected from the group consisting of silicone rubber microparticles, silicone resin microparticles, fluorocarbon resin microparticles, urethane elastomer microparticles, urethane acrylate microparticles, melamine resin microparticles, phenol resin microparticles, (metha)acrylate-based resin microparticles and styrene-based resin microparticles.

(10) The microparticles are glassy carbon microparticles.

(11) The microparticle-containing resin coating layer comprises a conductive agent.

(12) The content of the conductive agent is 0.01 to 20 parts by mass based on 100 parts by mass of the resin in the microparticle-containing resin coating layer.

(13) The elastic layer is formed by shaping in a mold, and the microparticle-containing resin coating layer is formed on the outer peripheral surface of the elastic layer without grinding its outer peripheral surface.

Moreover, optional combinations of the above items (1)-(13) are also preferable embodiments of the second developing roller according to the invention, as far as they are not contradictory.

The third developing roller according to the invention comprises a shaft, an elastic layer formed on the outer periphery of the shaft and at least one resin coating layer formed on the outer peripheral surface of the elastic layer, and is characterized in that the resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and an electron beam curing type resin.

There are the followings as a preferable embodiment of the third developing roller according to the invention:

(1) The electron beam non-curable fluorine-containing resin and/or compound is at least one selected from the group consisting of a fluorine-containing (metha)acrylate-based resin and compound and a fluorine-containing olefin-based resin and compound.

(2) The electron beam non-curable silicon-containing resin and/or compound is at least one selected from the group consisting of a silicon-containing (metha)acrylate-based resin and compound and a silicone resin.

(3) The electron beam curing type resin is a fluorine-containing electron beam curing type resin and/or a silicon-containing electron beam curing type resin.

(4) The resin coating layer comprises a carbon-based electron conductive agent.

(5) The resin coating layer has a thickness of 1 to 500 μm.

(6) The resin coating layer is obtained by applying a coating liquid comprising the electron beam non-curable fluorine-containing resin and/or compound and an electron beam polymerizable resin and/or compound on the outer peripheral surface of the elastic layer and then curing the electron beam polymerizable resin and/or compound by electron beam irradiation.

(7) The resin coating layer is obtained by applying a coating liquid comprising the electron beam non-curable silicon-containing resin and/or compound and an electron beam polymerizable resin and/or compound on the outer peripheral surface of the elastic layer and then curing the electron beam polymerizable resin and/or compound by electron beam irradiation.

(8) The electron beam polymerizable resin and/or compound has an electron beam polymerizable carbon-carbon double bond.

(9) The resin and/or compound having the electron beam polymerizable carbon-carbon double bond does not contain fluorine and silicon.

(10) The resin and/or compound having the electron beam polymerizable carbon-carbon double bond and containing no fluorine and silicon is a (metha)acrylate monomer and/or oligomer.

(11) The resin and/or compound having the electron beam polymerizable carbon-carbon double bond contains fluorine and/or silicon.

(12) The resin and/or compound having the electron beam polymerizable carbon-carbon double bond and containing fluorine is at least one selected from the group consisting of compounds derived from a fluoroolefin and fluoro (metha) acrylates.

(13) The resin and/or compound having the electron beam polymerizable carbon-carbon double bond and containing silicon is at least one selected from the group consisting of both-terminal reactive silicone oils, one-terminal reactive silicone oils and (metha)acryloxy alkylsilanes.

Moreover, optional combinations of the above items (1)-(13) are also preferable embodiments of the third developing roller according to the invention, as far as they are not contradictory.

The fourth developing roller according to the invention comprises a shaft, an elastic layer formed on the outer periphery of the shaft and at least one microparticle-containing resin coating layer formed on the outer peripheral surface of the elastic layer and cured by electron beam irradiation, and is characterized in that a ratio a/b of a maximum particle size a of the microparticles in the microparticle-containing resin coating layer to a thickness b of the microparticle-containing resin coating layer is 1.0 to 5.0.

There are the followings as a preferable embodiment of the fourth developing roller according to the invention:

(1) The microparticle-containing resin coating layer contains fluorine and/or silicon.

(2) The microparticle-containing resin coating layer cured by electron beam irradiation is formed by heating to cure a remaining unreacted compound after the irradiation of electron beam.

(3) The microparticle-containing resin coating layer cured by electron beam irradiation is formed by microwave-heating to cure a remaining unreacted compound after the irradiation of electron beam.

(4) The microparticles have an average particle size of 1 to 30 μm.

(5) The microparticles have a particle size distribution within a range of 1 to 50 μm.

(6) The content of the microparticles is 0.1 to 100 parts by mass based on 100 parts by mass of the resin in the microparticle-containing resin coating layer.

(7) The thickness b of the microparticle-containing resin coating layer is 1 to 40 μm.

(8) The microparticles are microparticles composed of a rubber or a synthetic resin.

(9) The microparticles are at least one selected from the group consisting of silicone rubber microparticles, silicone resin microparticles, fluorocarbon resin microparticles, urethane elastomer microparticles, urethane acrylate microparticles, melamine resin microparticles, phenol resin microparticles, (metha)acrylate-based resin microparticles and styrene-based resin microparticles.

(10) The microparticles are glassy carbon microparticles.

(11) The microparticle-containing resin coating layer comprises a conductive agent.

(12) The content of the conductive agent is 0.01 to 20 parts by mass based on 100 parts by mass of the resin in the microparticle-containing resin coating layer.

(13) The elastic layer is formed by shaping in a mold, and the microparticle-containing resin coating layer is formed on the outer peripheral surface of the elastic layer without grinding its outer peripheral surface.

Moreover, optional combinations of the above items (1)-(13) are also preferable embodiments of the fourth developing roller according to the invention, as far as they are not contradictory.

Also, the first charging roller according to the invention comprises a shaft, a non-foam elastic layer formed on the outer periphery of the shaft and at least one resin coating layer formed on the outer peripheral surface of the non-foam elastic layer, and is characterized in that the resin coating layer comprises an ultraviolet-curing type resin.

There are the followings as a preferable embodiment of the first charging roller according to the invention:

(1) The resin coating layer is obtained by applying a coating liquid comprising an ultraviolet polymerizable resin and/or compound on the outer peripheral surface of the non-foam elastic layer and then curing the ultraviolet polymerizable resin and/or compound by ultraviolet irradiation.

(2) The coating liquid comprises a photo-polymerization initiator.

(3) The ultraviolet polymerizable resin and/or compound has an ultraviolet polymerizable carbon-carbon double bond.

(4) The resin and/or compound having the ultraviolet polymerizable carbon-carbon double bond is a (metha)acrylate monomer and/or oligomer.

Moreover, optional combinations of the above items (1)-(4) are also preferable embodiments of the first charging roller according to the invention, as far as they are not contradictory.

The second charging roller according to the invention comprises a shaft, an elastic layer formed on the outer periphery of the shaft and at least one resin coating layer comprising an ultraviolet-curing type resin and formed on the outer peripheral surface of the elastic layer, and is characterized in that the resin coating layer comprises at least one selected from the group consisting of a fluorine-containing resin, a fluorine-containing compound, a silicon-containing resin and a silicon-containing compound.

There are the followings as a preferable embodiment of the second charging roller according to the invention:

(1) The resin coating layer comprises a fluorine-containing ultraviolet-curing type resin and/or a silicon-containing ultraviolet-curing type resin.

(2) The resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and an ultraviolet-curing type resin.

(3) The resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and a fluorine-containing ultraviolet-curing type resin and/or a silicon-containing ultraviolet-curing type resin.

(4) The fluorine-containing ultraviolet-curing type resin is at least one selected from the group consisting of a fluorine-containing poly(metha)acrylate-based resin and a fluorine-containing polyolefin-based resin.

(5) The ultraviolet non-curable fluorine-containing resin and/or compound is at least one selected from the group consisting of a fluorine-containing (metha)acrylate-based resin and compound and a fluorine-containing olefin-based resin and compound.

(6) The ultraviolet non-curable silicon-containing resin and/or compound is at least one selected from the group consisting of a silicon-containing (metha)acrylate-based resin and compound and a silicone resin.

(7) The resin coating layer is obtained by applying any one of (A) a coating liquid comprising the ultraviolet polymerizable fluorine-containing resin and/or compound, (B) a coating liquid comprising the ultraviolet non-curable fluorine-containing resin and/or compound and an ultraviolet polymerizable resin and/or compound containing no fluorine, and (C) a coating liquid comprising the ultraviolet non-curable fluorine-containing resin and/or compound and an ultraviolet polymerizable fluorine-containing resin and/or compound on the outer peripheral surface of the elastic layer and then curing the ultraviolet polymerizable resin and/or compound (which may contain fluorine or not) by ultraviolet irradiation.

(8) The resin coating layer is obtained by applying any one of (A) a coating liquid comprising the ultraviolet polymerizable silicon-containing resin and/or compound, (B) a coating liquid comprising the ultraviolet non-curable silicon-containing resin and/or compound and an ultraviolet polymerizable resin and/or compound containing no silicon, and (C) a coating liquid comprising the ultraviolet non-curable silicon-containing resin and/or compound and an ultraviolet polymerizable silicon-containing resin and/or compound on the outer peripheral surface of the elastic layer and then curing the ultraviolet polymerizable resin and/or compound (which may contain silicon or not) by ultraviolet irradiation.

(9) The coating liquid comprises a photo-polymerization initiator.

(10) The ultraviolet polymerizable resin and/or compound containing no fluorine and silicon has an ultraviolet polymerizable carbon-carbon double bond.

(11) The resin and/or compound having the ultraviolet polymerizable carbon-carbon double bond and containing no fluorine and silicon is a (metha)acrylate monomer and/or oligomer.

(12) The ultraviolet polymerizable fluorine-containing resin and/or compound has an ultraviolet polymerizable carbon-carbon double bond.

(13) The fluorine-containing resin and/or compound having the ultraviolet polymerizable carbon-carbon double bond is at least one selected from the group consisting of compounds derived from a fluoroolefin and fluoro (metha)acrylates.

(14) The ultraviolet polymerizable silicon-containing resin and/or compound has an ultraviolet polymerizable carbon-carbon double bond.

(15) The silicon-containing resin and/or compound having the ultraviolet polymerizable carbon-carbon double bond is at least one selected from the group consisting of both-terminal reactive silicone oils, one-terminal reactive silicone oils and (metha)acryloxy alkylsilanes.

Moreover, optional combinations of the above items (1)-(15) are also preferable embodiments of the second charging roller according to the invention, as far as they are not contradictory.

The third charging roller according to the invention comprises a shaft, a non-foam elastic layer formed on the outer periphery of the shaft and at least one resin coating layer formed on the outer peripheral surface of the non-foam elastic layer, and is characterized in that the resin coating layer comprises an electron beam curing type resin.

There are the followings as a preferable embodiment of the third charging roller according to the invention:

(1) The resin coating layer is obtained by applying a coating liquid comprising an electron beam polymerizable resin and/or compound on the outer peripheral surface of the non-foam elastic layer and then curing the electron beam polymerizable resin and/or compound by electron beam irradiation.

(2) The coating liquid comprises a photo-polymerization initiator.

(3) The electron beam polymerizable resin and/or compound has an electron beam polymerizable carbon-carbon double bond.

(4) The resin and/or compound having the electron beam polymerizable carbon-carbon double bond is a (metha)acrylate monomer and/or oligomer.

Moreover, optional combinations of the above items (1)-(4) are also preferable embodiments of the third charging roller according to the invention, as far as they are not contradictory.

The fourth charging roller according to the invention comprises a shaft, an elastic layer formed on the outer periphery of the shaft and at least one resin coating layer comprising an electron beam curing type resin and formed on the outer peripheral surface of the elastic layer.

There are the followings as a preferable embodiment of the fourth charging roller according to the invention:

(1) The resin coating layer comprises at least one selected from the group consisting of a fluorine-containing resin, a fluorine-containing compound, a silicon-containing resin and a silicon-containing compound.

(2) The resin coating layer comprises a fluorine-containing electron beam curing type resin and/or a silicon-containing electron beam curing type resin.

(3) The resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and an electron beam curing type resin.

(4) The resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and a fluorine-containing electron beam curable resin and/or a silicon-containing electron beam curing type resin.

(5) The fluorine-containing electron beam curing type resin is at least one selected from the group consisting of a fluorine-containing poly(metha)acrylate-based resin and a fluorine-containing polyolefin-based resin.

(6) The electron beam non-curable fluorine-containing resin and/or compound is at least one selected from the group consisting of a fluorine-containing (metha)acrylate-based resin and compound and a fluorine-containing olefin-based resin and compound.

(7) The electron beam non-curable silicon-containing resin and/or compound is at least one selected from the group consisting of a silicon-containing (metha)acrylate-based resin and compound and a silicone resin.

(8) The resin coating layer comprises a carbon-based electron conductive agent.

(9) The resin coating layer has a thickness of 1 to 500 μm.

(10) The resin coating layer is obtained by applying a coating liquid comprising an electron beam polymerizable resin and/or compound on the outer peripheral surface of the elastic layer and then curing the electron beam polymerizable resin and/or compound by electron beam irradiation.

(11) The electron beam polymerizable resin and/or compound has an electron beam polymerizable carbon-carbon double bond.

(12) The resin and/or compound having the electron beam polymerizable carbon-carbon double bond is a (metha)acrylate monomer and/or oligomer.

(13) The resin coating layer is obtained by applying any one of (A) a coating liquid comprising the electron beam polymerizable fluorine-containing resin and/or compound, (B) a coating liquid comprising the electron beam non-curable fluorine-containing resin and/or compound and an electron beam polymerizable resin and/or compound containing no fluorine, and (C) a coating liquid comprising the electron beam non-curable fluorine-containing resin and/or compound and an electron beam polymerizable fluorine-containing resin and/or compound on the outer peripheral surface of the elastic layer and then curing the electron beam polymerizable resin and/or compound (which may contain fluorine or not) by electron beam irradiation.

(14) The resin coating layer is obtained by applying any one of (A) a coating liquid comprising the electron beam polymerizable silicon-containing resin and/or compound, (B) a coating liquid comprising the electron beam non-curable silicon-containing resin and/or compound and an electron beam polymerizable resin and/or compound containing no silicon, and (C) a coating liquid comprising the electron beam non-curable silicon-containing resin and/or compound and an electron beam polymerizable silicon-containing resin and/or compound on the outer peripheral surface of the elastic layer and then curing the electron beam polymerizable resin and/or compound (which may contain silicon or not) by electron beam irradiation.

(15) The electron beam polymerizable resin and/or compound containing no fluorine and silicon has an electron beam polymerizable carbon-carbon double bond.

(16) The resin and/or compound having the electron beam polymerizable carbon-carbon double bond and containing no fluorine and silicon is a (metha)acrylate monomer and/or oligomer containing no fluorine and silicon.

(17) The electron beam polymerizable fluorine-containing resin and compound and the electron beam polymerizable silicon-containing resin and compound have an electron beam polymerizable carbon-carbon double bond.

(18) The fluorine-containing resin and/or compound having the electron beam polymerizable carbon-carbon double bond is at least one selected from the group consisting of compounds derived from a fluoroolefin and fluoro (metha) acrylates.

(19) The silicon-containing resin and/or compound having the electron beam polymerizable carbon-carbon double bond is at least one selected from the group consisting of both-terminal reactive silicone oils, one-terminal reactive silicone oils and (metha)acryloxy alkylsilanes.

Moreover, optional combinations of the above items (1)-(19) are also preferable embodiments of the fourth charging roller according to the invention, as far as they are not contradictory.

Furthermore, the first conductive roller according to the invention comprises a shaft, an elastic layer formed on the outer periphery of the shaft and a microparticle-containing resin coating layer formed on the outer peripheral surface of the elastic layer, and is characterized in that the microparticle-containing resin coating layer comprises an ultraviolet-curing type resin.

There are the followings as a preferable embodiment of the first conductive roller according to the invention:

(1) The microparticles in the microparticle-containing resin coating layer have an average particle size of 1 to 50 μm.

(2) The microparticle-containing resin coating layer comprises at least one selected from the group consisting of a fluorine-containing resin, a fluorine-containing compound, a silicon-containing resin and a silicon-containing compound.

(3) The microparticle-containing resin coating layer comprises a fluorine-containing ultraviolet-curing type resin and/or a silicon-containing ultraviolet-curing type resin.

(4) The microparticle-containing resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and an ultraviolet-curing type resin.

(5) The microparticle-containing resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and a fluorine-containing ultraviolet-curing type resin and/or a silicon-containing ultraviolet-curing type resin.

(6) The ultraviolet non-curable fluorine-containing resin and/or compound is at least one selected from the group consisting of a fluorine-containing (metha)acrylate-based resin and compound and a fluorine-containing olefin-based resin and compound.

(7) The ultraviolet non-curable silicon-containing resin and/or compound is at least one selected from the group consisting of a silicon-containing (metha)acrylate-based resin and compound and a silicone resin.

(8) The microparticle-containing resin coating layer is obtained by applying a coating liquid comprising the microparticles and an ultraviolet polymerizable resin and/or compound on the outer peripheral surface of the elastic layer and then curing the ultraviolet polymerizable resin and/or compound by ultraviolet irradiation.

(9) The ultraviolet polymerizable resin and/or compound has an ultraviolet polymerizable carbon-carbon double bond.

(10) The resin and/or compound having the ultraviolet polymerizable carbon-carbon double bond is a (metha)acrylate monomer and/or oligomer.

(11) The microparticle-containing resin coating layer comprising at least one selected from the group consisting of the fluorine-containing resin, the fluorine-containing compound, the silicon-containing resin and the silicon-containing compound is obtained by applying any one of (A) a coating liquid comprising the microparticles and at least one selected from the group consisting of the ultraviolet polymerizable fluorine-containing resin and compound and silicon-containing resin and compound, (B) a coating liquid comprising the microparticles, at least one selected from the group consisting of the ultraviolet non-curable fluorine-containing resin and compound and silicon-containing resin and compound, and an ultraviolet polymerizable resin and/or compound containing no fluorine and silicon, and (C) a coating liquid comprising the microparticles, at least one selected from the group consisting of the ultraviolet non-curable fluorine-containing resin and compound and silicon-containing resin and compound, and at least one selected from the group consisting of an ultraviolet polymerizable fluorine-containing resin and compound and silicon-containing resin and compound on the outer peripheral surface of the elastic layer and then curing at least any one of the ultraviolet polymerizable resins and compounds by ultraviolet irradiation.

(12) The ultraviolet polymerizable resin and/or compound containing no fluorine and silicon has an ultraviolet polymerizable carbon-carbon double bond.

(13) The resin and/or compound having the ultraviolet polymerizable carbon-carbon double bond and containing no fluorine and silicon is a (metha)acrylate monomer and/or oligomer containing no fluorine and silicon.

(14) The ultraviolet polymerizable fluorine-containing resin and/or compound has an ultraviolet polymerizable carbon-carbon double bond.

(15) The fluorine-containing resin and/or compound having the ultraviolet polymerizable carbon-carbon double bond is at least one selected from the group consisting of compounds derived from a fluoroolefin and fluoro (metha)acrylates.

(16) The ultraviolet polymerizable silicon-containing resin and/or compound has an ultraviolet polymerizable carbon-carbon double bond.

(17) The silicon-containing resin and/or compound having the ultraviolet polymerizable carbon-carbon double bond is at least one selected from the group consisting of both-terminal reactive silicone oils, one-terminal reactive silicone oils and (metha)acryloxy alkylsilanes.

(18) The coating liquid comprises a photo-polymerization initiator.

Moreover, optional combinations of the above items (1)-(18) are also preferable embodiments of the first conductive roller according to the invention, as far as they are not contradictory.

The second conductive roller according to the invention comprises a shaft, an elastic layer formed on the outer periphery of the shaft, a first resin coating layer having a volume resistivity of not more than $10^6$ Ω·cm and formed on the outer peripheral surface of the elastic layer and a second resin coating layer having a volume resistivity of not less than $10^{10}$ Ω·cm and formed on the outer peripheral surface of the first resin coating layer, and is characterized in that at least one of the first resin coating layer and the second resin coating layer comprises an ultraviolet-curing type resin.

There are the followings as a preferable embodiment of the second conductive roller according to the invention:

(1) The first resin coating layer comprises a conductive agent and the second resin coating layer does not comprise a conductive agent.

(2) The second resin coating layer comprises at least one selected from the group consisting of a fluorine-containing resin, a fluorine-containing compound, a silicon-containing resin and a silicon-containing compound.

(3) The second resin coating layer comprises a fluorine-containing ultraviolet-curing type resin and/or a silicon-containing ultraviolet-curing type resin.

(4) The second resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and an ultraviolet-curing type resin.

(5) The second resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and a fluorine-containing ultraviolet-curing type resin and/or a silicon-containing ultraviolet-curing type resin.

(6) The ultraviolet non-curable fluorine-containing resin and/or compound is at least one selected from the group consisting of a fluorine-containing (metha)acrylate-based resin and compound and a fluorine-containing olefin-based resin and compound.

(7) The ultraviolet non-curable silicon-containing resin and/or compound is at least one selected from the group consisting of a silicon-containing (metha)acrylate-based resin and compound and a silicone resin.

(8) The first resin coating layer is obtained by applying a coating liquid comprising the conductive agent and an ultraviolet polymerizable resin and/or compound on the outer peripheral surface of the elastic layer and then curing the ultraviolet polymerizable resin and/or compound by ultraviolet irradiation.

(9) The second resin coating layer is obtained by applying a coating liquid comprising an ultraviolet polymerizable resin and/or compound on the outer peripheral surface of the first resin coating layer and then curing the ultraviolet polymerizable resin and/or compound by ultraviolet irradiation.

(10) The ultraviolet polymerizable resin and/or compound has an ultraviolet polymerizable carbon-carbon double bond.

(11) The resin and/or compound having the ultraviolet polymerizable carbon-carbon double bond is a (metha)acrylate monomer and/or oligomer.

(12) The second resin coating layer comprising at least one selected from the group consisting of the fluorine-containing resin, the fluorine-containing compound, the silicon-containing resin and the silicon-containing compound is obtained by applying any one of (A) a coating liquid comprising at least one selected from the group consisting of the ultraviolet polymerizable fluorine-containing resin and compound and silicon-containing resin and compound, (B) a coating liquid comprising at least one selected from the group consisting of the ultraviolet non-curable fluorine-containing resin and compound and silicon-containing resin and compound, and an ultraviolet polymerizable resin and/or compound containing no fluorine and silicon, and (C) a coating liquid comprising at least one selected from the group consisting of the ultraviolet non-curable fluorine-containing resin and compound and silicon-containing resin and compound, and at least one selected from the group consisting of an ultraviolet polymerizable fluorine-containing resin and compound and silicon-containing resin and compound on the outer peripheral surface of the first resin coating layer and then curing at least any one of the ultraviolet polymerizable resins and compounds by ultraviolet irradiation.

(13) The ultraviolet polymerizable resin and/or compound containing no fluorine and silicon has an ultraviolet polymerizable carbon-carbon double bond.

(14) The resin and/or compound having the ultraviolet polymerizable carbon-carbon double bond and containing no fluorine and silicon is a (metha)acrylate monomer and/or oligomer containing no fluorine and silicon.

(15) The ultraviolet polymerizable fluorine-containing resin and/or compound has an ultraviolet polymerizable carbon-carbon double bond.

(16) The fluorine-containing resin and/or compound having the ultraviolet polymerizable carbon-carbon double bond is at least one selected from the group consisting of compounds derived from a fluoroolefin and fluoro (metha)acrylates.

(17) The ultraviolet polymerizable silicon-containing resin and/or compound has an ultraviolet polymerizable carbon-carbon double bond.

(18) The silicon-containing resin and/or compound having the ultraviolet polymerizable carbon-carbon double bond is at least one selected from the group consisting of both-terminal reactive silicone oils, one-terminal reactive silicone oils and (metha)acryloxy alkylsilanes.

(19) The coating liquid comprises a photo-polymerization initiator.

Moreover, optional combinations of the above items (1)-(19) are also preferable embodiments of the second conductive roller according to the invention, as far as they are not contradictory.

The third conductive roller according to the invention comprises a shaft, an elastic layer formed on the outer periphery of the shaft, a microparticle-containing resin coating layer formed on the outer peripheral surface of the elastic layer and a protective layer formed on the outer peripheral surface of the microparticle-containing resin coating layer, and is characterized in that at least one of the microparticle-containing resin coating layer and the protective layer comprises an ultraviolet-curing type resin.

There are the followings as a preferable embodiment of the third conductive roller according to the invention:

(1) The microparticles in the microparticle-containing resin coating layer have an average particle size of 1 to 50 μm.

(2) The protective layer comprises at least one selected from the group consisting of a fluorine-containing resin, a fluorine-containing compound, a silicon-containing resin and a silicon-containing compound.

(3) The protective layer comprises a fluorine-containing ultraviolet-curing type resin and/or a silicon-containing ultraviolet-curing type resin.

(4) The protective layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and an ultraviolet-curing type resin.

(5) The protective layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and a fluorine-containing ultraviolet-curing type resin and/or a silicon-containing ultraviolet-curing type resin.

(6) The ultraviolet non-curable fluorine-containing resin and/or compound is at least one selected from the group consisting of a fluorine-containing (metha)acrylate-based resin and compound and a fluorine-containing olefin-based resin and compound.

(7) The ultraviolet non-curable silicon-containing resin and/or compound is at least one selected from the group consisting of a silicon-containing (metha)acrylate-based resin and compound and a silicone resin.

(8) The microparticle-containing resin coating layer is obtained by applying a coating liquid comprising the microparticles and an ultraviolet polymerizable resin and/or compound on the outer peripheral surface of the elastic layer and then curing the ultraviolet polymerizable resin and/or compound by ultraviolet irradiation.

(9) The protective layer is obtained by applying a coating liquid comprising an ultraviolet polymerizable resin and/or compound on the outer peripheral surface of the microparticle-containing resin coating layer and then curing the ultraviolet polymerizable resin and/or compound by ultraviolet irradiation.

(10) The ultraviolet polymerizable resin and/or compound has an ultraviolet polymerizable carbon-carbon double bond.

(11) The resin and/or compound having the ultraviolet polymerizable carbon-carbon double bond is a (metha)acrylate monomer and/or oligomer.

(12) The protective layer comprising at least one selected from the group consisting of the fluorine-containing resin, the fluorine-containing compound, the silicon-containing resin and the silicon-containing compound is obtained by applying any one of (A) a coating liquid comprising at least one selected from the group consisting of the ultraviolet polymerizable fluorine-containing resin and compound and silicon-containing resin and compound, (B) a coating liquid comprising at least one selected from the group consisting of the ultraviolet non-curable fluorine-containing resin and compound and silicon-containing resin and compound, and an ultraviolet polymerizable resin and/or compound containing no fluorine and silicon, and (C) a coating liquid comprising at least one selected from the group consisting of the ultraviolet non-curable fluorine-containing resin and compound and silicon-containing resin and compound, and at least one selected from the group consisting of an ultraviolet polymerizable fluorine-containing resin and compound and silicon-containing resin and compound on the outer peripheral surface of the microparticle-containing resin coating layer and then curing at least any one of the ultraviolet polymerizable resins and compounds by ultraviolet irradiation.

(13) The ultraviolet polymerizable resin and/or compound containing no fluorine and silicon has an ultraviolet polymerizable carbon-carbon double bond.

(14) The resin and/or compound having the ultraviolet polymerizable carbon-carbon double bond containing no fluorine and silicon is a (metha)acrylate monomer and/or oligomer containing no fluorine and silicon.

(15) The ultraviolet polymerizable fluorine-containing resin and/or compound has an ultraviolet polymerizable carbon-carbon double bond.

(16) The fluorine-containing resin and/or compound having the ultraviolet polymerizable carbon-carbon double bond is at least one selected from the group consisting of compounds derived from a fluoroolefin and fluoro (metha)acrylates.

(17) The ultraviolet polymerizable silicon-containing resin and/or compound has an ultraviolet polymerizable carbon-carbon double bond.

(18) The silicon-containing resin and/or compound having the ultraviolet polymerizable carbon-carbon double bond is at least one selected from the group consisting of both-terminal reactive silicone oils, one-terminal reactive silicone oils and (metha)acryloxy alkylsilanes.

(19) The coating liquid comprises a photo-polymerization initiator.

Moreover, optional combinations of the above items (1)-(19) are also preferable embodiments of the third conductive roller according to the invention, as far as they are not contradictory.

The fourth conductive roller according to the invention comprises a shaft, an elastic layer formed on the outer periphery of the shaft and a microparticle-containing resin coating layer formed on the outer peripheral surface of the elastic layer, and is characterized in that the microparticle-containing resin coating layer comprises an electron beam curing type resin.

There are the followings as a preferable embodiment of the fourth conductive roller according to the invention:

(1) The microparticles in the microparticle-containing resin coating layer have an average particle size of 1 to 50 μm.

(2) The microparticle-containing resin coating layer comprises at least one selected from the group consisting of a fluorine-containing resin, a fluorine-containing compound, a silicon-containing resin and a silicon-containing compound.

(3) The microparticle-containing resin coating layer comprises a fluorine-containing electron beam curing type resin and/or a silicon-containing electron beam curing type resin.

(4) The microparticle-containing resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and an electron beam curing type resin.

(5) The microparticle-containing resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and a fluorine-containing electron beam curing type resin and/or a silicon-containing electron beam curing type resin.

(6) The electron beam non-curable fluorine-containing resin and/or compound is at least one selected from the group consisting of a fluorine-containing (metha)acrylate-based resin and compound and a fluorine-containing olefin-based resin and compound.

(7) The electron beam non-curable silicon-containing resin and/or compound is at least one selected from the group consisting of a silicon-containing (metha)acrylate-based resin and compound and a silicone resin.

(8) The microparticle-containing resin coating layer is obtained by applying a coating liquid comprising the microparticles and an electron beam polymerizable resin and/or compound on the outer peripheral surface of the elastic layer and then curing the electron beam polymerizable resin and/or compound by electron beam irradiation.

(9) The electron beam polymerizable resin and/or compound has an electron beam polymerizable carbon-carbon double bond.

(10) The resin and/or compound having the electron beam polymerizable carbon-carbon double bond is a (metha)acrylate monomer and/or oligomer.

(11) The microparticle-containing resin coating layer comprising at least one selected from the group consisting of the fluorine-containing resin, the fluorine-containing compound, the silicon-containing resin and the silicon-containing compound is obtained by applying any one of (A) a coating liquid comprising the microparticles and at least one selected from the group consisting of the electron beam polymerizable fluorine-containing resin and compound and silicon-containing resin and compound, (B) a coating liquid comprising the microparticles, at least one selected from the group consisting of the electron beam non-curable fluorine-containing resin and compound and silicon-containing resin and compound, and an electron beam polymerizable resin and/or compound containing no fluorine and silicon, and (C) a coating liquid comprising the microparticles, at least one selected from the group consisting of the electron beam non-curable fluorine-containing resin and compound and silicon-containing resin and compound, and at least one selected from the group consisting of an electron beam polymerizable fluorine-containing resin and compound and silicon-containing resin and compound on the outer peripheral surface of the elastic layer and then curing at least any one of the electron beam polymerizable resins and compounds by electron beam irradiation.

(12) The electron beam polymerizable resin and/or compound containing no fluorine and silicon has an electron beam polymerizable carbon-carbon double bond.

(13) The resin and/or compound having the electron beam polymerizable carbon-carbon double bond and containing no fluorine and silicon is a (metha)acrylate monomer and/or oligomer containing no fluorine and silicon.

(14) The electron beam polymerizable fluorine-containing resin and/or compound has an electron beam polymerizable carbon-carbon double bond.

(15) The fluorine-containing resin and/or compound having the electron beam polymerizable carbon-carbon double bond is at least one selected from the group consisting of compounds derived from a fluoroolefin and fluoro (metha) acrylates.

(16) The electron beam polymerizable silicon-containing resin and/or compound has an electron beam polymerizable carbon-carbon double bond.

(17) The silicon-containing resin and/or compound having the electron beam polymerizable carbon-carbon double bond is at least one selected from the group consisting of both-terminal reactive silicone oils, one-terminal reactive silicone oils and (metha)acryloxy alkylsilanes.

(18) The microparticle-containing resin coating layer comprises a carbon-based electron conductive agent.

Moreover, optional combinations of the above items (1)-(18) are also preferable embodiments of the fourth conductive roller according to the invention, as far as they are not contradictory.

The fifth conductive roller according to the invention comprises a shaft, an elastic layer formed on the outer periphery of the shaft, a first resin coating layer having a volume resistivity of not more than $10^6$ Ω·cm and formed on the outer peripheral surface of the elastic layer and a second resin coating layer having a volume resistivity of not less than $10^{10}$ Ω·cm and formed on the outer peripheral surface of the first resin coating layer, and is characterized in that at least one of the first resin coating layer and the second resin coating layer comprises an electron beam curing type resin.

There are the followings as a preferable embodiment of the fifth conductive roller according to the invention:

(1) The first resin coating layer comprises a conductive agent and the second resin coating layer does not comprise a conductive agent.

(2) The second resin coating layer comprises at least one selected from the group consisting of a fluorine-containing resin, a fluorine-containing compound, a silicon-containing resin and a silicon-containing compound.

(3) The second resin coating layer comprises a fluorine-containing electron beam curing type resin and/or a silicon-containing electron beam curing type resin.

(4) The second resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and an electron beam curing type resin.

(5) The second resin coating layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and a fluorine-containing electron beam curable resin and/or a silicon-containing electron beam curing type resin.

(6) The electron beam non-curable fluorine-containing resin and/or compound is at least one selected from the group consisting of a fluorine-containing (metha)acrylate-based resin and compound and a fluorine-containing olefin-based resin and compound.

(7) The electron beam non-curable silicon-containing resin and/or compound is at least one selected from the group consisting of a silicon-containing (metha)acrylate-based resin and compound and a silicone resin.

(8) The first resin coating layer is obtained by applying a coating liquid comprising the conductive agent and an electron beam polymerizable resin and/or compound on the outer peripheral surface of the elastic layer and then curing the electron beam polymerizable resin and/or compound by electron beam irradiation.

(9) The second resin coating layer is obtained by applying a coating liquid comprising an electron beam polymerizable resin and/or compound on the outer peripheral surface of the first resin coating layer and then curing the electron beam polymerizable resin and/or compound by electron beam irradiation.

(10) The electron beam polymerizable resin and/or compound has an electron beam polymerizable carbon-carbon double bond.

(11) The resin and/or compound having the electron beam polymerizable carbon-carbon double bond is a (metha)acrylate monomer and/or oligomer.

(12) The second resin coating layer comprising at least one selected from the group consisting of the fluorine-containing resin, the fluorine-containing compound, the silicon-containing resin and the silicon-containing compound is obtained by applying any one of (A) a coating liquid comprising at least one selected from the group consisting of the electron beam polymerizable fluorine-containing resin and compound and silicon-containing resin and compound, (B) a coating liquid comprising at least one selected from the group consisting of the electron beam non-curable fluorine-containing resin and compound and silicon-containing resin and compound, and an electron beam polymerizable resin and/or compound containing no fluorine and silicon, and (C) a coating liquid comprising at least one selected from the group consisting of the electron beam non-curable fluorine-containing resin and compound and silicon-containing resin and compound, and at least one selected from the group consisting of an electron beam polymerizable fluorine-containing resin and compound and silicon-containing resin and compound on the outer peripheral surface of the first resin coating layer and then curing at least any one of the electron beam polymerizable resins and compounds by electron beam irradiation.

(13) The electron beam polymerizable resin and/or compound containing no fluorine and silicon has an electron beam polymerizable carbon-carbon double bond.

(14) The resin and/or compound having the electron beam polymerizable carbon-carbon double bond and containing no fluorine and silicon is a (metha)acrylate monomer and/or oligomer containing no fluorine and silicon.

(15) The electron beam polymerizable fluorine-containing resin and/or compound has an electron beam polymerizable carbon-carbon double bond.

(16) The fluorine-containing resin and/or compound having the electron beam polymerizable carbon-carbon double bond is at least one selected from the group consisting of compounds derived from a fluoroolefin and fluoro (metha) acrylates.

(17) The electron beam polymerizable silicon-containing resin and/or compound has an electron beam polymerizable carbon-carbon double bond.

(18) The silicon-containing resin and/or compound having the electron beam polymerizable carbon-carbon double bond is at least one selected from the group consisting of both-terminal reactive silicone oils, one-terminal reactive silicone oils and (metha)acryloxy alkylsilanes.

(19) The conductive agent included in the first resin coating layer is a carbon-based electron conductive agent.

Moreover, optional combinations of the above items (1)-(19) are also preferable embodiments of the fifth conductive roller according to the invention, as far as they are not contradictory.

The sixth conductive roller according to the invention comprises a shaft, an elastic layer formed on the outer periphery of the shaft, a microparticle-containing resin coating layer formed on the outer peripheral surface of the elastic layer and a protective layer formed on the outer peripheral surface of the microparticle-containing resin coating layer, and is characterized in that at least one of the microparticle-containing resin coating layer and the protective layer comprises an electron beam curing type resin.

There are the followings as a preferable embodiment of the sixth conductive roller according to the invention:

(1) The microparticles in the microparticle-containing resin coating layer have an average particle size of 1 to 50 μm.

(2) The protective layer comprises at least one selected from the group consisting of a fluorine-containing resin, a fluorine-containing compound, a silicon-containing resin and a silicon-containing compound.

(3) The protective layer comprises a fluorine-containing electron beam curable resin and/or a silicon-containing electron beam curable resin.

(4) The protective layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and an electron beam curing type resin.

(5) The protective layer comprises at least one selected from the group consisting of an electron beam non-curable fluorine-containing resin, an electron beam non-curable fluorine-containing compound, an electron beam non-curable silicon-containing resin and an electron beam non-curable silicon-containing compound, and a fluorine-containing electron beam curing type resin and/or a silicon-containing electron beam curing type resin.

(6) The electron beam non-curable fluorine-containing resin and/or compound is at least one selected from the group consisting of a fluorine-containing (metha)acrylate-based resin and compound and a fluorine-containing olefin-based resin and compound.

(7) The electron beam non-curable silicon-containing resin and/or compound is at least one selected from the group consisting of a silicon-containing (metha)acrylate-based resin and compound and a silicone resin.

(8) The microparticle-containing resin coating layer is obtained by applying a coating liquid comprising the microparticles and an electron beam polymerizable resin and/or compound on the outer peripheral surface of the elastic layer and then curing the electron beam polymerizable resin and/or compound by electron beam irradiation.

(9) The protective layer is obtained by applying a coating liquid comprising an electron beam polymerizable resin and/or compound on the outer peripheral surface of the microparticle-containing resin coating layer and then curing the electron beam polymerizable resin and/or compound by electron beam irradiation.

(10) The electron beam polymerizable resin and/or compound has an electron beam polymerizable carbon-carbon double bond.

(11) The resin and/or compound having the electron beam polymerizable carbon-carbon double bond is a (metha)acrylate monomer and/or oligomer.

(12) The protective layer comprising at least one selected from the group consisting of the fluorine-containing resin, the fluorine-containing compound, the silicon-containing resin and the silicon-containing compound is obtained by applying any one of (A) a coating liquid comprising at least one selected from the group consisting of the electron beam polymerizable fluorine-containing resin and compound and silicon-containing resin and compound, (B) a coating liquid comprising at least one selected from the group consisting of the electron beam non-curable fluorine-containing resin and compound and silicon-containing resin and compound, and an electron beam polymerizable resin and/or compound containing no fluorine and silicon, and (C) a coating liquid comprising at least one selected from the group consisting of the electron beam non-curable fluorine-containing resin and compound and silicon-containing resin and compound, and at least one selected from the group consisting of an electron beam polymerizable fluorine-containing resin and compound and silicon-containing resin and compound on the outer peripheral surface of the microparticle-containing resin coating layer and then curing at least any one of the electron beam polymerizable resins and compounds by electron beam irradiation.

(13) The electron beam polymerizable resin and/or compound containing no fluorine and silicon has an electron beam polymerizable carbon-carbon double bond.

(14) The resin and/or compound having the electron beam polymerizable carbon-carbon double bond and containing no fluorine and silicon is a (metha)acrylate monomer and/or oligomer containing no fluorine and silicon.

(15) The electron beam polymerizable fluorine-containing resin and/or compound has an electron beam polymerizable carbon-carbon double bond.

(16) The fluorine-containing resin and/or compound having the electron beam polymerizable carbon-carbon double bond is at least one selected from the group consisting of compounds derived from a fluoroolefin and fluoro (metha) acrylates.

(17) The electron beam polymerizable silicon-containing resin and/or compound has an electron beam polymerizable carbon-carbon double bond.

(18) The silicon-containing resin and/or compound having the electron beam polymerizable carbon-carbon double bond is at least one selected from the group consisting of both-terminal reactive silicone oils, one-terminal reactive silicone oils and (metha)acryloxy alkylsilanes.

(19) At least any one of the microparticle-containing resin coating layer and the protective layer comprises a carbon-based electron conductive agent.

Moreover, optional combinations of the above items (1)-(19) are also preferable embodiments of the sixth conductive roller according to the invention, as far as they are not contradictory.

Still furthermore, the first method for producing a conductive roller comprising a shaft, an elastic layer formed on the outer periphery of the shaft and at least one resin coating layer formed on the outer peripheral surface of the elastic layer according to the invention is characterized by comprising the steps of:

(i) subjecting the outer peripheral surface of the elastic layer to surface treatment;

(ii) applying a coating liquid comprising an ultraviolet curing type resin on the outer peripheral surface of the elastic layer; and (iii) irradiating ultraviolet rays to cure the resin to form the resin coating layer.

There are the followings as a preferable embodiment of the first method for producing the conductive roller according to the invention:

(1) The surface treatment is a corona treatment.

(2) The surface treatment is a plasma treatment.

(3) The coating liquid is solventless.

Moreover, optional combinations of the above items (1)-(3) are also preferable embodiments of the first method for producing the conductive roller according to the invention, as far as they are not contradictory.

The second method for producing a conductive roller comprising a shaft, an elastic layer formed on the outer periphery of the shaft and at least one resin coating layer formed on the outer peripheral surface of the elastic layer according to the invention is characterized by comprising the steps of:

(i) subjecting the outer peripheral surface of the elastic layer to surface treatment;

(ii) applying a coating liquid comprising an electron beam curing type resin on the outer peripheral surface of the elastic layer; and (iii) irradiating electron beam to cure the resin to form the resin coating layer.

There are the followings as a preferable embodiment of the second method for producing the conductive roller according to the invention:

(1) The surface treatment is a corona treatment.

(2) The surface treatment is a plasma treatment.

(3) The coating liquid is solventless.

Moreover, optional combinations of the above items (1)-(3) are also preferable embodiments of the second method for producing the conductive roller according to the invention, as far as they are not contradictory.

In the invention, the ultraviolet curable resin means the ultraviolet polymerizable rein and/or compound cured by ultraviolet irradiation.

In the invention, the electron beam curing type resin means the electron beam polymerizable rein and/or compound cured by electron beam irradiation, and particularly a resin obtained by progressing self-crosslinking with energy of the electron beam irradiation even without using a crosslinking agent, a photo-polymerization initiator or a photo-polymerization accelerator. Moreover, the electron beam polymerizable rein and compound in the invention mean a resin and an oligomer having an electron beam sensitive (metha)acryloyl group of not less than 0.01, preferably not less than 0.1 per 1,000 of molecular weight as well as a (metha)acrylate having at least one (metha)acryloyl group in its molecule. Furthermore, the electron beam non-curable resin and compound mean a resin and compound having an electron beam sensitive (metha) acryloyl group of 0 to less than 0.01, and preferably near 0.

In the invention, the thickness b of the microparticle-containing resin coating layer means an average thickness of the microparticle-containing resin coating layer in the developing roller. Moreover, the average thickness is an average value of the layer thickness at 10 points, and the measurement of the layer thickness is carried out by cutting the developing roller provided with the surface layer and measuring with a microscope.

BEST MODE FOR CARRYING OUT THE INVENTION

Figure 1:
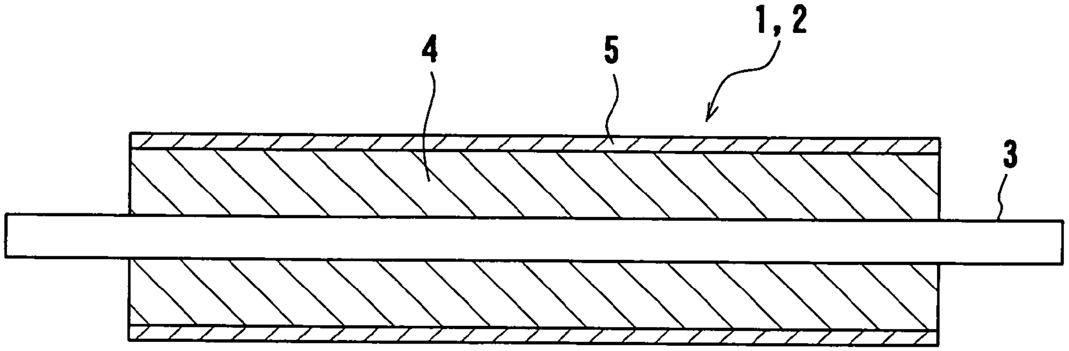
FIG. 1 is a sectional view of an embodiment of the first and third developing rollers and the first to fourth charging rollers according to the invention.

The developing roller, the charging roller and the conductive roller according to the invention will be described in detail below with reference to the figures. FIG. 1 is a sectional view of an embodiment of the first and third developing rollers and the first to fourth charging rollers according to the invention. The developing roller 1 and the charging roller 2 in the illustrated embodiment comprise a shaft 3, an elastic layer 4 formed on the outer periphery of the shaft 3 and a resin coating layer 5 formed on the outer peripheral surface of the elastic layer 4. Although the resin coating layer 5 is composed of one layer in FIG. 1, the resin coating layer 5 of the developing roller and the charging roller according to the invention may be composed of two or more layers.

In the first and third developing rollers according to the invention, the resin coating layer 5 comprises at least one selected from the group consisting of an ultraviolet non-curable or electron beam non-curable fluorine-containing resin and compound and silicon-containing resin and compound, and an ultraviolet-curing type resin, and has a small amount of toners attached onto the surface thereof since a surface energy of the ultraviolet non-curable or electron beam non-curable fluorine-containing resin and compound and silicon-containing resin and compound is low, hardly causes toner filming and rise of resistance even if it is used for a long time, and is excellent in the durability. Although the fluorine-containing resin and compound and silicon-containing resin and compound are incompatible with the elastic layer 4 and are inferior in the adhesiveness with the elastic layer 4 as compared with a commonly used resin, since the surface energy of the ultraviolet non-curable or electron beam non-curable fluorine-containing resin and compound and silicon-containing resin and compound in the developing roller and the charging roller is lower than that of a normal ultraviolet curable or electron beam curable rein, the ultraviolet non-curable or electron beam non-curable fluorine-containing resin and compound and silicon-containing resin and compound tend to be unevenly distributed to the surface side (that is a side not contacting the elastic layer 4) of the resin coating layer 5, and as a result, the content of the ultraviolet non-curable or electron beam non-curable fluorine-containing resin and compound and silicon-containing resin and compound in a side of the resin coating layer 5 contacting the elastic layer 4 is lowered and the adhesiveness between the resin coating layer 5 and the elastic layer 4 is improved. Moreover, as a result of unevenly distributing the ultraviolet non-curable or electron beam non-curable fluorine-containing resin and compound and silicon-containing resin and compound to the surface side of the resin coating layer 5, the releasing property of the resin coating layer 5 against toners is improved. Furthermore, even if the content of the ultraviolet non-curable or electron beam non-curable fluorine-containing resin and compound and silicon-containing resin and compound in the resin coating layer 5 is decreased, since the ultraviolet non-curable or electron beam non-curable fluorine-containing resin and compound and silicon-containing resin and compound are unevenly distributed to the surface side of the resin coating layer 5, the releasing property of the resin coating layer 5 against toners can be sufficiently maintained and the content of the expensive fluorine-containing resin and compound and silicon-containing resin and compound can be also decreased while the adhesiveness between the resin coating layer 5 and the elastic layer 4 is improved.

In the first and third charging rollers 2 according to the invention, the resin coating layer 5 is mainly composed of the ultraviolet-curing type resin or the electron beam curing type resin, so that it is unnecessary to conduct the drying for a long time in the formation of the resin coating layer 5, and hence it is unnecessary to provide a long drying line for mass production. That is, since the resin coating layer 5 of the first and third charging rollers 2 according to the invention is formed by, for example, applying the coating liquid comprising the ultraviolet or electron beam polymerizable resin and/or compound on the outer peripheral surface of the non-foam elastic layer 4 and then curing the ultraviolet or electron beam polymerizable resin and/or compound by ultraviolet ray or electron beam irradiation, the drying step is not essential. Moreover, since the resin coating layer 5 is formed at the step of irradiating ultraviolet ray or electron beam, the scattering of the properties in the resin coating layer 5 due to differences of a temperature distribution, an airflow amount and the like in the drying line can be eliminated.

In the second and fourth charging rollers 2 according to the invention, the resin coating layer 5 is mainly composed of the ultraviolet-curing type resin or the electron beam curing type resin, so that it is unnecessary to conduct the drying for a long time in the formation of the resin coating layer 5, and hence it is unnecessary to provide a long drying line for mass production. That is, since the resin coating layer 5 of the second and fourth charging rollers 2 according to the invention is formed by, for example, applying the coating liquid comprising the ultraviolet or electron beam polymerizable resin and/or compound on the outer peripheral surface of the elastic layer 4 and then curing the ultraviolet or electron beam polymerizable resin and/or compound by ultraviolet or electron beam irradiation, the drying step is not essential. Moreover, since the resin coating layer 5 is formed at the step of irradiating ultraviolet ray or electron beam, the scattering of the properties in the resin coating layer 5 due to differences of a temperature distribution, an airflow amount and the like in the drying line can be eliminated. Moreover, in a preferable embodiment of the second and fourth charging rollers 2 according to the invention, since the resin coating layer comprises at least one selected from the group consisting of the fluorine-containing resin, the fluorine-containing compound, the silicon-containing resin and the silicon-containing compound (which may be ultraviolet curable, ultraviolet non-curable, electron beam curable or electron beam non-curable) and its surface energy is low, the amount of toners attached thereon is small, and it is hardly worn even if it is used for a long time and is excellent in the durability.

Moreover, since the resin coating layer 5 is formed by electron beam irradiation in the fourth charging roller 2 according to the invention, an unreacted compound is prevented from remaining by optimizing a dose of the electron beam. Also, a crosslinking density of the resin coating layer 5 can be controlled by regulating an accelerating voltage of the electron beam. Furthermore, since the electron beam is hardly absorbed in a carbon-based electron conductive agent, even if the carbon-based electron conductive agent is used for the resin coating layer 5, the electron beam curing type resin can be sufficiently produced by electron beam irradiation and the unreacted compound can be prevented from remaining.

Figure 2:
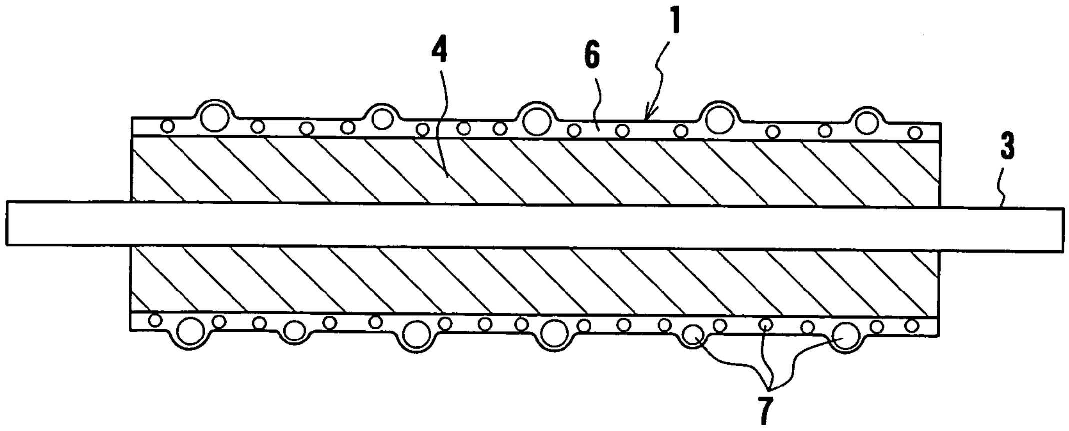
FIG. 2 is a sectional view of an embodiment of the second and fourth developing rollers according to the invention.

FIG. 2 is a sectional view of an embodiment of the second and fourth developing rollers according to the invention. The developing roller 1 of the illustrated embodiment comprises a shaft 3, an elastic layer 4 formed on the outer periphery of the shaft 3 and a microparticle-containing resin coating layer 6 formed on the outer peripheral surface of the elastic layer 4. The microparticle-containing resin coating layer 6 comprises microparticles 7 and formed by curing with ultraviolet or electron beam irradiation.

In the second and fourth developing rollers according to the invention, the micro-unevenness is properly formed on the surface of the microparticle-containing resin coating layer 6 by properly controlling the concentration and particle size of the microparticles 7 in the microparticle-containing resin coating layer 6, and a predetermined amount of toners can be evenly held on the outer peripheral surface. As described in more detail, although the microparticles 7 are dispersed in the microparticle-containing resin coating layer 6 for the purpose of giving the desired unevenness onto the surface in order to improve a toner supporting property of the surface of the developing roller 1, when the thickness of the microparticle-containing resin coating layer 6 is larger than the particle size of the microparticles 7, the unevenness may not be sufficiently formed on the surface of the microparticle-containing resin coating layer 6. The inventors have noticed this point, and made various studies and achieved to give an optimum unevenness for supporting toners on the surface of the developing roller 1 and as a result, the invention has been accomplished. Concretely, when a maximum particle diameter of the microparticles dispersed is smaller than the thickness of the microparticle-containing resin coating layer, the microparticles may be buried in the microparticle-containing resin coating layer and the desired unevenness cannot be obtained on the surface in some dispersing condition of the microparticles in the microparticle-containing resin coating layer. On the other hand, the microparticles having the particle size larger than the thickness of the microparticle-containing resin coating layer are projected from the surface of the microparticle-containing resin coating layer while having a thin resin coating thereon in some particle size distribution of the microparticles dispersed in the microparticle-containing resin coating layer, and as a result, the unevenness suitable for supporting toners can be given to the surface of the microparticle-containing resin coating layer, i.e. the surface of the developing roller. Moreover, even in the microparticles having the particle size larger than the thickness of the microparticle-containing resin coating layer, they are coated with the resin on its surface by being sufficiently dispersed into the resin although the coating is thin as described above, the microparticles do not drop off from the surface of the microparticle-containing resin coating layer by a sliding force loaded in the use as a developing roller. When the maximum particle size of the microparticles dispersed in the microparticle-containing resin coating layer is a and the thickness of the microparticle-containing resin coating layer is b, the ratio a/b must be between 1.0 and 5.0 in the second and fourth developing rollers according to the invention, and the a/b is preferable to be within a range of 1.0 to 3.0 in view of forming the unevenness capable of further improving toner supporting property on the surface of the developing roller. When the a/b is less than 1.0, even in the microparticles having the maximum particle size, they may be buried in the microparticle-containing resin coating layer and the desired unevenness cannot be formed on the surface in some dispersing condition into the microparticle-containing resin coating layer. On the other hand, when the a/b exceeds 5.0, the unevenness on the surface of the microparticle-containing resin coating layer is excessively large and the toner charging amount is insufficient although the toner supporting property is improved, and as a result, defects such as fog and faulty tone are caused. Moreover, since the microparticle-containing resin coating layer 6 is formed by ultraviolet or electron beam irradiation in the second and fourth developing rollers 1, it is unnecessary to conduct the drying for a long time in the formation of the microparticle-containing resin coating layer 6, so that it is unnecessary to provide a long drying line for mass production. When the microparticle-containing resin coating layer 6 is formed by electron beam irradiation, since an energy of electron beam is tens of thousands times as large as that of ultraviolet ray and the electron beam is efficient, it is advantageously unnecessary to use a cancer-causing photo-polymerization initiator and there is also advantageously no problem in forming the microparticle-containing resin coating layer even if a conductive carbon such as a carbon black or the like which easily absorbs ultraviolet rays is used.

Figure 3:
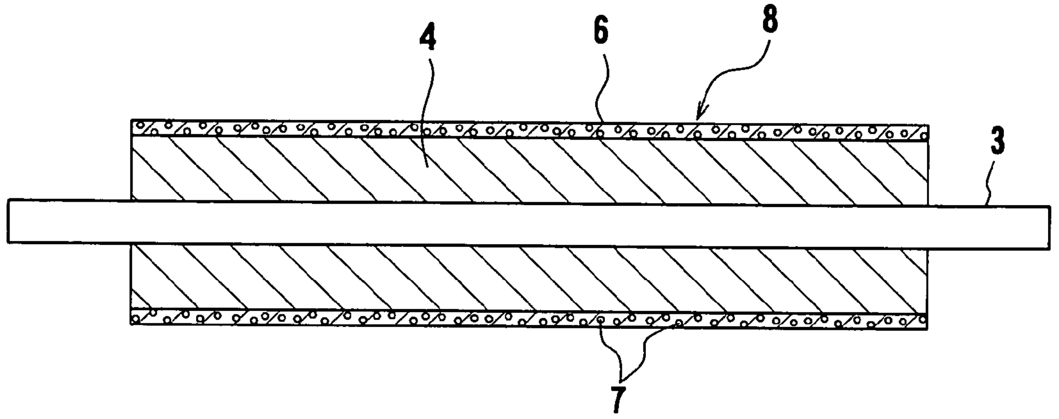
FIG. 3 is a sectional view of an embodiment of the first and fourth conductive rollers according to the invention.

FIG. 3 is a sectional view of an embodiment of the first and fourth conductive rollers according to the invention. The conductive roller 8 of the illustrated embodiment comprises a shaft 3, an elastic layer 4 formed on the outer periphery of the shaft 3 and a microparticle-containing resin coating layer 6 formed on the outer peripheral surface of the elastic layer 4. The microparticle-containing resin coating layer 6 comprises microparticles 7, and the ultraviolet-curing type resin or the electron beam curing type resin.

In the first and fourth conductive rollers 8 according to the invention, the microparticle-containing resin coating layer 6 is composed of the ultraviolet curable resin or the electron beam curable resin, so that it is unnecessary to conduct the drying for a long time in the formation of the microparticle-containing resin coating layer 6, and hence it is unnecessary to provide a long drying line for mass production. That is, since the microparticle-containing resin coating layer 6 of the first and fourth conductive rollers 8 according to the invention is formed by, for example, applying the coating liquid comprising the microparticles and the ultraviolet or electron beam polymerizable resin and/or compound on the outer peripheral surface of the elastic layer 4 and then curing the ultraviolet or electron beam polymerizable resin and/or compound by ultraviolet or electron beam irradiation, the drying step is not essential. Moreover, since the microparticle-containing resin coating layer 6 is formed at the step of irradiating ultraviolet ray or electron beam, the scattering of the properties in the microparticle-containing resin coating layer 6 due to differences of a temperature distribution, an airflow amount and the like in the drying line can be eliminated. Moreover, in the first and fourth conductive rollers 8 according to the invention, since the microparticle-containing resin coating layer 6 comprises the microparticles 7, the micro-unevenness is properly formed on the surface of the microparticle-containing resin coating layer 6 by properly controlling the concentration and particle size of the microparticles 7 in the microparticle-containing resin coating layer 6. Furthermore, in a preferable embodiment of the first and fourth conductive rollers 8 according to the invention, the surface energy of the microparticle-containing resin coating layer 6 can be lowered by rendering the microparticle-containing resin coating layer 6 to comprise at least one selected from the group consisting of the fluorine-containing resin and compound and the silicon-containing resin and compound (which may be ultraviolet curable, ultraviolet non-curable, electron beam curable or electron beam non-curable), and such a conductive rollers 8 is low in the friction resistance of the surface, hardly worn even if it is used for a long time, and excellent in the durability.

Moreover, since the microparticle-containing resin coating layer 6 is formed by electron beam irradiation in the fourth conductive roller 8 according to the invention, an unreacted compound is prevented from remaining by optimizing a dose of the electron beam. Also, the crosslinking density of the microparticle-containing resin coating layer 6 can be controlled by regulating an accelerating voltage of the electron beam. Furthermore, since the electron beam is hardly absorbed in a carbon-based electron conductive agent, even if the carbon-based electron conductive agent is used for the microparticle-containing resin coating layer 6, the electron beam curable resin can be sufficiently produced by electron beam irradiation and the unreacted compound can be prevented from remaining.

Figure 4:
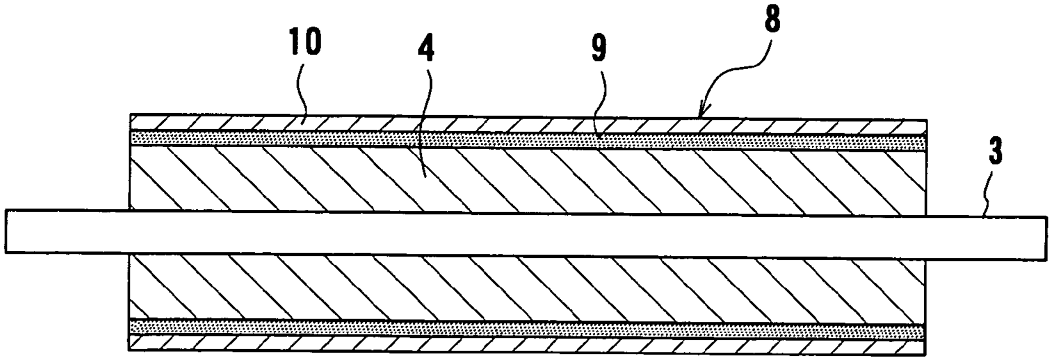
FIG. 4 is a sectional view of an embodiment of the second and fifth conductive rollers according to the invention.

FIG. 4 is a sectional view of an embodiment of the second and fifth conductive rollers according to the invention. The conductive roller 8 of the illustrated embodiment comprises a shaft 3, an elastic layer 4 formed on the outer periphery of the shaft 3, a first resin coating layer 9 formed on the outer peripheral surface of the elastic layer 4 and a second resin coating layer 10 formed on the outer peripheral surface of the first resin coating layer 9. The first resin coating layer 9 has a volume resistivity of not more than $10^6$ Ω·cm and the second resin coating layer 10 has a volume resistivity of not less than $10^{10}$ Ω·cm. Moreover, at least one of the first resin coating layer 9 and the second resin coating layer 10 comprises the ultraviolet-curing type resin or the electron beam curing type resin.

In the second and fifth conductive rollers 8 according to the invention, it is unnecessary to dry for a long time in forming the resin coating layer using the ultraviolet curable resin or the electron beam curable resin by using the ultraviolet curable resin or the electron beam curable resin for at least one of the first resin coating layer 9 and the second resin coating layer 10, so that a drying step in mass production can be skipped or shortened. That is, since the first resin coating layer 9 and/or second resin coating layer 10 in the second and fifth conductive rollers 8 according to the invention is formed by, for example, applying the coating liquid comprising the ultraviolet or electron beam polymerizable resin and/or compound (which is preferable to further comprise a conductive agent when the first resin coating layer 9 is formed) on the outer peripheral surface of the elastic layer 4 and/or the first resin coating layer 9 and then curing the ultraviolet or electron beam polymerizable resin and/or compound by ultraviolet or electron beam irradiation, drying step is not essential. Moreover, since the first resin coating layer 9 and/or the second resin coating layer 10 is formed at the step of irradiating ultraviolet ray or electron beam, the scattering of the properties in the first resin coating layer 9 and/or the second resin coating layer 10 due to differences of a temperature distribution, an airflow amount and the like in the drying line can be eliminated. Moreover, in the second and fifth conductive rollers 8 according to the invention, since the first resin coating layer 9 has a volume resistivity of not more than $10^6$ Ω·cm and the second resin coating layer 10 has a volume resistivity of not less than $10^{10}$ Ω·cm, the charging property against toners or the photosensitive drum of the conductive rollers 8 is highly improved. At this point, the first resin coating layer 9 is preferable to comprise a conductive agent and the second resin coating layer 10 is preferable not to comprise a conductive agent. Furthermore, in a preferable embodiment of the second and fifth conductive rollers 8 according to the invention, a surface energy of the second resin coating layer 10 can be lowered by rendering the second resin coating layer 10 to comprise at least one selected from the group consisting of the fluorine-containing resin and compound and the silicon-containing resin and compound (which may be ultraviolet curable, ultraviolet non-curable, electron beam curable or electron beam non-curable), and such a conductive rollers 8 is low in the friction resistance of the surface, hardly worn even if it is used for a long time, and excellent in the durability.

Moreover, since the first resin coating layer 9 and/or the second resin coating layer 10 is formed by electron beam irradiation in the fifth conductive roller 8 according to the invention, the residence of an unreacted compound can be suppressed by optimizing a dose of the electron beam. Also, the crosslinking density of the first resin coating layer 9 and/or the second resin coating layer 10 can be controlled by regulating an accelerating voltage of the electron beam. Furthermore, since the electron beam is hardly absorbed in a carbon-based electron conductive agent, even if the carbon-based electron conductive agent is used for the first resin coating layer 9, the electron beam curable resin can be sufficiently produced by electron beam irradiation and the unreacted compound can be prevented from remaining.

Figure 5:
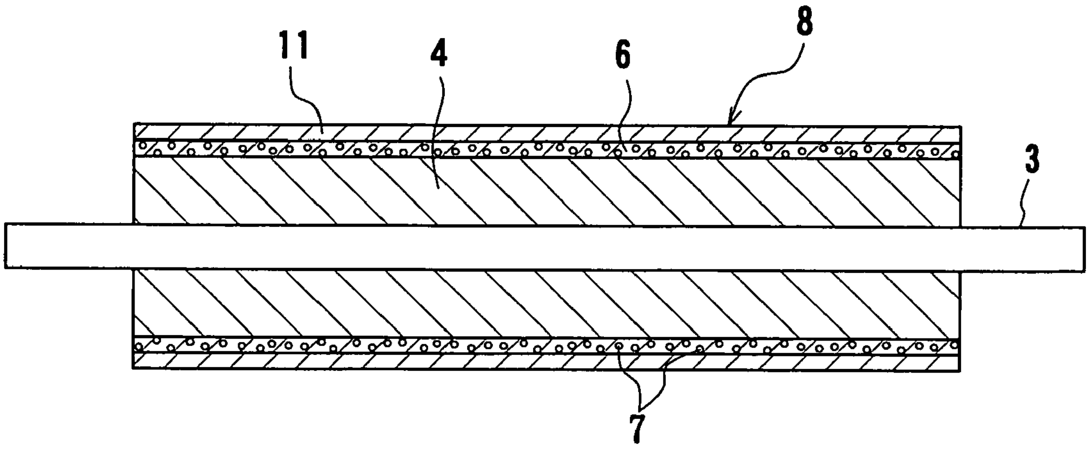
FIG. 5 is a sectional view of an embodiment of the third and sixth conductive rollers according to the invention.

FIG. 5 is a sectional view of an embodiment of the third and sixth conductive rollers according to the invention. The conductive roller 8 of the illustrated embodiment comprises a shaft 3, an elastic layer 4 formed on the outer periphery of the shaft 3, a microparticle-containing resin coating layer 6 formed on the outer peripheral surface of the elastic layer 4 and a protective layer 1 formed on the outer peripheral surface of the microparticle-containing resin coating layer 6. The microparticle-containing resin coating layer 6 comprises microparticles 7, and at least one of the microparticle-containing resin coating layer 6 and the protective layer 1 comprises the ultraviolet-curing type resin or the electron beam curing type resin.

In the third and sixth conductive rollers 8 according to the invention, it is unnecessary to conduct the drying for a long time in the formation of the microparticle-containing resin coating layer 6 and/or the protective layer 1 using the ultraviolet-curing type resin or the electron beam curing type resin by using the ultraviolet curable resin or the electron beam curable resin for at least one of the microparticle-containing resin coating layer 6 and the protective layer 1, so that a drying step in mass production can be skipped or shortened. That is, since the microparticle-containing resin coating layer 6 and/or the protective layer 1 of the third and sixth conductive rollers 8 according to the invention is formed by, for example, applying the coating liquid comprising the ultraviolet or electron beam polymerizable resin and/or compound (which is preferable to further comprise the microparticles 7 when the microparticle-containing resin coating layer 6 is formed) on the outer peripheral surface of the elastic layer 4 and/or the microparticle-containing resin coating layer 6 and then curing the ultraviolet or electron beam polymerizable resin and/or compound by ultraviolet or electron beam irradiation, the drying step is not essential. Moreover, since the microparticle-containing resin coating layer 6 and/or the protective layer 1 is formed at the step of irradiating ultraviolet rays or electron beam, the scattering of the properties in the microparticle-containing resin coating layer 6 and/or the protective layer 1 due to differences of a temperature distribution, an airflow amount and the like in the drying line can be eliminated. Moreover, since the microparticle-containing resin coating layer 6 comprises the microparticles 7 in the third and sixth conductive rollers 8 according to the invention, the micro-unevenness is properly formed on the surface of the microparticle-containing resin coating layer 6 by properly controlling the concentration and particle size of the microparticles 7 in the microparticle-containing resin coating layer 6, and the protective layer 1 formed on the outer peripheral surface of the microparticle-containing resin coating layer 6 also has a proper micro-unevenness. Moreover, since the protective layer 11 is formed on the outer peripheral surface of the microparticle-containing resin coating layer 6, the microparticles 11 can be prevented from peeling off from the microparticle-containing resin coating layer 6 and the durability of the conductive roller is highly improved. Furthermore, in a preferable embodiment of the third and sixth conductive rollers 8 according to the invention, a surface energy of the protective layer 11 can be lowered by rendering the protective layer 11 to comprise at least one selected from the group consisting of the fluorine-containing resin and compound and the silicon-containing resin and compound (which may be ultraviolet curable, ultraviolet non-curable, electron beam curable or electron beam non-curable), and such a conductive rollers 8 is low in the friction resistance of the surface, hardly worn even if it is used for a long time, and excellent in the durability.

Moreover, since the microparticle-containing resin coating layer 6 and/or the protective layer 11 is formed by electron beam irradiation in the sixth conductive roller 8 according to the invention, the residence of an unreacted compound can be suppressed by optimizing a dose of the electron beam. Also, the crosslinking density of the microparticle-containing resin coating layer 6 and/or the protective layer 11 can be controlled by regulating an accelerating voltage of the electron beam. Furthermore, since the electron beam is hardly absorbed in a carbon-based electron conductive agent, even if the carbon-based electron conductive agent is used for the microparticle-containing resin coating layer 6 and/or the protective layer 11, the electron beam curable resin can be sufficiently produced by electron beam irradiation and the unreacted compound can be prevented from remaining.

The shaft of the developing roller, charging roller and conductive roller according to the invention is not particularly limited as far as it has a good electrical conductivity, and as the roller can be used metal shafts such as a core metal made of a metallic solid body or a hollow metal cylinder which are made of iron, stainless steel, aluminum and so on.

The elastic layer of the developing roller, charging roller and conductive roller according to the invention comprises an elastomer and a conductive agent, and may comprise other components such as filler and so on, if necessary. As the elastomer used for the elastic layer are mentioned silicone rubber, ethylene-propylene-diene rubber (EPDM), acrylonitrile-butadiene rubber (NBR), natural rubber, styrene-butadiene rubber (SBR), butyl rubber, chloroprene rubber, acrylic rubber, epichlorohydrin rubber (ECO), ethylene-vinyl acetate copolymer (EVA), polyurethane, their mixture and the like. Among them, silicone rubber, EPDM, ECO and polyurethane are preferable. A foam formed by chemically foaming the elastomer with a foaming agent or by foaming the elastomer with mechanically involving air just like a polyurethane foam may be used for the elastic layer except for the elastic layer of the first and third charging rollers according to the invention. On the other hand, the elastomer must be used as a non-foam for the elastic layer of the first and third charging rollers according to the invention.

The shaft and the elastic layer may be integrally united by using a reactive injection molding method (RIM method). That is, two kinds of monomer components composing a raw material of the elastic layer are mixed, injected and polymerized, and as a result, the shaft and the elastic layer can be united. The time required from an injection of the raw material to a release from the mold can be shortened and the production cost can be highly reduced.

When the silicone rubber is used for the elastic layer, the silicone rubber may be a normal millable type silicone rubber (HCR) or a liquid silicone rubber (LSR). When the liquid silicone rubber is used, the elastic layer is preferably formed by a liquid injection molding (LIM). The liquid silicone rubber is formed by compounding an organohydrogenpolysiloxane, a filler such as silica or the like, a conductive agent, a platinum-based catalyst, an inhibitor, a silicone oil and other various additives to a vinyl group-containing polyorganosiloxane, and is formed by being injected into a mold having a predetermined form and heat-curing.

The vinyl group-containing polyorganosiloxane has two or more reactive groups in its molecule. As the reactive group are mentioned an alkenyl group and hydroxyl group. As the vinyl group-containing polyorganosiloxane is preferable a compound represented by the following formula (I):

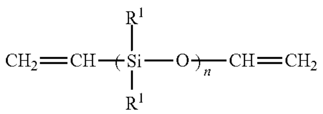

(I)

(wherein $R^1$s are independently a monovalent hydrocarbon group, and n is an integer of 100 to 10,000). As the monovalent hydrocarbon group in the $R^1$s are mentioned an alkyl group such as methyl group, ethyl group, propyl group, butyl group, pentyl group or the like; an alkenyl group such as vinyl group, allyl group or the like; a cycloalkyl group such as cyclohexyl group or the like; an aryl group such as phenyl group or the like; and an aralkyl group such as benzyl group or the like.

As the organohydrogenpolysiloxane is preferable a compound represented by the following formula (II):

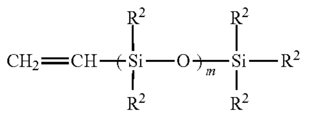

(II)

(wherein $R^2$s are independently hydrogen or a monovalent hydrocarbon group, and m is an integer of 100 to 10,000) and having two or more silicon-hydrogen bond in its molecule. As the monovalent hydrocarbon group in the $R^2$s are mentioned an alkyl group such as methyl group, ethyl group, propyl group, butyl group, pentyl group or the like; an alkenyl group such as vinyl group, allyl group or the like; a cycloalkyl group such as cyclohexyl group or the like; an aryl group such as phenyl group or the like; and an aralkyl group such as benzyl group or the like.

As the conductive agent included in the liquid silicone rubber can be used conductive agents usually used for the elastic layer mentioned later. As the platinum-based catalyst are mentioned platinum chloride, chloroplatinic acid, alcohol-modified chloroplatinic acid and so on. As the inhibitor are mentioned methylvinylcyclotetrasiloxane, acetylene alcohols, siloxane-modified acetylene alcohol, hydroperoxide and the like.

As the conductive agent used for the elastic layer are mentioned an electron conductive agent, an ion conductive agent and the like. As the electron conductive agent are mentioned conductive carbons such as Ketjen black, acetylene black and the like; carbon blacks for rubber such as SAF, ISAF, HAF, FEF, GPF, SRF, FT, MT and the like; carbon black for coloring agent treated by oxidation or the like; pyrolyzed carbon black, natural graphite, artificial graphite; metal oxides such as antimony-doped tin oxide, ITO, tin oxide, titanium oxide, zinc oxide and the like; metals such as nickel, copper, silver, germanium and the like; conductive polymers such as polyaniline, polypyrrole, polyacetylene and the like; conductive whiskers such as carbon whisker, graphite whisker, titanium carbide whisker, conductive potassium titanate whisker, conductive barium titanate whisker, conductive titanium oxide whisker, conductive zinc oxide whisker and the like. The amount of the electron conductive agent used is preferable to be within a range of 1 to 50 parts by mass, and more preferable 5 to 40 parts by mass based on 100 parts by mass of the elastomer.

As the ion conductive agent are mentioned ammonium salts such as perchlorate, chlorate, hydrochloride, bromate, iodate, hydroborofluoride, sulfate, ethylsulfate, carboxylate, and sulfonate of tetraethyl ammonium, tetrabutyl ammonium, dodecyltrimethyl ammonium, hexadecyltrimethyl ammonium, benzyltrimethyl ammonium, and modified-fatty acid dimethylethyl ammonium and the like; perchlorate, chlorate, hydrochloride, bromate, iodate, hydroborofluoride, sulfate, trifluoromethyl sulfate, and sulfonic acid salt of an alkali metal such as lithium, sodium or potassium, and an alkali earth metal such as calcium or magnesium, and the like. The amount of the ion conductive agent used is preferable to be within a range of 0.01 to 10 parts by mass, and more preferable 0.05 to 5 parts by mass based on 100 parts by mass of the elastomer. These conductive agents may be used alone or in a combination of two or more, and a combination of the electron conductive agent and the ion conductive agent may be used.

The resistance of the elastic layer is preferable to have a resistance value of $10^3$ to $10^{10}$ Ω·cm, and is more preferable to be $10^4$ to $10^8$ Ω·cm by compounding the conductive agent. When the resistance value of the elastic layer is less than $10^3$ Ω·cm, charge may leak to the photosensitive drum and so on, or the conductive roller itself may be broken due to the voltage, while when it exceeds $10^{10}$ Ω·cm, fog easily occurs.

The elastic layer may contain a crosslinking agent such as an organic peroxide or the like, a vulcanizing agent such as sulfur or the like in order to render the elastomer to be a rubber-like substance, and may further contain a vulcanization auxiliary agent, a vulcanization accelerator, a vulcanization accelerating auxiliary agent, a vulcanization retarder and the like. Moreover, the elastic layer may contain other additives for a rubber such as a filler, a peptizer, a foaming agent, a plasticizer, a softener, a tackifier, an antitackifier, a separating agent, a mold releasing agent, a filler, a coloring agent and the like.

When the elastic layer is formed by using polyurethane or EPDM as a base material, various charge controlling agents such as nigrosine, triaminophenylmethane, cation dye and so on and fine powders such as silicone resin, silicone rubber, nylon an so on can be added for controlling the charge of toners on the surface. The amount of the charge controlling agent added is preferable to be within a range of 1 to 5 parts by mass based on 100 parts by mass of polyurethane or EPDM, and the amount of the fine powder added is preferable to be within a range of 1 to 10 parts by mass based on 100 parts by weight of polyurethane or EPDM.

The hardness of the elastic layer is not particularly limited, but is preferable to be not more than 80 degrees, and more preferable to be 20 to 70 degrees in an Asker C hardness. When the Asker C hardness of the elastic layer exceeds 80 degrees, the contact area between the conductive roller and the photosensitive drum or the like becomes small, and the development may not be well conducted, and when the conductive roller is used as a developing roller, toners may be damaged and be attached to the photosensitive drum or a layer forming blade, and as a result, a faulty image is easily caused. On the other hand, if the hardness of the elastic layer is excessively low and when the conductive roller is used as a developing roller, a friction force between the roller and the photosensitive drum or the layer forming blade becomes large, and as a result, a faulty image such as jitter or the like is easily caused. Moreover, since the elastic layer is used by contacting with the photosensitive drum, the layer forming blade and the like, the elastic layer preferably has a small compression set, and concretely and preferably has a compression set of not more than 20%, even if their hardness is set to be low.

The microparticle-containing layer of the second and fourth developing rollers according to the invention comprises microparticles dispersed and is cured and formed by ultraviolet or electron beam irradiation. The microparticle-containing layer of the first and fourth conductive rollers according to the invention needs to comprise the microparticles and the ultraviolet-curing type resin or the electron beam curing type resin, and may further contain known additives, if necessary. In the third and sixth conductive rollers according to the invention, the microparticle-containing layer comprises the microparticles, and at least one of the microparticle-containing layer and the protective layer needs to comprise the ultraviolet-curing type resin or the electron beam curing type resin. The microparticle-containing layer and the protective layer may further contain known additives, if necessary. Moreover, the protective layer does not preferably comprise the microparticles.

As the microparticles are preferable to be microparticles of a rubber or a synthetic resin, and inorganic microparticles such as carbon microparticles, silica-based microparticles, and particularly preferable to be microparticles of silicone rubber, silicone resin, fluorocarbon resin, urethane elastomer, polyolefin resin, epoxy resin, polystyrene resin, urethane acrylate, melamine resin, phenol resin, (metha)acrylate-based resin and glassy carbon, and silica microparticles. These microparticles may be used alone or in a combination of two or more.

In the second and fourth developing rollers of the invention, the mount of the microparticle added is preferable to be within a range of 0.1 to 100 parts by mass, and more preferable 5 to 80 parts by mass based on 100 parts by mass of the resin. The average particle size of the microparticles used in the microparticle-containing resin coating layer of the second and fourth developing rollers according to the invention is preferable to be within a range of 1 to 30 μm, and more preferable 3 to 20 μm. The ratio a/b of the maximum particle size a (μm) to the thickness b (μm) of the microparticle-containing resin coating layer is 1.0 to 5.0, and preferable to be within a range of 1.0 to 3.0. The thickness b of the microparticle-containing resin coating layer is preferable to be within a range of 1 to 40 μm. When the a/b is within the above range, the micro-unevenness can be properly formed on the surface of the microparticle-containing resin coating layer.

In the first, third, fourth and sixth conductive rollers, the content of the microparticles is preferable to be within a range of 0.1 to 100 parts by mass, and more preferable 5 to 80 parts by mass based on 100 parts by mass of the resin constituting the microparticle-containing resin coating layer. The microparticles used in the microparticle-containing resin coating layer preferably has an average particle size of 1 to 50 μm, and more preferably 3 to 20 μm. The ratio (a/b) of the average particle size a to the thickness b of the microparticle-containing resin coating layer is preferable to be within a range of 0.03 to 5.0, and more preferable 0.1 to 5.0. When the a/b is within the range of 0.03 to 5.0, the micro-unevenness can be properly formed on the surface of the microparticle-containing resin coating layer.

When the ultraviolet-curing type resin and the electron beam curing type resin are not used in the microparticle-containing resin coating layer in the third and sixth conductive rollers, as a resin constituting the microparticle-containing resin coating layer can be used normal resins which are used for a conventional resin coating layer and the resin is not particularly limited but preferably includes, for example, alcohol-soluble polyamide copolymer, water-soluble acrylic resin, water-soluble butyral resin, acrylic emulsion, urethane dispersion, rubber latex and the like. On the other hand, when the ultraviolet-curing type resin and the electron beam curing type resin are not used in the protective layer, as a resin constituting the protective layer can be used normal resins which are used for a conventional resin coating layer and the resin is not particularly limited but preferably includes, for example, polyester resin, polyether resin, epoxy resin, amino resin, polyamide resin, acrylic resin, acrylic urethane resin, urethane resin, alkyd resin, phenol resin, melamine resin, urea resin and polyvinyl butyral resin as well as the above-mentioned ultraviolet non-curable fluorine-containing resin and silicon-containing resin. The microparticle-containing resin coating layer and the protective layer not containing the ultraviolet-curing type resin and the electron beam curing type resin are formed by applying the coating liquid comprising the above resin on the outer peripheral surface of the elastic layer or the microparticle-containing resin coating layer, then heating and drying.

In the second and fifth conductive rollers of the invention, at least one of the first resin coating layer and the second resin coating layer needs to comprise the ultraviolet-curing type resin or the electron beam curing type resin. Moreover, the first resin coating layer preferably comprises the conductive agent and the second coating layer does not preferably comprise the conductive agent. Furthermore, the first and second resin coating layers may further contain known additives, if necessary. The volume resistivity of the first resin coating layer is not more than $10^6$ Ω·cm and preferable to be $10^3$ to $10^6$ Ω·cm and the volume resistivity of the second resin coating layer is not less than $10^{10}$ Ω·cm and preferable to be $10^{10}$ to $10^{16}$ Ω·cm. When the volume resistivity of the first resin coating layer exceeds $10^6$ Ω·cm, fog is easily caused. When the resistivity of the second resin coating layer is not less than $10^{10}$ Ω·cm, the charging property for toners or the photosensitive drum is improved and image quality can be highly improved. The volume resistivity of the resin coating layer can be determined by, for example, applying the coating liquid used for forming the resin coating layer on a copper plate, curing the coating liquid by ultraviolet or electron beam irradiation, and then measuring a resistance between the copper plate and the measuring electrode.

It is usually necessary to use the conductive agent for rendering the volume resistivity of the first resin coating layer into not more than $10^6$ Ω·cm. As the conductive agent can be preferably used the above-described electron conductive agents and ion conductive agents. When the ultraviolet-curing type resin is used in the first resin coating layer, the carbon-based electron conductive agent and the ion conductive agent are preferable. The amount of the electron conductive agent used is preferable to be not more than 100 parts by mass, and more preferable to be within a range of 1 to 80 parts by mass, and particularly preferable 10 to 50 parts by mass based on 100 parts by mass of the resin constituting the first resin coating layer. On the other hand, the amount of the ion conductive agent used is preferable to be not more than 20 parts by mass, and more preferable to be within a range of 0.01 to 20 parts by mass, and particularly preferable 1 to 10 parts by mass based on 100 parts by mass of the resin constituting the first resin coating layer.

When the ultraviolet-curing type resin and the electron beam curing type resin are not used in the first resin coating layer in the third and sixth conductive rollers, as a resin constituting the first resin coating layer can be used normal resins which are used for a conventional resin coating layer and the resin is not particularly limited but preferably includes, for example, alcohol-soluble polyamide copolymer, water-soluble acrylic resin, water-soluble butyral resin, acrylic emulsion, urethane dispersion, rubber latex and the like. On the other hand, when the ultraviolet-curing type resin and the electron beam curing type resin are not used in the second resin coating layer, as a resin constituting the second resin coating layer can be used normal resins which are used for a conventional resin coating layer and the resin is not particularly limited but preferably includes, for example, polyester resin, polyether resin, epoxy resin, amino resin, polyamide resin, acrylic resin, acrylic urethane resin, urethane resin, alkyd resin, phenol resin, melamine resin, urea resin and polyvinyl butyral resin as well as the above-mentioned ultraviolet non-curable fluorine-containing resin and silicon-containing resin. The first resin coating layer and the second resin coating layer not containing the ultraviolet-curing type resin and the electron beam curing type resin are formed by applying the coating liquid comprising the above resin on the outer peripheral surface of the elastic layer or the first resin coating layer, then heating and drying.

The resin coating layer of the first and third developing rollers according to the invention is formed by, for example, applying a coating liquid comprising at lest one of the ultraviolet non-curable or electron beam non-curable fluorine-containing resin, fluorine-containing compound, silicon-containing resin and silicon-containing compound, and the ultraviolet or electron beam polymerizable resin and/or compound on the outer peripheral surface of the elastic layer and then curing the ultraviolet polymerizable resin and/or compound by ultraviolet or electron beam irradiation. Although a resistance value, a charge of toner, an amount of carried toner and a friction force between the developing roller and the layer forming blade can be commonly controlled by providing the outer surface of the elastic layer with the resin coating layer, the amount of toners attached on the resin coating layer can be highly reduced and the durability of the developing roller can be highly improved by rendering the resin coating layer to comprise at lest one of the ultraviolet non-curable or electron beam non-curable fluorine-containing resin, fluorine-containing compound, silicon-containing resin and silicon-containing compound, and the ultraviolet-curing type resin or the electron beam curing type resin. The coating liquid to be irradiated with ultraviolet rays is preferable to comprise a reactive diluent, a conductive agent, a photo-polymerization initiator and a photo-polymerization accelerator. On the other hand, the coating liquid to be irradiated with electron beam is preferable to comprise a reactive diluent and a conductive agent. These coating liquids may further contain known additives, if necessary, and are preferable not to comprise a solvent.

In the resin coating layer of the first and third developing rollers according to the invention, as a ratio of the ultraviolet non-curable or electron beam non-curable fluorine-containing resin, fluorine-containing compound, silicon-containing resin and silicon-containing compound to the ultraviolet-curing type or the electron beam curing type resin, the amount of the ultraviolet-curing type or the electron beam curing type resin is preferable to be within a range of 10 to 10000 parts by mass, more preferable 30 to 5000 parts by mass based on 100 parts by mass of the total amount of the ultraviolet non-curable or electron beam non-curable fluorine-containing resin, fluorine-containing compound, silicon-containing resin and silicon-containing compound. When the amount of the ultraviolet-curing type or the electron beam curing type resin used is less than 10 parts by mass based on 100 parts by mass of the total amount of the ultraviolet non-curable or electron beam non-curable fluorine-containing resin, fluorine-containing compound, silicon-containing resin and silicon-containing compound, the crosslinking degree by ultraviolet or electron beam curing may be insufficient and the strength of the coating may be low, while when it exceeds 10000 parts by mass, the total content of fluorine and silicon is decreased and the target performance cannot be expressed. The content of fluorine in the resin coating layer is preferable to be within a range of 0.1 to 45% by mass, and more preferable 0.5 to 20% by mass. When the content of fluorine in the resin coating layer is less than 0.1% by mass, the sufficient performance for toner adhesion may not be expressed, while when it exceeds 45% by mass, the adhesiveness with the elastic layer or the underlayer is deteriorated. Moreover, the content of silicon in the resin coating layer is preferable to be within a range of 0.1 to 50% by mass, and more preferable 0.5 to 30% by mass. When the content of silicon in the resin coating layer is less than 0.1% by mass, the performance of silicon cannot be sufficiently expressed to probably cause the durability to be insufficient, while when it exceeds 50% by mass, the adhesiveness between the coating and the underlayer may be deteriorated.

In the second and fourth developing rollers according to the invention, as the method for forming the microparticle-containing resin coating layer on the elastic layer is preferably employed a method comprising the steps of applying a coating liquid of a composition including the components for forming the microparticle-containing resin coating layer and additives on the surface of the elastic layer, and irradiating ultraviolet ray or electron beam. Moreover, the coating liquid is preferable not to comprise a solvent, but may comprise a solvent which is easily volatilized at room temperature as a medium.

In the second and fourth developing rollers according to the invention, the microparticle-containing resin coating layer is preferable to be formed by irradiating ultraviolet ray or electron beam, then heating and curing a remaining unreacted compound. In this case, even if an unreacted compound remains in the microparticle-containing resin coating layer after ultraviolet or electron beam irradiation, the unreacted compound is cured by heating, and as a result, the unreacted compound can be prevented from remaining in the microparticle-containing resin coating layer. Therefore, contamination of the photosensitive drum is prevented and good image can be formed. Moreover, since the heating and curing treatment after ultraviolet or electron beam irradiation can be achieved for a shot time, the elastic layer is not damaged. The heating time after ultraviolet or electron beam irradiation is preferable to be about 5 to 120 minutes, and more preferable 10 to 40 minutes, and the heating temperature is preferable to be about 40 to 100° C., and more preferable 50 to 80° C. When the heating time and the heating temperature are within the above ranges, the elastic layer is not damaged by heating.

In the second and fourth developing rollers according to the invention, the microparticle-containing resin coating layer is also preferable to be formed by irradiating ultraviolet ray or electron beam, then microwave-heating and curing a remaining unreacted compound. In this case, even if the unreacted compound remains in the microparticle-containing resin coating layer after ultraviolet or electron beam irradiation, the unreacted compound is cured by microwave-heating, and as a result, the unreacted compound can be prevented from remaining in the microparticle-containing resin coating layer. Therefore, contamination of the photosensitive drum is prevented and good image can be formed. Moreover, since the microwave-heating is one of induction heatings, and is excellent in the heating efficiency from a viewpoint that the microparticle-containing resin coating layer can be evenly heated. Furthermore, since the remaining unreacted compound can be cured for a very short time, for example, 20 seconds to 10 minutes, the productivity is not lost and the elastic layer is not damaged. The microwave-heating treatment after ultraviolet or electron beam irradiation is conducted by a microwave having a frequency of not less than 300 MHz, preferably about 2450 MHz for about 20 seconds to 30 minutes, preferably about 1 to 30 minutes, more preferably about 2 to 10 minutes, particularly about 2 to 5 minutes. The remaining unreacted compound can be evenly microwave-heated and cured without damaging the elastic layer by such a microwave-heating treatment.

The resin coating layer of the first and third charging rollers according to the invention is formed by, for example, applying a coating liquid comprising the ultraviolet or electron beam polymerizable resin and/or compound on the outer peripheral surface of the non-foam elastic layer and then curing the ultraviolet or electron beam polymerizable resin and/or compound by ultraviolet or electron beam irradiation. Although a resistance value can be controlled, the adhesion of toners can be prevented and image quality can be improved commonly by providing the outer peripheral surface of the elastic layer with the resin coating layer, when the resin coating layer is formed by curing the coating liquid comprising the ultraviolet or electron beam polymerizable resin and/or compound, it is unnecessary to provide a long drying line for forming the resin coating layer and the scattering of the properties in the resin coating layer due to differences of various conditions in drying step can be eliminated. The coating liquid to be irradiated with ultraviolet ray is preferable to comprise a reactive diluent, a conductive agent, a photo-polymerization initiator and a photo-polymerization accelerator. On the other hand, the coating liquid to be irradiated with electron beam is preferable to comprise a reactive diluent and a conductive agent. These coating liquids may further contain known additives, if necessary, and are preferable not to comprise a solvent.

The resin coating layer of the fourth charging roller according to the invention is formed by, for example, applying a coating liquid comprising the electron beam polymerizable resin and/or compound on the outer peripheral surface of the elastic layer and then curing the electron beam polymerizable resin and/or compound by electron beam irradiation. Although the resistance value can be controlled and the adhesion of toners can be prevented and the image quality can be improved commonly by providing the outer peripheral surface of the elastic layer with the resin coating layer, when the resin coating layer is formed by curing the coating liquid comprising the electron beam polymerizable resin and/or compound, it is unnecessary to provide a long drying line for forming the resin coating layer and the scattering of the properties in the resin coating layer due to differences of various conditions in the drying step can be eliminated. The above coating liquid is preferable to comprise a reactive diluent and a conductive agent and may further contain known additives, if necessary, and is preferable not to comprise a solvent. The content of the electron beam curing type resin in the rein coating layer is preferable to be not less than 10% by mass, and more preferable to be not less than 30% by mass. When the content of the electron beam curing type resin in the rein coating layer is less than 10% by mass, a crosslinking degree caused by the electron beam curing may be insufficient and a strength of the coating may be low.

The resin coating layer of the second charging roller and the resin coating layer in a preferable embodiment of the fourth charging roller according to the invention are formed by, for example, applying any one of (A) a coating liquid comprising at least one of the ultraviolet or electron beam polymerizable fluorine-containing resin, fluorine-containing compound, silicon-containing resin and silicon-containing compound, (B) a coating liquid comprising at least one of the ultraviolet non-curable or electron beam non-curable fluorine-containing resin, fluorine-containing compound, silicon-containing resin and silicon-containing compound, and an ultraviolet polymerizable resin and/or compound containing no fluorine and silicon, and (C) a coating liquid comprising at least one of the ultraviolet non-curable or electron beam non-curable fluorine-containing resin, fluorine-containing compound, silicon-containing resin and silicon-containing compound, and at least one of an ultraviolet or electron beam polymerizable fluorine-containing resin, fluorine-containing compound, silicon-containing resin and silicon-containing compound on the outer peripheral surface of the elastic layer and then curing the ultraviolet or electron beam polymerizable resin and/or compound by ultraviolet or electron beam irradiation. Although a resistance value can be controlled and the adhesion of toners can be prevented and the image quality can be improved commonly by providing the outer peripheral surface of the elastic layer with the resin coating layer, when the resin coating layer is formed by curing the coating liquid comprising the ultraviolet or electron beam polymerizable resin and/or compound, it is unnecessary to provide a long drying line for forming the resin coating layer and the scattering of the properties in the resin coating layer due to differences of various conditions in the drying step can be eliminated. Furthermore, the adhesion property with toners can be highly lowered and the durability of the charging roller can be highly improved by rendering the resin coating layer to comprise at least one of the fluorine-containing resin and compound and the silicon-containing resin and compound (which may be ultraviolet curable, ultraviolet non-curable, electron beam curable or electron beam non-curable). The coating liquid to be irradiated with ultraviolet ray is preferable to comprise a reactive diluent, a conductive agent, a photo-polymerization initiator and a photo-polymerization accelerator. On the other hand, the coating liquid to be irradiated with electron beam is preferable to comprise a reactive diluent and a conductive agent. These coating liquids may further comprise known additives, if necessary, and are preferable not to comprise a solvent.

In the resin coating layer of the second charging roller and the resin coating layer in the preferable embodiment of the fourth charging roller according to the invention, as a ratio of the ultraviolet non-curable or electron beam non-curable fluorine-containing resin and compound and silicon-containing resin and compound to the ultraviolet-curing type or the electron beam curing type resin, the amount of the ultraviolet-curing type or the electron beam curing type resin is preferable to be within a range of 10 to 10000 parts by mass, and more preferable 30 to 5000 parts by mass based on 100 parts by mass of the total amount of the ultraviolet non-curable or electron beam non-curable fluorine-containing resin, fluorine-containing compound, silicon-containing resin and silicon-containing compound. When the amount of the ultraviolet-curing type or the electron beam curing type resin used is less than 10 parts by mass based on 100 parts by mass of the total amount of the ultraviolet non-curable or electron beam non-curable fluorine-containing resin, fluorine-containing compound, silicon-containing resin and silicon-containing compound, the crosslinking degree caused by the ultraviolet or electron beam curing may be insufficient and the strength of the coating may be low, while when it exceeds 10000 parts by mass, the total content of fluorine and silicon is decreased and target performance cannot be expressed. The content of fluorine in the resin coating layer is preferable to be within a range of 0.1 to 45% by mass, and more preferable 0.5 to 20% by mass. When the content of fluorine in the resin coating layer is less than 0.1% by mass, sufficient performance against toner adhesion may not be expressed, while when it exceeds 45% by mass, the adhesiveness with the elastic layer or the underlayer is deteriorated. Moreover, the content of silicon in the resin coating layer is preferable to be within a range of 0.1 to 50% by mass, and more preferable 0.5 to 30% by mass. When the content of silicon in the resin coating layer is less than 0.1% by mass, the performance of silicon cannot be sufficiently expressed to probably cause durability to be insufficient, while when it exceeds 50% by mass, the adhesiveness between the coating and the underlayer may be deteriorated.

The microparticle-containing resin coating layer of the first and fourth conductive rollers is formed by, for example, applying a coating liquid comprising the microparticles and the ultraviolet or electron beam polymerizable resin and/or compound on the outer peripheral surface of the elastic layer and then curing the ultraviolet or electron beam polymerizable resin and/or compound by ultraviolet or electron beam irradiation. Although a resistance value can be controlled and the adhesion of toners can be prevented and the image quality can be improved commonly by providing the outer peripheral surface of the elastic layer with the resin coating layer, when the microparticle-containing resin coating layer is formed by curing the coating liquid comprising the microparticles and the ultraviolet or electron beam polymerizable resin and/or compound, the micro-unevenness is properly formed on the surface of the conductive roller, the image quality can be further improved, it is unnecessary to provide a long drying line for forming the microparticle-containing resin coating layer and the scattering of the properties in the microparticle-containing resin coating layer due to differences of various conditions in the drying step can be eliminated. The coating liquid to be irradiated with ultraviolet ray is preferable to comprise a reactive diluent, a conductive agent, a photo-polymerization initiator and a photo-polymerization accelerator. On the other hand, the coating liquid to be irradiated with electron beam is preferable to comprise a reactive diluent and a conductive agent. These coating liquids may further contain known additives, if necessary, and are preferable not to comprise a solvent. In the microparticle-containing resin coating layer, as a ratio of the ultraviolet-curing type or the electron beam curing type resin to the ultraviolet non-curable or electron beam non-curable resin and/or compound, the amount of the ultraviolet-curing type or the electron beam curing type resin is preferable to be within a range of 10 to 10000 parts by mass, and more preferable 30 to 5000 parts by mass based on 100 parts by mass of the total amount of the ultraviolet non-curable or electron beam non-curable resin and compound. When the amount of the ultraviolet-curing type or the electron beam curing type resin used is less than 10 parts by mass based on 100 parts by mass of the total amount of the ultraviolet non-curable or electron beam non-curable resin and compound, the crosslinking degree caused by the ultraviolet or electron beam curing may be insufficient and the strength of the coating may be low, while when it exceeds 10000 parts by mass, target performance cannot be expressed.

When the microparticle-containing resin coating layer of the first and fourth conductive rollers comprises at least one of fluorine-containing resin, fluorine-containing compound, silicon-containing resin and silicon-containing compound, the microparticle-containing resin coating layer is formed by, for example, applying any one of (A) a coating liquid comprising the microparticles, and at least one of the ultraviolet or electron beam polymerizable fluorine-containing resin, fluorine-containing compound, silicon-containing resin and silicon-containing compound, (B) a coating liquid comprising the microparticles, at least one of the ultraviolet non-curable or electron beam non-curable fluorine-containing resin, fluorine-containing compound, silicon-containing resin and silicon-containing compound, and the ultraviolet or electron beam polymerizable resin and/or compound containing no fluorine and silicon, and (C) a coating liquid comprising the microparticles, at least one of the ultraviolet non-curable or electron beam non-curable fluorine-containing resin, fluorine-containing compound, silicon-containing resin and silicon-containing compound, and at least one of the ultraviolet or electron beam polymerizable fluorine-containing resin, fluorine-containing compound, silicon-containing resin and silicon-containing compound on the outer peripheral surface of the elastic layer and then curing at least any one of the ultraviolet or electron beam polymerizable resins and compounds by ultraviolet or electron beam irradiation. In this case, the friction force on the microparticle-containing resin coating layer can be highly reduced and the durability of the conductive roller can be highly improved. The ultraviolet or electron beam polymerizable resin and compound preferably has an ultraviolet or electron beam polymerizable carbon-carbon double bond. The total content of fluorine and silicon in the microparticle-containing resin coating layer is preferable to be within a range of 0.1 to 50% by mass, and more preferable 0.5 to 30% by mass. When the total content of fluorine and silicon in the microparticle-containing resin coating layer is less than 0.1% by mass, the performance of fluorine and silicon cannot be sufficiently expressed to probably cause durability to be insufficient, while when it exceeds 50% by mass, the adhesiveness between the coating and the underlayer, solubility and dispersity may be deteriorated.

When the first resin coating layer of the second and fifth conductive rollers according to the invention comprises the ultraviolet-curing type resin or the electron beam curing type resin, the first resin coating layer is formed by, for example, applying a coating liquid comprising the conductive agent and the ultraviolet or electron beam polymerizable resin and/ or compound on the outer peripheral surface of the elastic layer and then curing the ultraviolet or electron beam polymerizable resin and/or compound by ultraviolet or electron beam irradiation. Also, when the second resin coating layer comprises the ultraviolet-curing type resin or the electron beam curing type resin, the second resin coating layer is formed by, for example, applying a coating liquid comprising the ultraviolet or electron beam polymerizable resin and/or compound on the outer peripheral surface of the first resin coating layer and then curing the ultraviolet or electron beam polymerizable resin and/or compound by ultraviolet or electron beam irradiation. When the first resin coating layer and/or the second resin coating layer is formed by curing the coating liquid comprising the ultraviolet or electron beam polymerizable resin and/or compound, it is unnecessary to provide a long drying line for forming the first resin coating layer and/or the second resin coating layer and the scattering of the properties in the first resin coating layer and/or the second resin coating layer due to differences of various conditions in the drying step can be eliminated. The coating liquid to be irradiated with ultraviolet ray is preferable to comprise a reactive diluent, a conductive agent, a photo-polymerization initiator and a photo-polymerization accelerator. On the other hand, the coating liquid to be irradiated with electron beam is preferable to comprise a reactive diluent and a conductive agent. These coating liquids may further contain known additives, if necessary, and are preferable not to comprise a solvent. In the resin coating layer comprising the ultraviolet-curing type resin or the electron beam curing type resin, as a ratio of the ultraviolet-curing type or the electron beam curing type resin to the ultraviolet non-curable or electron beam non-curable resin and/or compound, the amount of the ultraviolet curable or the electron beam curable resin is preferable to be within a range of 10 to 10000 parts by mass, and more preferable 30 to 5000 parts by mass based on 100 parts by mass of the total amount of the ultraviolet non-curable or electron beam non-curable resin and compound. When the amount of the ultraviolet-curing type or the electron beam curing type resin used is less than 10 parts by mass based on 100 parts by mass of the total amount of the ultraviolet non-curable or electron beam non-curable resin and compound, the crosslinking degree caused by the ultraviolet or electron beam curing may be insufficient and the strength of the coating may be low, while when it exceeds 10000 parts by mass, target performance cannot be expressed.

When the second resin coating layer of the second and fifth conductive rollers according to the invention comprises at least one of fluorine-containing resin, fluorine-containing compound, silicon-containing resin and silicon-containing compound, the second resin coating layer is formed by, for example, applying any one of (A) a coating liquid comprising at least one of the ultraviolet or electron beam polymerizable fluorine-containing resin, fluorine-containing compound, silicon-containing resin and silicon-containing compound, (B) a coating liquid comprising at least one of the ultraviolet non-curable or electron beam non-curable fluorine-containing resin, fluorine-containing compound, silicon-containing resin and silicon-containing compound, and the ultraviolet or electron beam polymerizable resin and/or compound containing no fluorine and silicon, and (C) a coating liquid comprising at least one of the ultraviolet non-curable or electron beam non-curable fluorine-containing resin, fluorine-containing compound, silicon-containing resin and silicon-containing compound, and at least one of the ultraviolet or electron beam polymerizable fluorine-containing resin, fluorine-containing compound, silicon-containing resin and silicon-containing compound on the outer peripheral surface of the first resin coating layer and then curing the ultraviolet or electron beam polymerizable resins and/or compounds by ultraviolet or electron beam irradiation. On the other hand, when the second resin coating layer does not comprise the ultraviolet-curing type resin and the electron beam curing type resin but comprises at least one of fluorine-containing resin, fluorine-containing compound, silicon-containing resin and silicon-containing compound, the second resin coating layer is formed by, for example, applying a coating liquid comprising at least one of the ultraviolet non-curable or electron beam non-curable fluorine-containing resin, fluorine-containing compound, silicon-containing resin and silicon-containing compound on the outer peripheral surface of the first resin coating layer, then heating and drying. The surface energy of the second resin coating layer can be lowered and the friction force on the second resin coating layer can be highly reduced by rendering the second resin coating layer to comprise at least one of the fluorine-containing resin, fluorine-containing compound, silicon-containing resin and silicon-containing compound, and as a result, the durability of the conductive roller can be highly improved. The ultraviolet or electron beam polymerizable resin and compound preferably has an ultraviolet or electron beam polymerizable carbon-carbon double bond. The total content of fluorine and silicon in the second resin coating layer comprising at least one of the fluorine-containing resin, fluorine-containing compound, silicon-containing resin and silicon-containing compound is preferable to be within a range of 0.1 to 50% by mass, and more preferable 0.5 to 30% by mass. When the total content of fluorine and silicon in the second resin coating layer is less than 0.1% by mass, performance of fluorine and silicon cannot be sufficiently expressed to probably cause durability to be insufficient, while when it exceeds 50% by mass, the adhesiveness between the coating and the underlayer, solubility and dispersity may be deteriorated.

When the microparticle-containing resin coating layer of the third and sixth conductive rollers according to the invention comprises the ultraviolet-curing type resin or the electron beam curing type resin, the microparticle-containing resin coating layer is formed by, for example, applying a coating liquid comprising the microparticles and the ultraviolet or electron beam polymerizable resin and/or compound on the outer peripheral surface of the elastic layer and then curing the ultraviolet or electron beam polymerizable resin and/or compound by ultraviolet or electron beam irradiation. Also, when the protective layer comprises the ultraviolet-curing type resin or the electron beam curing type resin, the protective layer is formed by, for example, applying a coating liquid comprising the ultraviolet or electron beam polymerizable resin and/or compound on the outer peripheral surface of the microparticle-containing resin coating layer and then curing the ultraviolet or electron beam polymerizable resin and/or compound by ultraviolet or electron beam irradiation. When the microparticle-containing resin coating layer and/or the protective layer is formed by curing the coating liquid comprising the ultraviolet or electron beam polymerizable resin and/or compound, it is unnecessary to provide a long drying line for forming the microparticle-containing resin coating layer and/or the protective layer and the scattering of the properties in the microparticle-containing resin coating layer and/or the protective layer due to differences of various conditions in the drying step can be eliminated. The coating liquid to be irradiated with ultraviolet ray is preferable to comprise a reactive diluent, a conductive agent, a photo-polymerization initiator and a photo-polymerization accelerator. On the other hand, the coating liquid to be irradiated with electron beam is preferable to comprise a reactive diluent and a conductive agent. These coating liquids may further contain known additives, if necessary, and are preferable not to comprise a solvent. In the microparticle-containing resin coating layer and the protective layer comprising the ultraviolet-curing type resin or the electron beam curing type resin, as a ratio of the ultraviolet curable or the electron beam curable resin to the ultraviolet non-curable or electron beam non-curable resin and/or compound, the amount of the ultraviolet curable or the electron beam curable resin is preferable to be within a range of 10 to 10000 parts by mass, and more preferable 30 to 5000 parts by mass based on 100 parts by mass of the total amount of the ultraviolet non-curable or electron beam non-curable resin and compound. When the amount of the ultraviolet curable or the electron beam curable resin used is less than 10 parts by mass based on 100 parts by mass of the total amount of the ultraviolet non-curable or electron beam non-curable resin and compound, the crosslinking degree caused by the ultraviolet or electron beam curing may be insufficient and the strength of the coating may be low, while when it exceeds 10000 parts by mass, target performance cannot be expressed.

When the protective layer of the third and sixth conductive rollers according to the invention comprises at least one of fluorine-containing resin, fluorine-containing compound, silicon-containing resin and silicon-containing compound, the protective layer is formed by, for example, applying any one of (A) a coating liquid comprising at least one of the ultraviolet or electron beam polymerizable fluorine-containing resin, fluorine-containing compound, silicon-containing resin and silicon-containing compound, (B) a coating liquid comprising at least one of the ultraviolet non-curable or electron beam non-curable fluorine-containing resin, fluorine-containing compound, silicon-containing resin and silicon-containing compound, and the ultraviolet or electron beam polymerizable resin and/or compound containing no fluorine and silicon, and (C) a coating liquid comprising at least one of the ultraviolet non-curable or electron beam non-curable fluorine-containing resin, fluorine-containing compound, silicon-containing resin and silicon-containing compound, and at least one of the ultraviolet or electron beam polymerizable fluorine-containing resin, fluorine-containing compound, silicon-containing resin and silicon-containing compound on the outer peripheral surface of the microparticle-containing resin coating layer and then curing the ultraviolet or electron beam polymerizable resins and/or compounds by ultraviolet or electron beam irradiation. On the other hand, when the protective layer does not comprise the ultraviolet-curing type resin and the electron beam curing type resin but comprises at least one of fluorine-containing resin, fluorine-containing compound, silicon-containing resin and silicon-containing compound, the protective layer is formed by, for example, applying a coating liquid comprising at least one of the ultraviolet non-curable or electron beam non-curable fluorine-containing resin, fluorine-containing compound, silicon-containing resin and silicon-containing compound on the outer peripheral surface of the microparticle-containing resin coating layer, then heating and drying. The surface energy of the protective layer can be lowered and the friction force on the protective layer can be highly reduced by rendering the protective layer to comprise at least one of the fluorine-containing resin, fluorine-containing compound, silicon-containing resin and silicon-containing compound, and as a result, the durability of the conductive roller can be highly improved. The ultraviolet or electron beam polymerizable resin and compound preferably has an ultraviolet or electron beam polymerizable carbon-carbon double bond. The total content of fluorine and silicon in the protective layer comprising at least one of the fluorine-containing resin and compound and silicon-containing resin and compound is preferable to be within a range of 0.1 to 50% by mass, and more preferable 0.5 to 30% by mass. When the total content of fluorine and silicon in the protective layer is less than 0.1% by mass, the performance of fluorine and silicon cannot be sufficiently expressed to probably cause durability to be insufficient, while when it exceeds 50% by mass, adhesiveness between the coating and the underlayer, solubility and dispersity may be deteriorated.

The method for producing the conductive roller according to the invention is characterized by comprising the steps of (i) subjecting the outer peripheral surface of the elastic layer to surface treatment; (ii) applying a coating liquid comprising the ultraviolet-curing type resin or the electron beam curing type resin on the outer peripheral surface of the elastic layer; and (iii) irradiating ultraviolet ray or electron beam to cure the ultraviolet-curing type resin or the electron beam curing type resin to form the resin coating layer. The wettability between the elastic layer and the coating liquid comprising the ultraviolet-curing type resin or the electron beam curing type resin can be improved by subjecting the outer peripheral surface of the elastic layer to surface treatment, and the adhesiveness (adhesion property) between the elastic layer and the resin coating layer after the irradiation of ultraviolet ray or electron beam can be improved. The conductive roller produced by the production method according to the invention is not particularly limited, as far as comprises the shaft 3, the elastic layer 4 formed on the outer periphery of the shaft 3 and the resin coating layer 5 formed on the outer peripheral surface of the elastic layer 4. As the surface treatment are preferable corona treatment and plasma treatment. The corona treatment used herein means corona discharge treatment normally conducted for various purposes, and an instrument used for the corona treatment is not particularly limited but includes instruments of a spark gap system, a vacuum tube system, a solid state system and the like. The treating conditions are properly adjusted depending on the equipment, system and so on, and not particularly limited. Moreover, the plasma treatment used herein means vacuum or atmospheric pressure plasma discharge treatment normally conducted for the purpose of various surface treatments, and a gas used for the plasma treatment is not particularly limited but includes argon, oxygen, nitrogen, $CF_4$/oxygen, ethylene and the like.

As the method for applying the coating liquid are mentioned spraying method, roll-coating method, dipping method, die coating method and the like. As a light source used for the ultraviolet irradiation are mentioned mercury vapor lamp, high pressure mercury vapor lamp, super high pressure mercury vapor lamp, metalhalide lamp, xenon lamp and the like. The conditions of the ultraviolet irradiation are properly selected depending on the kind of the ultraviolet-curing type resin and the amount of the coating liquid, and the irradiation intensity is preferable to be 100 to 700 $mW/cm^2$ and the integrated light amount is preferable to be 200 to 3000 $mJ/cm^2$. On the other hand, the conditions of the electron beam irradiation are properly selected depending on the kind of the electron beam curing type resin and the amount of the coating liquid.

As the ultraviolet-curing type resin and the electron beam curing type resin are mentioned polyester resin, polyether resin, fluorocarbon resin, epoxy resin, amino resin, polyamide resin, acrylic resin, acrylic urethane resin, urethane resin, alkyd resin, phenol resin, melamine resin, urea resin, silicone resin, polyvinyl butyral resin, vinyl ether resin, vinyl ester resin, their modified resins introduced with a specific functional group, and the like. These resins may be used alone or in a combination of two or more. The resin coating layer is preferable to be introduced with a cross-linking structure in order to improve the mechanical strength and the environmental resistance.

The ultraviolet-curing type resin is formed by curing the ultraviolet polymerizable resin and/or compound, and preferably the resin and/or compound having the ultraviolet polymerizable carbon-carbon double bond by the ultraviolet irradiation. Also, the electron beam curing type resin is formed by curing the electron beam polymerizable resin and/or compound, and preferably the resin and/or compound having the electron beam polymerizable carbon-carbon double bond by the electron beam irradiation. These ultraviolet or electron beam polymerizable resin and/or compound may be used alone or in a combination of two or more.

As the resin and compound having the polymerizable carbon-carbon double bond used for forming the ultraviolet-curing type resin or the electron beam curing type resin are preferable a (metha)acrylate monomer and oligomer. As the (metha)acrylate monomer and oligomer are mentioned a monomer and oligomer of urethane-based (metha)acrylate, epoxy-based (metha)acrylate, ether-based (metha)acrylate, ester-based (metha)acrylate, polycarbonate-based (metha) acrylate, fluorine-based (metha)acrylate, silicone-based (metha)acrylate, and the like. The above (metha)acrylate oligomer can be synthesized by a reaction of polyethylene glycol, polyoxypropylene glycol, polytetramethylene ether glycol, bisphenol A-based epoxy resin, phenolic novolac-type epoxy resin, an adduct of polyalcohol and ϵ-caprolactone or the like and a (metha)acrylic acid, or a urethanation of a polyisocyanate compound and a (metha)acrylate compound having a hydroxy group.

The urethane-based (metha)acrylate oligomer can be obtained by a urethanation of a polyol, an isocyanate compound and a (metha)acrylate compound having a hydroxy group. As the epoxy-based (metha)acrylate oligomer is preferable a reaction product of a compound having a glycidyl group and a (metha)acrylic acid, and more preferable a reaction product of a compound having a cyclic structure such as a benzene ring, a naphthalene ring, a spiro ring, dicyclopentadien, tricyclodecane or the like and a (metha)acrylic acid. The ether-based (metha)acrylate oligomer, the ester-based (metha)acrylate oligomer and the polycarbonate-based (metha)acrylate oligomer can be obtained by a reaction of a polyol (polyether polyol, polyester polyol, and polycarbonate polyol) corresponding to each oligomer and a (metha)acrylic acid.

As the resin and/or compound having the ultraviolet or electron beam polymerizable carbon-carbon double bond and containing no fluorine and silicon is preferable a (metha) acrylate monomer and oligomer containing no fluorine and silicon, and for example, are mentioned a monomer and oligomer of urethane-based (metha)acrylate, epoxy-based (metha)acrylate, ether-based (metha)acrylate, ester-based (metha)acrylate, polycarbonate-based (metha)acrylate and the like. These (metha)acrylate oligomer can be synthesized according to the mentioned above.

As the fluorine-containing resin and/or compound having the ultraviolet or electron beam polymerizable carbon-carbon double bond are preferable a compound derived from a fluoroolefin and fluoro (metha)acrylates. These fluorine-containing resins and/or compounds having the polymerizable carbon-carbon double bond may be a monomer or an oligomer and may further be a mixture of the monomer and the oligomer. The content of fluorine in the fluorine-containing resin and/or compound having the polymerizable carbon-carbon double bond is preferable to be within a range of 0.05 to 80% by mass, more preferable 0.08 to 80% by mass, and particularly preferable 0.1 to 80% by mass.

As the fluoroolefin used for the compound derived from the fluoroolefin are preferable olefins having a carbon number of 2 to 12 in which at least one of hydrogens is substituted with fluorine, and are concretely mentioned vinyl fluoride [$CFH{=}CH_2$, fluorine content: 41% by mass], vinylidene fluoride [$CF_2{=}CH_2$, fluorine content: 59% by mass], trifluoroethylene [$CF_2{=}CFH$, fluorine content: 70% by mass], tetrafluoroethylene [$CF_2{=}CF_2$, fluorine content: 76% by mass], hexafluoropropene [$CF_3CF_2{=}CF_2$, fluorine content: 76% by mass], (perfluorobutyl)ethylene [$CF_3(CF_2)_3CH{=}CH_2$, fluorine content: 69% by mass], (perfluorohexyl)ethylene [$CF_3(CF_2)_5CH{=}CH_2$, fluorine content: 71% by mass], (perfluorooctyl)ethylene [$CF_3(CF_2)_7CH{=}CH_2$, fluorine content: 72% by mass], (perfluorodecyl)ethylene [$CF_3(CF_2)_9CH{=}CH_2$, fluorine content: 73% by mass], chlorotrifluoroethylene [$CF_2{=}CFCl$, fluorine content: 49% by mass], 1-methoxy-(perfluoro-2-methyl-1-propene) [$(CF_3)_2C{=}CFOCH_3$, fluorine content: 63% by mass], 1,4-divinyloctafluorobutane [$CH_2{=}CH{-}(CF_2)_4{-}CH{=}CH_2$, fluorine content: 60% by mass], 1,6-divinyldodecafluorohexane [$CH_2{=}CH{-}(CF_2)_6{-}CH{=}CH_2$, fluorine content: 64% by mass], 1,8-divinylhexadecafluorooctane [$CH_2{=}CH{-}(CF_2)_8{-}CH{=}CH_2$, fluorine content: 67% by mass] and the like.

Moreover, as the fluoro (metha)acrylate are preferable alkyl (metha)acrylates having a carbon number of 5 to 16 in which at least one of hydrogens is substituted with fluorine, and are concretely mentioned 2,2,2-trifluoroethyl acrylate [$CF_3CH_2OCOCH{=}CH_2$, fluorine content: 37% by mass], 2,2,3,3,3-pentafluoropropyl acrylate [$CF_3CF_2CH_2OCOCH{=}CH_2$, fluorine content: 47% by mass], 2-(perfluorobutyl)ethyl acrylate [$CF_3(CF_2)_3CH_2CH_2OCOCH{=}CH_2$, fluorine content: 54% by mass], 3-(perfluorobutyl)-2-hydroxypropyl acrylate [$CF_3(CF_2)_3CH_2CH(OH)CH_2OCOCH{=}CH_2$, fluorine content: 49% by mass], 2-(perfluorohexyl)ethyl acrylate [$CF_3(CF_2)_5CH_2CH_2OCOCH{=}CH_2$, fluorine content: 59% by mass], 3-(perfluorohexyl)-2-hydroxypropyl acrylate [$CF_3(CF_2)_5CH_2CH(OH)CH_2OCOCH{=}CH_2$, fluorine content: 55% by mass], 2-(perfluorooctyl)ethyl acrylate [$CF_3(CF_2)_7CH_2CH_2OCOCH{=}CH_2$, fluorine content: 62% by mass], 3-(perfluorooctyl)-2-hydroxypropyl acrylate [$CF_3(CF_2)_7CH_2CH(OH)CH_2OCOCH{=}CH_2$, fluorine content: 59% by mass], 2-(perfluorodecyl)ethyl acrylate [$CF_3(CF_2)_9CH_2CH_2OCOCH{=}CH_2$, fluorine content: 65% by mass], 2-(perfluoro-3-methylbutyl)ethyl acrylate [$(CF_3)_2CF(CF_2)_2CH_2CH_2OCOCH{=}CH_2$, fluorine content: 57% by mass], 3-(perfluoro-3-methylbutyl)-2-hydroxypropyl acrylate [$(CF_3)_2CF(CF_2)_2CH_2CH(OH)CH_2OCOCH{=}CH_2$, fluorine content: 52% by mass], 2-(perfluoro-5-methylhexyl)ethyl acrylate [$(CF_3)_2CF(CF_2)_4CH_2CH_2OCOCH{=}CH_2$, fluorine content: 61% by mass], 3-(perfluoro-5-methylhexyl)-2-hydroxypropyl acrylate [$(CF_3)_2CF(CF_2)_4CH_2CH(OH)CH_2OCOCH{=}CH_2$, fluorine content: 57% by mass], 2-(perfluoro-7-methyloctyl)ethyl acrylate [$(CF_3)_2CF(CF_2)_6CH_2CH_2OCOCH{=}CH_2$, fluorine content: 64% by mass], 3-(perfluoro-7-methyloctyl)-2-hydroxypropyl acrylate [$(CF_3)_2CF(CF_2)_6CH_2CH(OH)CH_2OCOCH{=}CH_2$, fluorine content: 60% by mass], 1H,1H,3H-tetrafluoropropyl acrylate [$CHF_2CF_2CH_2OCOCH{=}CH_2$, fluorine content: 41% by mass], 1H,1H,5H-octafluoropentyl acrylate [$CHF_2(CF_2)_3CH_2OCOCH{=}CH_2$, fluorine content: 53% by mass], 1H,1H,7H-dodecafluoroheptyl acrylate [$CHF_2(CF_2)_5CH_2OCOCH{=}CH_2$, fluorine content: 59% by mass], 1H,1H,9H-hexadecafluorononyl acrylate [$CHF_2$ $(CF_2)_7CH_2OCOCH{=}CH_2$, fluorine content: 63% by mass], 1H-1-(trifluoromethyl)trifluoroethyl acrylate $[(CF_3)_2CHOCOCH{=}CH_2$, fluorine content: 51% by mass], 1H,1H,3H-hexafluorobutyl acrylate $[CF_3CHFCF_2CH_2OCOCH{=}CH_2$, fluorine content: 48% by mass], 2,2,2-trifluoroethyl methacrylate $[CF_3CH_2OCOC(CH_3){=}CH_2$, fluorine content: 34% by mass], 2,2,3,3,3-pentafluoropropyl methacrylate $[CF_3CF_2CH_2OCOC(CH_3){=}CH_2$, fluorine content: 44% by mass], 2-(perfluorobutyl)ethyl methacrylate $[CF_3(CF_2)_3CH_2CH_2OCOC(CH_3){=}CH_2$, fluorine content: 51% by mass], 3-(perfluorobutyl)-2-hydroxypropyl methacrylate $[CF_3(CF_2)_3CH_2CH(OH)CH_2OCOC(CH_3){=}CH_2$, fluorine content: 47% by mass], 2-(perfluorohexyl)ethyl methacrylate $[CF_3(CF_2)_5CH_2CH_2OCOC(CH_3){=}CH_2$, fluorine content: 57% by mass], 3-(perfluorohexyl)-2-hydroxypropyl methacrylate $[CF_3(CF_2)_5CH_2CH(OH)CH_2OCOC(CH_3){=}CH_2$, fluorine content: 53% by mass], 2-(perfluorooctyl)ethyl methacrylate $[CF_3(CF_2)_7CH_2CH_2OCOC(CH_3){=}CH_2$, fluorine content: 61% by mass], 3-perfluorooctyl-2-hydroxypropyl methacrylate $[CF_3(CF_2)_7CH_2CH(OH)CH_2OCOC(CH_3){=}CH_2$, fluorine content: 57% by mass], 2-(perfluorodecyl)ethyl methacrylate $[CF_3(CF_2)_9CH_2CH_2OCOC(CH_3){=}CH_2$, fluorine content: 63% by mass], 2-(perfluoro-3-methylbutyl)ethyl methacrylate $[(CF_3)_2CF(CF_2)_2CH_2CH_2OCOC(CH_3){=}CH_2$, fluorine content: 0.55% by mass], 3-(perfluoro-3-methylbutyl)-2-hydroxypropyl methacrylate $[(CF_3)_2CF(CF_2)_2CH_2CH(OH)CH_2OCOC(CH_3){=}CH_2$, fluorine content: 51% by mass], 2-(perfluoro-5-methylhexyl)ethyl methacrylate $[(CF_3)_2CF(CF_2)_4CH_2CH_2OCOC(CH_3){=}CH_2$, fluorine content: 59% by mass], 3-(perfluoro-5-methylhexyl)-2-hydroxypropyl methacrylate $[(CF_3)_2CF(CF_2)_4CH_2CH(OH)CH_2OCOC(CH_3){=}CH_2$, fluorine content: 56% by mass], 2-(perfluoro-7-methyloctyl)ethyl methacrylate $[(CF_3)_2CF(CF_2)_6CH_2CH_2OCOC(CH_3){=}CH_2$, fluorine content: 62% by mass], 3-(perfluoro-7-methyloctyl)-2-hydroxypropyl methacrylate $[(CF_3)_2CF(CF_2)_6CH_2CH(OH)CH_2OCOC(CH_3){=}CH_2$, fluorine content: 59% by mass], 1H,1H,3H-tetrafluoropropyl methacrylate $[CHF_2CF_2CH_2OCOC(CH_3){=}CH_2$, fluorine content: 51% by mass], 1H,1H,5H-octafluoropentyl methacrylate $[CHF_2(CF_2)_3CH_2OCOC(CH_3){=}CH_2$, fluorine content: 51% by mass], 1H,1H,7H-dodecafluoroheptyl methacrylate $[CHF_2(CF_2)_5CH_2OCOC(CH_3){=}CH_2$, fluorine content: 57% by mass], 1H,1H,9H-hexadecafluorononyl methacrylate $[CHF_2(CF_2)_7CH_2OCOC(CH_3){=}CH_2$, fluorine content: 61% by mass], 1H-1-(trifluoromethyl)trifluoroethyl methacrylate $[(CF_3)_2CHOCOC(CH_3){=}CH_2$, fluorine content: 48% by mass], 1H,1H,3H-hexafluorobutyl methacrylate $[CF_3CHFCF_2CH_2OCOC(CH_3){=}CH_2$, fluorine content: 46% by mass] and the like.

As the silicon-containing resin and/or compound having the ultraviolet or electron beam polymerizable carbon-carbon double bond are preferable both-terminal reactive silicone oils, one-terminal reactive silicone oils and (metha)acryloxy alkylsilanes. Moreover, as the reactive silicone oils are preferable ones wherein a (metha)acryl group is introduced into its terminal(s). The content of silicon in the silicon-containing resin and/or compound having the polymerizable carbon-carbon double bond is preferable to be within a range of 0.01 to 40% by mass, more preferable 0.05 to 35% by mass, and particularly preferable 0.1 to 30% by mass.

As the both-terminal reactive silicone oil is mentioned a silicone oil represented by the following formula (III):

(III)

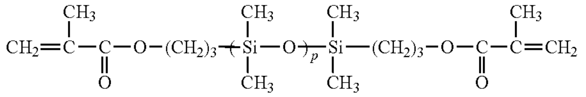

(wherein p is the number of a repeating unit). As the both-terminal reactive silicone oil can be used commercially available ones, and for example, commodity item "X-22-164A" (viscosity: 25 $mm^2/s$, equivalent of a functional group: 860 g/mol), commodity item "X-22-164B" (viscosity: 55 $mm^2/s$, equivalent of a functional group: 1630 g/mol) and commodity item "X-22-164C" (viscosity: 90 $mm^2/s$, equivalent of a functional group: 2370 g/mol) manufactured by Shin-Etsu Chemical Co. Ltd., item number "BX16-152B" (viscosity: 40 cs/25° C., equivalent of a methacryl group: 1300 g/mol, specific gravity at 25° C.: 0.97), item number "BX16-152" (viscosity: 85 cs/25° C., equivalent of a methacryl group: 2800 g/mol, specific gravity at 25° C.: 0.97) and item number "BX16-152C" (viscosity: 330 cs/25° C., equivalent of a methacryl group: 5100 g/mol, specific gravity at 25° C.: 0.97) manufactured by Dow Corning Toray Silicone Co., Ltd. and the like.

As the one-terminal reactive silicone oil are mentioned a silicone oil represented by the following formula (IV):

(IV)

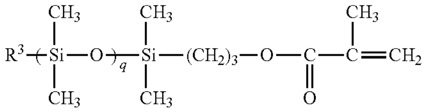

(wherein $R^3$ is methyl group or butyl group, q is the number of a repeating unit), and a silicone oil represented by the following formula (V):

(V)

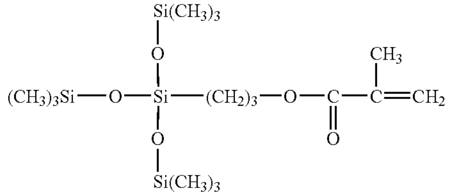

As the one-terminal reactive silicone oil can be used commercially available ones, and for example, commodity item "X-24-8201" (viscosity: 25 $mm^2/s$, equivalent of a functional group: 2100 g/mol), commodity item "X-22-174DX" (viscosity: 60 $mm^2/s$, equivalent of a functional group: 4500 g/mol) and commodity item "X-22-2426" (viscosity: 180 $mm^2/s$, equivalent of a functional group: 12000 g/mol) manufactured by Shin-Etsu Chemical Co. Ltd., item number "BX16-122A" (viscosity: 5 cs/25° C., refractive index: 1.417, specific gravity at 25° C.: 0.92) manufactured by Dow Corning Toray Silicone Co., Ltd. and the like.

Furthermore, as the (metha)acryloxy alkylsilane are mentioned 3-methacryloxypropyl dichloromethylsilane $[CH_2{=}C(CH_3)COO(CH_2)_3SiCl_2CH_3]$, 3-acryloxypropyl dimethoxymethylsilane $[CH_2{=}CHCOO(CH_2)_3Si(OCH_3)_2CH_3]$, 3-acryloxypropyl trimethoxysilane $[CH_2{=}CHCOO(CH_2)_3Si(OCH_3)_3]$, 3-methacryloxypropyl dimethoxymethylsilane [$CH_2$=C($CH_3$)COO($CH_2$)$_3$Si($OCH_3$)$_2$$CH_3$], 3-methacryloxypropyl trimethoxysilane [$CH_2$=C($CH_3$)COO($CH_2$)$_3$Si($OCH_3$)$_3$], 3-methacryloxypropyl diethoxymethylsilane [$CH_2$=C($CH_3$)COO($CH_2$)$_3$Si($OC_2H_5$)$_2$$CH_3$], 3-methacryloxypropyl triethoxysilane [$CH_2$=C($CH_3$)COO($CH_2$)$_3$Si($OC_2H_5$)$_3$] and the like. As the (meth)acryloxyalkylsilane can be used commercially available ones, and for example, item numbers "LS-2080", "LS-2826", "LS-2827", "LS-3375", "LS-3380", "LS-4548" and "LS-5118" manufactured by Shin-Etsu Chemical Co., Ltd. and the like.

As the ultraviolet non-curable fluorine-containing resin, the ultraviolet non-curable fluorine-containing compound, the ultraviolet non-curable silicon-containing resin, the ultraviolet non-curable silicon-containing compound, the electron beam non-curable fluorine-containing resin, the electron beam non-curable fluorine-containing compound, the electron beam non-curable silicon-containing resin and the electron beam non-curable silicon-containing compound is preferable one capable of dispersing or dissolving in the coating liquid. As the ultraviolet non-curable fluorine-containing resin and compound and the electron beam non-curable fluorine-containing resin and compound are concretely mentioned a fluorine-containing (metha)acrylate-based resin and compound, a fluorine-containing olefin-based resin and compound, a fluorine-containing ether-based resin and compound, a fluorine-containing ester-based resin and compound, a fluorine-containing epoxy-based resin and compound and a fluorine-containing urethane-based resin and compound. As the ultraviolet non-curable silicon-containing resin and compound and the electron beam non-curable silicon-containing resin and compound are concretely mentioned a silicon-containing (metha)acrylate-based resin and compound having plural siloxane bonds, a silicone resin, alkoxysilanes and their polymers. They may be used alone or in a combination of two or more. Although the fluorine-containing resin and compound and silicon-containing resin and compound is incompatible with the elastic layer and is inferior in the adhesiveness with the elastic layer to a resin not containing fluorine and silicon, since the surface energy of the ultraviolet non-curable or electron beam non-curable fluorine-containing resin and compound and silicon-containing resin and compound is lower than that of an ultraviolet curable or electron beam curable rein not containing fluorine and silicon, the ultraviolet non-curable or electron beam non-curable fluorine-containing resin and compound and silicon-containing resin and compound tend to be unevenly distributed to the surface side (that is, a side not contacting the elastic layer) of the resin coating layer, and as a result, the content of the ultraviolet non-curable or electron beam non-curable fluorine-containing resin and compound and silicon-containing resin and compound in a side of the elastic layer contacting the resin coating layer is lowered and the adhesiveness between the resin coating layer and the elastic layer is improved. Moreover, as a result of unevenly distributing the ultraviolet non-curable or electron beam non-curable fluorine-containing resin and compound and silicon-containing resin and compound to the surface side of the resin coating layer, the releasing property of the resin coating layer against toners is improved. Furthermore, even if the content of the ultraviolet non-curable or electron beam non-curable fluorine-containing resin and compound and silicon-containing resin and compound in the resin coating layer is decreased, since the ultraviolet non-curable or electron beam non-curable fluorine-containing resin and compound and silicon-containing resin and compound are unevenly distributed to the surface side of the resin coating layer, the releasing property of the resin coating layer against toners can be sufficiently maintained, and the content of expensive fluorine-containing resin and compound and silicon-containing resin and compound can be also decreased while the adhesiveness between the resin coating layer and the elastic layer is improved.

The content of fluorine in the ultraviolet non-curable fluorine-containing resin, the ultraviolet non-curable fluorine-containing compound, the electron beam non-curable fluorine-containing resin and the electron beam non-curable fluorine-containing compound is preferable to be within a range of 2 to 80% by mass, and more preferable 2 to 70% by mass. When the content of fluorine in the ultraviolet non-curable or electron beam non-curable fluorine-containing resin and compound is less than 2% by mass, the effect of fluorine is insufficient, while when it exceeds 80% by mass, there are problems in the compatibility and dispersibility. Also, the content of silicon in the ultraviolet non-curable silicon-containing resin, the ultraviolet non-curable silicon-containing compound, the electron beam non-curable silicon-containing resin and the electron beam non-curable silicon-containing compound is preferable to be within a range of 2 to 70% by mass, and more preferable 2 to 50% by mass. When the content of silicon in the ultraviolet non-curable or electron beam non-curable silicon-containing resin and compound is less than 2% by mass, the content of silicon is low and as a result, target performance may not by expressed, while when it exceeds 70% by mass, the compatibility and dispersibility may be deteriorated disadvantageously.

As the ultraviolet non-curable or electron beam non-curable fluorine-containing (metha)acrylate-based resin are mentioned a homopolymer of a fluorine-containing (metha) acrylate such as a perfluoroalkyl(metha)acrylate, a partially fluorinated alkyl (metha)acrylate and a (metha)acrylate bonded with a perfluoroalkyl group or a partially fluorinated alkyl group via an organic linking group, a copolymer of the fluorine-containing (metha)acrylate and a (metha)acrylate containing no fluorine such as alkyl esters, e.g. methyl (metha)acrylate, ethyl(metha)acrylate, butyl(metha)acrylate, octyl (metha)acrylate and dodecyl(metha)acrylate, hydroxy alkyl esters, e.g. hydroxyethyl(metha)acrylate and hydroxybutyl (metha)acrylate, glycidyl ester, and the like. The copolymer can be further reacted with a small amount of (metha)acrylate having a polysiloxane group. The carbon number of the perfluoroalkyl group or the partially fluorinated alkyl group in the fluorine-containing (metha)acrylate is preferable to be within a range of 1 to 20. Moreover, as the fluorine-containing (metha)acrylate is preferable a compound represented by the following formula (VI):

(VI)

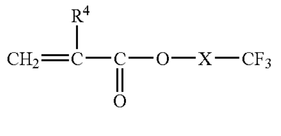

(wherein X is an alkylene group, a perfluoroalkylene group or a partially fluorinated alkylene group having a carbon number of 1 to 20, and may be linear or branched, or ones wherein oxygen is introduced into the main chain or the side chain of the alkylene group, the perfluoroalkylene group or the partially fluorinated alkylene group; $R^4$ is hydrogen, methyl group, chlorine, fluorine or cyano group). In view of improving the durability of the resin coating layer, X in the formula (IV) is preferable to be an alkylene group, a perfluoroalkylene group or a partially fluorinated alkylene group having a carbon number of not less than 4, more preferable to be an alkylene group, a perfluoroalkylene group or a partially fluorinated alkylene group having a carbon number of not less than 6, and particularly preferable to be $—(CH_2)_2—(CF_2)_7—$.

The ultraviolet non-curable or electron beam non-curable fluorine-containing (metha)acrylate-based resin may contain a crosslinkable functional group in its molecule. As the crosslinkable functional group are mentioned hydroxyl group, thiol group, carboxyl group, amino group, isocyanate group, aziridinyl group, glycidyl group, alkoxysilyl group, silanol group, cyclocarbonate group, acid anhydride group, vinyl group, enolether group, thioether group, active ester group, acetoacetate group, metal salt, metal oxide, thier blocked ones with various blocking agents, and the like. As the compound reacting with the crosslinkable functional group can be used a reactive multifunctional compound having two or more reactive functional groups in its molecule. As the reactive functional group are mentioned the same functional groups as the above mentioned crosslinkable functional groups. As the reactive multifunctional compound are preferable an organic epoxy compound and an organic polyisocyanate compound in view of industrial availability.

As the organic epoxy compound are mentioned compounds having at least two glycidyl groups, and are concretely mentioned ethylene glycol diglycidyl ether, propylene glycol diglycidyl ether, glycerol polyglycidyl ether, diglycerol polyglycidyl ether, sorbitol polyglycidyl ether, polyethylene glycol diglycidyl ether, tripropylene glycol diglycidyl ether, polypropylene glycol diglycidyl ether, neopentyl glycol diglycidyl ether, 1,6-hexanediol diglycidyl ether, glycerine polyglycidyl ether, diglycerine polyglycidyl ether, trimethylolpropane polyglycidyl ether, spiroglycol diglycidyl ether, various epoxy resins and the like.

As the organic polyisocyanate compound are concretely mentioned 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-phenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, and the like, and their dimers, trimers, as well as a polyisocyanate in which their isocyanate group is partially blocked with phenols, oximes, alcohols, active methylenes, mercaptans, amide acids, imides, amines, imidazoles, ureas, carbamates, imines or sulphites, and so on.

As the ultraviolet non-curable or electron beam non-curable fluorine-containing olefin-based resin are concretely mentioned polyvinylidene fluoride, polytetrafluoroethylene, vinylidene fluoride-tetrafluoroethylene copolymer, fluoride-tetrafluoroethylene-hexafluoropropylene terpolymer, tetrafluoroethylene-hexafluoropropylene copolymer, vinylidene fluoride-hexafluoropropylene copolymer, polyvinyl fluoride, polyvinyl fluoride ether, vinyl fluoride ether-tetrafluoroethylene copolymer, and the like. The fluorine-containing polyolefin-based resin can be obtained by polymerizing or copolymerizing a fluorine-containing olefin-based monomer(s) such as vinyl fluoride, vinylidene fluoride, tetrafluoroethylene, hexafluoropropylene, vinyl fluoride ether and the like.

As the ultraviolet non-curable or electron beam non-curable silicon-containing (metha)acrylate-based resin are mentioned a homopolymer of a silicon-containing (metha)acrylate such as polysiloxane group-containing (metha)acrylate or the like, a copolymer of the silicon-containing (metha) acrylate and a (metha)acrylate containing no silicon such as alkyl esters, e.g. methyl(metha)acrylate, ethyl(metha)acrylate, butyl(metha)acrylate, octyl(metha)acrylate and dodecyl (metha)acrylate, hydroxy alkyl esters, e.g. hydroxyethyl (metha)acrylate and hydroxybutyl(metha)acrylate, glycidyl ester, and the like. The copolymer may be copolymerized with a small amount of a fluorine-containing (metha)acrylate such as a perfluoroalkyl (metha)acrylate, a partially fluorinated alkyl(metha)acrylate, a (metha)acrylate bonded with a perfluoroalkyl group or a partially fluorinated alkyl group via an organic linking group. As the polysiloxane group-containing (metha)acrylate are mentioned a (metha)acrylate wherein one end or both ends of a polysiloxane chain is bonded with a (metha)acryloyl group and the like.

The ultraviolet non-curable or electron beam non-curable silicone resin is a polymer having a three dimensional network structure obtained by, for example, hydrolyzing and polymerizing organochlorosilanes, and produced from a trifunctional monomer such as methyltrichlorosilane, phenyltrichlorosilane or the like as a main monomer, and optionally combined with a difunctional monomer such as dimethyldichlorosilane, diphenyldichlorosilane or the like, and a monofunctional monomer such as chlorosilane or the like. A modified silicone resin obtained by subjecting the silicone resin to modification with alkyd, polyester, epoxy, phenol or the like can be also used. As the ultraviolet non-curable silicon-containing resin and/or compound can be also used a silicate being one of alkoxysilanes (silicate esters) and thier polymer obtained by polymerizing them. As the silicate are mentioned methyl silicate, ethyl silicate, propyl silicate, butyl silicate and the like. These may be used alone or in a combination of two or more.

To the coating liquid can be added various additives such as a reactive diluent having polymerizable doule bond, a conductive agent and the like. The viscosity of the coating liquid can be controlled by adding the reactive diluent having a polymerizable doule bond to the coating liquid. As the reactive diluent can be used a monofunctional, difunctional, or multifunctional polymerizable compound having a structure in which a (metha)acrylic acid is bonded to an amino acid or hydroxyl group-containing compound by esterification reaction and amidization reaction. The amount of the reactive diluent added is preferable to be within a range of 10 to 200 parts by mass based on 100 parts by mass of the total amount of the above ultraviolet or electron beam polymerizable resin and compound.

As the conductive agent used for the coating liquid are mentioned the same conductive agents as described for the elastic layer. Among them, the carbon-based electron conductive agent, the ion conductive agent and the transparent conductive agent are preferable. As the carbon-based electron conductive agent are mentioned conductive carbons such as Ketjen black, acetylene black and the like; carbon blacks for rubber such as SAF, ISAF, HAF, FEF, GPF, SRF, FT, MT and the like; carbon black for coloring agent treated by oxidation or the like; pyrolyzed carbon black, natural graphite, artificial graphite and the like. As the transparent conductive agent are mentioned microparticles of metal oxides such as ITO, tin oxide, titanium oxide, zinc oxide and the like; microparticles of metals such as nickel, copper, silver, germanium and the like; conductive whiskers such as conductive titanium oxide whisker, conductive barium titanate whisker and the like. The amount of the transparent conductive agent added is preferable to be not more than 100 parts by mass, more preferable within a range of 1 to 80 parts by mass, and particularly preferable 10 to 50 parts by mass based on 100 parts by mass of the resin constituting the resin coating layer. On the other hand, the amount of the ion conductive agent added is preferable to be not more than 20 parts by mass, more preferable within a range of 0.01 to 20 parts by mass, and particularly preferable 1 to 10 parts by mass based on 100 parts by mass of the resin constituting the resin coating layer.

When the resin coating layer is formed by ultraviolet irradiation, it is preferable to compound a photo-polymerization initiator into the coating liquid. As the photo-polymerization initiator can be used known ones, for example, 4-dimethylaminobenzoic acid, 4-dimethylaminobenzoic ester, 2,2-dimethoxy-2-phenylacetophenone, acetophenone diethylketal, alkoxyacetophenone, benzyldimethylketal, benzophenone, benzophenone derivatives such as 3,3-dimethyl-4-methoxy benzophenone, 4,4-dimethoxy benzophenone, and 4,4-diamino benzophenone and the like, alkyl benzoylbenzoate, bis (4-dialkylaminophenyl) ketone, benzyl, benzyl derivatives such as benzyl methylketal and the like, benzoin, benzoin derivatives such as benzoin isobutyl ether and the like, benzoin isopropyl ether, 2-hydroxy-2-methyl propiophenone, 1-hydroxycyclohexyl phenylketone, xanthone, thioxanthone, thioxanthone derivatives, fluorine, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)-phenylphosphine oxide, 2-methyl-1-[4-(methylthio)phenyl]-2-morpholino propanone-1, 2-benzyl-2-dimethylamino-1-(morpholinophenyl)-butanone-1 and the like. These photo-polymerization initiators may be used alone or in a combination of two or more. The amount of the photo-polymerization initiator added is preferable to be within a range of 0.1 to 10 parts by mass based on 100 parts by mass of the total amount of the ultraviolet polymerizable resin and compound.

When the photo-polymerization initiator is compounded into the coating liquid, a tertiary amine-based photo-polymerization accelerator such as triethylamine, triethanolamine or the like, a phosphine-based photo-polymerization accelerator such as triphenyl phosphine or the like, a thioether-based photo-polymerization accelerator such as thiodiglycol or the like and so on may be further added in order to accelerate the polymerization by the photo-polymerization initiator. The amount of the photo-polymerization accelerator added is preferable to be within a range of 0.01 to 10 parts by mass based on 100 parts by mass of the total amount of the ultraviolet polymerizable resin and compound.

When the resin coating layer is formed by ultraviolet irradiation, the thickness of the resin coating layer is preferable to be within a range of 1 to 100 μm, more preferable 3 to 100 μm, and particularly preferable 5 to 100 μm. When the thickness of the resin coating layer is less than 1 μm, the electric performance of the surface of the roller may not be sufficiently ensured due to the friction during the long-term use, while when it exceeds 100 μm, the surface of the roller may be hard and cause toners to be damaged and firmly fixed on the photosensitive drum and the layer forming blade, and as a result, faulty image may be caused.

When the resin coating layer is formed by electron beam irradiation, the thickness of the resin coating layer is preferable to be within a range of 1 to 500 μm, more preferable 3 to 200 μm, and particularly preferable 5 to 100 μm. When the thickness of the resin coating layer is less than 1 μm, the electric performance of the surface of the roller may not be sufficiently ensured due to the friction during the long-term use, while when it exceeds 500 μm, the surface of the roller may be hard and cause toners to be damaged and firmly fixed on the photosensitive drum and the layer forming blade, and as a result, a faulty image may be caused.

When the microparticle-containing resin coating layer is formed by ultraviolet irradiation, the thickness of the microparticle-containing resin coating layer is preferable to be within a range of 1 to 100 μm, more preferable 3 to 100 μm, and particularly preferable 5 to 100 μm. When the thickness of the microparticle-containing resin coating layer is less than 1 μm, the charging performance of the surface of the roller may not be sufficiently ensured due to the friction during the long-term use, while when it exceeds 100 μm, the surface of the roller may be hard and cause toners to be damaged and firmly fixed on the photosensitive drum and the layer forming blade, and as a result, a faulty image may be caused.

When the microparticle-containing resin coating layer is formed by electron beam irradiation, the thickness of the microparticle-containing resin coating layer is preferable to be within a range of 1 to 100 μm, more preferable 3 to 100 μm, and particularly preferable 5 to 100 μm. When the thickness of the microparticle-containing resin coating layer is less than 1 μm, the charging performance of the surface of the roller may not be sufficiently ensured due to the friction during the long-term use, while when it exceeds 100 μm, the surface of the roller may be hard and cause toners to be damaged and firmly fixed on the photosensitive drum and the layer forming blade, and as a result, a faulty image may be caused. Moreover, since the electron beam can reach a deep portion of the microparticle-containing resin coating layer, the amount of the remaining unreacted compound can be sufficiently suppressed even if the microparticle-containing resin coating layer is thicker than a normal one.

The thickness of the first resin coating layer is preferable to be within a range of 3 to 30 μm, and more preferable 5 to 20 μm. On the other hand, the thickness of the second resin coating layer is preferable to be within a range of 1 to 20 μm, and more preferable 3 to 10 μm. When the thickness of the second resin coating layer is less than 1 μm, the local discharge may occur and a white line tends to easily occur in the image, while when it exceeds 20 μm, the resistance value excessively rises and the developing bias cannot be sufficiently ensured, and as a result, a faulty image may be caused.

The thickness of the protective layer is preferable to be within a range of 1 to 50 μm, and more preferable 1 to 30 μm. When the thickness of the protective layer is less than 1 μm, the performance as the protective layer is not sufficient and the durability may be deteriorated, while when it exceeds 50 μm, the unevenness formed by the microparticle-containing layer is covered and proper unevenness cannot be formed.

The developing roller, charging roller and conductive roller according to the invention are preferable to have an electric resistance of $10^3$ to $10^{10}\Omega$, more preferably $10^4$ to $10^8\Omega$. When the resistance value of these rollers is less than $10^3\Omega$, it is difficult to control a tone and a bias leakage may be caused if the photosensitive drum or the like has a defect, while when it exceeds $10^{10}\Omega$, a developing bias is decreased by the high resistance of the roller itself and cannot be sufficiently ensured for development, and as a result, an image density cannot be sufficiently obtained. The resistance value can be determined from a current value obtained by pressing the outer peripheral surface of the roller onto a plate-like or cylindrical counter electrode under a predetermined pressure and applying a voltage of 100 V between the shaft and the counter electrode. Moreover, it is important to properly and evenly control the resistance value of the roller from a viewpoint that an electric field intensity is properly and uniformly maintained for transferring toner.

Figure 6:
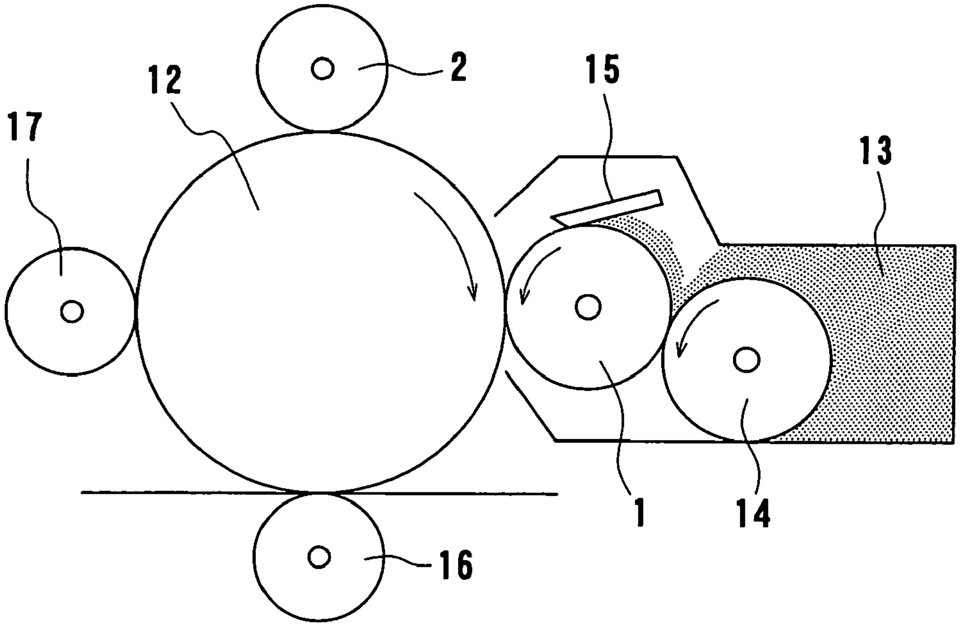
FIG. 6 is a partial sectional view of an embodiment of the image forming apparatus using the developing roller, the charging roller and the conductive roller according to the invention.

The surface roughness of the developing roller, charging roller and conductive roller according to the invention is preferable to be within a range of 0.2 to 30 μm, and more preferable 0.2 to 20 μm in JIS 10-point average roughness. When the JIS 10-point average roughness of the roller is less than 0.2 μm, the transferring property of toners may be bad when the roller is used as a developing roller, while when it exceeds 30 μm, spots may be badly caused in the image when the roller is used as a charging roller, The developing roller, charging roller and conductive roller according to the invention can be used in the image forming apparatus. Moreover, the conductive roller according to the invention can be used as a toner feed roller, a transfer roller, a cleaning roller and the like as well as the developing roller and the charging roller. The image forming apparatus using the developing roller, charging roller and conductive roller according to the invention will be described in detail below with reference to the figure. FIG. 6 is a partial sectional view of an embodiment of the image forming apparatus using the developing roller, the charging roller and the conductive roller according to the invention. The illustrated image forming apparatus comprises a photosensitive drum 12 carrying an electrostatic latent image, a charging roller 2 positioned near (upside in the figure) to the photosensitive drum 12 and for charging the photosensitive drum 12, a toner feed roller 14 for supplying a toner 13, a developing roller 1 disposed between the toner feed roller 14 and the photosensitive drum 12, a layer forming blade 15 disposed near (upside in the figure) to the developing roller 1, a transfer roller 16 positioned near (downside in the figure) to the photosensitive drum 12, and a cleaning roller 17 disposed adjacent to the photosensitive drum 12. Moreover, the image forming apparatus may further comprise known members (not shown) usually used for the image forming apparatus.

In the illustrated image forming apparatus, the charging roller 2 is contacted with the photosensitive drum 12, and the voltage is applied between the photosensitive drum 12 and the charging roller 2 to charge the photosensitive drum 12 at a constant electric potential and then an electrostatic latent image is formed on the photosensitive drum 12 by an exposure machine (not shown). Then, the toners 13 are supplied from the toner feed roller 14 to the photosensitive drum 12 through the developing roller 1 by rotating the photosensitive drum 12, the toner feed roller 14 and the developing roller 1 in the direction shown by arrows in the figure. The toners 13 on the developing roller 1 are made to a uniform thin layer by the layer forming blade 15, while since the developing roller 1 and the photosensitive drum 12 are rotated with contacting each other, the toners 13 are attached from the developing roller 1 to the electrostatic latent image on the photosensitive drum 12 to visualize the latent image. The toners 13 attached to the latent image are transferred to a recording medium such as a paper or the like by the transfer roller 16, while the remaining toners 13 on the photosensitive drum 12 after the transferring are removed by the cleaning roller 17. In the image forming apparatus, it is possible to stably form an excellent image for a long time by using the above-mentioned developing roller, charging roller and conductive roller according to the invention as at least one of the charging roller 2, the toner feed roller 14, the developing roller 1, the transfer roller 16 and the cleaning roller 17.

EXAMPLES

The following examples are given in illustration of the invention and are not intended as limitations thereof.

<A. First Developing Roller>

Example A-1

100 parts by mass of Sunnix FA952 [polyetherpolyol manufactured by Sanyo Chemical Industries, Ltd., OH value=37], 1 part by mass of SRX274C [foam stabilizer manufactured by Dow Corning Toray Silicone Co., Ltd.], 2.8 parts by mass of TOYOCAT NP [amine catalyst manufactured by Tosoh Corporation], 1.5 parts by mass of TOYOCAT EP [amine catalyst manufactured by Tosoh Corporation] and 59 parts by mass of SANFOAM IC-716 [tolylene diisocyanate manufactured by Sanyo Chemical Industries, Ltd.] are mechanically stirred and foamed. Then, a metal shaft having an outer diameter of 8.0 mm and a length of 240 mm is disposed into a metal cylindrical mold having an inner diameter of 16 mm, a length of 250 mm and a fluorine-processed surface through its opening and then 8.0 g of the above raw material for a polyurethane foam is charged from a foaming machine. Then, the mold charged with the raw material for the polyurethane foam is heated in an oven of 80° C. for 20 minutes and released to make a main body of a roller provided with an elastic layer composed of the urethane foam and having an outer diameter of 16 mm and a total length of a foam portion of 230 mm.

A coating liquid according to a formulation shown in Table 1 is applied on an outer peripheral surface of the main body of the roller by a roll coater, ultraviolet rays are irradiated on the roller at an irradiation intensity of 400 mW and an integrated light amount of 1000 mJ/cm$^2$ by using Unicure UVH-0252C manufactured by Ushio, Inc. while the roller is rotated, and as a result, the coating liquid is immediately cured to form an elastic resin coating layer to obtain a developing roller provided with the resin coating layer on the outer peripheral surface of the main body of the roller. A charge of toners and an amount of carried toner of the resulting developing roller are evaluated according to a known method. Also, the developing roller is incorporated into an image forming apparatus, and an image density, whether a half-tone spot and fog occur or not and a difference of a density between a top end and a bottom end are evaluated according to a known method. Moreover, whether a wear of the surface of the developing roller occur or not is checked after 10000 sheets are printed. These results are shown in Table 1.

Evaluation Method:

(1) Evaluation of Image

Image forming apparatus: commercially available laser printer

Color of cartridge: cyan (2) Surface Roughness

SURFCOM 590A (manufactured by Tokyo Seimitsu)

(3) Resistance

R8340A ULTRA HIGH RESISTANCE METER (manufactured by ADVANTEST)

Measuring condition: voltage applied between the shaft and the surface of the roller: 100 V, measured under static condition by applying 500 g of load to both the ends of the roller.

Example A-2

100 parts by mass of polyetherpolyol which is trifunctional, has a molecular weight of 9,000 and is produced by adding propylene oxide to glycerin, is added with 1.6 parts by mass of conductive carbon and 0.15 part by mass of dibutyltin dilaurate, sufficiently stirred and mixed, and then defoamed for 20 minutes with stirring under vacuum to be used as a polyol component. The polyol component has a hydroxyl value of 19 mgKOH/g. On the other hand, polypropylene glycol-modified polymeric MDI having a NCO content of 11% is defoamed for 20 minutes with stirring under vacuum and used as an isocyanate component. The polyol component and the isocyanate component are stirred at high speed and mixed by a binary type casting machine while regulating a ratio of the polyol component to the isocyanate component to be 101.75/13.70 (isocyanate index: 103). The mixed urethane raw material is charged into a metal cylindrical mold in which a metal shaft having an outer diameter ϕ of 8 mm is set and heat-cured in an oven at 90° C. for 60 minutes. The urethane roller with the metal shaft is removed from the cylindrical mold to obtain a roller. A developing roller is made by the same manner as in Example A-1 except that a resin coating layer is formed on an outer peripheral surface of the main body of the roller by using a coating liquid according to a formulation shown in Table 1. The properties and performances of the resulting developing roller are shown in Table 1.

Example A-3

Liquid silicone LIM liquid #2090 (manufactured by Dow Corning Toray Silicone Co., Ltd.) is stirred and defoamed, and then charged into a metal cylindrical mold in which a metal shaft having an outer diameter ϕ of 8 mm is set and heat-cured in an oven at 120° C. for 30 minutes. The roller with the metal shaft is removed from the cylindrical mold and heat-cured in a convection oven at 200° C. for 4 hours to obtain a roller. A developing roller is made by the same manner as in Example A-1 except that a resin coating layer is formed on an outer peripheral surface of the main body of the roller by using a coating liquid according to a formulation shown in Table 1. The properties and performances of the resulting developing roller are shown in Table 1.

Example A-4

100 parts by mass of Nipol IR2200L having a Moony viscosity $ML_{1+4}$(100° C.) of 70 (manufactured by Nippon Zeon), 60 parts by mass of LIR-30 having an average molecular weight of 29000 (manufactured by Kuraray), 28 parts by mass of Carbon Black TB#5500 (manufactured by Tokai Carbon), 5 parts by mass of zinc white, 1 part by mass of stearic acid and 9 parts by mass of PERHEXA C-40 (manufactured by Nippon Oil and Fat) are kneaded by using a kneader having a volume of 55 L to provide a rubber composition. The rubber composition is extruded from a crosshead-type extruder manufactured by Mitsuba Industries to a metal shaft having an outer diameter ϕ of 8 mm and being attached with an adhesive agent to obtain an unvulcanized rubber/shaft integral molding. This is set in a metal cylindrical mold, and vulcanized at 175° C. under a pressure of $3.2\times10^6$ Pa for 20 minutes. The pressure in the split mold is released to obtain a rubber roller, which is vulcanized in an oven of 180° C. for 4 hours. The resulting roller is plunger-type ground to have a diameter ϕ of 16 mm by a rotary grinder to obtain a rubber roller. A developing roller is made by the same manner as in Example A-1 except that a resin coating layer is formed on an outer peripheral surface of the main body of the roller by using a coating liquid according to a formulation shown in Table 1. The properties and performances of the resulting developing roller are shown in Table 1.

Example A-5

100 parts by mass of EPDM having an iodine value of 36 and a Moony viscosity $ML_{1+4}$(100° C.) of 39, 50 parts by mass of Carbon Black TB#5500 (manufactured by Tokai Carbon), 36 parts by mass of Nobelite A (manufactured by Nippon Funka Kogyo) as a calcium carbonate, 60 parts by mass of Diana Process Oil PW90 (manufactured by Idemitsu Kosan), 3 parts by mass of zinc white, 2 parts by mass of stearic acid, 1 part by mass of 2-mercaptobenzothiazole as a vulcanization accelerator, 1.5 parts by mass of sulfur and 6 parts by mass of NEOCELLBORN N#1000M (manufactured by Eiwa Chemical) as a foaming agent are kneaded by using a kneader having a volume of 55 L to provide a rubber foam composition. The rubber composition is extruded from a crosshead-type extruder manufactured by Mitsuba Industries to a metal shaft having an outer diameter ϕ of 8 mm and being attached with an adhesive agent to obtain an unvulcanized rubber/shaft integral molding. This is set in a metal cylindrical mold, and vulcanized and foamed at 175° C. under a pressure of $3.2\times10^6$ Pa for 20 minutes. The pressure in the split mold is released to obtain a rubber foam roller with a skin layer, which is vulcanized in an oven of 180° C. for 4 hours. The resulting roller is plunger-type ground to have a diameter ϕ of 16 mm by a rotary grinder to obtain a rubber foam roller. A developing roller is made by the same manner as in Example A-1 except that a resin coating layer is formed on an outer peripheral surface of the main body of the roller by using a coating liquid according to a formulation shown in Table 1. The properties and performances of the resulting developing roller are shown in Table 1.

Example A-6

A developing roller is made in the same manner as in Example A-1 except that a resin coating layer is formed by using a coating liquid according to a formulation shown in Table 2. The properties and performances of the resulting developing roller are shown in Table 2.

Example A-7

A developing roller is made by the same manner as in Example A-1 except that a resin coating layer is formed by using a coating liquid according to a formulation shown in Table 2. Properties and performances of the resulting developing roller are shown in Table 2.

Example A-8

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 100 parts by mass of MEK (methyl ethyl ketone) is applied on the main body of the roller provided with the elastic layer composed of urethane foam made in Example A-1 at a thickness of 50 μm, and then heat-cured at 100° C. for 1 hour. A resin coating layer is formed onto the resulting roller by using a coating liquid according to a formulation shown in Table 2 to make a developing roller. The properties and performances of the resulting developing roller are shown in Table 2.

Comparative Example A-1

A developing roller is made by the same manner as in Example A-1 except that a resin coating layer is formed by using a coating liquid according to a formulation shown in Table 2. Properties and performances of the resulting developing roller are shown in Table 2.

Comparative Example A-2

A developing roller is made in the same manner as in Example A-4 except that a resin coating layer is formed by using a coating liquid according to a formulation shown in Table 2. The properties and performances of the resulting developing roller are shown in Table 2.

TABLE 1

| | | | | | Example A-1 | Example A-2 | Example A-3 | Example A-4 | Example A-5 |
|---|---|---|---|---|---|---|---|---|---|
| Elastic layer | Elastomer | | | | Urethane foam | Solid urethane | Silicone | Rubber | Rubber foam |
| | Thickness | | | mm | 4 | 4 | 4 | 4 | 4 |
| Resin coating layer | Formulation of coating liquid | UV non-curable fluorine-containing component | MODIPER F200 (made by Nippon Oil & Fat) | parts by mass | 10 | — | — | — | — |
| | | | LF200 (made by Asahi Glass) | | — | 15 | — | — | 15 |
| | | | THV220A (made by Sumitomo 3M) | | — | — | 10 | — | — |
| | | | KYNER 7201 (mede by ATOFINA) | | — | — | — | 10 | — |
| | | UV-curing type | UF8001 (made by Kyoeisha Chemical) | | 50 | 50 | 50 | 50 | 50 |
| | | | Methoxytriethyleneglycol acrylate | | 50 | 50 | 25 | 25 | 25 |
| | | | Isoamyl acrylate | | — | — | — | 25 | 25 |
| | | | Dimethylaminoethyl methacrylate | | — | — | 25 | — | — |
| | | | 2-(perfluorooctyl)ethyl acrylate | | — | — | — | — | 10 |
| | | | 1H-1-(trifluoromethyl)trifluoroethyl acrylate | | — | — | — | — | — |
| | | | Ketjen Black (made by Mitsubishi Chemical) | | 2.5 | 2.5 | — | — | 2.5 |
| | | | DENKA BLACK (made by Denki Kagaku Kogyo) | | — | — | 2.5 | 2.5 | — |
| | | | ITO microparticle | | — | — | — | — | — |
| | | | CFB-101-40 (made by Dainippon Ink & Chemicals) | | — | — | 10 | — | — |
| | | | SS20 (made by Nippon Silica) | | — | — | — | 3 | — |
| | | | IRGACURE184 (made by Ciba-Geigy Specialty Chemicals) | | 2.5 | 2.5 | — | — | 2.5 |
| | | | IRGACURE819 (made by Ciba-Geigy Specialty Chemicals) | | 2.5 | 2.5 | — | — | 2.5 |
| | | | KAYACURE DETX-S (made by Nippon Kayaku) | | — | — | 1.7 | 1.7 | — |
| | | | KAYACURE DMBI (made by Nippon Kayaku) | | — | — | 3.3 | 3.3 | — |
| | | | Benzyltributylammonium chloride | | — | — | — | — | — |
| | | | Propylene glycol monomethyl ether | | — | — | — | — | — |
| | Thickness | | | μm | 15 | 20 | 18 | 12 | 15 |
| Physical values of developing roller | Resitance | | | Ω | 7.0E+05 | 4.0E+06 | 4.0E+07 | 3.0E+07 | 7.0E+06 |
| | Surface roughness Rz | | | μm | 4.0 | 3.0 | 5.0 | 4.2 | 7.0 |
| Initial properties of developing roller | Charge of toner | | | μC/g | 32 | 34 | 31 | 32 | 33 |
| | Amount of carried toner | | | $mg/cm^2$ | 0.31 | 0.33 | 0.39 | 0.33 | 0.31 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner adhesion on surface of developing roller after 10000 sheets were printed | | | | | good | good | good | good | very good |
| Image after 10000 sheets were printed | Image density | | | | good | good | good | good | good |
| | Fog | | | | good | good | good | good | very good |
| | Difference of density between top and bottom ends | | | | good | good | good | good | good |
| | Half-tone spot | | | | good | good | good | good | good |

TABLE 2

| | | | | | Example A-6 | Example A-7 | Example A-8 | Comparative example A-1 | Comparative example A-2 |
|---|---|---|---|---|---|---|---|---|---|
| Elastic layer | Elastomer | | | | Urethane foam | Urethane foam | Urethane foam | Urethane foam | Rubber |
| | Thickness | | | mm | 4 | 4 | 4 | 4 | 4 |
| Resin coating layer | Formulation of coating liquid | UV non-curable fluorine-containing component | MODIPER F200 (made by Nippon Oil & Fat) | parts by mass | — | 10 | 10 | — | — |
| | | | LF200 (made by Asahi Glass) | | — | — | — | — | — |
| | | | THV220A (made by Sumitomo 3M) | | 10 | — | — | — | — |
| | | | KYNER 7201 (mede by ATOFINA) | | — | — | — | — | — |
| | | UV-curing type | UF8001 (made by Kyoeisha Chemical) | | 50 | 50 | 50 | 50 | 50 |
| | | | Methoxytriethyleneglycol acrylate | | 25 | 25 | 25 | 25 | 50 |
| | | | Isoamyl acrylate | | 25 | 25 | 25 | 25 | — |
| | | | Dimethylaminoethyl methacrylate | | — | — | — | — | — |
| | | | 2-(perfluorooctyl)ethyl acrylate | | — | — | — | — | — |
| | | | 1H-1-(trifluoromethyl)trifluoroethyl acrylate | | 10 | — | — | — | — |
| | | | Ketjen Black (made by Mitsubishi Chemical) | | — | — | 2.5 | 2.5 | 2.5 |
| | | | DENKA BLACK (made by Denki Kagaku Kogyo) | | 2.5 | — | — | — | — |
| | | | ITO microparticle | | — | 30 | — | — | — |
| | | | CFB-101-40 (made by Dainippon Ink & Chemicals) | | 10 | — | — | — | 10 |
| | | | SS20 (made by Nippon Silica) | | — | — | — | — | — |
| | | | IRGACURE184 (made by Ciba-Geigy Specialty Chemicals) | | 2.5 | 2.5 | 2.5 | 2.5 | — |
| | | | IRGACURE819 (made by Ciba-Geigy Specialty Chemicals) | | 2.5 | 2.5 | 2.5 | 2.5 | — |
| | | | KAYACURE DETX-S (made by Nippon Kayaku) | | — | — | — | — | 1.7 |
| | | | KAYACURE DMBI (made by Nippon Kayaku) | | — | — | — | — | 3.3 |
| | | | Benzyltributylammonium chloride | | — | — | 4 | — | — |
| | | | Propylene glycol monomethyl ether | | — | — | 20 | — | — |
| | Thickness | | | μm | 16 | 20 | 20 | 20 | 20 |
| Physical values of developing roller | Resitance | | | Ω | 8.5E+07 | 7.0E+08 | 8.0E+05 | 7.0E+06 | 5.0E+05 |
| | Surface roughness Rz | | | μm | 6.0 | 4.1 | 4.5 | 3.0 | 5.5 |
| Initial properties of developing roller | Charge of toner | | | μC/g | 28 | 29 | 31 | 30 | 31 |
| | Amount of carried toner | | | $mg/cm^2$ | 0.41 | 0.29 | 0.31 | 0.32 | 0.39 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner adhesion on surface of developing roller after 10000 sheets were printed | | | | | very good | good | good | much filming | filming |
| Image after 10000 sheets were printed | Image density | | | | good | good | good | bad | bad |
| | Fog | | | | very good | good | good | very bad | bad |
| | Difference of density between top and bottom ends | | | | good | good | good | bad | bad |
| | Half-tone spot | | | | good | good | good | bad | bad |

As seen from Tables 1 and 2, since the developing rollers of Examples has little adhesion of toners on the resin coating layers, even if the image forming apparatuses incorporated with the developing roller are used for a long time, toners are adhered little on the surface of the developing roller and a good image can be obtained for a long time.

Example A-9

A developing roller is made in the same manner as in Example A-1 except that a resin coating layer is formed by using a coating liquid according to a formulation shown in Table 3. The properties and performances of the resulting developing roller are shown in Table 3.

Example A-10

A developing roller is made in the same manner as in Example A-2 except that a resin coating layer is formed by using a coating liquid according to a formulation shown in Table 3. The properties and performances of the resulting developing roller are shown in Table 3.

Example A-11

A developing roller is made in the same manner as in Example A-4 except that a resin coating layer is formed by using a coating liquid according to a formulation shown in Table 3. The properties and performances of the resulting developing roller are shown in Table 3.

Example A-12

A developing roller is made in the same manner as in Example A-5 except that a resin coating layer is formed by using a coating liquid according to a formulation shown in Table 3. The properties and performances of the resulting developing roller are shown in Table 3.

Example A-13

A developing roller is made in the same manner as in Example A-3 except that a resin coating layer is formed by using a coating liquid according to a formulation shown in Table 3. The properties and performances of the resulting developing roller are shown in Table 3.

Example A-14

A developing roller is made in the same manner as in Example A-1 except that a resin coating layer is formed by using a coating liquid according to a formulation shown in Table 4. The properties and performances of the resulting developing roller are shown in Table 4.

Example A-15

A developing roller is made in the same manner as in Example A-11 except that a resin coating layer is formed by using a coating liquid according to a formulation shown in Table 4. The properties and performances of the resulting developing roller are shown in Table 4.

Example A-16

A developing roller is made by the same manner as in Example A-8 except that a resin coating layer is formed by using a coating liquid according to a formulation shown in Table 4. Properties and performances of the resulting developing roller are shown in Table 4.

Comparative Example A-3

A developing roller is made in the same manner as in Example A-1 except that a resin coating layer is formed by using a coating liquid according to a formulation shown in Table 4. The properties and performances of the resulting developing roller are shown in Table 4.

Comparative Example A-4

A developing roller is made in the same manner as in Example A-4 except that a resin coating layer is formed by using a coating liquid according to a formulation shown in Table 4. The properties and performances of the resulting developing roller are shown in Table 4.

TABLE 3

| | | | | | Example A-9 | Example A-10 | Example A-11 | Example A-12 | Example A-13 |
|---|---|---|---|---|---|---|---|---|---|
| Elastic layer | Elastomer | | | | Urethane foam | Solid urethane | Rubber | Rubber foam | Silicone |
| | Thickness | | | mm | 4 | 4 | 4 | 4 | 4 |
| Resin coating layer | Formulation of coating liquid | UV non-curable silicon-containing component | MODIPER FS700 (made by Nippon Oil & Fat) | parts by mass | 10 | — | — | — | — |
| | | | MODIPER FS710 (made by Nippon Oil & Fat) | | — | 15 | — | — | — |
| | | | US-270 (made by Toagosei) | | — | — | 10 | — | — |
| | | | Ethyl silicate 45 (made by Tama Chemicals) | | — | — | — | 20 | — |
| | | | X-22-821 (made by Shin-Etsu Chemical) | | — | — | — | — | 10 |
| | | UV-curing type | UF8001 (made by Kyoeisha Chemical) | | 50 | 50 | 50 | 50 | 50 |
| | | | Methoxytriethyleneglycol acrylate | | 50 | 50 | 25 | 25 | 25 |
| | | | Isoamyl acrylate | | — | — | — | 25 | 25 |
| | | | Dimethylaminoethyl methacrylate | | — | — | 25 | — | — |
| | | | γ-methacryloxypropyl trimethoxysilane | | — | — | — | — | 10 |
| | | | X-24-8201 (made by Shin-Etsu Chemical) | | — | — | — | — | — |
| | | | Ketjen Black (made by Mitsubishi Chemical) | | 2.5 | 2.5 | — | — | 2.5 |
| | | | DENKA BLACK (made by Denki Kagaku Kogyo) | | — | — | 2.5 | 2.5 | — |
| | | | ITO microparticle | | — | — | — | — | — |
| | | | CFB-101-40 (made by Dainippon Ink & Chemicals) | | — | — | 10 | — | — |
| | | | SS20 (made by Nippon Silica) | | — | — | — | 3 | — |
| | | | IRGACURE184 (made by Ciba-Geigy Specialty Chemicals) | | 2.5 | 2.5 | — | 2.5 | 2.5 |
| | | | IRGACURE819 (made by Ciba-Geigy Specialty Chemicals) | | 2.5 | 2.5 | — | 2.5 | 2.5 |
| | | | KAYACURE DETX-S (made by Nippon Kayaku) | | — | — | 1.7 | — | — |
| | | | KAYACURE DMBI (made by Nippon Kayaku) | | — | — | 3.3 | — | — |
| | | | Benzyltributylammonium chloride | | — | — | — | — | — |
| | | | Propylene glycol monomethyl ether | | — | — | — | — | — |
| | Thickness | | | μm | 16 | 15 | 19 | 20 | 18 |
| Physical values of developing roller | Resitance | | | Ω | 7.0E+05 | 4.0E+06 | 3.0E+07 | 3.0E+07 | 7.0E+06 |
| | Surface roughness Rz | | | μm | 4.0 | 3.0 | 5.0 | 7.5 | 4.1 |

TABLE 3-continued

| | | | Example A-9 | Example A-10 | Example A-11 | Example A-12 | Example A-13 |
|---|---|---|---|---|---|---|---|
| Initial property of developing roller | Charge of toner | μC/g | 33 | 32 | 30 | 33 | 34 |
| | Amount of carried toner | mg/cm$^2$ | 0.3 | 0.33 | 0.31 | 0.37 | 0.29 |
| Initial image | Image density | | good | good | good | good | good |
| | Fog | | good | good | good | good | good |
| | Difference of density between top and bottom ends | | good | good | good | good | good |
| | Half-tone spot | | good | good | good | good | good |
| Wear of surface of developing roller after 10000 sheets were printed | | | good | good | good | good | very good |
| Image after 10000 sheets were printed | Image density | | good | good | good | good | good |
| | Fog | | good | good | good | good | very good |
| | Difference of density between top and bottom ends | | good | good | good | good | good |
| | Half-tone spot | | good | good | good | good | good |

TABLE 4

| | | | | | Example A-14 | Example A-15 | Example A-16 | Comparative example A-3 | Comparative example A-4 |
|---|---|---|---|---|---|---|---|---|---|
| Elastic layer | Elastomer | | | | Urethane foam | Urethane foam | Urethane foam | Urethane foam | Rubber |
| | Thickness | | | mm | 4 | 4 | 4 | 4 | 4 |
| Resin coating layer | Formulation of coating liquid | UV non-curable silicon-containing component | MODIPER FS700 (made by Nippon Oil & Fat) | parts by mass | — | 10 | 10 | — | — |
| | | | MODIPER FS710 (made by Nippon Oil & Fat) | | — | — | — | — | — |
| | | | US-270 (made by Toagosei) | | 10 | — | — | — | — |
| | | | Ethyl silicate 45 (made by Tama Chemicals) | | — | — | — | — | — |
| | | | X-22-821 (made by Shin-Etsu Chemical) | | — | — | — | — | — |
| | | UV-curing type | UF8001 (made by Kyoeisha Chemical) | | 50 | 50 | 50 | 50 | 50 |
| | | | Methoxytriethyleneglycol acrylate | | 25 | 25 | 25 | 25 | 50 |
| | | | Isoamyl acrylate | | 25 | 25 | 25 | 25 | — |
| | | | Dimethylaminoethyl methacrylate | | — | — | — | — | — |
| | | | γ-methacryloxypropyl trimethoxysilane | | — | — | — | — | — |
| | | | X-24-8201 (made by Shin-Etsu Chemical) | | 10 | — | — | — | — |
| | | | Ketjen Black (made by Mitsubishi Chemical) | | — | — | 2.5 | 2.5 | 2.5 |
| | | | DENKA BLACK (made by Denki Kagaku Kogyo) | | 2.5 | — | — | — | — |
| | | | ITO microparticle | | — | 30 | — | — | — |
| | | | CFB-101-40 (made by Dainippon Ink & Chemicals) | | 10 | — | — | — | 10 |
| | | | SS20 (made by Nippon Silica) | | — | — | — | — | — |
| | | | IRGACURE184 (made by Ciba-Geigy Specialty Chemicals) | | 2.5 | 2.5 | 2.5 | 2.5 | — |
| | | | IRGACURE819 (made by Ciba-Geigy Specialty Chemicals) | | 2.5 | 2.5 | 2.5 | 2.5 | — |
| | | | KAYACURE DETX-S (made by Nippon Kayaku) | | — | — | — | — | 1.7 |
| | | | KAYACURE DMBI (made by Nippon Kayaku) | | — | — | — | — | 3.3 |
| | | | Benzyltributylammonium chloride | | — | — | 3 | — | — |
| | | | Propylene glycol monomethyl ether | | — | — | 20 | — | — |
| | Thickness | | | μm | 17 | 19 | 18 | 17 | 19 |
| Physical values of developing roller | Resitance | | | Ω | 8.0E+07 | 7.0E+06 | 8.0E+05 | 7.0E+06 | 5.0E+05 |
| | Surface roughness Rz | | | μm | 6.0 | 4.1 | 4.5 | 3.0 | 5.5 |
| Initial property of developing roller | Charge of toner | | | μC/g | 30 | 28 | 30 | 30 | 31 |
| | Amount of carried toner | | | mg/cm$^2$ | 0.33 | 0.33 | 0.31 | 0.31 | 0.34 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |

TABLE 4-continued

| | | Example A-14 | Example A-15 | Example A-16 | Comparative example A-3 | Comparative example A-4 |
|---|---|---|---|---|---|---|
| Wear of surface of developing roller after 10000 sheets were printed | | very good | good | good | wear | wear |
| Image after 10000 sheets were printed | Image density | good | good | good | bad | bad |
| | Fog | very good | good | good | very bad | bad |
| | Difference of density between top and bottom ends | good | good | good | bad | bad |
| | Half-tone spot | good | good | good | bad | bad |

As seen from Tables 3 and 4, since the developing rollers of Examples have a small friction resistance on the resin coating layers, even if the image forming apparatuses incorporated with the developing roller are used for a long time, the surfaces of the developing rollers are hardly worn and a good image can be obtained for a long time.

<B. Second and Fourth Developing Rollers>

Example B-1

100 parts by mass of Sunnix FA952 [polyetherpolyol manufactured by Sanyo Chemical Industries, Ltd., OH value=37], 1 part by mass of SRX274C [foam stabilizer manufactured by Dow Corning Toray Silicone Co., Ltd.], 1.5 parts by mass of TOYOCAT NP [amine catalyst manufactured by Tosoh Corporation], 2.0 parts by mass of DENKA BLACK and 59 parts by mass of SANFOAM IC-716 [tolylene diisocyanate manufactured by Sanyo Chemical Industries, Ltd.] are mechanically stirred and foamed. Then, a metal shaft having an outer diameter of 8.0 mm and a length of 240 mm is disposed into a metal cylindrical mold having an inner diameter of 16 mm, a length of 250 mm and a fluorine-processed surface through its opening and the above raw material for a polyurethane foam is charged from a foaming machine for RIM molding. Then, the mold charged with the raw material for the polyurethane foam is cured in an oven of 80° C. for 20 minutes and released to obtain a main body of a roller with an elastic layer having an outer diameter of 16 mm and a total length of an elastic layer portion of 210 mm.

An urethane-based composition which can be cured by irradiating ultraviolet ray and comprises 10 parts by mass of silicone rubber microparticles having an average particle size of 3 μm (particle size distribution: 1-15 μm) as a microparticle and 2 parts by mass of sodium perchlorate as an ion conductive agent based on 100 parts by mass of polyurethane acrylate as shown in Table 5 is applied on the outer peripheral surface of the main body of the roller thus obtained at a thickness of 10 μm by a roll coater, ultraviolet rays are then irradiated on the roller at an irradiation intensity of 400 mW and an integrated light amount of 1000 mJ/cm$^2$ by using Unicure UVH-0252C manufactured by Ushio, Inc. while the roller is rotated, and as a result, the coating is immediately cured to form an elastic resin layer (microparticle-containing resin coating layer). The resulting roller has properties shown in Table 5 and is suitable for a developing roller.

Example B-2

A developing roller is made in the same manner as in Example B-1 except that an elastic layer is made of urethane elastomer and a thickness of a resin layer is 7 μm. This roller has properties shown in Table 5 and is also suitable for a developing roller.

Example B-3

A developing roller is made in the same manner as in Example B-1 except that 10 parts by mass of polymethyl methacrylate microparticles having an average particle size of 11 μm (particle size distribution: 3-25 μm) is compounded as a microparticle and a thickness of a resin layer is 12 μm. This roller has properties shown in Table 5 and is also suitable for a developing roller.

Example B-4

A developing roller is made in the same manner as in Example B-1 except that 10 parts by mass of polymethyl methacrylate microparticles having an average particle size of 17 μm (particle size distribution: 4-35 μm) is compounded as a microparticle and a thickness of a resin layer is 12 μm. This roller has properties shown in Table 5 and is also suitable for a developing roller.

Example B-5

A developing roller is made in the same manner as in Example B-1 except that 7 parts by mass of polystyrene microparticles having an average particle size of 11 μm (particle size distribution: 4-25 μm) is compounded as a microparticle and a thickness of a resin layer is 18 μm. This roller has properties shown in Table 5 and is also suitable for a developing roller.

Example B-6

A developing roller is made in the same manner as in Example B-1 except that 5 parts by mass of polystyrene microparticles having an average particle size of 16 μm (particle size distribution: 5-32 μm) is compounded as a microparticle and a thickness of a resin layer is 25 μm. This roller has properties shown in Table 6 and is also suitable for a developing roller.

Example B-7

An urethane-based composition comprising 20 parts by mass of polystyrene microparticles having an average particle size of 16 μm (particle size distribution: 5-32 μm) as a microparticle and 20 parts by mass of carbon black as a conductive agent based on 100 parts by mass of polyurethane acrylate as shown in Table 6 is applied on the outer peripheral surface of the main body of the roller made in the same manner as in Example B-1 at a thickness of 12 μm by a roll coater, electron beam is then irradiated on the roller at an accelerating voltage of 30 kV, a lamp current of 300 μA and an irradiation distance of 10 mm for 10 seconds in nitrogen flow by using Min-EB instrument manufactured by Ushio, Inc. while the roller is moved in an axial direction and rotated, and as a result, the coating is thoroughly cured to form an elastic resin layer (microparticle-containing resin coating layer). This roller has properties shown in Table 6 and is also suitable for a developing roller.

Comparative Example B-1

A developing roller is made in the same manner as in Example B-1 except that microparticles are not added to the resin layer and a thickness of a resin layer is 15 μm. In this case, an amount of carried toner is small and image quality is low as shown in Table 6.

Comparative Example B-2

A developing roller is made in the same manner as in Example B-1 except that 10 parts by mass of silicone rubber microparticles having an average particle size of 20 μm (particle size distribution: 3-80 μm) is compounded as a microparticle and a thickness of a resin layer is 15 μm. In this case, an amount of carried toner is large but image quality and durability are inferior to those of Examples as shown in Table 6.

Comparative Example B-3

A developing roller is made in the same manner as in Example B-1 except that 10 parts by mass of polymethyl methacrylate microparticles having an average particle size of 5 μm (particle size distribution: 1-12 μm) is compounded as a microparticle and a thickness of a resin layer is 15 μm. In this case, an amount of carried toner is small and image quality is inferior to those of Examples as shown in Table 6.

TABLE 5

| | | Example B-1 | Example B-2 | Example B-3 |
|---|---|---|---|---|
| Elastic layer | Resin | Urethane foam by RIM | Urethane elastomer | Urethane foam by RIM |
| | Resin resistance (Ωcm) | 1E+07 | 1E+07 | 1E+07 |
| | Thickness (mm) | 4 | 4 | 4 |
| Resin layer | Resin | Polyurethane acrylate | Polyurethane acrylate | Polyurethane acrylate |
| | Conductive agent | $NaClO_4$ | $NaClO_4$ | $NaClO_4$ |
| | Part of conductive agent added (parts by mass) | 2 | 2 | 2 |
| | Kind of microparticle | Microparticle of silicone rubber Trefil E-500 made by Dow Corning Toray Silicone Co., Ltd. | Microparticle of silicone rubber Trefil E-500 made by Dow Corning Toray Silicone Co., Ltd. | Microparticle of polymethyl methacrylate Techpolymer MBX-12 made by Sekisui Plastics Co., Ltd. |
| | Part of microparticle added (parts by mass) | 10 | 10 | 10 |
| | Particle size of microparticle (μm) | Average particle size 3 Particle size distribution 1-15 | Average particle size 3 Particle size distribution 1-15 | Average particle size 11 Particle size distribution 3-25 |
| | Resin resistance (Ωcm) | 1E+08 | 1E+07 | 1E+08 |
| | Thickness of resin layer b (μm) | 10 | 7 | 12 |
| | a/b | 1.5 | 2.1 | 2.1 |
| Physical values | Roller resistance (Ω) | 7E+07 | 7E+07 | 7E+07 |
| | Rz (μm) | 7 | 7 | 8 |
| | Hardness (Asker C) | 48 | 49 | 49 |
| Initial property of roller | Charge of toner (μC/g) | −20 | −21 | −18 |
| | Amount of carried toner ($mg/cm^2$) | 0.3 | 0.3 | 0.3 |
| | Image density | good | good | good |
| | Fog | non | non | non |
| | Difference of density between top and bottom ends | non | non | non |
| | Half-tone spot | good | good | good |
| | Wear of roller (after 10000 sheets were printed) | non | non | non |
| | Note | The Resin layer was cured by UV radiation | The Resin layer was cured by UV radiation | The Resin layer was cured by UV radiation |

| | | Example B-4 | Example B-5 |
|---|---|---|---|
| Elastic layer | Resin | Urethane foam by RIM | Urethane foam by RIM |
| | Resin resistance (Ωcm) | 1E+07 | 1E+07 |
| | Thickness (mm) | 4 | 4 |
| Resin layer | Resin | Polyurethane acrylate | Polyurethane acrylate |
| | Conductive agent | $NaClO_4$ | $NaClO_4$ |
| | Part of conductive agent added (parts by mass) | 2 | 2 |
| | Kind of microparticle | Microparticle of polymethyl methacrylate Techpolymer MBX-20 made by Sekisui Plastics Co., Ltd. | Microparticle of polystyrene Techpolymer SBX-21 made by Sekisui Plastics Co., Ltd. |
| | Part of microparticle added (parts by mass) | 10 | 7 |
| | Particle size of microparticle (μm) | Average particle size 17 Particle size distribution 4-35 | Average particle size 11 Particle size distribution 4-25 |
| | Resin resistance (Ωcm) | 1E+08 | 1E+07 |
| | Thickness of resin layer b (μm) | 12 | 18 |
| | a/b | 2.9 | 1.4 |

TABLE 5-continued

| | | | |
|---|---|---|---|
| Physical values | Roller resistance (Ω) | 7E+07 | 7E+07 |
| | Rz (μm) | 9 | 10 |
| | Hardness (Asker C) | 52 | 48 |
| Initial property of roller | Charge of toner (μC/g) | −20 | −19 |
| | Amount of carried toner ($mg/cm^2$) | 0.3 | 0.3 |
| | Image density | good | good |
| | Fog | non | non |
| | Difference of density between top and bottom ends | non | non |
| | Half-tone spot | good | good |
| | Wear of roller (after 10000 sheets were printed) | non | non |
| | Note | The Resin layer was cured by UV radiation | The Resin layer was cured by UV radiation |

TABLE 6

| | | Example B-6 | Example B-7 | Comparative example B-1 |
|---|---|---|---|---|
| Elastic layer | Resin | Urethane foam by RIM | Urethane foam by RIM | Urethane foam by RIM |
| | Resin resistance (Ωcm) | 1E+07 | 1E+07 | 1E+07 |
| | Thickness (mm) | 4 | 4 | 4 |
| Resin layer | Resin | Polyurethane acrylate | Polyurethane acrylate | Polyurethane acrylate |
| | Conductive agent | $NaClO_4$ | Carbon black | $NaClO_4$ |
| | Part of conductive agent added (parts by mass) | 2 | 20 | 2 |
| | Kind of microparticle | Microparticle of polystyrene Techpolymer SBX-17 made by Sekisui Plastics Co., Ltd. | Microparticle of polystyrene Techpolymer SBX-17 made by Sekisui Plastics Co., Ltd. | — |
| | Part of microparticle added (parts by mass) | 5 | 20 | — |
| | Particle size of microparticle (μm) | Average particle size 16 Particle size distribution 5-32 | Average particle size 16 Particle size distribution 5-32 | — |
| | Resin resistance (Ωcm) | 1E+08 | 1E+08 | 5E+06 |
| | Thickness of resin layer b (μm) | 25 | 12 | 15 |
| | a/b | 1.3 | 2.7 | 0 |
| Physical values | Roller resistance (Ω) | 7E+07 | 5E+07 | 2E+07 |
| | Rz (μm) | 10 | 10 | 1 |
| | Hardness (Asker C) | 50 | 48 | 48 |
| Initial property of roller | Charge of toner (μC/g) | −20 | −21 | −12 |
| | Amount of carried toner ($mg/cm^2$) | 0.3 | 0.3 | 0.1 |
| | Image density | good | good | thin |
| | Fog | non | non | non |
| | Difference of density between top and bottom ends | non | non | large |
| | Half-tone spot | good | good | non |
| | Wear of roller (after 10000 sheets were printed) | non | non | non |
| | Note | The Resin layer was cured by UV radiation | The Resin layer was cured by EB radiation | without adding microparticles The Resin layer was cured by UV radiation |

| | | Comparative example B-2 | Comparative example B-3 |
|---|---|---|---|
| Elastic layer | Resin | Urethane foam by RIM | Urethane foam by RIM |
| | Resin resistance (Ωcm) | 1E+07 | 1E+07 |
| | Thickness (mm) | 4 | 4 |
| Resin layer | Resin | Polyurethane acrylate | Polyurethane acrylate |
| | Conductive agent | $NaClO_4$ | $NaClO_4$ |
| | Part of conductive agent added (parts by mass) | 2 | 2 |
| | Kind of microparticle | Microparticle of silicone rubber Trefil R-900 made by Dow Corning Toray Silicone Co., Ltd. | Microparticle of polymethyl methacrylate Techpolymer MBX-5 made by Sekisui Plastics Co., Ltd. |
| | Part of microparticle added (parts by mass) | 10 | 10 |
| | Particle size of microparticle (μm) | Average particle size 20 Particle size distribution 3-80 | Average particle size 5 Particle size distribution 1-12 |
| | Resin resistance (Ωcm) | 1E+08 | 1E+08 |
| | Thickness of resin layer b (μm) | 15 | 15 |
| | a/b | 5.3 | 0.8 |

TABLE 6-continued

| | | | |
|---|---|---|---|
| Physical values | Roller resistance (Ω) | 1E+08 | 1E+08 |
| | Rz (μm) | 20 | 2 |
| | Hardness (Asker C) | 51 | 47 |
| Initial property of roller | Charge of toner (μC/g) | −3 | −20 |
| | Amount of carried toner ($mg/cm^2$) | 0.5 | 0.1 |
| | Image density | thin | thin |
| | Fog | occur on white background | non |
| | Difference of density between top and bottom ends | large | large |
| | Half-tone spot | slightly occur | non |
| | Wear of roller (after 10000 sheets were printed) | slightly occur | non |
| Note | | a/b is excessive The Resin layer was cured by UV radiation | a/b is insufficient The Resin layer was cured by UV radiation |

Example B-8

An urethane-based composition which can be cured by irradiating ultraviolet rays and comprises 70 parts by mass of polyurethane acrylate, 30 parts by mass of silicon-containing compound A (methacryl-based silicone oil having reactivities at both its ends, manufactured by Shin-Etsu Chemical Co., Ltd., "X-22-164A"), 10 parts by mass of silicone rubber microparticles having an average particle size of 3 μm (particle size distribution: 1-15 μm) as a microparticle and 3.0 parts by mass of modified aliphatic dimethylethylammonium ethosulfate ($RN(CH_3)_2C_2H_5.C_2H_5SO_4$, manufactured by Nippon Oil and Fat, "Elegan 264WAX") as an ion conductive agent as shown in Table 7 is applied on the outer peripheral surface of the main body of the roller made in the same manner as in Example B-1 at a thickness of 10 μm by a roll coater, ultraviolet rays are then irradiated on the roller at an irradiation intensity of 400 mW and an integrated light amount of 1000 $mJ/cm^2$ by using Unicure UVH-0252C manufactured by Ushio, Inc. while the roller is rotated, and as a result, the coating is immediately cured to form an elastic resin layer (microparticle-containing resin coating layer). The resulting roller has properties shown in Table 7 and is suitable for a developing roller.

Example B-9

A developing roller is made in the same manner as in Example B-8 except that an elastic layer is made of urethane elastomer, a silicon-containing compound B (methacryl-based silicone oil having reactivity at one end, manufactured by Shin-Etsu Chemical Co., Ltd., "X-22-174DX") is used instead of the silicon-containing compound A and a thickness of a resin layer is 7 μm. This roller has properties shown in Table 7 and is also suitable for a developing roller.

Example B-10

A developing roller is made in the same manner as in Example B-8 except that a silicon-containing compound C (methacryl-based silicone oil having reactivities at both its ends, manufactured by Dow Corning Toray Silicone Co., Ltd., "BY16-152B") is used instead of the silicon-containing compound A, 10 parts by mass of polymethyl methacrylate microparticles having an average particle size of 11 μm (particle size distribution: 3-25 μm) is compounded as a microparticle and a thickness of a resin layer is 12 μm. This roller has properties shown in Table 7 and is also suitable for a developing roller.

Example B-11

A developing roller is made in the same manner as in Example B-8 except that polyurethane acrylate is not compounded but a silicon-containing compound D (methacryl-based silicone oil having reactivity at one end, manufactured by Dow Corning Toray Silicone Co., Ltd., "BX16-122A") is only compounded for forming a resin layer, 10 parts by mass of polymethyl methacrylate microparticles having an average particle size of 17 μm (particle size distribution: 4-35 μm) is compounded as a microparticle and a thickness of a resin layer is 12 μm. This roller has properties shown in Table 7 and is also suitable for a developing roller.

Example B-12

A developing roller is made in the same manner as in Example B-8 except that polyurethane acrylate is not compounded but a silicon-containing compound E (methacryl-based (metha)acryloxy silane having reactivity at one end, manufactured by Shin-Etsu Chemical Co., Ltd., "LS-2826") is only compounded for forming a resin layer, 7 parts by mass of polystyrene microparticles having an average particle size of 11 μm (particle size distribution: 4-25 μm) is compounded as a microparticle and a thickness of a resin layer is 18 μm. This roller has properties shown in Table 7 and is also suitable for a developing roller.

Example B-13

An urethane-based composition which comprises 70 parts by mass of polyurethane acrylate, 30 parts by mass of silicon-containing compound A, 10 parts by mass of silicone rubber microparticles having an average particle size of 3 μm (particle size distribution: 1-15 μm) as a microparticle and 20 parts by mass of carbon black as a conductive agent as shown in Table 8 is applied on the outer peripheral surface of the main body of the roller made in the same manner as in Example B-1 at a thickness of 10 μm by a roll coater, electron beam is then irradiated on the roller at an accelerating voltage of 30 kV, a lamp current of 300 μA and an irradiation distance of 10 mm for 10 seconds in nitrogen flow by using Min-EB instrument manufactured by Ushio, Inc. while the roller is moved in an axial direction and rotated, and as a result, the coating is thoroughly cured to form an elastic resin layer (microparticle-containing resin coating layer). This roller has properties shown in Table 8 and is also suitable for a developing roller.

Comparative Example B-4

A developing roller is made in the same manner as in Example B-8 except that an elastic layer is made of urethane elastomer, a silicon-containing compound B is used instead of the silicon-containing compound A, microparticles are not added to a resin layer and a thickness of the resin layer is 15 μm. In this case, an amount of carried toner is small and image quality is low as shown in Table 8.

Comparative Example B-5

A developing roller is made in the same manner as in Example B-8 except that 10 parts by mass of silicone rubber microparticles having an average particle size of 20 μm (particle size distribution: 3-80 μm) is compounded as a microparticle and a thickness of a resin layer is 15 μm. In this case, an amount of carried toner is large but image quality and durability are inferior to those of Examples as shown in Table 8.

Comparative Example B-6

A developing roller is made in the same manner as in Example B-8 except that the silicon-containing compound A is not compounded but the polyurethane acrylate is only compounded for forming a resin layer, 20 parts by mass of polystyrene microparticles having an average particle size of 16 μm (particle size distribution: 5-32 μm) is compounded as a microparticle and a thickness of a resin layer is 12 μm. In this case, durability of the roller is bad and image quality is inferior to those of Examples as shown in Table 8.

Comparative Example B-7

A developing roller is made in the same manner as in Example B-8 except that 10 parts by mass of polymethyl methacrylate microparticles having an average particle size of 5 μm (particle size distribution: 1-12 μm) is compounded as a microparticle and a thickness of a resin layer is 15 μm. In this case, an amount of carried toner is small and image quality is inferior to those of Examples as shown in Table 8.

TABLE 7

| | | Example B-8 | Example B-9 | Example B-10 | Example B-11 | Example B-12 |
|---|---|---|---|---|---|---|
| Elastic Layer | Resin | Urethane foam by RIM | Urethane elastomer | Urethane foam by RIM | Urethane foam by RIM | Urethane foam by RIM |
| | Resin resistance (Ωcm) | 1E+06 | 1E+06 | 1E+06 | 1E+06 | 1E+06 |
| | Thickness (mm) | 4 | 4 | 4 | 4 | 4 |
| Resin layer | Resin Amount (part by mass) Polyurethane | 70 | 70 | 70 | — | — |
| | Resin Amount (part by mass) Silicon-containing compound Kind | A | B | C | D | E |
| | Resin Amount (part by mass) Silicon-containing compound Amount | 30 | 30 | 30 | 100 | 100 |
| | Conductive agent | Elegan 264WAX | Elegan 264WAX | Elegan 264WAX | Elegan 264WAX | Elegan 264WAX |
| | Part of conductive agent added | 3.0 | 3.0 | 3.0 | 3.0 | 3.0 |
| | Kind of microparticle | Microparticle of silicone rubber Trefil E-500 made by Dow Corning Toray Silicone Co., Ltd. | Microparticle of silicone rubber Trefil E-500 made by Dow Corning Toray Silicone Co., Ltd. | Microparticle of polymethyl methacrylate Techpolymer MBX-12 made by Sekisui Plastics Co., Ltd. | Microparticle of polymethyl methacrylate Techpolymer MBX-20 made by Sekisui Plastics Co., Ltd. | Microparticle of polystyrene Techpolymer SBX-21 made by Sekisui Plastics Co., Ltd. |
| | Part of microparticle added (parts by mass) | 10 | 10 | 10 | 10 | 7 |
| | Particle size of microparticle | Average particle size 3 Particle size distribution 1-15 | Average particle size 3 Particle size distribution 1-15 | Average particle size 11 Particle size distribution 3-25 | Average particle size 17 Particle size distribution 4-35 | Average particle size 11 Particle size distribution 4-25 |
| | Resin resistance (Ωcm) | 1E+07 | 1E+07 | 1E+07 | 1E+08 | 1E+07 |
| | Thickness of resin layer b (μm) | 10 | 7 | 12 | 12 | 18 |
| | a/b | 1.5 | 2.1 | 2.1 | 2.9 | 1.4 |
| Physical values | Roller resistnce (Ω) | 6.6E+07 | 6.4E+07 | 6.2E+07 | 6.8E+06 | 6.7E+07 |
| | Rz (μm) | 7 | 7 | 8 | 9 | 7 |
| | Hardness (Asker C) | 51 | 52 | 51 | 53 | 54 |
| Initial property of roller | Charge of toner (μC/g) | −17 | −18 | −18 | −16 | −18 |
| | Amount of carried toner ($mg/cm^2$) | 0.3 | 0.3 | 0.3 | 0.3 | 0.3 |
| | Image density | good | good | good | good | good |
| | Fog | non | non | non | non | non |
| | Difference of density between top and bottom ends | non | non | non | non | non |
| | Half-tone spot | good | good | good | good | good |
| | Wear of roller (after 10000 sheets were printed) | non | non | non | non | non |
| | Note | The Resin layer was cured by UV radiation | The Resin layer was cured by UV radiation | The Resin layer was cured by UV radiation | The Resin layer was cured by UV radiation | The Resin layer was cured by UV radiation |

TABLE 8

| | | Example B-13 | Comparative example B-4 | Comparative example B-5 | Comparative example B-6 | Comparative example B-7 |
|---|---|---|---|---|---|---|
| Elastic layer | Resin | Urethane foam by RIM | Urethane elastomer | Urethane foam by RIM | Urethane foam by RIM | Urethane foam by RIM |
| | Resin resistance (Ωcm) | 1E+06 | 1E+06 | 1E+06 | 1E+07 | 1E+07 |
| | Thickness (mm) | 4 | 4 | 4 | 4 | 4 |
| Resin layer | Resin Amount (part by mass) Polyurethane | 70 | 70 | 70 | 100 | 70 |
| | Silicon-containing compound Kind | A | B | A | — | A |
| | Silicon-containing compound Amount | 30 | 30 | 30 | — | 30 |
| | Conductive agent | Carbon black | Elegan 264WAX | Elegan 264WAX | Elegan 264WAX | Elegan 264WAX |
| | Part of conductive agent added | 20 | 3.0 | 3.0 | 3.0 | 3.0 |
| | Kind of microparticle | Microparticle of silicone rubber Trefil E-500 made by Dow Corning Toray Silicone Co., Ltd. | — | Microparticle of silicone rubber Trefil R-900 made by Dow Corning Toray Silicone Co., Ltd. | Microparticle of polystyrene Techpolymer SBX-17 made by Sekisui Plastics Co., Ltd. | Microparticle of polymethyl methacrylate Techpolymer MBX-5 made by Sekisui Plastics Co., Ltd. |
| | Part of microparticle added (parts by mass) | 10 | — | 10 | 20 | 10 |
| | Particle size of microparticle | Average particle size 3 Particle size distribution 1-15 | — | Average particle size 20 Particle size distribution 3-80 | Average particle size 16 Particle size distribution 5-32 | Average particle size 5 Particle size distribution 1-12 |
| | Resin resistance (Ωcm) | 1E+07 | 5E+06 | 1E+08 | 1E+08 | 1E+08 |
| | Thickness of resin layer b (μm) | 10 | 15 | 15 | 12 | 15 |
| | a/b | 1.5 | 0 | 5.3 | 2.7 | 0.8 |
| Physical values | Roller resistnce (Ω) | 5.3E+07 | 2E+07 | 1E+08 | 1E+08 | 1E+08 |
| | Rz (μm) | 7 | 1 | 20 | 20 | 2 |
| | Hardness (Asker C) | 51 | 48 | 51 | 51 | 47 |
| Initial property of roller | Charge of toner (μC/g) | −19 | −12 | −3 | −10 | −20 |
| | Amount of carried toner ($mg/cm^2$) | 0.3 | 0.1 | 0.5 | 0.3 | 0.1 |
| | Image density | good | thin | thin | thin | thin |
| | Fog | non | non | occur on white background | occur on white background | non |
| | Difference of density between top and bottom ends | non | large | large | large | large |
| | Half-tone spot | good | non | slightly occur | slightly occur | non |
| | Wear of roller (after 10000 sheets were printed) | non | non | slightly occur | occur (Lines occur on the surface after about 6000 sheets were | non |
| | Note | The Resin layer was cured by EB radiation | without adding microparticles The Resin layer was cured by UV radiation | a/b is excessive The Resin layer was cured by UV radiation | The resin layer does not contain silicon The Resin layer was cured by UV radiation | a/b is insufficient The Resin layer was cured by UV radiation |

Example B-14

An urethane-based composition which can be cured by irradiating ultraviolet rays and comprises 80 parts by mass of polyurethane acrylate, 20 parts by mass of 2,2,2-trifluoroethyl acrylate (fluorine content: 34 mass %), 10 parts by mass of silicone rubber microparticles having an average particle size of 3 μm (particle size distribution: 1-15 μm) as a microparticle and 2.5 parts by mass of quaternary ammonium-perchlorate salt (KS555 manufactured by Kao Corporation) as an ion conductive agent as shown in Table 9 is applied on the outer peripheral surface of the main body of the roller made in the same manner as in Example B-1 at a thickness of 10 μm by a roll coater, ultraviolet rays are then irradiated on the roller at an irradiation intensity of 400 mW and an integrated light amount of 1000 mJ/cm$^2$ by using Unicure UVH-0252C manufactured by Ushio, Inc. while the roller is rotated, and as a result, the coating is immediately cured to form an elastic resin layer (microparticle-containing resin coating layer). The resulting roller has properties shown in Table 9 and is suitable for a developing roller.

Example B-15

A developing roller is made in the same manner as in Example B-14 except that an elastic layer is made of urethane elastomer, a compound ratio of polyurethane acrylate to 2,2,2-trifluoroethyl acrylate is varied and a thickness of a resin layer is 7 μm. This roller has properties shown in Table 9 and is also suitable for a developing roller.

Example B-16

A developing roller is made in the same manner as in Example B-14 except that 7 parts by mass of polystyrene microparticles having an average particle size of 11 μm (particle size distribution: 4-25 μm) is compounded as a microparticle and a thickness of a resin layer is 18 μm. This roller has properties shown in Table 10 and is also suitable for a developing roller.

Example B-17

A developing roller is made in the same manner as in Example B-14 except that a compound ratio of polyurethane acrylate to 2,2,2-trifluoroethyl acrylate is varied, 5 parts by mass of polystyrene microparticles having an average particle size of 16 μm (particle size distribution: 5-32 μm) is compounded as a microparticle and a thickness of a resin layer is 25 μm. This roller has properties shown in Table 10 and is also suitable for a developing roller.

Example B-18

An urethane-based composition which comprises 80 parts by mass of polyurethane acrylate, 20 parts by mass of 2,2,2-trifluoroethyl acrylate (fluorine content: 34 mass %), 20 parts by mass of polystyrene microparticles having an average particle size of 16 μm (particle size distribution: 5-32 μm) as a microparticle and 20 parts by mass of carbon black as a conductive agent as shown in Table 10 is applied on the outer peripheral surface of the main body of the roller made in the same manner as in Example B-1 at a thickness of 12 μm by a roll coater, electron beam is then irradiated on the roller at an accelerating voltage of 30 kV, a lamp current of 300 μA and an irradiation distance of 10 mm for 10 seconds in nitrogen flow by using Min-EB instrument manufactured by Ushio, Inc. while the roller is moved in an axial direction and rotated, and as a result, the coating is thoroughly cured to form an elastic resin layer (microparticle-containing resin coating layer). This roller has properties shown in Table 10 and is also suitable for a developing roller.

Comparative Example B-8

A developing roller is made in the same manner as in Example B-14 except that an elastic layer is made of urethane elastomer, microparticles are not added to a resin layer and a thickness of the resin layer is 15 μm. In this case, an amount of carried toner is small and image quality is low as shown in Table 11.

Comparative Example B-9

A developing roller is made in the same manner as in Example B-14 except that 10 parts by mass of silicone rubber microparticles having an average particle size of 20 μm (particle size distribution: 3-80 μm) is compounded as a microparticle and a thickness of a resin layer is 15 μm. In this case, an amount of carried toner is large but image quality and durability are inferior to those of Examples as shown in Table 11.

Comparative Example B-10

A developing roller is made in the same manner as in Example B-14 except that 2,2,2-trifluoroethyl acrylate is not compounded but the polyurethane acrylate is only compounded for forming a resin layer, 20 parts by mass of the same microparticle as in Example B-17 is compounded and a thickness of a resin layer is 12 μm. In this case, durability of the roller is bad and image quality is inferior to that of Examples as shown in Table 11.

Comparative Example B-11

A developing roller is made in the same manner as in Example B-14 except that 10 parts by mass of polymethyl methacrylate microparticles having an average particle size of 5 μm (particle size distribution: 1-12 μm) is compounded as a microparticle and a thickness of a resin layer is 15 μm. In this case, an amount of carried toner is small and image quality is inferior to that of Examples as shown in Table 11.

TABLE 9

| | | Example B-14 | Example B-15 |
|---|---|---|---|
| Elastic layer | Resin | Urethane foam by RIM | Urethane elastomer |
| | Resin resistance (Ωcm) | 1E+06 | 1E+06 |
| | Thickness (mm) | 4 | 4 |
| Resin layer | Resin | Polyurethane acrylate 80 parts by mass 2,2,2-trifluoroethyl acrylate 20 parts by mass | Polyurethane acrylate 95 parts by mass 2,2,2-trifluoroethyl acrylate 5 parts by mass |
| | Fluorine content in resin layer (mass %) | 7 | 2 |
| | Conductive agent | KS555 | KS555 |
| | Part of conductive agent added (parts by mass) | 2.5 | 2.5 |
| | Kind of microparticle | Microparticle of silicone Trefil E-500 made by Dow Corning Toray Silicone Co., Ltd. | Microparticle of silicone Trefil E-500 made by Dow Corning Toray Silicone Co., Ltd. |
| | Part of microparticle added (parts by mass) | 10 | 10 |
| | Particle size of microparticle | Average particle size 3 Particle size distribution 1-15 | Average particle size 3 Particle size distribution 1-15 |
| | Resin resistance (Ωcm) | 1E+07 | 1E+07 |
| | Thickness of resin layer b (μm) | 10 | 7 |
| | a/b | 1.5 | 2.1 |
| Physical values | Roller resistnce (Ω) | 6.8E+07 | 6.6E+07 |
| | Rz (μm) | 7 | 7 |
| | Hardness (Asker C) | 52 | 51 |
| Initial property of roller | Charge of toner (μC/g) | −18 | −18 |
| | Amount of carried toner ($mg/cm^2$) | 0.3 | 0.3 |
| | Image density | good | good |
| | Fog | non | non |
| | Difference of density between top and bottom ends | non | non |
| | Half-tone spot | good | good |
| | Wear of roller (after 10000 sheets were printed) | non | non |
| | Note | The Resin layer was cured by UV radiation | The Resin layer was cured by UV radiation |

TABLE 10

| | | Example B-16 | Example B-17 | Example B-18 |
|---|---|---|---|---|
| Elastic layer | Resin | Urethane foam by RIM | Urethane foam by RIM | Urethane foam by RIM |
| | Resin resistance (Ωcm) | 1E+06 | 1E+06 | 1E+07 |
| | Thickness (mm) | 4 | 4 | 4 |
| Resin layer | Resin | Polyurethane acrylate 80 parts by mass 2,2,2-trifluoroethyl acrylate 20 parts by mass | Polyurethane acrylate 95 parts by mass 2,2,2-trifluoroethyl acrylate 5 parts by mass | Polyurethane acrylate 80 parts by mass 2,2,2-trifluoroethyl acrylate 20 parts by mass |
| | Fluorine content in resin layer (mass %) | 7 | 2 | 7 |
| | Conductive agent | KS555 | KS555 | Carbon black |
| | Part of conductive agent added (parts by mass) | 2.5 | 2.5 | 20 |
| | Kind of microparticle | Microparticle of polystyrene Techpolymer SBX-21 made by Sekisui Plastics Co., Ltd. | Microparticle of polystyrene Techpolymer SBX-17 made by Sekisui Plastics Co., Ltd. | Microparticle of polystyrene Techpolymer SBX-17 made by Sekisui Plastics Co., Ltd. |
| | Part of microparticle added (parts by mass) | 7 | 5 | 20 |
| | Particle size of microparticle | Average particle size 11 Particle size distribution 4-25 | Average particle size 16 Particle size distribution 5-32 | Average particle size 16 Particle size distribution 5-32 |
| | Resin resistance (Ωcm) | 1E+07 | 1E+07 | 1E+08 |
| | Thickness of resin layer b (μm) | 18 | 25 | 12 |
| | a/b | 1.4 | 1.3 | 2.7 |
| Physical values | Roller resistnce (Ω) | 6.8E+07 | 6.6E+07 | 5E+07 |
| | Rz (μm) | 7 | 7 | 9 |
| | Hardness (Asker C) | 52 | 51 | 51 |
| Initial property of roller | Charge of toner (μC/g) | −18 | −18 | −19 |
| | Amount of carried toner ($mg/cm^2$) | 0.3 | 0.3 | 0.3 |
| | Image density | good | good | good |
| | Fog | non | non | non |

TABLE 10-continued

| | Example B-16 | Example B-17 | Example B-18 |
|---|---|---|---|
| Difference of density between top and bottom ends | non | non | non |
| Half-tone spot | good | good | good |
| Wear of roller (after 10000 sheets were printed) | non | non | non |
| Note | The Resin layer was cured by UV radiation | The Resin layer was cured by UV radiation | The Resin layer was cured by EB radiation |

TABLE 11

| | | Comparative example B-8 | Comparative example B-9 | Comparative example B-10 | Comparative example B-11 |
|---|---|---|---|---|---|
| Elastic layer | Resin | Urethane elastomer | Urethane foam by RIM | Urethane foam by RIM | Urethane foam by RIM |
| | Resin resistance (Ωcm) | 1E+06 | 1E+07 | 1E+07 | 1E+07 |
| | Thickness (mm) | 4 | 4 | 4 | 4 |
| Resin layer | Resin | Polyurethane acrylate 80 parts by mass 2,2,2-trifluoroethyl acrylate 20 parts by mass | Polyurethane acrylate 80 parts by mass 2,2,2-trifluoroethyl acrylate 20 parts by mass | Polyurethane acrylate 100 parts by mass | Polyurethane acrylate 80 parts by mass 2,2,2-trifluoroethyl acrylate 20 parts by mass |
| | fluorine content in resin layer (mass %) | 7 | 7 | — | 7 |
| | Conductive agent | KS555 | KS555 | KS555 | KS555 |
| | Part of conductive agent added (parts by mass) | 2.5 | 2.5 | 2.5 | 2.5 |
| | Kind of microparticle | — | Microparticle of silicone rubber Trefil R-900 made by Dow Corning Toray Silicone Co., Ltd. | Microparticle of polystyrene Techpolymer SBX-17 made by Sekisui Plastics Co., Ltd. | Microparticle of polymethyl methacrylate Techpolymer MBX-5 made by Sekisui Plastics Co., Ltd. |
| | Part of microparticle added (parts by mass) | — | 10 | 20 | 10 |
| | Particle size of microparticle | — | Average particle size 20 Particle size distribution 3-80 | Average particle size 16 Particle size distribution 5-32 | Average particle size 5 Particle size distribution 1-12 |
| | Resin resistance (Ωcm) | 5E+06 | 1E+08 | 1E+08 | 1E+08 |
| | Thickness of resin layer b (μm) | 15 | 15 | 12 | 15 |
| | a/b | 0 | 5.3 | 2.7 | 0.8 |
| Physical values | Roller resistnce (Ω) | 2E+07 | 1E+08 | 1E+08 | 1E+08 |
| | Rz (μm) | 1 | 20 | 20 | 2 |
| | Hardness (Asker C) | 48 | 51 | 51 | 47 |
| Initial property of roller | Charge of toner (μC/g) | −12 | −3 | −10 | −20 |
| | Amount of carried toner ($mg/cm^2$) | 0.1 | 0.5 | 0.3 | 0.1 |
| | Image density | thin | thin | thin | thin |
| | Fog | non | occur on white background | occur on white background | non |
| | Difference of density between top and bottom ends | large | large | large | large |
| | Half-tone spot | non | slightly occur | slightly occur | non |
| | Wear of roller (after 10000 sheets were printed) | non | slightly occur | occur (Lines occur on the surface after about 6000 sheets were | non |
| | Note | without adding microparticles The Resin layer was cured by UV radiation | a/b is excessive The Resin layer was cured by UV radiation | The resin layer does not contain fluorine The Resin layer was cured by UV radiation | a/b is insufficient The Resin layer was cured by UV radiation |

<C. Third Developing Roller>

Example C-1

A coating liquid according to a formulation shown in Table 12 is applied on the outer peripheral surface of the main body of the roller made in the same manner as in Example A-1 by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic resin coating layer to obtain a developing roller provided with the resin coating layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not, a difference of a density between a top end and a bottom end are evaluated according to a known method. Furthermore, after 10000 sheets were printed, attachment of toner on the surface of the developing roller, an image density, whether a half-tone spot and fog occur or not, a difference of a density between a top end and a bottom end are checked (Moreover, the methods for evaluating image, surface roughness and resistance are the same as in Example A-1). These results are shown in Table 12.

Example C-2

A developing roller is made in the same manner as in Example C-1 except that a resin coating layer is formed on the outer peripheral surface of the main body of the roller made by the same manner as in Example A-4 by using a coating liquid according to a formulation shown in Table 12. The properties and performances of the resulting developing roller are shown in Table 12.

Example C-3

A developing roller is made in the same manner as in Example C-1 except that a resin coating layer is formed on the outer peripheral surface of the main body of the roller made by the same manner as in Example A-S by using a coating liquid according to a formulation shown in Table 12. The properties and performances of the resulting developing roller are shown in Table 12.

Example C-4

A developing roller is made in the same manner as in Example C-1 except that a resin coating layer is formed on the outer peripheral surface of the main body of the roller made by the same manner as in Example A-2 by using a coating liquid according to a formulation shown in Table 12. The properties and performances of the resulting developing roller are shown in Table 12.

Example C-5

A developing roller is made in the same manner as in Example C-1 except that a resin coating layer is formed on the outer peripheral surface of the main body of the roller made by the same manner as in Example A-3 by using a coating liquid according to a formulation shown in Table 12. The properties and performances of the resulting developing roller are shown in Table 12.

Example C-6

A developing roller is made by the same manner as in Example C-1 except that a resin coating layer is formed by using a coating liquid according to a formulation shown in Table 13. Properties and performances of the resulting developing roller are shown in Table 13.

Example C-7

A developing roller is made in the same manner as in Example C-1 except that a resin coating layer is formed by using a coating liquid according to a formulation shown in Table 13. The properties and performances of the resulting developing roller are shown in Table 13.

Example C-8

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 100 parts by mass of MEK (methyl ethyl ketone) is applied on the main body of the roller provided with the elastic layer composed of urethane foam made in Example A-1 at a thickness of 50 μm, and then heat-cured at 100° C. for 1 hour. A resin coating layer is formed on the outer peripheral surface of the resulting roller by using a coating liquid according to a formulation shown in Table 13 and irradiating electron beam in the same manner as in Example C-1 to make a developing roller. The properties and performances of the resulting developing roller are shown in Table 13.

Comparative Example C-1

A developing roller is made in the same manner as in Example C-1 except that a resin coating layer is formed by using a coating liquid according to a formulation shown in Table 13. The properties and performances of the resulting developing roller are shown in Table 13.

Comparative Example C-2

A developing roller is made in the same manner as in Example C-2 except that a resin coating layer is formed by using a coating liquid according to a formulation shown in Table 13. The properties and performances of the resulting developing roller are shown in Table 13.

TABLE 12

| | | | | | Example C-1 | Example C-2 | Example C-3 | Example C-4 | Example C-5 |
|---|---|---|---|---|---|---|---|---|---|
| Elastic layer | Elastomer | | | | Urethane foam | Rubber | Rubber foam | Solid urethane | Silicone |
| | Thickness | | | mm | 4 | 4 | 4 | 4 | 4 |
| Resin coating layer | Formulation of coating liquid | EB non-curable fluorine-containing component | MODIPER F200 (made by Nippon Oil & Fat) | parts by mass | 10 | — | — | — | — |
| | | | LF200 (made by Asahi Glass) | | — | 15 | — | — | 15 |
| | | | THV220A (made by Sumitomo 3M) | | — | — | 10 | — | — |
| | | | KYNER 7201 (made by ATOFINA) | | — | — | — | 10 | — |
| | | EB-curing type | UF8001 (made by Kyoeisha Chemical) | | 50 | 50 | — | 50 | 50 |
| | | | V4260 (made by Dainippon Ink & Chemicals) | | — | — | 50 | — | — |

TABLE 12-continued

| | | | | Example C-1 | Example C-2 | Example C-3 | Example C-4 | Example C-5 |
|---|---|---|---|---|---|---|---|---|
| | | Methoxytriethyleneglycol acrylate | | 25 | 50 | 25 | 25 | 25 |
| | | Isoamyl acrylate | | 25 | — | — | 25 | 25 |
| | | Dimethylaminoethyl methacrylate | | — | — | 25 | — | — |
| | | 2-(perfluorooctyl)ethyl acrylate | | — | — | — | — | 15 |
| | | 1H-1-(trifluoromethyl)trifluoroethyl acrylate | | — | — | — | — | — |
| | | Printex35 (made by Degussa) | | 30 | 30 | 30 | 30 | 30 |
| | | CFB-101-40 (made by Dainippon Ink & Chemicals) | | — | — | 10 | — | 10 |
| | | SS20 (made by Nippon Silica) | | — | — | — | — | — |
| | | Benzyltributylammonium chloride | | — | — | — | — | — |
| | | Propylene glycol monomethyl ether | | — | — | — | — | — |
| | Thickness | | μm | 16 | 25 | 17 | 30 | 16 |
| Physical values of developing roller | Resitance | | Ω | 7.1E+05 | 4.0E+07 | 4.0E+06 | 3.0E+07 | 6.0E+06 |
| | Surface roughness Rz | | μm | 4.6 | 3.5 | 7.2 | 4.5 | 7.6 |
| Initial property of developing roller | Charge of toner | | μC/g | 30 | 31 | 36 | 31 | 33 |
| | Amount of carried toner | | $mg/cm^2$ | 0.31 | 0.33 | 0.36 | 0.31 | 0.33 |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | good | good |
| Toner attachment on surface of developing roller after 10000 sheets were printed | | | | good | good | good | good | very good |
| Image after 10000 sheets were printed | Image density | | | good | good | good | good | good |
| | Fog | | | good | good | good | good | very good |
| | Difference of density between top and bottom ends | | | good | good | good | good | good |
| | Half-tone spot | | | good | good | good | good | good |

TABLE 13

| | | | | | Example C-6 | Example C-7 | Example C-8 | Comparative example C-1 | Comparative example C-2 |
|---|---|---|---|---|---|---|---|---|---|
| Elastic layer | Elastomer | | | | Urethane foam | Urethane foam | Urethane foam | Urethane foam | Rubber |
| | Thickness | | | mm | 4 | 4 | 4 | 4 | 4 |
| Resin coating layer | Formulation of coating liquid | EB non-curable fluorine-containing component | MODIPER F200 (made by Nippon Oil & Fat) | parts by mass | — | 10 | 10 | — | — |
| | | | LF200 (made by Asahi Glass) | | — | — | — | — | — |
| | | | THV220A (made by Sumitomo 3M) | | 10 | — | — | — | — |
| | | | KYNER 7201 (made by ATOFINA) | | — | — | — | — | — |
| | | EB-curing type | UF8001 (made by Kyoeisha Chemical) | | 50 | 50 | 50 | 50 | 50 |
| | | | V4260 (made by Dainippon Ink & Chemicals) | | — | — | — | — | — |
| | | | Methoxytriethyleneglycol acrylate | | 25 | 25 | 25 | 50 | 25 |
| | | | Isoamyl acrylate | | 25 | 25 | 25 | — | 25 |
| | | | Dimethylaminoethyl methacrylate | | — | — | — | — | — |
| | | | 2-(perfluorooctyl)ethyl acrylate | | — | — | — | — | — |
| | | | 1H-1-(trifluoromethyl)trifluoroethyl acrylate | | 15 | — | — | — | — |
| | | | Printex35 (made by Degussa) | | 30 | 30 | 30 | 30 | 30 |
| | | | CFB-101-40 (made by Dainippon Ink & Chemicals) | | — | — | — | — | 10 |
| | | | SS20 (made by Nippon Silica) | | 3 | — | — | — | — |
| | | | Benzyltributylammonium chloride | | — | — | 4 | — | — |
| | | | Propylene glycol monomethyl ether | | — | — | 20 | — | — |
| | Thickness | | | μm | 16 | 21 | 19 | 18 | 25 |
| Physical values of developing roller | Resitance | | | Ω | 8.5E+06 | 7.0E+07 | 6.5E+06 | 6.0E+06 | 7.0E+05 |
| | Surface roughness Rz | | | μm | 6.3 | 4.2 | 5.1 | 3.5 | 5.0 |
| Initial property of developing roller | Charge of toner | | | μC/g | 34 | 30 | 31 | 29 | 31 |
| | Amount of carried toner | | | $mg/cm^2$ | 0.33 | 0.28 | 0.32 | 0.31 | 0.33 |

TABLE 13-continued

| | | Example C-6 | Example C-7 | Example C-8 | Comparative example C-1 | Comparative example C-2 |
|---|---|---|---|---|---|---|
| Initial image | Image density | good | good | good | good | good |
| | Fog | good | good | good | good | good |
| | Difference of density between top and bottom ends | good | good | good | good | good |
| | Half-tone spot | good | good | good | good | good |
| Toner attachment on surface of developing roller after 10000 sheets were printed | | very good | good | good | much filming | filming |
| Image after 10000 sheets were printed | Image density | good | good | good | bad | bad |
| | Fog | very good | good | good | very bad | bad |
| | Difference of density between top and bottom ends | good | good | good | bad | bad |
| | Half-tone spot | good | good | good | bad | bad |

As seen from Tables 12 and 13, since the developing rollers of Examples has little adhesion of toners on the resin coating layers, even if the image forming apparatuses incorporated with the developing roller are used for a long time, toners are hardly adhered on the developing roller and a good image can be obtained for a long time. Moreover, the developing rollers of Examples do not contaminate a photosensitive drum, since the remaining amount of unreacted compound is sufficiently suppressed in its resin coating layer.

Example C-9

A developing roller is made in the same manner as in Example C-1 except that a resin coating layer is formed by using a coating liquid according to a formulation shown in Table 14. The properties and performances of the resulting developing roller are shown in Table 14.

Example C-10

A developing roller is made in the same manner as in Example C-2 except that a resin coating layer is formed by using a coating liquid according to a formulation shown in Table 14. The properties and performances of the resulting developing roller are shown in Table 14.

Example C-11

A developing roller is made in the same manner as in Example C-3 except that a resin coating layer is formed by using a coating liquid according to a formulation shown in Table 14. The properties and performances of the resulting developing roller are shown in Table 14.

Example C-12

A developing roller is made in the same manner as in Example C-5 except that a resin coating layer is formed by using a coating liquid according to a formulation shown in Table 14. The properties and performances of the resulting developing roller are shown in Table 14.

Example C-13

A developing roller is made by the same manner as in Example C-4 except that a resin coating layer is formed by using a coating liquid according to a formulation shown in Table 14. Properties and performances of the resulting developing roller are shown in Table 14.

Example C-14

A developing roller is made in the same manner as in Example C-1 except that a resin coating layer is formed by using a coating liquid according to a formulation shown in Table 15. The properties and performances of the resulting developing roller are shown in Table 15.

Example C-15

A developing roller is made in the same manner as in Example C-1 except that a resin coating layer is formed by using a coating liquid according to a formulation shown in Table 15. The properties and performances of the resulting developing roller are shown in Table 15.

Example C-16

A developing roller is made by the same manner as in Example C-8 except that a resin coating layer is formed by using a coating liquid according to a formulation shown in Table 15. Properties and performances of the resulting developing roller are shown in Table 15.

Comparative Example C-3

A developing roller is made in the same manner as in Example C-1 except that a resin coating layer is formed by using a coating liquid according to a formulation shown in Table 15. The properties and performances of the resulting developing roller are shown in Table 15.

Comparative Example C-4

A developing roller is made in the same manner as in Example C-2 except that a resin coating layer is formed by using a coating liquid according to a formulation shown in Table 15. The properties and performances of the resulting developing roller are shown in Table 15.

TABLE 14

| | | | | | Example C-9 | Example C-10 | Example C-11 | Example C-12 | Example C-13 |
|---|---|---|---|---|---|---|---|---|---|
| Elastic layer | Elastomer | | | | Urethane foam | Rubber | Rubber foam | Silicone | Solid urethane |
| | Thickness | | | mm | 4 | 4 | 4 | 4 | 4 |
| Resin coating layer | Formulation of coating liquid | EB non-curable silicon-containing component | MODIPER FS700 (made by Nippon Oil & Fat) | parts by mass | 10 | — | — | — | — |
| | | | MODIPER FS710 (made by Nippon Oil & Fat) | | — | 15 | — | — | — |
| | | | US-270 (made by Toagosei) | | — | — | 10 | — | — |
| | | | Ethyl silicate 45 (made by Tama Chemicals) | | — | — | — | 20 | — |
| | | | X-22-821 (made by Shin-Etsu Chemical) | | — | — | — | — | 10 |
| | | EB-curing type | UF8001 (made by Kyoeisha Chemical) | | 50 | 50 | 50 | 50 | 50 |
| | | | Methoxytriethyleneglycol acrylate | | 25 | 25 | 50 | 25 | — |
| | | | Isoamyl acrylate | | 25 | — | — | 25 | 25 |
| | | | Dimethylaminoethyl methacrylate | | — | 25 | — | — | 25 |
| | | | γ-methacryloxypropyl trimethoxysilane | | — | — | — | — | 10 |
| | | | X-24-8201 (made by Shin-Etsu Chemical) | | — | — | — | — | — |
| | | | Printex35 (made by Degussa) | | 30 | 30 | 30 | 30 | 30 |
| | | | CFB-101-40 (made by Dainippon Ink & Chemicals) | | — | — | 10 | — | — |
| | | | SS20 (made by Nippon Silica) | | — | — | — | 3 | — |
| | | | Benzyltributylammonium chloride | | — | — | — | — | — |
| | | | Propylene glycol monomethyl ether | | — | — | — | — | — |
| | Thickness | | | μm | 15 | 17 | 18 | 21 | 15 |
| Physical values of developing roller | Resitance | | | Ω | 9.1E+05 | 5.1E+06 | 3.0E+06 | 4.0E+06 | 6.0E+06 |
| | Surface roughness Rz | | | μm | 4.1 | 3.5 | 4.5 | 7.2 | 4.1 |
| Initial property of developing roller | Charge of toner | | | μC/g | 30 | 31 | 29 | 31 | 32 |
| | Amount of carried toner | | | $mg/cm^2$ | 0.29 | 0.31 | 0.3 | 0.35 | 0.33 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Wear of surface of developing roller after 10000 sheets were printed | | | | | good | good | good | good | very good |
| Image after 10000 sheets were printed | Image density | | | | good | good | good | good | good |
| | Fog | | | | good | good | good | good | very good |
| | Difference of density between top and bottom ends | | | | good | good | good | good | good |
| | Half-tone spot | | | | good | good | good | good | good |

TABLE 15

| | | | | | Example C-14 | Example C-15 | Example C-16 | Comparative example C-3 | Comparative example C-4 |
|---|---|---|---|---|---|---|---|---|---|
| Elastic layer | Elastomer | | | | Urethane foam | Urethane foam | Urethane foam | Urethane foam | Rubber |
| | Thickness | | | mm | 4 | 4 | 4 | 4 | 4 |
| Resin coating layer | Formulation of coating liquid | EB non-curable silicon-containing component | MODIPER FS700 (made by Nippon Oil & Fat) | parts by mass | — | 10 | 10 | — | — |
| | | | MODIPER FS710 (made by Nippon Oil & Fat) | | — | — | — | — | — |
| | | | US-270 (made by Toagosei) | | 10 | — | — | — | — |
| | | | Ethyl silicate 45 (made by Tama Chemicals) | | — | — | — | — | — |
| | | | X-22-821 (made by Shin-Etsu Chemical) | | — | — | — | — | — |
| | | EB-curing type | UF8001 (made by Kyoeisha Chemical) | | 50 | 50 | 50 | 50 | 50 |
| | | | Methoxytriethyleneglycol acrylate | | 25 | 25 | 25 | 25 | 50 |
| | | | Isoamyl acrylate | | 25 | 25 | 25 | 25 | — |
| | | | Dimethylaminoethyl methacrylate | | — | — | — | — | — |
| | | | γ-methacryloxypropyl trimethoxysilane | | — | — | — | — | — |

TABLE 15-continued

| | | | | Example C-14 | Example C-15 | Example C-16 | Comparative example C-3 | Comparative example C-4 |
|---|---|---|---|---|---|---|---|---|
| | | X-24-8201 (made by Shin-Etsu Chemical) | | 10 | — | — | — | — |
| | | Printex35 (made by Degussa) | | 30 | 30 | 30 | 30 | 30 |
| | | CFB-101-40 (made by Dainippon Ink & Chemicals) | | 10 | — | — | — | 10 |
| | | SS20 (made by Nippon Silica) | | — | — | — | — | — |
| | | Benzyltributylammonium chloride | | — | 3 | 3 | — | — |
| | | Propylene glycol monomethyl ether | | — | — | 20 | — | — |
| | Thickness | | μm | 18 | 18 | 17 | 20 | 18 |
| Physical values of developing roller | Resitance | | Ω | 5.0E+07 | 6.0E+06 | 1.8E+06 | 6.0E+06 | 2.5E+06 |
| | Surface roughness Rz | | μm | 6.2 | 4.5 | 5.5 | 4.2 | 4.9 |
| Initial property of developing roller | Charge of toner | | μC/g | 31 | 30 | 31 | 29 | 32 |
| | Amount of carried toner | | $mg/cm^2$ | 0.31 | 0.32 | 0.3 | 0.3 | 0.29 |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | good | good |
| Wear of surface of developing roller after 10000 sheets were printed | | | | very good | good | good | wear | wear |
| Image after 10000 sheets were printed | Image density | | | good | good | good | bad | bad |
| | Fog | | | very good | good | good | very bad | bad |
| | Difference of density between top and bottom ends | | | good | good | good | bad | bad |
| | Half-tone spot | | | good | good | good | bad | bad |

As seen from Tables 14 and 15, since the developing rollers of Examples have a small friction resistance on the resin coating layers, even if the image forming apparatuses incorporated with the developing roller are used for a long time, the surfaces of the developing rollers are hardly worn and a good image can be obtained for a long time. Moreover, the developing rollers of Examples do not contaminate a photosensitive drum, since the remaining amount of unreacted compound is sufficiently suppressed in its resin coating layer.

<D. First Charging Roller>

Example D-1

100 parts by mass of polyetherpolyol which is trifunctional, has a molecular weight of 9,000 and is produced by adding propylene oxide to glycerin is added with 1.6 parts by mass of conductive carbon and 0.15 part by mass of dibutyltin dilaurate, sufficiently stirred and mixed, and then defoamed for 20 minutes while stirred under vacuum to be used as a polyol component. The polyol component has a hydroxyl value of 19 mgKOH/g. On the other hand, polypropylene glycol-modified polymeric MDI having a NCO content of 11% is defoamed for 20 minutes with stirring under vacuum and used as an isocyanate component. The polyol component and the isocyanate component are stirred at high speed and mixed by a binary type casting machine while regulating a ratio of the polyol component to the isocyanate component to be 101.75/13.70 (isocyanate index: 103). The mixed urethane raw material is charged into a metal cylindrical mold having an inner diameter φ of 12 mm in which a metal shaft having an outer diameter φ of 6 mm is set and heat-cured in an oven at 90° C. for 60 minutes. The urethane roller with the metal shaft is removed from the cylindrical mold to obtain a roller.

A coating liquid according to a formulation shown in Table 1 is applied on an outer peripheral surface of the main body of the roller by a roll coater, ultraviolet rays are irradiated on the roller at an irradiation intensity of 400 mW and an integrated light amount of 1000 $mJ/cm^2$ by using Unicure UVH-0252C manufactured by Ushio, Inc. while the roller is rotated, and as a result, the coating liquid is immediately cured to form an elastic resin coating layer to obtain a charging roller provided with the resin coating layer on the outer peripheral surface of the main body of the roller. A roughness and a resistance of the resulting charging roller are evaluated according to a known method. Also, the charging roller is incorporated into an image forming apparatus, and an image density, whether a half-tone spot and fog occur or not and a difference of a density between a top end and a bottom end are evaluated according to a known method. These results are shown in Table 1.

Evaluation Method:

(1) Evaluation of Image

Image forming apparatus: commercially available Laser printer

Color of cartridge: cyan (2) Surface Roughness

SURFCOM 590A (manufactured by Tokyo Seimitsu)

(3) Resistance

R8340A ULTRA HIGH RESISTANCE METER (manufactured by ADVANTEST)

Measuring condition: voltage applied between the shaft and the surface of the roller: 100 V, measured under static condition by applying 500 g of load to both the ends of the roller.

Example D-2

A charging roller is made in the same manner as in Example D-1 except that a resin coating layer is formed by using a coating liquid according to a formulation shown in Table 16. The properties and performances of the resulting charging roller are shown in Table 16.

Example D-3

Liquid silicone LIM liquid #2090 (manufactured by Dow Corning Toray Silicone Co., Ltd.) is stirred and defoamed, and then charged into a metal cylindrical mold having an inner diameter ϕ of 12 mm in which a metal shaft having an outer diameter ϕ of 6 mm is set and heat-cured in an oven at 120° C. for 30 minutes. The roller with the metal shaft is removed from the cylindrical mold and heat-cured in a convection oven at 200° C. for 4 hours to obtain a roller. A charging roller is made in the same manner as in Example D-1 except that a resin coating layer is formed on an outer peripheral surface of the main body of the roller by using a coating liquid according to a formulation shown in Table 16. The properties and performances of the resulting charging roller are shown in Table 16.

Example D-4

100 parts by mass of Nipol IR2200L having a Mooney viscosity $ML_{1+4}$(100° C.) of 70 (manufactured by Nippon Zeon), 60 parts by mass of LIR-30 having an average molecular weight of 29000 (manufactured by Kuraray), 28 parts by mass of Carbon Black TB#5500 (manufactured by Tokai Carbon), 5 parts by mass of zinc white, 1 part by mass of stearic acid and 9 parts by mass of PERHEXA C-40 (manufactured by Nippon Oil and Fat) are kneaded by using a kneader having a volume of 55 L to provide a rubber composition. The rubber composition is extruded from a crosshead-type extruder manufactured by Mitsuba Industries to a metal shaft having an outer diameter ϕ of 6 mm and being attached with an adhesive agent to obtain an unvulcanized rubber/shaft integral molding. This is set in a metal cylindrical mold, and vulcanized at 175° C. under a pressure of $3.2\times10^6$ Pa for 20 minutes. The pressure in the split mold is released to obtain a rubber roller, which is vulcanized in an oven of 180° C. for 4 hours. The resulting roller is plunger-type ground to have a diameter ϕ of 12 mm by a rotary grinder to obtain a rubber roller. A charging roller is made in the same manner as in Example D-1 except that a resin coating layer is formed on an outer peripheral surface of the main body of the roller by using a coating liquid according to a formulation shown in Table 16. The properties and performances of the resulting charging roller are shown in Table 16.

Example D-5

A charging roller is made in the same manner as in Example D-4 except that a resin coating layer is formed by using a coating liquid according to a formulation shown in Table 17. The properties and performances of the resulting charging roller are shown in Table 17.

Example D-6

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 60 parts by mass of MEK (methyl ethyl ketone) is applied on the main body of the roller provided with the elastic layer composed of solid urethane made in Example D-1 at a thickness of 10 μm, and then heat-cured at 100° C. for 1 hour. A resin coating layer is formed onto the resulting roller by using a coating liquid according to a formulation shown in Table 17 to make a charging roller. The properties and performances of the resulting charging roller are shown in Table 17.

Comparative Example D-1

A charging roller is made in the same manner as in Example D-1 except that a resin coating layer is formed by using and heat curing a coating liquid according to a formulation shown in Table 17. The properties and performances of the resulting charging roller are shown in Table 17.

Comparative Example D-2

A charging roller is made in the same manner as in Example D-4 except that a resin coating layer is formed by using and heat curing a coating liquid according to a formulation shown in Table 17. The properties and performances of the resulting charging roller are shown in Table 17.

TABLE 16

| | | | | | Example D-1 | Example D-2 | Example D-3 | Example D-4 |
|---|---|---|---|---|---|---|---|---|
| Elastic layer | Elastomer | | | | Solid urethane | Solid urethane | Silicone | Rubber |
| | Thickness | | | mm | 3 | 3 | 3 | 3 |
| Resin coating layer | Formulation of coating liquid | UV-curing type | UF8001 (made by Kyoeisha Chemical) | parts by mass | 50 | 50 | 50 | 50 |
| | | | Methoxytriethyleneglycol acrylate | | 50 | 50 | 25 | 25 |
| | | | Isoamyl acrylate | | — | — | — | 25 |
| | | | Dimethylaminoethyl methacrylate | | — | — | 25 | — |
| | | | 2-(perfluorooctyl)ethyl acrylate | | — | — | — | 10 |
| | | | X-24-8201 (made by Shin-Etsu Chemical) | | — | — | — | — |
| | | | Ketjen Black (made by Mitsubishi Chemical) | | 2.5 | — | — | — |
| | | | DENKA BLACK (made by Denki Kagaku Kogyo) | | — | — | 2.5 | 2.5 |
| | | | ITO microparticle | | — | 30 | — | — |
| | | | IRGACURE184 (made by Ciba-Geigy Specialty Chemicals) | | 2.5 | 2.5 | — | — |
| | | | IRGACURE819 (made by Ciba-Geigy Specialty Chemicals) | | 2.5 | 2.5 | — | — |
| | | | KAYACURE DETX-S (made by Nippon Kayaku) | | — | — | 1.7 | 1.7 |
| | | | KAYACURE DMBI (made by Nippon Kayaku) | | — | — | 3.3 | 3.3 |
| | | | CFB-101-40 (made by Dainippon Ink & Chemicals) | | 10 | 5 | 10 | — |
| | | | SS20 (made by Nippon Silica) | | — | — | — | 3 |
| | | Heat curable | UR8401 (made by Toyobo) | | — | — | — | — |
| | | | Colonate HX (made by Nippon Polyurethane) | | — | — | — | — |
| | | | Printex35 (made by Degussa) | | — | — | — | — |
| | | | Benzyltributylammonium chloride | | — | — | 3 | — |

TABLE 16-continued

| | | | | Example D-1 | Example D-2 | Example D-3 | Example D-4 |
|---|---|---|---|---|---|---|---|
| | | Methyl ethyl ketone | | — | — | — | — |
| | | Propylene glycol monomethyl ether | | — | — | — | — |
| | Thickness | | μm | 8 | 5 | 9 | 5 |
| Physical values of charging roller | Resitance | | Ω | 2.5E+05 | 5.0E+05 | 3.0E+05 | 3.2E+05 |
| | Surface roughness Rz | | μm | 4.0 | 3.0 | 8.0 | 6.0 |
| Initial image | Image density | | | good | good | good | good |
| | Fog | | | good | good | good | good |
| | Difference of density between top and bottom ends | | | good | good | good | good |
| | Half-tone spot | | | good | good | good | good |

TABLE 17

| | | | | | Example D-5 | Example D-6 | Comparative example D-1 | Comparative example D-2 |
|---|---|---|---|---|---|---|---|---|
| Elastic layer | Elastomer | | | | Rubber | Solid urethane | Solid urethane | Rubber |
| | Thickness | | | mm | 3 | 3 | 3 | 3 |
| Resin coating layer | Formulation of coating liquid | UV-curing type | UF8001 (made by Kyoeisha Chemical) | parts by mass | 50 | 50 | — | — |
| | | | Methoxytriethyleneglycol acrylate | | 25 | 50 | — | — |
| | | | Isoamyl acrylate | | 25 | — | — | — |
| | | | Dimethylaminoethyl methacrylate | | — | — | — | — |
| | | | 2-(perfluorooctyl)ethyl acrylate | | — | — | — | — |
| | | | X-24-8201 (made by Shin-Etsu Chemical) | | 10 | — | — | — |
| | | | Ketjen Black (made by Mitsubishi Chemical) | | 2.5 | 2.5 | — | — |
| | | | DENKA BLACK (made by Denki Kagaku Kogyo) | | — | — | — | — |
| | | | ITO microparticle | | — | — | — | — |
| | | | IRGACURE184 (made by Ciba-Geigy Specialty Chemicals) | | 2.5 | 2.5 | — | — |
| | | | IRGACURE819 (made by Ciba-Geigy Specialty Chemicals) | | 2.5 | 2.5 | — | — |
| | | | KAYACURE DETX-S (made by Nippon Kayaku) | | — | — | — | — |
| | | | KAYACURE DMBI (made by Nippon Kayaku) | | — | — | — | — |
| | | | CFB-101-40 (made by Dainippon Ink & Chemicals) | | — | — | 10 | — |
| | | | SS20 (made by Nippon Silica) | | — | — | — | — |
| | | Heat curable | UR8401 (made by Toyobo) | | — | — | 100 | 100 |
| | | | Colonate HX (made by Nippon Polyurethane) | | — | — | 8 | 8 |
| | | | Printex35 (made by Degussa) | | — | — | 25 | 25 |
| | | | Benzyltributylammonium chloride | | — | — | — | — |
| | | | Methyl ethyl ketone | | — | — | 60 | 60 |
| | | | Propylene glycol monomethyl ether | | 20 | — | — | — |
| | Thickness | | | μm | 6 | 5 | 7 | 6 |
| Physical values of charging roller | Resitance | | | Ω | 2.8E+05 | 2.4E+05 | 2.6E+05 | 3.2E+05 |
| | Surface roughness Rz | | | μm | 7.0 | 3.2 | 5.0 | 5.5 |
| Initial image | Image density | | | | good | good | good | good |
| | Fog | | | | good | good | good | good |
| | Difference of density between top and bottom ends | | | | good | good | bad | somewhat bad |
| | Half-tone spot | | | | good | good | bad | bad |

As seen from Tables 16 and 17, since the charging rollers of Examples have uniform properties in the resin coating layers, the image forming apparatuses incorporated with the charging roller can form an excellent image stably.

<E. Second Charging Roller>

Example E-1

100 parts by mass of Sunnix FA952 [polyetherpolyol manufactured by Sanyo Chemical Industries, Ltd., OH value=37], 1 part by mass of SRX274C [foam stabilizer manufactured by Dow Corning Toray Silicone Co., Ltd.], 2.8 parts by mass of TOYOCAT NP [amine catalyst manufactured by Tosoh Corporation], 1.5 parts by mass of TOYOCAT EP [amine catalyst manufactured by Tosoh Corporation] and 59 parts by mass of SANFOAM IC-716 [tolylene diisocyanate manufactured by Sanyo Chemical Industries, Ltd.] are mechanically stirred and foamed. Then, a metal shaft having an outer diameter of 6.0 mm and a length of 240 mm is disposed into a metal cylindrical mold having an inner diameter of 12 mm, a length of 250 mm and a fluorine-processed surface through its opening and 8.0 g of the above raw material for a polyurethane foam is charged from a foaming machine. Then, the mold charged with the raw material for the polyurethane foam is heated in an oven of 80° C. for 20 minutes and released to make a main body of a roller provided with a elastic layer composed of the urethane foam and having an outer diameter of 12 mm and a total length of a foam portion of 230 mm.

A coating liquid according to a formulation shown in Table 18 is applied on an outer peripheral surface of the main body of the roller by a roll coater, ultraviolet rays are irradiated on the roller at an irradiation intensity of 400 mW and an integrated light amount of 1000 mJ/$cm^2$ by using Unicure UVH-0252C manufactured by Ushio, Inc. while the roller is rotated, and as a result, the coating liquid is immediately cured to form an elastic resin coating layer to obtain a charging roller provided with the resin coating layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Moreover, attachment of toner on the surface of the charging roller is checked after 10000 sheets were printed (Moreover, the methods for evaluating image, surface roughness and resistance are the same as in Example D-1). These results are shown in Table 18.

Example E-2

A charging roller is made in the same manner as in Example E-1 except that a resin coating layer is formed on the outer peripheral surface of the main body of the roller made by the same manner as in Example D-1 by using a coating liquid according to a formulation shown in Table 18. The properties and performances of the resulting charging roller are shown in Table 18.

Example E-3

A charging roller is made in the same manner as in Example E-1 except that a resin coating layer is formed on the outer peripheral surface of the main body of the roller made by the same manner as in Example D-3 by using a coating liquid according to a formulation shown in Table 18. The properties and performances of the resulting charging roller are shown in Table 18.

Example E-4

A charging roller is made in the same manner as in Example E-1 except that a resin coating layer is formed on the outer peripheral surface of the main body of the roller made by the same manner as in Example D-4 by using a coating liquid according to a formulation shown in Table 18. The properties and performances of the resulting charging roller are shown in Table 18.

Example E-5

100 parts by mass of EPDM having an iodine value of 36 and a Moony viscosity $ML_{1+4}$(100° C.) of 39, 50 parts by mass of Carbon Black TB#5500 (manufactured by Tokai Carbon), 36 parts by mass of Nobelite A (manufactured by Nippon Funka Kogyo) as a calcium carbonate, 60 parts by mass of Diana Process Oil PW90 (manufactured by Idemitsu Kosan), 3 parts by mass of zinc white, 2 parts by mass of stearic acid, 1 part by mass of 2-mercaptobenzothiazole as a vulcanization accelerator, 1.5 parts by mass of sulfur and 6 parts by mass of NEOCELLBORN N#1000M (manufactured by Eiwa Chemical) as a foaming agent are kneaded by using a kneader having a volume of 55 L to provide a rubber foam composition. The rubber composition is extruded from a crosshead-type extruder manufactured by Mitsuba Industries to a metal shaft having an outer diameter ϕ of 6 mm and being attached with an adhesive agent to obtain an unvulcanized rubber/shaft integral molding. This is set in a metal cylindrical mold, and vulcanized and foamed at 175° C. under a pressure of $3.2\times10^6$ Pa for 20 minutes. The pressure in the split mold is released to obtain a rubber foam roller with a skin layer and it is vulcanized in an oven of 180° C. for 4 hours. The resulting roller is plunger-type ground to have a diameter ϕ of 12 mm by a rotary grinder to obtain a rubber foam roller. A charging roller is made by the same manner as in Example E-1 except that a resin coating layer is formed on an outer peripheral surface of the main body of the roller by using a coating liquid according to a formulation shown in Table 18. The properties and performances of the resulting charging roller are shown in Table 18.

Example E-6

A charging roller is made in the same manner as in Example E-1 except that a resin coating layer is formed by using a coating liquid according to a formulation shown in Table 19. The properties and performances of the resulting charging roller are shown in Table 19.

Example E-7

A charging roller is made in the same manner as in Example E-1 except that a resin coating layer is formed by using a coating liquid according to a formulation shown in Table 19. The properties and performances of the resulting charging roller are shown in Table 19.

Example E-8

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 100 parts by mass of MEK (methyl ethyl ketone) is applied on the main body of the roller provided with the elastic layer composed of urethane foam made in Example E-1 at a thickness of 50 μm, and then heat cured at 100° C. for 1 hour. A resin coating layer is formed onto the resulting roller by using a coating liquid according to a formulation shown in Table 19 to make a charging roller. The properties and performances of the resulting charging roller are shown in Table 19.

Comparative Example E-1

A charging roller is made in the same manner as in Example E-1 except that a resin coating layer is formed by using a coating liquid according to a formulation shown in Table 19. The properties and performances of the resulting charging roller are shown in Table 19.

Comparative Example E-2

A charging roller is made in the same manner as in Example E-4 except that a resin coating layer is formed by using a coating liquid according to a formulation shown in Table 19. The properties and performances of the resulting charging roller are shown in Table 19.

TABLE 18

| | | | | | Example E-1 | Example E-2 | Example E-3 | Example E-4 | Example E-5 |
|---|---|---|---|---|---|---|---|---|---|
| Elastic layer | Elastomer | | | | Urethane foam | Solid urethane | Silicone | Rubber | Rubber foam |
| | Thickness | | | mm | 3 | 3 | 3 | 3 | 3 |
| Resin coating layer | Formulation of coating liquid | UV non-curable fluorine-containing component | MODIPER F200 (made by Nippon Oil & Fat) | parts by mass | 10 | — | — | — | 10 |
| | | | LF200 (made by Asahi Glass) | | — | 15 | — | — | — |
| | | | THV220A (made by Sumitomo 3M) | | — | — | 10 | — | — |
| | | | KYNER 7201 (mede by ATOFINA) | | — | — | — | 10 | — |
| | | UV-curing type | UF8001 (made by Kyoeisha Chemical) | | 50 | 50 | 50 | 50 | 50 |
| | | | Methoxytriethyleneglycol acrylate | | 25 | 25 | 25 | — | — |
| | | | Isoamyl acrylate | | 25 | 25 | — | 25 | 25 |
| | | | Dimethylaminoethyl methacrylate | | — | — | 25 | 25 | 25 |
| | | | 2-(perfluorooctyl)ethyl acrylate | | — | — | — | — | 10 |
| | | | 1H-1-(trifluoromethyl)trifluoroethyl acrylate | | — | — | — | — | — |
| | | | Ketjen Black (made by Mitsubishi Chemical) | | 2.5 | 2.5 | 2.5 | 2.5 | 3 |
| | | | DENKA BLACK (made by Denki Kagaku Kogyo) | | — | — | — | — | — |
| | | | ITO microparticle | | — | — | — | — | — |
| | | | CFB-101-40 (made by Dainippon Ink & Chemicals) | | — | — | 5 | — | — |
| | | | SS20 (made by Nippon Silica) | | — | — | — | 3 | — |
| | | | IRGACURE184 (made by Ciba-Geigy Specialty Chemicals) | | 2.5 | 2.5 | — | — | 2.5 |
| | | | IRGACURE819 (made by Ciba-Geigy Specialty Chemicals) | | 2.5 | 2.5 | — | — | 2.5 |
| | | | KAYACURE DETX-S (made by Nippon Kayaku) | | — | — | 1.7 | 1.7 | — |
| | | | KAYACURE DMBI (made by Nippon Kayaku) | | — | — | 3.3 | 3.3 | — |
| | | | Benzyltributylammonium chloride | | — | — | — | — | — |
| | | | Propylene glycol monomethyl ether | | — | — | — | — | — |
| | Thickness | | | μm | 7 | 6 | 8 | 7 | 8 |
| Physical values of charging roller | Resitance | | | Ω | 3.0E+05 | 4.0E+05 | 4.1E+05 | 3.6E+05 | 7.0E+04 |
| | Surface roughness Rz | | | μm | 4.0 | 3.0 | 7.0 | 4.2 | 7.0 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner attachment on surface of charging roller after 10000 sheets were printed | | | | | good | good | good | good | very good |
| Image after 10000 sheets were printed | Image density | | | | good | good | good | good | good |
| | Fog | | | | good | good | good | good | very good |
| | Difference of density between top and bottom ends | | | | good | good | good | good | good |
| | Half-tone spot | | | | good | good | good | good | good |

TABLE 19

| | | | | | Example E-6 | Example E-7 | Example E-8 | Comparative example E-1 | Comparative example E-2 |
|---|---|---|---|---|---|---|---|---|---|
| Elastic layer | Elastomer | | | | Urethane foam | Urethane foam | Urethane foam | Urethane foam | Rubber |
| | Thickness | | | mm | 3 | 3 | 3 | 3 | 3 |
| Resin coating layer | Formulation of coating liquid | UV non-curable fluorine-containing component | MODIPER F200 (made by Nippon Oil & Fat) | parts by mass | — | 10 | 10 | — | — |
| | | | LF200 (made by Asahi Glass) | | — | — | — | — | — |
| | | | THV220A (made by Sumitomo 3M) | | 10 | — | — | — | — |
| | | | KYNER 7201 (mede by ATOFINA) | | — | — | — | — | — |
| | | UV-curing type | UF8001 (made by Kyoeisha Chemical) | | 50 | 50 | 50 | 50 | 50 |
| | | | Methoxytriethyleneglycol acrylate | | 25 | — | — | 25 | — |
| | | | Isoamyl acrylate | | 25 | 25 | 25 | — | 25 |
| | | | Dimethylaminoethyl methacrylate | | — | 25 | 25 | 25 | 25 |
| | | | 2-(perfluorooctyl)ethyl acrylate | | — | — | — | — | — |
| | | | 1H-1-(trifluoromethyl)trifluoroethyl acrylate | | 10 | — | — | — | — |

TABLE 19-continued

| | | | | Example E-6 | Example E-7 | Example E-8 | Comparative example E-1 | Comparative example E-2 |
|---|---|---|---|---|---|---|---|---|
| | | Ketjen Black (made by Mitsubishi Chemical) | | — | — | — | — | 2.5 |
| | | DENKA BLACK (made by Denki Kagaku Kogyo) | | 2.5 | — | 2.5 | 2.5 | — |
| | | ITO microparticle | | — | 30 | — | — | — |
| | | CFB-101-40 (made by Dainippon Ink & Chemicals) | | 5 | — | — | — | 5 |
| | | SS20 (made by Nippon Silica) | | — | — | — | — | — |
| | | IRGACURE184 (made by Ciba-Geigy Specialty Chemicals) | | 2.5 | 2.5 | 2.5 | 2.5 | — |
| | | IRGACURE819 (made by Ciba-Geigy Specialty Chemicals) | | 2.5 | 2.5 | 2.5 | 2.5 | — |
| | | KAYACURE DETX-S (made by Nippon Kayaku) | | — | — | — | — | 1.7 |
| | | KAYACURE DMBI (made by Nippon Kayaku) | | — | — | — | — | 3.3 |
| | | Benzyltributylammonium chloride | | — | — | 4 | — | — |
| | | Propylene glycol monomethyl ether | | — | — | 20 | — | — |
| | Thickness | | μm | 9 | 7 | 6 | 7 | 6 |
| Physical values of charging roller | Resitance | | Ω | 3.5E+05 | 7.0E+05 | 2.8E+05 | 3.0E+05 | 3.5E+05 |
| | Surface roughness Rz | | μm | 7.5 | 4.1 | 4.5 | 3.0 | 7.6 |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | good | good |
| Toner attachment on surface of charging roller after 10000 sheets were printed | | | | very good | good | good | much filming | filming |
| Image after 10000 sheets were printed | Image density | | | good | good | good | bad | bad |
| | Fog | | | very good | good | good | very bad | bad |
| | Difference of density between top and bottom ends | | | good | good | good | bad | bad |
| | Half-tone spot | | | good | good | good | bad | bad |

As seen from Tables 18 and 19, since the charging rollers of Examples has little adhesion of toners on the resin coating layers, even if the image forming apparatuses incorporated with the charging roller are used for a long time, toners are adhered little on the surface of the charging roller and a good image can be obtained for a long time.

Example E-9

A charging roller is made in the same manner as in Example E-1 except that a resin coating layer is formed by using a coating liquid according to a formulation shown in Table 20. The properties and performances of the resulting charging roller are shown in Table 20.

Example E-10

A charging roller is made in the same manner as in Example E-2 except that a resin coating layer is formed by using a coating liquid according to a formulation shown in Table 20. The properties and performances of the resulting charging roller are shown in Table 20.

Example E-11

A charging roller is made in the same manner as in Example E-4 except that a resin coating layer is formed by using a coating liquid according to a formulation shown in Table 20. The properties and performances of the resulting charging roller are shown in Table 20.

Example E-12

A charging roller is made in the same manner as in Example E-5 except that a resin coating layer is formed by using a coating liquid according to a formulation shown in Table 20. The properties and performances of the resulting charging roller are shown in Table 20.

Example E-13

A charging roller is made in the same manner as in Example E-3 except that a resin coating layer is formed by using a coating liquid according to a formulation shown in Table 20. The properties and performances of the resulting charging roller are shown in Table 20.

Example E-14

A charging roller is made in the same manner as in Example E-1 except that a resin coating layer is formed by using a coating liquid according to a formulation shown in Table 21. The properties and performances of the resulting charging roller are shown in Table 21.

Example E-15

A charging roller is made in the same manner as in Example E-1 except that a resin coating layer is formed by using a coating liquid according to a formulation shown in Table 21. The properties and performances of the resulting charging roller are shown in Table 21.

Example E-16

A charging roller is made in the same manner as in Example E-8 except that a resin coating layer is formed by using a coating liquid according to a formulation shown in Table 21. The properties and performances of the resulting charging roller are shown in Table 21.

Comparative Example E-3

A charging roller is made in the same manner as in Example E-1 except that a resin coating layer is formed by using a coating liquid according to a formulation shown in Table 21. The properties and performances of the resulting charging roller are shown in Table 21.

Comparative Example E-4

A charging roller is made in the same manner as in Example E-4 except that a resin coating layer is formed by using a coating liquid according to a formulation shown in Table 21. The properties and performances of the resulting charging roller are shown in Table 21.

TABLE 20

| | | | | | Example E-9 | Example E-10 | Example E-11 | Example E-12 | Example E-13 |
|---|---|---|---|---|---|---|---|---|---|
| Elastic layer | Elastomer | | | | Urethane foam | Solid urethane | Rubber | Rubber foam | Silicone |
| | Thickness | | | mm | 3 | 3 | 3 | 3 | 3 |
| Resin coating layer | Formulation of coating liquid | UV non-curable silicon-containing component | MODIPER FS700 (made by Nippon Oil & Fat) | parts by mass | 10 | — | — | — | — |
| | | | MODIPER FS710 (made by Nippon Oil & Fat) | | — | 15 | — | — | — |
| | | | US-270 (made by Toagosei) | | — | — | 10 | — | — |
| | | | Ethyl silicate 45 (made by Tama Chemicals) | | — | — | — | 20 | — |
| | | | X-22-821 (made by Shin-Etsu Chemical) | | — | — | — | — | 10 |
| | | UV-curing type | UF8001 (made by Kyoeisha Chemical) | | 50 | 50 | 50 | 50 | 50 |
| | | | Methoxytriethyleneglycol acrylate | | 25 | 25 | — | 25 | 25 |
| | | | Isoamyl acrylate | | 25 | 25 | 25 | 25 | 25 |
| | | | Dimethylaminoethyl methacrylate | | — | — | 25 | — | — |
| | | | γ-methacryloxypropyl trimethoxysilane | | — | — | — | — | 10 |
| | | | X-24-8201 (made by Shin-Etsu Chemical) | | — | — | — | — | — |
| | | | Ketjen Black (made by Mitsubishi Chemical) | | 2.5 | 2.5 | 2.5 | 2.5 | 3 |
| | | | DENKA BLACK (made by Denki Kagaku Kogyo) | | — | — | — | — | — |
| | | | ITO microparticle | | — | — | — | — | — |
| | | | CFB-101-40 (made by Dainippon Ink & Chemicals) | | — | — | 5 | — | — |
| | | | SS20 (made by Nippon Silica) | | — | — | — | 3 | — |
| | | | IRGACURE184 (made by Ciba-Geigy Specialty Chemicals) | | 2.5 | 2.5 | — | 2.5 | 2.5 |
| | | | IRGACURE819 (made by Ciba-Geigy Specialty Chemicals) | | 2.5 | 2.5 | — | 2.5 | 2.5 |
| | | | KAYACURE DETX-S (made by Nippon Kayaku) | | — | — | 1.7 | — | — |
| | | | KAYACURE DMBI (made by Nippon Kayaku) | | — | — | 3.3 | — | — |
| | | | Benzyltributylammonium chloride | | — | — | — | — | — |
| | | | Propylene glycol monomethyl ether | | — | — | — | — | — |
| | Thickness | | | μm | 6 | 7 | 7 | 8 | 6 |
| Physical values of charging roller | Resitance | | | Ω | 3.1E+05 | 3.5E+05 | 3.0E+05 | 3.0E+05 | 9.0E+04 |
| | Surface roughness Rz | | | μm | 4.0 | 3.0 | 7.0 | 7.5 | 6.0 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Wear of surface of charging roller after 10000 sheets were printed | | | | | good | good | good | good | very good |
| Image after 10000 sheets were printed | Image density | | | | good | good | good | good | good |
| | Fog | | | | good | good | good | good | very good |
| | Difference of density between top and bottom ends | | | | good | good | good | good | good |
| | Half-tone spot | | | | good | good | good | good | good |

TABLE 21

| | | | | | Example E-9 | Example E-10 | Example E-11 | Example E-12 | Example E-13 |
|---|---|---|---|---|---|---|---|---|---|
| Elastic layer | Elastomer | | | | Urethane foam | Solid urethane | Rubber | Rubber foam | Silicone |
| | Thickness | | | mm | 3 | 3 | 3 | 3 | 3 |
| Resin coating layer | Formulation of coating liquid | UV non-curable silicon-containing component | MODIPER FS700 (made by Nippon Oil & Fat) | parts by mass | 10 | — | — | — | — |
| | | | MODIPER FS710 (made by Nippon Oil & Fat) | | — | 15 | — | — | — |
| | | | US-270 (made by Toagosei) | | — | — | 10 | — | — |
| | | | Ethyl silicate 45 (made by Tama Chemicals) | | — | — | — | 20 | — |
| | | | X-22-821 (made by Shin-Etsu Chemical) | | — | — | — | — | 10 |
| | | UV-curing type | UF8001 (made by Kyoeisha Chemical) | | 50 | 50 | 50 | 50 | 50 |
| | | | Methoxytriethyleneglycol acrylate | | 25 | 25 | — | 25 | 25 |
| | | | Isoamyl acrylate | | 25 | 25 | 25 | 25 | 25 |
| | | | Dimethylaminoethyl methacrylate | | — | — | 25 | — | — |
| | | | γ-methacryloxypropyl trimethoxysilane | | — | — | — | — | 10 |
| | | | X-24-8201 (made by Shin-Etsu Chemical) | | — | — | — | — | — |
| | | | Ketjen Black (made by Mitsubishi Chemical) | | 2.5 | 2.5 | 2.5 | 2.5 | 3 |
| | | | DENKA BLACK (made by Denki Kagaku Kogyo) | | — | — | — | — | — |
| | | | ITO microparticle | | — | — | — | — | — |
| | | | CFB-101-40 (made by Dainippon Ink & Chemicals) | | — | — | 5 | — | — |
| | | | SS20 (made by Nippon Silica) | | — | — | — | 3 | — |
| | | | IRGACURE184 (made by Ciba-Geigy Specialty Chemicals) | | 2.5 | 2.5 | — | 2.5 | 2.5 |
| | | | IRGACURE819 (made by Ciba-Geigy Specialty Chemicals) | | 2.5 | 2.5 | — | 2.5 | 2.5 |
| | | | KAYACURE DETX-S (made by Nippon Kayaku) | | — | — | 1.7 | — | — |
| | | | KAYACURE DMBI (made by Nippon Kayaku) | | — | — | 3.3 | — | — |
| | | | Benzyltributylammonium chloride | | — | — | — | — | — |
| | | | Propylene glycol monomethyl ether | | — | — | — | — | — |
| | Thickness | | | μm | 6 | 7 | 7 | 8 | 6 |
| Physical values of charging roller | Resitance | | | Ω | 3.1E+05 | 3.5E+05 | 3.0E+05 | 3.0E+05 | 9.0E+04 |
| | Surface roughness Rz | | | μm | 4.0 | 3.0 | 7.0 | 7.5 | 6.0 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Wear of surface of charging roller after 10000 sheets were printed | | | | | good | good | good | good | very good |
| Image after 10000 sheets were printed | Image density | | | | good | good | good | good | good |
| | Fog | | | | good | good | good | good | very good |
| | Difference of density between top and bottom ends | | | | good | good | good | good | good |
| | Half-tone spot | | | | good | good | good | good | good |

As seen from Tables 20 and 21, since the charging rollers of Examples have uniform properties in the resin coating layers and small friction resistance, the image forming apparatuses incorporated with the charging roller can stably form an excellent image for a long time.

<F. Third and Fourth Charging Rollers>

Example F-1

A coating liquid according to a formulation shown in Table 22 is applied on the outer peripheral surface of the main body of the roller made in the same manner as in Example E-1 by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic resin coating layer to obtain a charging roller provided with the resin coating layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, attachment of toner on the surface of the charging roller, an image density, whether a half-tone spot and fog occur or not, a difference of a density between a top end and a bottom end are checked (Moreover, the methods for evaluating image, surface roughness and resistance are the same as in Example D-1). These results are shown in Table 22.

Example F-2

A charging roller is made in the same manner as in Example F-1 except that a resin coating layer is formed on the outer peripheral surface of the main body of the roller made by the same manner as in Example D-4 by using a coating liquid according to a formulation shown in Table 22. The properties and performances of the resulting charging roller are shown in Table 22.

Example F-3

A charging roller is made in the same manner as in Example F-1 except that a resin coating layer is formed on the outer peripheral surface of the main body of the roller made by the same manner as in Example E-5 by using a coating liquid according to a formulation shown in Table 22. The properties and performances of the resulting charging roller are shown in Table 22.

Example F-4

A charging roller is made in the same manner as in Example F-1 except that a resin coating layer is formed on the outer peripheral surface of the main body of the roller made by the same manner as in Example D-1 by using a coating liquid according to a formulation shown in Table 22. The properties and performances of the resulting charging roller are shown in Table 22.

Example F-5

A charging roller is made in the same manner as in Example F-1 except that a resin coating layer is formed on the outer peripheral surface of the main body of the roller made by the same manner as in Example D-3 by using a coating liquid according to a formulation shown in Table 22. The properties and performances of the resulting charging roller are shown in Table 22.

Example F-6

A charging roller is made in the same manner as in Example F-1 except that a resin coating layer is formed by using a coating liquid according to a formulation shown in Table 23. The properties and performances of the resulting charging roller are shown in Table 23.

Example F-7

A charging roller is made in the same manner as in Example F-1 except that a resin coating layer is formed by using a coating liquid according to a formulation shown in Table 23. The properties and performances of the resulting charging roller are shown in Table 23.

Example F-8

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 100 parts by mass of MEK (methyl ethyl ketone) is applied on the main body of the roller provided with the elastic layer composed of urethane foam made in Example E-1 at a thickness of 50 μm, and then heat-cured at 100° C. for 1 hour. A resin coating layer is formed onto the outer peripheral surface of the resulting roller by using a coating liquid according to a formulation shown in Table 23 and irradiating electron beam in the same manner as in Example F-1 to make a charging roller. The properties and performances of the resulting charging roller are shown in Table 23.

Comparative Example F-1

A charging roller is made in the same manner as in Example F-1 except that a resin coating layer is formed by using a coating liquid according to a formulation shown in Table 23. The properties and performances of the resulting charging roller are shown in Table 23.

Comparative Example F-2

A charging roller is made in the same manner as in Example F-2 except that a resin coating layer is formed by using a coating liquid according to a formulation shown in Table 23. The properties and performances of the resulting charging roller are shown in Table 23.

TABLE 22

| | | | | | Example F-1 | Example F-2 | Example F-3 | Example F-4 | Example F-5 |
|---|---|---|---|---|---|---|---|---|---|
| Elastic layer | Elastomer | | | | Urethane foam | Rubber | Rubber foam | Solid urethane | Silicone |
| | Thickness | | | mm | 3 | 3 | 3 | 3 | 3 |
| Resin coating layer | Formulation of coating liquid | EB non-curable fluorine-containing component | MODIPER F200 (made by Nippon Oil & Fat) | parts by mass | — | 10 | — | — | — |
| | | | LF200 (made by Asahi Glass) | | — | — | 10 | — | — |
| | | | THV220A (made by Sumitomo 3M) | | — | — | — | 10 | — |
| | | | KYNER 7201 (mede by ATOFINA) | | — | — | — | — | 10 |
| | | EB-curing type | UF8001 (made by Kyoeisha Chemical) | | 50 | 50 | — | 50 | 50 |
| | | | V4260 (made by Dainippon Ink & Chemicals) | | — | — | 50 | — | — |
| | | | Methoxytriethyleneglycol acrylate | | 25 | 50 | 25 | 25 | 25 |
| | | | Isoamyl acrylate | | 25 | — | — | 25 | 25 |
| | | | Dimethylaminoethyl methacrylate | | — | — | 25 | — | — |
| | | | 2-(perfluorooctyl)ethyl acrylate | | — | — | — | — | — |
| | | | 1H-1-(trifluoromethyl)trifluoroethyl acrylate | | — | — | — | — | — |
| | | | Printex35 (made by Degussa) | | 30 | 30 | 30 | 30 | 30 |

TABLE 22-continued

| | | | | Example F-1 | Example F-2 | Example F-3 | Example F-4 | Example F-5 |
|---|---|---|---|---|---|---|---|---|
| | | | CFB-101-40 (made by Dainippon Ink & Chemicals) | — | — | 10 | — | 10 |
| | | | SS20 (made by Nippon Silica) | — | — | — | — | — |
| | | Heat curable | UR8401 (made by Toyobo) | — | — | — | — | — |
| | | | Colonate HX (made by Nippon Polyurethane) | — | — | — | — | — |
| | | | Printex35 (made by Degussa) | — | — | — | — | — |
| | | | Benzyltributylammonium chloride | — | — | — | — | — |
| | | | Methyl ethyl ketone | — | — | — | — | — |
| | | | Propylene glycol monomethyl ether | — | — | — | — | — |
| | Thickness | | µm | 8 | 7 | 10 | 8 | 7 |
| Physical values of roller | Resitance | | Ω | 5.1E+05 | 4.0E+05 | 4.5E+05 | 3.9E+05 | 6.0E+05 |
| | Surface roughness Rz | | µm | 5.4 | 5.2 | 7.9 | 4.6 | 7.7 |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | good | good |
| Toner attachment on surface of charging roller after 10000 sheets were printed | | | | somewhat good | good | good | good | good |
| Image after 10000 sheets were printed | Image density | | | good | good | good | good | good |
| | Fog | | | good | good | good | good | good |
| | Difference of density between top and bottom ends | | | good | good | good | good | good |
| | Half-tone spot | | | good | good | good | good | good |

TABLE 23

| | | | | | Example F-6 | Example F-7 | Example F-8 | Comparative example F-1 | Comparative example F-2 |
|---|---|---|---|---|---|---|---|---|---|
| Elastic layer | Elastomer | | | | Urethane foam | Urethane foam | Urethane foam | Urethane foam | Rubber |
| | Thickness | | | mm | 3 | 3 | 3 | 3 | 3 |
| Resin coating layer | Formulation of coating liquid | EB non-curable fluorine-containing component | MODIPER F200 (made by Nippon Oil & Fat) | parts by mass | — | 10 | 10 | — | — |
| | | | LF200 (made by Asahi Glass) | | — | — | — | — | — |
| | | | THV220A (made by Sumitomo 3M) | | — | — | — | — | — |
| | | | KYNER 7201 (mede by ATOFINA) | | — | — | — | — | — |
| | | EB-curing type | UF8001 (made by Kyoeisha Chemical) | | 50 | 50 | 50 | — | — |
| | | | V4260 (made by Dainippon Ink & Chemicals) | | — | — | — | — | — |
| | | | Methoxytriethyleneglycol acrylate | | 25 | 25 | 25 | — | — |
| | | | Isoamyl acrylate | | 25 | 25 | 25 | — | — |
| | | | Dimethylaminoethyl methacrylate | | — | — | — | — | — |
| | | | 2-(perfluorooctyl)ethyl acrylate | | — | 10 | — | — | — |
| | | | 1H-1-(trifluoromethyl)trifluoroethyl acrylate | | 15 | — | 10 | — | — |
| | | | Printex35 (made by Degussa) | | 30 | 30 | 30 | — | — |
| | | | CFB-101-40 (made by Dainippon Ink & Chemicals) | | — | — | — | — | 10 |
| | | | SS20 (made by Nippon Silica) | | 3 | — | — | — | — |
| | | Heat curable | UR8401 (made by Toyobo) | | — | — | — | 100 | 100 |
| | | | Colonate HX (made by Nippon Polyurethane) | | — | — | — | 8 | 8 |
| | | | Printex35 (made by Degussa) | | — | — | — | 25 | 25 |
| | | | Benzyltributylammonium chloride | | — | — | 4 | — | — |
| | | | Methyl ethyl ketone | | — | — | — | 60 | 60 |
| | | | Propylene glycol monomethyl ether | | — | — | 20 | — | — |
| | Thickness | | | µm | 9 | 10 | 10 | 9 | 8 |
| Physical values of roller | Resitance | | | Ω | 8.5E+05 | 7.0E+05 | 6.5E+05 | 6.1E+05 | 7.3E+05 |
| | Surface roughness Rz | | | µm | 6.2 | 5.2 | 5.3 | 4.5 | 7.2 |
| Initial image | Image density | | | | good | good | good | good | good |
| | Fog | | | | good | good | good | good | good |
| | Difference of density between top and bottom ends | | | | good | good | good | bad | bad |
| | Half-tone spot | | | | good | good | good | bad | bad |
| Toner attachment on surface of charging roller after 10000 sheets were printed | | | | | good | very good | very good | much filming | filming |

TABLE 23-continued

| | | Example F-6 | Example F-7 | Example F-8 | Comparative example F-1 | Comparative example F-2 |
|---|---|---|---|---|---|---|
| Image after 10000 sheets were printed | Image density | good | good | good | bad | bad |
| | Fog | good | very good | very good | very bad | bad |
| | Difference of density between top and bottom ends | good | good | good | bad | bad |
| | Half-tone spot | good | good | good | bad | bad |

As seen from Tables 22 and 23, since the charging rollers of Examples have uniform properties in the resin coating layers, the image forming apparatuses incorporated with the charging roller can form an excellent image stably. Moreover, the charging rollers of Examples do not contaminate a photosensitive drum, since the remaining amount of unreacted compound is sufficiently suppressed in its resin coating layer. Furthermore, since the charging rollers of Examples F-2 to F-8 including a fluorine-containing resin and/or compound in its resin coating layer is small in the adhesion property of toners on the resin coating layers, the image forming apparatuses incorporated with the charging roller can stably form an excellent image for a long time.

Example F-9

A charging roller is made in the same manner as in Example F-1 except that a resin coating layer is formed by using a coating liquid according to a formulation shown in Table 24. The properties and performances of the resulting charging roller are shown in Table 24.

Example F-10

A charging roller is made in the same manner as in Example F-3 except that a resin coating layer is formed by using a coating liquid according to a formulation shown in Table 24. The properties and performances of the resulting charging roller are shown in Table 24.

Example F-11

A charging roller is made in the same manner as in Example F-2 except that a resin coating layer is formed by using a coating liquid according to a formulation shown in Table 24. The properties and performances of the resulting charging roller are shown in Table 24.

Example F-12

A charging roller is made in the same manner as in Example F-4 except that a resin coating layer is formed by using a coating liquid according to a formulation shown in Table 24. The properties and performances of the resulting charging roller are shown in Table 24.

Example F-13

A charging roller is made by the same manner as in Example F-5 except that a resin coating layer is formed by using a coating liquid according to a formulation shown in Table 24. Properties and performances of the resulting charging roller are shown in Table 24.

Example F-14

A charging roller is made in the same manner as in Example F-1 except that a resin coating layer is formed by using a coating liquid according to a formulation shown in Table 25. The properties and performances of the resulting charging roller are shown in Table 25.

Example F-15

A charging roller is made in the same manner as in Example F-1 except that a resin coating layer is formed by using a coating liquid according to a formulation shown in Table 25. The properties and performances of the resulting charging roller are shown in Table 25.

Example F-16

A charging roller is made in the same manner as in Example F-8 except that a resin coating layer is formed by using a coating liquid according to a formulation shown in Table 25. The properties and performances of the resulting charging roller are shown in Table 25.

Comparative Example F-3

A charging roller is made in the same manner as in Example F-1 except that a resin coating layer is formed by using a coating liquid according to a formulation shown in Table 25. The properties and performances of the resulting charging roller are shown in Table 25.

Comparative Example F-4

A charging roller is made in the same manner as in Example F-2 except that a resin coating layer is formed by using a coating liquid according to a formulation shown in Table 25. The properties and performances of the resulting charging roller are shown in Table 25.

TABLE 24

| | | | | | Example F-9 | Example F-10 | Example F-11 | Example F-12 | Example F-13 |
|---|---|---|---|---|---|---|---|---|---|
| Elastic layer | Elastomer | | | | Urethane foam | Rubber foam | Rubber | Solid urethane | Silicone |
| | Thickness | | | mm | 3 | 3 | 3 | 3 | 3 |
| Resin coating layer | Formulation of coating liquid | EB non-curable silicon-containing component | MODIPER FS700 (made by Nippon Oil & Fat) | parts by mass | 10 | — | — | — | — |
| | | | MODIPER FS710 (made by Nippon Oil & Fat) | | — | 15 | — | — | — |
| | | | US-270 (made by Toagosei) | | — | — | 10 | — | — |
| | | | Ethyl silicate 45 (made by Tama Chemicals) | | — | — | — | 20 | — |
| | | | X-22-821 (made by Shin-Etsu Chemical) | | — | — | — | — | 10 |
| | | EB-curing type | UF8001 (made by Kyoeisha Chemical) | | 50 | 50 | 50 | 50 | 50 |
| | | | Methoxytriethyleneglycol acrylate | | 50 | 50 | 25 | 25 | — |
| | | | Isoamyl acrylate | | — | — | 25 | 25 | 25 |
| | | | Dimethylaminoethyl methacrylate | | — | — | — | — | 25 |
| | | | γ-methacryloxypropyl trimethoxysilane | | — | — | — | — | 10 |
| | | | X-24-8201 (made by Shin-Etsu Chemical) | | — | — | — | — | — |
| | | | Printex35 (made by Degussa) | | 30 | 30 | 30 | 30 | 30 |
| | | | CFB-101-40 (made by Dainippon Ink & Chemicals) | | — | — | 5 | — | — |
| | | | SS20 (made by Nippon Silica) | | — | — | — | 3 | — |
| | | | Benzyltributylammonium chloride | | — | — | — | — | — |
| | | | Propylene glycol monomethyl ether | | — | — | — | — | — |
| | Thickness | | | μm | 8 | 10 | 6 | 12 | 8 |
| Physical values of charging roller | Resitance | | | Ω | 4.1E+05 | 4.5E+05 | 3.6E+05 | 4.5E+05 | 3.0E+05 |
| | Surface roughness Rz | | | μm | 4.3 | 5.1 | 7.2 | 7.0 | 5.6 |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Wear of surface of charging roller after 10000 sheets were printed | | | | | good | good | good | good | very good |
| Image after 10000 sheets were printed | Image density | | | | good | good | good | good | good |
| | Fog | | | | good | good | good | good | very good |
| | Difference of density between top and bottom ends | | | | good | good | good | good | good |
| | Half-tone spot | | | | good | good | good | good | good |

TABLE 25

| | | | | | Example F-14 | Example F-15 | Example F-16 | Compara-tive example F-3 | Compara-tive example F-4 |
|---|---|---|---|---|---|---|---|---|---|
| Elastic layer | Elastomer | | | | Urethane foam | Urethane foam | Urethane foam | Urethane foam | Rubber |
| | Thickness | | | mm | 3 | 3 | 3 | 3 | 3 |
| Resin coating layer | Formulation of coating liquid | EB non-curable silicon-containing component | MODIPER FS700 (made by Nippon Oil & Fat) | parts by mass | — | 10 | 10 | — | — |
| | | | MODIPER FS710 (made by Nippon Oil & Fat) | | — | — | — | — | — |
| | | | US-270 (made by Toagosei) | | 10 | — | — | — | — |
| | | | Ethyl silicate 45 (made by Tama Chemicals) | | — | — | — | — | — |
| | | | X-22-821 (made by Shin-Etsu Chemical) | | — | — | — | — | — |
| | | EB-curing type | UF8001 (made by Kyoeisha Chemical) | | 50 | 50 | 50 | 50 | 50 |
| | | | Methoxytriethyleneglycol acrylate | | 50 | 50 | 50 | 25 | 25 |
| | | | Isoamyl acrylate | | — | — | — | 25 | — |
| | | | Dimethylaminoethyl methacrylate | | — | — | — | — | 25 |
| | | | γ-methacryloxypropyl trimethoxysilane | | — | — | — | — | — |
| | | | X-24-8201 (made by Shin-Etsu Chemical) | | 10 | — | — | — | — |
| | | | Printex35 (made by Degussa) | | 30 | 30 | 30 | 30 | 30 |
| | | | CFB-101-40 (made by Dainippon Ink & Chemicals) | | 5 | — | — | — | 5 |

TABLE 25-continued

| | | | | Example F-14 | Example F-15 | Example F-16 | Comparative example F-3 | Comparative example F-4 |
|---|---|---|---|---|---|---|---|---|
| | | SS20 (made by Nippon Silica) | | — | — | — | — | — |
| | | Benzyltributylammonium chloride | | — | — | 3 | — | — |
| | | Propylene glycol monomethyl ether | | — | — | 20 | — | — |
| | Thickness | | μm | 8 | 7 | 7 | 8 | 7 |
| Physical values of charging roller | Resitance | | Ω | 4.5E+05 | 3.7E+05 | 4.5E+05 | 3.5E+05 | 4.1E+05 |
| | Surface roughness Rz | | μm | 7.5 | 4.6 | 4.9 | 4.6 | 7.6 |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | good | good |
| Wear of surface of charging roller after 10000 sheets were printed | | | | very good | good | good | wear | wear |
| Image after 10000 sheets were printed | Image density | | | good | good | good | bad | bad |
| | Fog | | | very good | good | good | very bad | bad |
| | Difference of density between top and bottom ends | | | good | good | good | bad | bad |
| | Half-tone spot | | | good | good | good | bad | bad |

As seen from Tables 24 and 25, since the charging rollers of Examples have uniform properties in the resin coating layers and small friction resistance, the image forming apparatuses incorporated with the charging roller can stably form an excellent image for a long time. Moreover, the charging rollers of Examples do not contaminate a photosensitive drum, since the remaining amount of unreacted compound is sufficiently suppressed in its resin coating layer.

<G. First Conductive Roller>

Example G-1

100 parts by mass of Sunnix FA952 [polyetherpolyol manufactured by Sanyo Chemical Industries, Ltd., OH value=37], 1 part by mass of SRX274C [foam stabilizer manufactured by Dow Corning Toray Silicone Co., Ltd.], 2.8 parts by mass of TOYOCAT NP [amine catalyst manufactured by Tosoh Corporation], 1.5 parts by mass of TOYOCAT EP [amine catalyst manufactured by Tosoh Corporation] and 59 parts by mass of SANFOAM IC-716 [tolylene diisocyanate manufactured by Sanyo Chemical Industries, Ltd.] are mechanically stirred and foamed. Then, a metal shaft having an outer diameter of 8.0 mm and a length of 240 mm is disposed into a metal cylindrical mold having an inner diameter of 16 mm, a length of 250 mm and a fluorine-processed surface through its opening and 8.0 g of the above raw material for a polyurethane foam is charged from a foaming machine. Then, the mold charged with the raw material for the polyurethane foam is heated in an oven of 80° C. for 20 minutes and released to make a main body of a roller provided with a elastic layer composed of the urethane foam and having an outer diameter of 16 mm and a total length of a foam portion of 230 mm.

A coating liquid according to a formulation shown in Table 26 is applied on an outer peripheral surface of the main body of the roller by a roll coater, ultraviolet rays are irradiated on the roller at an irradiation intensity of 400 mW and an integrated light amount of 1000 mJ/cm$^2$ by using Unicure UVH-0252C manufactured by Ushio, Inc. while the roller is rotated, and as a result, the coating liquid is immediately cured to form an elastic microparticle-containing resin coating layer to obtain a developing roller provided with the microparticle-containing resin coating layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the developing roller, an image density, whether a half-tone spot and fog occur or not, a difference of a density between a top end and a bottom end are checked. These results are shown in Table 26.

Evaluation Method:

(1) Evaluation of Image

Image forming apparatus: commercially available Laser printer

Color of cartridge: cyan (2) Surface Roughness

SURFCOM 590A (manufactured by Tokyo Seimitsu)

(3) Resistance

R8340A ULTRA HIGH RESISTANCE METER (manufactured by ADVANTEST)

Measuring condition: voltage applied between the shaft and the surface of the roller: 100 V, measured under static condition by applying 500 g of load to both the ends of the roller.

Example G-2

100 parts by mass of Nipol IR2200L having a Moony viscosity $ML_{1+4}$(100° C.) of 70 (manufactured by Nippon Zeon), 60 parts by mass of LIR-30 having an average molecular weight of 29000 (manufactured by Kuraray), 28 parts by mass of Carbon Black TB#5500 (manufactured by Tokai Carbon), 5 parts by mass of zinc white, 1 part by mass of stearic acid and 9 parts by mass of PERHEXA C-40 (manufactured by Nippon Oil and Fat) are kneaded by using a kneader having a volume of 55 L to provide a rubber composition. The rubber composition is extruded from a crosshead-type extruder manufactured by Mitsuba Industries to a metal shaft having an outer diameter ϕ of 8 mm and being attached with an adhesive agent to obtain an unvulcanized rubber/shaft integral molding. This is set in a metal cylindrical mold, and vulcanized at 175° C. under a pressure of 3.2×10$^6$ Pa for 20 minutes. The pressure in the split mold is released to obtain a rubber roller and it is vulcanized in an oven of 180° C. for 4 hours. The resulting roller is plunger-type ground to have a diameter (of 16 mm by a rotary grinder to obtain a rubber roller. A developing roller is made by the same manner as in Example G-1 except that a microparticle-containing resin coating layer is formed on an outer peripheral surface of the main body of the roller by using a coating liquid according to a formulation shown in Table 26. The properties and performances of the resulting developing roller are shown in Table 26.

Example G-3

100 parts by mass of EPDM having an iodine value of 36 and a Moony viscosity $ML_{1+4}$(100° C.) of 39, 5.0 parts by mass of Carbon Black TB#5500 (manufactured by Tokai Carbon), 36 parts by mass of Nobelite A (manufactured by Nippon Funka Kogyo) as a calcium carbonate, 60 parts by mass of Diana Process Oil PW90 (manufactured by Idemitsu Kosan), 3 parts by mass of zinc white, 2 parts by mass of stearic acid, 1 part by mass of 2-mercaptobenzothiazole as a vulcanization accelerator, 1.5 parts by mass of sulfur and 6 parts by mass of NEOCELLBORN N#1000M (manufactured by Eiwa Chemical) as a foaming agent are kneaded by using a kneader having a volume of 55 L to provide a rubber foam composition. The rubber composition is extruded from a crosshead-type extruder manufactured by Mitsuba Industries to a metal shaft having an outer diameter ϕ of 8 mm and being attached with an adhesive agent to obtain an unvulcanized rubber/shaft integral molding. This is set in a metal cylindrical mold, and vulcanized and foamed at 175° C. under a pressure of $3.2\times10^6$ Pa for 20 minutes. The pressure in the split mold is released to obtain a rubber foam roller with a skin layer and it is vulcanized in an oven of 180° C. for 4 hours. The resulting roller is plunger-type ground to have a diameter ϕ of 16 mm by a rotary grinder to obtain a rubber foam roller. A developing roller is made in the same manner as in Example G-1 except that a microparticle-containing resin coating layer is formed on an outer peripheral surface of the main body of the roller by using a coating liquid according to a formulation shown in Table 26. The properties and performances of the resulting developing roller are shown in Table 26.

Example G-4

100 parts by mass of polyetherpolyol which is trifunctional, has a molecular weight of 9,000 and is produced by adding propylene oxide to glycerin is added with 1.6 parts by mass of conductive carbon and 0.15 part by mass of dibutyltin dilaurate, sufficiently stirred and mixed, and then defoamed for 20 minutes while stirred under vacuum to be used as a polyol component. The polyol component has a hydroxyl value of 19 mgKOH/g. On the other hand, polypropylene glycol-modified polymeric MDI having a NCO content of 11% is defoamed for 20 minutes while stirred under vacuum and used as an isocyanate component. The polyol component and the isocyanate component are stirred at high speed and mixed by a binary type casting machine while regulating a ratio of the polyol component to the isocyanate component to be 101.75/13.70 (isocyanate index: 103). The mixed urethane raw material is charged into a metal cylindrical mold in which a metal shaft having an outer diameter ϕ of 8 mm is set and heat-cured in an oven at 90° C. for 60 minutes. The urethane roller with the metal shaft is removed from the cylindrical mold to obtain a roller. A developing roller is made by the same manner as in Example G-1 except that a microparticle-containing resin coating layer is formed on an outer peripheral surface of the main body of the roller by using a coating liquid according to a formulation shown in Table 26. The properties and performances of the resulting developing roller are shown in Table 26.

Example G-5

100 parts by mass of Sunnix FA952 [polyetherpolyol manufactured by Sanyo Chemical Industries, Ltd., OH value=37], 1 part by mass of SRX274C [foam stabilizer manufactured by Dow Corning Toray Silicone Co., Ltd.], 2.8 parts by mass of TOYOCAT NP [amine catalyst manufactured by Tosoh Corporation], 1.5 parts by mass of TOYOCAT EP [amine catalyst manufactured by Tosoh Corporation] and 59 parts by mass of SANFOAM IC-716 [tolylene diisocyanate manufactured by Sanyo Chemical Industries, Ltd.] are mechanically stirred and foamed. Then, a metal shaft having an outer diameter of 6.0 mm and a length of 240 mm is disposed into a metal cylindrical mold having an inner diameter of 12 mm, a length of 250 mm and a fluorine-processed surface through its opening and 8.0 g of the above raw material for a polyurethane foam is charged from a foaming machine. Then, the mold charged with the raw material for the polyurethane foam is heated in an oven of 80° C. for 20 minutes and released to make a main body of a roller provided with a elastic layer composed of the urethane foam and having an outer diameter of 12 mm and a total length of a foam portion of 230 mm.

A microparticle-containing coating liquid according to a formulation shown in Table 26 is applied on an outer peripheral surface of the main body of the roller by a roll coater, ultraviolet rays are irradiated on the roller at an irradiation intensity of 400 mW and an integrated light amount of 1000 $mJ/cm^2$ by using Unicure UVH-0252C manufactured by Ushio, Inc. while the roller is rotated, and as a result, the coating liquid is immediately cured to form an elastic microparticle-containing resin coating layer to obtain a charging roller provided with the microparticle-containing resin coating layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the charging roller, an image density, whether a half-tone spot and fog occur or not, a difference of a density between a top end and a bottom end are checked (Moreover, the methods for evaluating image, surface roughness and resistance are the same as in Example G-1). These results are shown in Table 26.

Example G-6

100 parts by mass of Nipol IR2200L having a Moony viscosity $ML_{1+4}$(100° C.) of 70 (manufactured by Nippon Zeon), 60 parts by mass of LIR-30 having an average molecular weight of 29000 (manufactured by Kuraray), 28 parts by mass of Carbon Black TB#5500 (manufactured by Tokai Carbon), 5 parts by mass of zinc white, 1 part by mass of stearic acid and 9 parts by mass of PERHEXA C-40 (manufactured by Nippon Oil and Fat) are kneaded by using a kneader having a volume of 55 L to provide a rubber composition. The rubber composition is extruded from a crosshead-type extruder manufactured by Mitsuba Industries to a metal shaft having an outer diameter ϕ of 6 mm and being attached with an adhesive agent to obtain an unvulcanized rubber/shaft integral molding. This is set in a metal cylindrical mold, and vulcanized at 175° C. under a pressure of $3.2\times10^6$ Pa for 20 minutes. The pressure in the split mold is released to obtain a rubber roller and it is vulcanized in an oven of 180° C. for 4 hours. The resulting roller is plunger-type ground to have a diameter ϕ of 12 mm by a rotary grinder to obtain a rubber roller. A charging roller is made by the same manner as in Example G-5 except that a microparticle-containing resin coating layer is formed on an outer peripheral surface of the main body of the roller by using a coating liquid according to a formulation shown in Table 26. The properties and performances of the resulting charging roller are shown in Table 26.

Example G-7

100 parts by mass of EPDM having an iodine value of 36 and a Moony viscosity $ML_{1+4}$(100° C.) of 39, 50 parts by mass of Carbon Black TB#5500 (manufactured by Tokai Carbon), 36 parts by mass of Nobelite A (manufactured by Nippon Funka Kogyo) as a calcium carbonate, 60 parts by mass of Diana Process Oil PW90 (manufactured by Idemitsu Kosan), 3 parts by mass of zinc white, 2 parts by mass of stearic acid, 1 part by mass of 2-mercaptobenzothiazole as a vulcanization accelerator, 1.5 parts by mass of sulfur and 6 parts by mass of NEOCELLBORN N#1000M (manufactured by Eiwa Chemical) as a foaming agent are kneaded by using a kneader having a volume of 55 L to provide a rubber foam composition. The rubber composition is extruded from a crosshead-type extruder manufactured by Mitsuba Industries to a metal shaft having an outer diameter ϕ of 6 mm and being attached with an adhesive agent to obtain an unvulcanized rubber/shaft integral molding. This is set in a metal cylindrical mold, and vulcanized and foamed at 175° C. under a pressure of $3.2\times10^6$ Pa for 20 minutes. The pressure in the split mold is released to obtain a rubber foam roller with a skin layer and it is vulcanized in an oven of 180° C. for 4 hours. The resulting roller is plunger-type ground to have a diameter ϕ of 12 mm by a rotary grinder to obtain a rubber foam roller. A charging roller is made in the same manner as in Example G-5 except that a microparticle-containing resin coating layer is formed on an outer peripheral surface of the main body of the roller by using a coating liquid according to a formulation shown in Table 27. The properties and performances of the resulting charging roller are shown in Table 27.

Example G-8

Liquid silicone LIM liquid #2090 (manufactured by Dow Corning Toray Silicone Co., Ltd.) is stirred and defoamed, and then charged into a metal cylindrical mold in which a metal shaft having an outer diameter ϕ of 6 mm is set and heat-cured in an oven at 120° C. for 30 minutes. The roller with the metal shaft is removed from the cylindrical mold and heat-cured in a convection oven at 200° C. for 4 hours to obtain a roller. A charging roller is made by the same manner as in Example G-5 except that a microparticle-containing resin coating layer is formed on an outer peripheral surface of the main body of the roller by using a coating liquid according to a formulation shown in Table 27. The properties and performances of the resulting charging roller are shown in Table 27.

Example G-9

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 100 parts by mass of MEK (methyl ethyl ketone) is applied on the main body of the roller provided with the elastic layer composed of urethane foam made in Example G-5 at a thickness of 50 μm, and then heat-cured at 100° C. for 1 hour. A microparticle-containing resin coating layer is formed onto the resulting roller by using a coating liquid according to a formulation shown in Table 27 to make a charging roller. The properties and performances of the resulting charging roller are shown in Table 27.

Comparative Example G-1

A developing roller is made in the same manner as in Example G-1 except that a resin coating layer is formed by using a coating liquid according to a formulation shown in Table 27. The properties and performances of the resulting developing roller are shown in Table 27.

Comparative Example G-2

A charging roller is made in the same manner as in Example G-8 except that a resin coating layer is formed by using a coating liquid according to a formulation shown in Table 27. The properties and performances of the resulting charging roller are shown in Table 27.

TABLE 26

| | | | | | Example G-1 | Example G-2 | Example G-3 | Example G-4 | Example G-5 | Example G-6 |
|---|---|---|---|---|---|---|---|---|---|---|
| Elastic layer | Elastomer | | | | Urethane foam | Rubber | Rubber foam | Solid urethane | Urethane foam | Rubber |
| | Thickness | | | mm | 4 | 4 | 4 | 4 | 3 | 3 |
| Micro-particle-containing resin coating layer | Formulation of coating liquid | UV non-curable | MODIPER F200 (made by Nippon Oil & Fat) *1 | parts by mass | — | 10 | — | — | 5 | — |
| | | | THV220A (made by Sumitomo 3M) *1 | | — | — | 10 | — | — | — |
| | | | MODIPER FS700 (made by Nippon Oil & Fat) *2 | | — | — | — | 10 | — | — |
| | | | US-270 (made by Toagosei) *2 | | — | — | — | — | — | 10 |
| | | | Ethyl silicate 45 (made by Tama Chemicals) *2 | | — | — | — | — | — | — |
| | | | X-22-821 (made by Shin-Etsu Chemical) *2 | | — | — | — | — | — | — |
| | | UV-curing type | UF8001 (made by Kyoeisha Chemical) | | 50 | 50 | — | — | 50 | 50 |
| | | | V4260 (made by Dainippon Ink & Chemicals) | | — | — | 50 | — | — | — |

TABLE 26-continued

| | | | | Example G-1 | Example G-2 | Example G-3 | Example G-4 | Example G-5 | Example G-6 |
|---|---|---|---|---|---|---|---|---|---|
| | | UC-203 (made by Kuraray) | | — | — | — | 50 | — | — |
| | | Methoxytriethyleneglycol acrylate | | 25 | 25 | 25 | 50 | 50 | 50 |
| | | Isoamyl acrylate | | 25 | 25 | 25 | — | — | — |
| | | Dimethylaminoethyl methacrylate | | — | — | — | — | — | — |
| | | 2-(perfluorooctyl)ethyl acrylate | | — | — | 5 | — | 5 | — |
| | | γ-methacryloxypropyl trimethoxysilane | | — | — | — | — | — | — |
| | | X-24-8201 (made by Shin-Etsu Chemical) | | — | — | — | — | — | — |
| | | Ketjen Black (made by Mitsubishi Chemical) | | — | 2.5 | — | 2.5 | 2.5 | 2.5 |
| | | DENKA BLACK (made by Denki Kagaku Kogyo) | | — | — | 3 | — | — | — |
| | | ITO microparticle | | — | — | — | — | — | — |
| | | IRGACURE184 (made by Ciba-Geigy Specialty Chemicals) | | — | 2.5 | — | 2.5 | — | 2.5 |
| | | IRGACURE819 (made by Ciba-Geigy Specialty Chemicals) | | — | 2.5 | — | 2.5 | — | 2.5 |
| | | KAYACURE DETX-S (made by Nippon Kayaku) | | — | — | 1.7 | — | 1.7 | — |
| | | KAYACURE DMBI (made by Nippon Kayaku) | | — | — | 3.3 | — | 3.3 | — |
| | Micro-particle | CFB-101-40 (made by Dainippon Ink & Chemicals) | | 10 | 10 | — | — | — | — |
| | | SS20 (made by Nippon Silica) | | — | — | — | — | 5 | — |
| | | MX500 (made by Soken Chemical & Engineering) | | — | — | — | — | — | 5 |
| | | Tospal 2000B (made by GE Toshiba Silicone) | | — | — | — | — | — | — |
| | | C-1510 (made by Fuji Silysia Chemical) | | — | — | 10 | — | — | — |
| | | LE-1080 (made by Sumitomo Seika Chemicals) | | — | — | — | 10 | — | — |
| | | Benzyltributylammonium chloride | | — | — | — | — | — | — |
| | | Propylene glycol monomethyl ether | | — | — | — | — | — | — |
| | Thickness | | μm | 18 | 21 | 19 | 22 | 7 | 9 |
| Physical values of roller | Resitance | | Ω | 6.1E+06 | 4.2E+06 | 6.2E+06 | 5.0E+06 | 5.0E+06 | 6.1E+05 |
| | Surface roughness Rz | | μm | 8.6 | 6.2 | 6.8 | 5.9 | 4.0 | 5.8 |
| Initial property of developing roller | Charge of toner | | μC/g | 30 | 30 | 31 | 32 | — | — |
| | Amount of carried toner | | $mg/cm^2$ | 0.31 | 0.31 | 0.32 | 0.33 | — | — |
| Initial image | Image density | | | good | good | good | good | good | good |
| | Fog | | | good | good | good | good | good | good |
| | Difference of density between top and bottom ends | | | good | good | good | good | good | good |
| | Half-tone spot | | | good | good | good | good | good | good |
| Toner attachment on surface of developing roller after 10000 sheets were printed | | | | slightly occur | good | very good | good | — | — |
| Wear of surface of charging roller after 10000 sheets were printed | | | | — | — | — | — | very good | good |
| Image after 10000 sheets were printed | Image density | | | good | good | good | good | good | good |
| | Fog | | | good | good | good | good | very good | very good |
| | Difference of density between top and bottom ends | | | good | good | good | good | good | good |
| | Half-tone spot | | | good | good | very good | good | very good | very good |

*1 Fluorine-containing component

*2 Silicon-containing component

TABLE 27

| | | | | | Example G-7 | Example G-8 | Example G-9 | Comparative example G-1 | Comparative example G-2 |
|---|---|---|---|---|---|---|---|---|---|
| Elastic layer | Elastomer | | | | Rubber foam | Silicone | Urethane foam | Urethane foam | Silicone |
| | Thickness | | | mm | 3 | 3 | 3 | 4 | 3 |
| Micro-particle-containing resin coating layer | Formulation of coating liquid | UV non-curable | MODIPER F200 (made by Nippon Oil & Fat) *1 | parts by mass | — | — | 10 | — | — |
| | | | THV220A (made by Sumitomo 3M) *1 | | — | — | — | — | — |
| | | | MODIPER FS700 (made by Nippon Oil & Fat) *2 | | — | — | — | — | — |
| | | | US-270 (made by Toagosei) *2 | | — | — | — | — | — |
| | | | Ethyl silicate 45 (made by Tama Chemicals) *2 | | 10 | — | — | — | — |
| | | | X-22-821 (made by Shin-Etsu Chemical) *2 | | — | 5 | — | — | — |
| | | UV-curing type | UF8001 (made by Kyoeisha Chemical) | | — | — | 50 | 50 | 50 |
| | | | V4260 (made by Dainippon Ink & Chemicals) | | 50 | — | — | — | — |
| | | | UC-203 (made by Kuraray) | | — | 50 | — | — | — |
| | | | Methoxytriethyleneglycol acrylate | | 25 | 25 | 25 | 25 | 50 |
| | | | Isoamyl acrylate | | — | 25 | 25 | 25 | — |
| | | | Dimethylaminoethyl methacrylate | | 25 | — | — | — | — |
| | | | 2-(perfluorooctyl)ethyl acrylate | | — | — | — | — | — |
| | | | γ-methacryloxypropyl trimethoxysilane | | 10 | — | — | — | — |
| | | | X-24-8201 (made by Shin-Etsu Chemical) | | — | 5 | — | — | — |
| | | | Ketjen Black (made by Mitsubishi Chemical) | | — | 2.5 | — | 2.5 | 2.5 |
| | | | DENKA BLACK (made by Denki Kagaku Kogyo) | | — | — | 3 | — | — |
| | | | ITO microparticle | | 30 | — | — | — | — |
| | | | IRGACURE184 (made by Ciba-Geigy Specialty Chemicals) | | 2.5 | — | 2.5 | 2.5 | 2.5 |
| | | | IRGACURE819 (made by Ciba-Geigy Specialty Chemicals) | | 2.5 | — | 2.5 | 2.5 | 2.5 |
| | | | KAYACURE DETX-S (made by Nippon Kayaku) | | — | 1.7 | — | — | — |
| | | | KAYACURE DMBI (made by Nippon Kayaku) | | — | 3.3 | — | — | — |
| | | Micro-particle | CFB-101-40 (made by Dainippon Ink & Chemicals) | | — | — | 10 | — | — |
| | | | SS20 (made by Nippon Silica) | | — | — | — | — | — |
| | | | MX500 (made by Soken Chemical & Engineering) | | — | — | — | — | — |
| | | | Tospal 2000B (made by GE Toshiba Silicone) | | 5 | 5 | — | — | — |
| | | | C-1510 (made by Fuji Silysia Chemical) | | — | — | — | — | — |
| | | | LE-1080 (made by Sumitomo Seika Chemicals) | | — | — | — | — | — |
| | | | Benzyltributylammonium chloride | | — | 4 | — | — | — |
| | | | Propylene glycol monomethyl ether | | — | 20 | — | — | — |
| | Thickness | | | μm | 6 | 8 | 7 | 16 | 7 |
| Physical values of roller | Resitance | | | Ω | 8.0E+05 | 5.9E+05 | 6.5E+05 | 6.0E+06 | 7.4E+05 |
| | Surface roughness Rz | | | μm | 6.8 | 5.6 | 5.8 | 0.1 | 0.1 |
| Initial property of developing roller | Charge of toner | | | μC/g | — | — | — | 28 | — |
| | Amount of carried toner | | | $mg/cm^2$ | — | — | — | 0.26 | — |
| Initial image | Image density | | | | good | good | good | thin | thin |
| | Fog | | | | good | good | good | good | good |
| | Difference of density between top and bottom ends | | | | good | good | good | good | good |
| | Half-tone spot | | | | good | good | good | fisheye | fisheye |
| Toner attachment on surface of developing roller after 10000 sheets were printed | | | | | — | — | — | much filming | — |
| Wear of surface of charging roller after 10000 sheets were printed | | | | | good | very good | good | — | wear |
| Image after 10000 sheets were printed | Image density | | | | good | good | good | bad | bad |
| | Fog | | | | good | very good | good | very bad | bad |
| | Difference of density between top and bottom ends | | | | good | good | good | bad | bad |
| | Half-tone spot | | | | good | very good | good | bad | bad |

*1 Fluorine-containing component

*2 Silicon-containing component

As seen from Tables 26 and 27, since the conductive rollers of Examples have moderate micro-unevenness on their surfaces, the image forming apparatuses incorporated with the conductive roller can stably form an excellent image for a long time.

<H. Second Conductive Roller>

Example H-1

A coating liquid for a first resin coating layer according to a formulation shown in Table 28 is applied on an outer peripheral surface of the main body of the roller made in the same manner as in Example G-1 by a roll coater and heat-cured in a convection oven at 100° C. for 1 hour. Then, a coating liquid for a second resin coating layer according to a formulation shown in Table 28 is applied by a roll coater, ultraviolet rays are irradiated on the roller at an irradiation intensity of 400 mW and an integrated light amount of 1000 mJ/cm$^2$ by using Unicure UVH-0252C manufactured by Ushio, Inc. while the roller is rotated, and as a result, the coating liquid is immediately cured to form an elastic resin coating layer to obtain a developing roller provided with the resin coating layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not, a difference of a density between a top end and a bottom end are evaluated according to a known method. Furthermore, after 10000 sheets were printed, toner attachment on the surface of the developing roller, an image density, whether a half-tone spot and fog occur or not, a difference of a density between a top end and a bottom end are checked (Moreover, the methods for evaluating image, surface roughness and resistance are the same as in Example G-1). These results are shown in Table 28.

Example H-2

A developing roller is made in the same manner as in Example H-1 except that a resin coating layer is formed on the outer peripheral surface of the main body of the roller made by the same manner as in Example G-2 by using a coating liquid according to a formulation shown in Table 28. The properties and performances of the resulting developing roller are shown in Table 28.

Example H-3

A developing roller is made in the same manner as in Example H-1 except that a resin coating layer is formed on the outer peripheral surface of the main body of the roller made in the same manner as in Example G-3 by using a coating liquid according to a formulation shown in Table 28 and curing of the first resin coating layer is performed by the same curing manner as in the second resin coating layer of Example H-1 by ultraviolet rays. The properties and performances of the resulting developing roller are shown in Table 28.

Example H-4

A developing roller is made in the same manner as in Example H-3 except that a resin coating layer is formed on the outer peripheral surface of the main body of the roller made in the same manner as in Example G-4 by using a coating liquid according to a formulation shown in Table 28. The properties and performances of the resulting developing roller are shown in Table 28.

Example H-5

A coating liquid for a first resin coating layer according to a formulation shown in Table 28 is applied on an outer peripheral surface of the main body of the roller made in the same manner as in Example G-1 by a roll coater and heat-cured in a convection oven at 100° C. for 1 hour. Then, a coating liquid for a second resin coating layer according to a formulation shown in Table 28 is applied by a roll coater, ultraviolet rays are irradiated on the roller at an irradiation intensity of 400 mW and an integrated light amount of 1000 mJ/cm$^2$ by using Unicure UVH-0252C manufactured by Ushio, Inc. while the roller is rotated, and as a result, the coating liquid is immediately cured to form an elastic resin coating layer to obtain a charging roller provided with the resin coating layer on the outer peripheral surface of the main body of the roller. The resulting charging roller are evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the charging roller, an image density, whether a half-tone spot and fog occur or not and a difference of a density between a top end and a bottom end are checked (Moreover, the methods for evaluating image, surface roughness and resistance are the same as in Example G-1). These results are shown in Table 28.

Example H-6

A charging roller is made in the same manner as in Example H-5 except that a resin coating layer is formed on the outer peripheral surface of the main body of the roller made in the same manner as in Example G-6 by using a coating liquid according to a formulation shown in Table 29. The properties and performances of the resulting charging roller are shown in Table 29.

Example H-7

A charging roller is made in the same manner as in Example H-5 except that a resin coating layer is formed on the outer peripheral surface of the main body of the roller made in the same manner as in Example G-7 by using a coating liquid according to a formulation shown in Table 29 and curing of the first resin coating layer is performed by the same curing manner as in the second resin coating layer of Example H-5 by ultraviolet rays. The properties and performances of the resulting charging roller are shown in Table 29.

Example H-8

A charging roller is made in the same manner as in Example H-7 except that a resin coating layer is formed on the outer peripheral surface of the main body of the roller made in the same manner as in Example G-8 by using a coating liquid according to a formulation shown in Table 29. The properties and performances of the resulting charging roller are shown in Table 29.

Comparative Example H-1

A developing roller is made in the same manner as in Example H-1 except that a resin coating layer is formed by using a coating liquid according to a formulation shown in Table 29. The properties and performances of the resulting developing roller are shown in Table 29.

Comparative Example H-2

A charging roller is made in the same manner as in Example H-8 except that a resin coating layer is formed by using a coating liquid according to a formulation shown in Table 29. The properties and performances of the resulting charging roller are shown in Table 29.

TABLE 28

| | | | | | Example H-1 | Example H-2 | Example H-3 | Example H-4 | Example H-5 |
|---|---|---|---|---|---|---|---|---|---|
| Elastic layer | Elastomer | | | | Urethane foam | Rubber | Rubber foam | Solid urethane | Urethane foam |
| | Thickness | | | mm | 4 | 4 | 4 | 4 | 3 |
| First resin coating layer | Formulation of coating liquid | UV non-curable | OD-E-198-50 (made by Dainippon Ink & Chemicals) | parts by mass | 100 | — | — | — | 100 |
| | | | CE8300 (made by Dainippon Ink & Chemicals) | | — | 100 | — | — | — |
| | | | CR latex | | — | — | — | — | — |
| | | | Ketjen Black (made by Mitsubishi Chemical) | | 4 | 4 | — | — | 4 |
| | | | CFB-101-40 (made by Dainippon Ink & Chemicals) | | — | 10 | — | — | — |
| | | UV-curing type | UF8001 (made by Kyoeisha Chemical) | | — | — | 50 | 50 | — |
| | | | Methoxytriethyleneglycol acrylate | | — | — | 50 | 50 | — |
| | | | Ketjen Black (made by Mitsubishi Chemical) | | — | — | 4 | 3 | — |
| | | | DENKA BLACK (made by Denki Kagaku Kogyo) | | — | — | — | — | — |
| | | | ITO microparticle | | — | — | — | — | — |
| | | | IRGACURE184 (made by Ciba-Geigy Specialty Chemicals) | | — | — | 2.5 | 2.5 | — |
| | | | IRGACURE819 (made by Ciba-Geigy Specialty Chemicals) | | — | — | 2.5 | 2.5 | — |
| | | | KAYACURE DETX-S (made by Nippon Kayaku) | | — | — | — | — | — |
| | | | KAYACURE DMBI (made by Nippon Kayaku) | | — | — | — | — | — |
| | | | CFB-101-40 (made by Dainippon Ink & Chemicals) | | — | — | — | 5 | — |
| | Volume resistivity | | | Ω · cm | 3.2E+05 | 3.5E+05 | 2.4E+05 | 7.2E+05 | 3.2E+05 |
| | Thickness | | | μm | 14 | 15 | 15 | 14 | 16 |
| Second resin coating layer | Formulation of coating liquid | UV non-curable | MODIPER F200 (made by Nippon Oil & Fat) *1 | parts by mass | — | 10 | — | — | 5 |
| | | | THV220A (made by Sumitomo 3M) *1 | | — | — | 10 | — | — |
| | | | MODIPER FS700 (made by Nippon Oil & Fat) *2 | | — | — | — | 10 | — |
| | | | US-270 (made by Toagosei) *2 | | — | — | — | — | — |
| | | | Ethyl silicate 45 (made by Tama Chemicals) *2 | | — | — | — | — | — |
| | | | X-22-821 (made by Shin-Etsu Chemical) *2 | | — | — | — | — | — |
| | | UV-curing type | UF8001 (made by Kyoeisha Chemical) | | 50 | 50 | — | — | 50 |
| | | | V4260 (made by Dainippon Ink & Chemicals) | | — | — | 50 | — | — |
| | | | UC-203 (made by Kuraray) | | — | — | — | 50 | — |
| | | | Methoxytriethyleneglycol acrylate | | 50 | 25 | 25 | 50 | 25 |
| | | | Isoamyl acrylate | | — | 25 | 25 | — | 25 |
| | | | Dimethylaminoethyl methacrylate | | — | — | — | — | — |
| | | | 2-(perfluorooctyl)ethyl acrylate | | — | — | 5 | — | 5 |
| | | | γ-methacryloxypropyl trimethoxysilane | | — | — | — | — | — |
| | | | X-24-8201 (made by Shin-Etsu Chemical) | | — | — | — | — | — |
| | | | Ketjen Black (made by Mitsubishi Chemical) | | — | — | — | — | — |
| | | | IRGACURE184 (made by Ciba-Geigy Specialty Chemicals) | | 2.5 | — | 2.5 | 2.5 | — |
| | | | IRGACURE819 (made by Ciba-Geigy Specialty Chemicals) | | 2.5 | — | 2.5 | 2.5 | — |
| | | | KAYACURE DETX-S (made by Nippon Kayaku) | | — | 1.7 | — | — | 1.7 |
| | | | KAYACURE DMBI (made by Nippon Kayaku) | | — | 3.3 | — | — | 3.3 |

TABLE 28-continued

| | | | | | Example H-1 | Example H-2 | Example H-3 | Example H-4 | Example H-5 |
|---|---|---|---|---|---|---|---|---|---|
| | | Micro-particle | CFB-101-40 (made by Dainippon Ink & Chemicals) | | 3 | — | — | — | — |
| | | | SS20 (made by Nippon Silica) | | — | — | 5 | — | 5 |
| | | | Benzyltributylammonium chloride | | — | — | — | — | — |
| | | | Propylene glycol monomethyl ether | | — | — | — | — | — |
| | Volume resistivity | | | Ωcm | 4.2E+14 | 3.0E+14 | 5.2E+14 | 5.2E+14 | 4.2E+14 |
| | Thickness | | | μm | 3 | 3 | 4 | 3 | 4 |
| Physical values of roller | Resitance | | | Ω | 6.2E+06 | 6.5E+06 | 7.4E+06 | 6.1E+06 | 5.0E+05 |
| | Surface roughness Rz | | | μm | 6.1 | 5.3 | 5.6 | 4.9 | 4.5 |
| Initial property of developing roller | Charge of toner | | | μC/g | 32 | 30 | 31 | 30 | — |
| | Amount of carried toner | | | $mg/cm^2$ | 0.25 | 0.31 | 0.32 | 0.3 | — |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner attachment on surface of developing roller after 10000 sheets were printed | | | | | slightly occur | good | very good | good | — |
| Wear of surface of charging roller after 10000 sheets were printed | | | | | — | — | — | — | very good |
| Image after 10000 sheets were printed | Image density | | | | good | good | good | good | good |
| | Fog | | | | good | good | very good | good | very good |
| | Difference of density between top and bottom ends | | | | good | good | good | good | good |
| | Half-tone spot | | | | good | good | good | good | good |

*1 Fluorine-containing component
*2 Silicon-containing component

TABLE 29

| | | | | | Example H-6 | Example H-7 | Example H-8 | Comparative example H-1 | Comparative example H-2 |
|---|---|---|---|---|---|---|---|---|---|
| Elastic layer | Elastomer | | | | Rubber | Rubber foam | Silicone | Urethane foam | Silicone |
| | Thickness | | | mm | 3 | 3 | 3 | 4 | 3 |
| First resin coating layer | Formulation of coating liquid | UV non-curable | OD-E-198-50 (made by Dainippon Ink & Chemicals) | parts by mass | — | — | — | — | — |
| | | | CE8300 (made by Dainippon Ink & Chemicals) | | — | — | — | — | — |
| | | | CR latex | | 100 | — | — | — | — |
| | | | Ketjen Black (made by Mitsubishi Chemical) | | 4 | — | — | — | — |
| | | | CFB-101-40 (made by Dainippon Ink & Chemicals) | | — | — | — | — | — |
| | | UV-curing type | UF8001 (made by Kyoeisha Chemical) | | — | 50 | 50 | — | — |
| | | | Methoxytriethyleneglycol acrylate | | — | 50 | 50 | — | — |
| | | | Ketjen Black (made by Mitsubishi Chemical) | | — | — | — | — | — |
| | | | DENKA BLACK (made by Denki Kagaku Kogyo) | | — | 4 | — | — | — |
| | | | ITO microparticle | | — | — | 35 | — | — |
| | | | IRGACURE184 (made by Ciba-Geigy Specialty Chemicals) | | — | 2.5 | — | — | — |
| | | | IRGACURE819 (made by Ciba-Geigy Specialty Chemicals) | | — | 2.5 | — | — | — |
| | | | KAYACURE DETX-S (made by Nippon Kayaku) | | — | — | 1.7 | — | — |
| | | | KAYACURE DMBI (made by Nippon Kayaku) | | — | — | 3.3 | — | — |
| | | | CFB-101-40 (made by Dainippon Ink & Chemicals) | | — | — | 5 | — | — |
| | Volume resistivity | | | Ω · cm | 4.2E+05 | 4.5E+05 | 6.6E+05 | — | — |
| | Thickness | | | μm | 17 | 18 | 18 | — | — |
| Second resin coating layer | Formulation of coating liquid | UV non-curable | MODIPER F200 (made by Nippon Oil & Fat) *1 | parts by mass | — | — | — | — | — |
| | | | THV220A (made by Sumitomo 3M) *1 | | — | — | — | — | — |
| | | | MODIPER FS700 (made by Nippon Oil & Fat) *2 | | — | — | — | — | — |

TABLE 29-continued

| | | | | Example H-6 | Example H-7 | Example H-8 | Comparative example H-1 | Comparative example H-2 |
|---|---|---|---|---|---|---|---|---|
| | | US-270 (made by Toagosei) *2 | | 10 | — | — | — | — |
| | | Ethyl silicate 45 (made by Tama Chemicals) *2 | | — | 10 | — | — | — |
| | | X-22-821 (made by Shin-Etsu Chemical) *2 | | — | — | 5 | — | — |
| | UV-curing type | UF8001 (made by Kyoeisha Chemical) | | 50 | — | — | 50 | 50 |
| | | V4260 (made by Dainippon Ink & Chemicals) | | — | 50 | — | — | — |
| | | UC-203 (made by Kuraray) | | — | — | 50 | — | — |
| | | Methoxytriethyleneglycol acrylate | | — | 25 | 50 | 50 | 25 |
| | | Isoamyl acrylate | | 25 | — | — | — | 25 |
| | | Dimethylaminoethyl methacrylate | | 25 | 25 | — | — | — |
| | | 2-(perfluorooctyl)ethyl acrylate | | — | — | — | — | — |
| | | γ-methacryloxypropyl trimethoxysilane | | — | 10 | — | — | — |
| | | X-24-3201 (made by Shin-Etsu Chemical) | | — | — | 5 | — | — |
| | | Ketjen Black (made by Mitsubishi Chemical) | | — | — | — | 2.5 | 2.5 |
| | | IRGACURE184 (made by Ciba-Geigy Specialty Chemicals) | | 2.5 | 2.5 | — | 2.5 | — |
| | | IRGACURE819 (made by Ciba-Geigy Specialty Chemicals) | | 2.5 | 2.5 | — | 2.5 | — |
| | | KAYACURE DETX-S (made by Nippon Kayaku) | | — | — | 1.7 | — | 1.7 |
| | | KAYACURE DMBI (made by Nippon Kayaku) | | — | — | 3.3 | — | 3.3 |
| | Micro-particle | CFB-101-40 (made by Dainippon Ink & Chemicals) | | — | — | — | 10 | — |
| | | SS20 (made by Nippon Silica) | | 5 | 5 | — | — | — |
| | | Benzyltributylammonium chloride | | — | — | 4 | — | — |
| | | Propylene glycol monomethyl ether | | — | — | 20 | — | — |
| | Volume resistivity | | Ωcm | 3.2E+14 | 3.1E+14 | 5.2E+13 | 4.4E+05 | 4.2E+05 |
| | Thickness | | μm | 3 | 4 | 3 | 17 | 8 |
| Physical values of roller | Resitance | | Ω | 7.4E+05 | 6.2E+05 | 5.4E+05 | 8.8E+06 | 6.1E+05 |
| | Surface roughness Rz | | μm | 4.2 | 4.0 | 6.0 | 5.1 | 0.2 |
| Initial property of developing roller | Charge of toner | | μC/g | — | — | — | 26 | — |
| | Amount of carried toner | | $mg/cm^2$ | — | — | — | 0.3 | — |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | fisheye | fisheye |
| Toner attachment or surface of developing roller after 10000 sheets were printed | | | | — | — | — | much filming | — |
| Wear of surface of charging roller after 10000 sheets were printed | | | | good | good | very good | — | wear |
| Image after 10000 sheets were printed | Image density | | | good | good | good | bad | bad |
| | Fog | | | very good | good | very good | very bad | bad |
| | Difference of density between top and bottom ends | | | good | good | good | bad | bad |
| | Half-tone spot | | | very good | good | good | bad | bad |

*1 Fluorine-containing component

*2 Silicon-containing component

As seen from Tables 28 and 29, since the conductive rollers of Examples are excellent in charging property to toner, the image forming apparatuses incorporated with the conductive roller as a developing roller can stably form an excellent image for a long time.

<I. Third Conductive Roller>

Example I-1

A coating liquid for a microparticle-containing resin coating layer according to a formulation shown in Table 30 is applied on an outer peripheral surface of the main body of the roller made by the same manner as in Example G-1 by a roll coater and heat-cured in a convection oven at 100° C. for 1 hour. Then, a coating liquid for a protective layer according to a formulation shown in Table 30 is applied by a roll coater, ultraviolet rays are irradiated on the roller at an irradiation intensity of 400 mW and an integrated light amount of 1000 $mJ/cm^2$ by using Unicure UVH-0252C manufactured by Ushio, Inc. while the roller is rotated, and as a result, the coating liquid is immediately cured to form an elastic protective layer to obtain a developing roller provided with the microparticle-containing resin coating layer and the protective layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not, a difference of a density between a top end and a bottom end are evaluated according to a known method. Furthermore, after 10000 sheets were printed, toner attachment on the surface of the developing roller, an image density, whether a half-tone spot and fog occur or not, a difference of a density between a top end and a bottom end are checked (Moreover, the methods for evaluating image, surface roughness and resistance are the same as in Example G-1). These results are shown in Table 30.

Example I-2

A developing roller is made in the same manner as in Example I-1 except that a resin coating layer is formed on the outer peripheral surface of the main body of the roller made in the same manner as in Example G-2 by using a coating liquid according to a formulation shown in Table 30. The properties and performances of the resulting developing roller are shown in Table 30.

Example I-3

A developing roller is made in the same manner as in Example H-1 except that a microparticle-containing resin coating layer and a protective layer are formed on the outer peripheral surface of the main body of the roller made in the same manner as in Example G-3 by using a coating liquid according to a formulation shown in Table 30 and curing of the microparticle-containing resin coating layer is performed by the same curing manner as in the protective layer of Example I-1 by ultraviolet rays. The properties and performances of the resulting developing roller are shown in Table 30.

Example I-4

A developing roller is made in the same manner as in Example I-3 except that a coating liquid according to a formulation shown in Table 30 is used on the outer peripheral surface of the main body of the roller made in the same manner as in Example G-4. The properties and performances of the resulting developing roller are shown in Table 30.

Example I-5

A coating liquid for a microparticle-containing resin coating layer according to a formulation shown in Table 30 is applied on an outer peripheral surface of the main body of the roller made in the same manner as in Example G-1 by a roll coater and heat-cured in a convection oven at 100° C. for 1 hour. Then, a coating liquid for a protective layer according to a formulation shown in Table 30 is applied by a roll coater, ultraviolet rays are irradiated on the roller at an irradiation intensity of 400 mW and an integrated light amount of 1000 $mJ/cm^2$ by using Unicure UVH-0252C manufactured by Ushio, Inc. while the roller is rotated, and as a result, the coating liquid is immediately cured to form an elastic protective layer to obtain a charging roller provided with the microparticle-containing resin coating layer and the protective layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the charging roller, an image density, whether a half-tone spot and fog occur or not and a difference of a density between a top end and a bottom end are checked (Moreover, the methods for evaluating image, surface roughness and resistance are the same as in Example G-1). These results are shown in Table 30.

Example I-6

A charging roller is made in the same manner as in Example I-5 except that a microparticle-containing resin coating layer and a protective layer are formed on the outer peripheral surface of the main body of the roller made in the same manner as in Example G-6 by using a coating liquid according to a formulation shown in Table 31. The properties and performances of the resulting charging roller are shown in Table 31.

Example I-7

A charging roller is made in the same manner as in Example 1-5 except that a microparticle-containing resin coating layer and a protective layer are formed on the outer peripheral surface of the main body of the roller made in the same manner as in Example G-7 by using coating liquids according to formulations shown in Table 31 and curing of the microparticle-containing resin coating layer is performed by the same curing manner as in the protective layer of Example I-5 by ultraviolet rays. The properties and performances of the resulting charging roller are shown in Table 31.

Example I-8

A charging roller is made in the same manner as in Example 1-7 except that a microparticle-containing resin coating layer and a protective layer are formed on the outer peripheral surface of the main body of the roller made in the same manner as in Example G-8 by using a coating liquid according to a formulation shown in Table 31. The properties and performances of the resulting charging roller are shown in Table 31.

Comparative Example I-1

A developing roller is made in the same manner as in Example I-1 except that a resin coating layer is only formed by using a coating liquid according to a formulation shown in Table 31. The properties and performances of the resulting developing roller are shown in Table 31.

Comparative Example I-2

A charging roller is made in the same manner as in Example 1-8 except that a resin coating layer is formed by using a coating liquid according to a formulation shown in Table 31. The properties and performances of the resulting charging roller are shown in Table 31.

TABLE 30

| | | | | | Example I-1 | Example I-2 | Example I-3 | Example I-4 | Example I-5 |
|---|---|---|---|---|---|---|---|---|---|
| Elastic layer | Elastomer | | | | Urethane foam | Rubber | Rubber foam | Solid urethane | Urethane foam |
| | Thickness | | | mm | 4 | 4 | 4 | 4 | 3 |
| Micro-particle-containing resin coating layer | Formulation of coating liquid | UV non-curable | OD-E-198-50 (made by Dainippon Ink & Chemicals) | parts by mass | 100 | — | — | — | 100 |
| | | | CE8300 (made by Dainippon Ink & Chemicals) | | — | 100 | — | — | — |
| | | | CR latex | | — | — | — | — | — |
| | | | Ketjen Black (made by Mitsubishi Chemical) | | 3 | 3 | — | — | 3 |
| | | UV-curing type | UF8001 (made by Kyoeisha Chemical) | | — | — | 50 | 50 | — |
| | | | Methoxytriethyleneglycol acrylate | | — | — | 50 | 50 | — |
| | | | Ketjen Black (made by Mitsubishi Chemical) | | — | — | 3 | — | — |
| | | | DENKA BLACK (made by Denki Kagaku Kogyo) | | — | — | — | 4 | — |
| | | | ITO microparticle | | — | — | — | — | — |
| | | | IRGACURE184 (made by Ciba-Geigy Specialty Chemicals) | | — | — | 2.5 | — | — |
| | | | IRGACURE819 (made by Ciba-Geigy Specialty Chemicals) | | — | — | 2.5 | — | — |
| | | | KAYACURE DETX-S (made by Nippon Kayaku) | | — | — | — | 1.7 | — |
| | | | KAYACURE DMBI (made by Nippon Kayaku) | | — | — | — | 3.3 | — |
| | | Micro-particle | CFB-101-40 (made by Dainippon Ink & Chemicals) | | 10 | 10 | — | — | — |
| | | | SS20 (made by Nippon Silica) | | — | — | 5 | — | — |
| | | | MX500 (made by Soken Chemical & Engineering) | | — | — | 5 | 10 | — |
| | | | Tospal 2000B (made by GE Toshiba Silicone) | | — | — | — | — | 10 |
| | | | C-1510 (made by Fuji Silysia Chemical) | | — | — | — | — | — |
| | | | LE-1080 (made by Sumitomo Seika Chemicals) | | — | — | — | — | — |
| | Thickness | | | µm | 12 | 15 | 14 | 13 | 18 |
| Protective layer | Formulation of coating liquid | UV non-curable | MODIPER F200 (made by Nippon Oil & Fat) *1 | parts by mass | — | 10 | — | — | 5 |
| | | | THV220A (made by Sumitomo 3M) *1 | | — | — | 10 | — | — |
| | | | MODIPER FS700 (made by Nippon Oil & Fat) *2 | | — | — | — | 10 | — |
| | | | US-270 (made by Toagosei) *2 | | — | — | — | — | — |
| | | | Ethyl silicate 45 (made by Tama Chemicals) *2 | | — | — | — | — | — |
| | | | X-22-821 (made by Shin-Etsu Chemical) *2 | | — | — | — | — | — |
| | | UV-curing type | UF8001 (made by Kyoeisha Chemical) | | 50 | 50 | — | — | 50 |
| | | | V4260 (made by Dainippon Ink & Chemicals) | | — | — | 50 | — | — |
| | | | UC-203 (made by Kuraray) | | — | — | — | 50 | — |
| | | | Methoxytriethyleneglycol acrylate | | 25 | 50 | 25 | 50 | 25 |
| | | | Isoamyl acrylate | | 25 | — | — | — | 25 |
| | | | Dimethylaminoethyl methacrylate | | — | — | 25 | — | — |
| | | | 2-(perfluorooctyl)ethyl acrylate | | — | — | 5 | — | 5 |
| | | | γ-methacryloxypropyltrimethoxysilane | | — | — | — | — | — |
| | | | X-24-8201 (made by Shin-Etsu Chemical) | | — | — | — | — | — |
| | | | Ketjen Black (made by Mitsubishi Chemical) | | 2.5 | 2.5 | — | — | — |
| | | | DENKA BLACK (made by Denki Kagaku Kogyo) | | — | — | 3 | 3 | — |
| | | | ITO microparticle | | — | — | — | — | 35 |
| | | | IRGACURE184 (made by Ciba-Geigy Specialty Chemicals) | | 2.5 | — | 2.5 | 2.5 | — |
| | | | IRGACURE819 (made by Ciba-Geigy Specialty Chemicals) | | 2.5 | — | 2.5 | 2.5 | — |
| | | | KAYACURE DETX-S (made by Nippon Kayaku) | | — | 1.7 | — | — | 1.7 |
| | | | KAYACURE DMBI (made by Nippon Kayaku) | | — | 3.3 | — | — | 3.3 |
| | | Micro-particle | CFB-101-40 (made by Dainippon Ink & Chemicals) | | — | — | — | — | — |
| | | | SS20 (made by Nippon Silica) | | — | — | — | — | — |

TABLE 30-continued

| | | | | Example I-1 | Example I-2 | Example I-3 | Example I-4 | Example I-5 |
|---|---|---|---|---|---|---|---|---|
| | | Benzyltributylammonium chloride | | — | — | — | — | — |
| | | Propylene glycol monomethyl ether | | — | — | — | — | — |
| | Thickness | | μm | 9 | 10 | 10 | 7 | 8 |
| Physical values of roller | Resitance | | Ω | 5.5E+06 | 6.1E+06 | 5.1E+06 | 5.3E+06 | 4.4E+05 |
| | Surface roughness Rz | | μm | 5.1 | 4.9 | 5.8 | 5.5 | 5.4 |
| Initial property of developing roller | Charge of toner | | μC/g | 31 | 32 | 31 | 32 | — |
| | Amount of carried toner | | $mg/cm^2$ | 0.27 | 0.3 | 0.33 | 0.32 | — |
| Initial image | Image density | | | good | good | good | good | good |
| | Fog | | | good | good | good | good | good |
| | Difference of density between top and bottom ends | | | good | good | good | good | good |
| | Half-tone spot | | | good | good | good | good | good |
| Toner attachment on surface of developing roller after 10000 sheets were printed | | | | good | good | very good | good | — |
| Wear of surface of charging roller after 10000 sheets were printed | | | | — | — | — | — | good |
| Image after 10000 sheets were printed | Image density | | | good | good | good | good | good |
| | Fog | | | good | good | good | good | very good |
| | Difference of density between top and bottom ends | | | good | good | good | good | good |
| | Half-tone spot | | | good | good | good | good | good |

*1 Fluorine-containing component
*2 Silicon-containing component

TABLE 31

| | | | | | Example I-6 | Example I-7 | Example I-8 | Comparative example I-1 | Comparative example I-2 |
|---|---|---|---|---|---|---|---|---|---|
| Elastic layer | Elastomer | | | | Rubber | Rubber foam | Silicone | Urethane foam | Silicone |
| | Thickness | | | mm | 3 | 3 | 3 | 4 | 3 |
| Micro-particle-containing resin coating layer | Formulation of coating liquid | UV non-curable | OD-E-198-50 (made by Dainippon Ink & Chemicals) | parts by mass | — | — | — | — | — |
| | | | CE8300 (made by Dainippon Ink & Chemicals) | | — | — | — | — | — |
| | | | CR latex | | 100 | — | — | — | — |
| | | | Ketjen Black (made by Mitsubishi Chemical) | | 3 | — | — | — | — |
| | | UV-curing type | UF8001 (made by Kyoeisha Chemical) | | — | 50 | 50 | — | — |
| | | | Methoxytriethyleneglycol acrylate | | — | 50 | 50 | — | — |
| | | | Ketjen Black (made by Mitsubishi Chemical) | | — | 2.5 | — | — | — |
| | | | DENKA BLACK (made by Denki Kagaku Kogyo) | | — | — | 3 | — | — |
| | | | ITO microparticle | | — | — | — | — | — |
| | | | IRGACURE184 (made by Ciba-Geigy Specialty Chemicals) | | — | 2.5 | — | — | — |
| | | | IRGACURE819 (made by Ciba-Geigy Specialty Chemicals) | | — | 2.5 | — | — | — |
| | | | KAYACURE DETX-S (made by Nippon Kayaku) | | — | — | 1.7 | — | — |
| | | | KAYACURE DMBI (made by Nippon Kayaku) | | — | — | 3.3 | — | — |
| | | Micro-particle | CFB-101-40 (made by Dainippon Ink & Chemicals) | | — | — | — | — | — |
| | | | SS20 (made by Nippon Silica) | | — | 5 | 5 | — | — |
| | | | MX500 (made by Soken Chemical & Engineering) | | — | — | — | — | — |
| | | | Tospal 2000B (made by GE Toshiba Silicone) | | — | — | — | — | — |
| | | | C-1510 (made by Fuji Silysia Chemical) | | 10 | — | 5 | — | — |
| | | | LE-1080 (made by Sumitomo Seika Chemicals) | | — | 5 | — | — | — |
| | Thickness | | | μm | 16 | 17 | 17 | — | — |
| Protective layer | Formulation of coating liquid | UV non-curable | MODIPER F200 (made by Nippon Oil & Fat) *1 | parts by mass | — | — | — | — | — |
| | | | THV220A (made by Sumitomo 3M) *1 | | — | — | — | — | — |
| | | | MODIPER FS700 (made by Nippon Oil & Fat) *2 | | — | — | — | — | — |

TABLE 31-continued

| | | | Example I-6 | Example I-7 | Example I-8 | Comparative example I-1 | Comparative example I-2 |
|---|---|---|---|---|---|---|---|
| | US-270 (made by Toagosei) *2 | | 10 | — | — | — | — |
| | Ethyl silicate 45 (made by Tama Chemicals) *2 | | — | 10 | — | — | — |
| | X-22-821 (made by Shin-Etsu Chemical) *2 | | — | — | 5 | — | — |
| UV-curing type | UF8001 (made by Kyoeisha Chemical) | | 50 | — | — | 50 | 50 |
| | V4260 (made by Dainippon Ink & Chemicals) | | — | 50 | — | — | — |
| | UC-203 (made by Kuraray) | | — | — | 50 | — | — |
| | Methoxytriethyleneglycol acrylate | | 25 | 25 | 25 | 50 | 25 |
| | Isoamyl acrylate | | 25 | 25 | 25 | — | 25 |
| | Dimethylaminoethyl methacrylate | | — | — | — | — | — |
| | 2-(perfluorooctyl)ethyl acrylate | | — | — | — | — | — |
| | γ-methacryloxypropyltrimethoxysilane | | — | 10 | — | — | — |
| | X-24-8201 (made by Shin-Etsu Chemical) | | — | — | 5 | — | — |
| | Ketjen Black (made by Mitsubishi Chemical) | | 2.5 | — | — | 2.5 | 2.5 |
| | DENKA BLACK (made by Denki Kagaku Kogyo) | | — | 3 | — | — | — |
| | ITO microparticle | | — | — | 35 | — | — |
| | IRGACURE184 (made by Ciba-Geigy Specialty Chemicals) | | 2.5 | — | 2.5 | 2.5 | — |
| | IRGACURE819 (made by Ciba-Geigy Specialty Chemicals) | | 2.5 | — | 2.5 | 2.5 | — |
| | KAYACURE DETX-S (made by Nippon Kayaku) | | — | 1.7 | — | — | 1.7 |
| | KAYACURE DMBI (made by Nippon Kayaku) | | — | 3.3 | — | — | 3.3 |
| Micro-particle | CFB-101-40 (made by Dainippon Ink & Chemicals) | | — | — | — | 10 | — |
| | SS20 (made by Nippon Silica) | | — | — | — | — | 5 |
| | Benzyltributylammonium chloride | | — | — | 4 | — | — |
| | Propylene glycol monomethyl ether | | — | — | 20 | — | — |
| Physical values of roller | Thickness | μm | 6 | 5 | 5 | 5 | 5 |
| | Resitance | Ω | 7.5E+05 | 5.3E+05 | 5.4E+05 | 4.5E+06 | 5.5E+05 |
| | Surface roughness Rz | μm | 4.9 | 5.1 | 5.9 | 6.0 | 0.7 |
| Initial property of developing roller | Charge of toner | μC/g | — | — | — | 27 | — |
| | Amount of carried toner | $mg/cm^2$ | — | — | — | 0.29 | — |
| Initial image | Image density | | good | good | good | good | good |
| | Fog | | good | good | good | good | good |
| | Difference of density between top and bottom ends | | good | good | good | good | good |
| | Half-tone spot | | good | good | good | good | good |
| Toner attachment on surface of developing roller after 10000 sheets were printed | | | — | — | — | much filming | — |
| Wear of surface of charging roller after 10000 sheets were printed | | | good | good | very good | — | wear |
| Image after 10000 sheets were printed | Image density | | good | good | good | bad | bad |
| | Fog | | very good | good | very good | very bad | bad |
| | Difference of density between top and bottom ends | | good | good | good | bad | bad |
| | Half-tone spot | | good | good | good | bad | bad |

*1 Fluorine-containing component
*2 Silicon-containing component

As seen from Tables 30 and 31, since the conductive rollers of Examples have moderate micro-unevenness on their surfaces and their protective layers prevent the microparticles from rubbing off, the image forming apparatuses incorporated with the conductive roller as a developing roller can stably form an excellent image for a long time.

<J. Fourth Conductive Roller>

Example J-1

A microparticle-containing coating liquid according to a formulation shown in Table 32 is applied on the outer peripheral surface of the main body of the roller made in the same manner as in Example G-1 by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic microparticle-containing resin coating layer to obtain a developing roller provided with the microparticle-containing resin coating layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the developing roller, an image density, whether a half-tone spot and fog occur or not and a difference of a density between a top end and a bottom end are checked (Moreover, the methods for evaluating image, surface roughness and resistance are the same as in Example G-1). These results are shown in Table 32.

Example J-2

A developing roller is made in the same manner as in Example J-1 except that a microparticle-containing resin coating layer is formed on the outer peripheral surface of the main body of the roller made in the same manner as in Example G-2 by using a coating liquid according to a formulation shown in Table 32. The properties and performances of the resulting charging roller are shown in Table 32.

Example J-3

A developing roller is made in the same manner as in Example J-1 except that a microparticle-containing resin coating layer is formed on the outer peripheral surface of the main body of the roller made in the same manner as in Example G-3 by using a coating liquid according to a formulation shown in Table 32. The properties and performances of the resulting charging roller are shown in Table 32.

Example J-4

A developing roller is made in the same manner as in Example J-1 except that a microparticle-containing resin coating layer is formed on the outer peripheral surface of the main body of the roller made in the same manner as in Example G-4 by using a coating liquid according to a formulation shown in Table 32. The properties and performances of the resulting developing roller are shown in Table 32.

Example J-5

A microparticle-containing coating liquid according to a formulation shown in Table 32 is applied on the outer peripheral surface of the main body of the roller made in the same manner as in Example G-5 by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic microparticle-containing resin coating layer to obtain a charging roller provided with the microparticle-containing resin coating layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the charging roller, an image density, whether a half-tone spot and fog occur or not and a difference of a density between a top end and a bottom end are checked (Moreover, the methods for evaluating image, surface roughness and resistance are the same as in Example G-1). These results are shown in Table 32.

Example J-6

A charging roller is made in the same manner as in Example J-5 except that a microparticle-containing resin coating layer is formed on the outer peripheral surface of the main body of the roller made in the same manner as in Example G-6 by using a coating liquid according to a formulation shown in Table 32. The properties and performances of the resulting charging roller are shown in Table 32.

Example J-7

A charging roller is made in the same manner as in Example J-5 except that a microparticle-containing resin coating layer is formed on the outer peripheral surface of the main body of the roller made in the same manner as in Example G-7 by using a coating liquid according to a formulation shown in Table 33. The properties and performances of the resulting charging roller are shown in Table 33.

Example J-8

A charging roller is made in the same manner as in Example J-5 except that a microparticle-containing resin coating layer is formed on the outer peripheral surface of the main body of the roller made in the same manner as in Example G-8 by using a coating liquid according to a formulation shown in Table 33. The properties and performances of the resulting charging roller are shown in Table 33.

Example J-9

A coating composition comprising 100 parts by mass of UR8401 (manufactured by Toyobo), 5 parts by mass of COLONATE HX (manufactured by Nippon Polyurethane), 25 parts by mass of Printex35 (manufactured by Degussa) as a carbon black and 100 parts by mass of MEK (methyl ethyl ketone) is applied on the main body of the roller provided with the elastic layer composed of urethane foam made in Example G-5 at a thickness of 50 μm, and then heat-cured at 100° C. for 1 hour. A microparticle-containing resin coating layer is formed onto the resulting roller by using a coating liquid according to a formulation shown in Table 33 and irradiating electron beam in the same manner as in Example J-5 to make a charging roller. The properties and performances of the resulting charging roller are shown in Table 33.

Comparative Example J-1

A developing roller is made in the same manner as in Example J-1 except that a resin coating layer is formed by using a coating liquid according to a formulation shown in Table 33. The properties and performances of the resulting developing roller are shown in Table 33.

Comparative Example J-2

A charging roller is made in the same manner as in Example J-8 except that a resin coating layer is formed by using a coating liquid according to a formulation shown in Table 33. The properties and performances of the resulting charging roller are shown in Table 33.

TABLE 32

| | | | | | Example J-1 | Example J-2 | Example J-3 | Example J-4 | Example J-5 | Example J-6 |
|---|---|---|---|---|---|---|---|---|---|---|
| Elastic layer | Elastomer | | | | Urethane foam | Rubber | Rubber foam | Solid urethane | Urethane foam | Rubber |
| | Thickness | | | mm | 4 | 4 | 4 | 4 | 3 | 3 |
| Micro-particle-containing resin coating layer | Formulation of coating liquid | EB non-curable | MODIPER F200 (made by Nippon Oil & Fat) *1 | parts by mass | — | 10 | — | — | 5 | — |
| | | | THV220A (made by Sumitomo 3M) *1 | | — | — | 10 | — | — | — |
| | | | MODIPER FS700 (made by Nippon Oil & Fat) *2 | | — | — | — | 10 | — | — |
| | | | US-270 (made by Toagosei) *2 | | — | — | — | — | — | 10 |
| | | | Ethyl silicate 45 (made by Tama Chemicals) *2 | | — | — | — | — | — | — |
| | | | X-22-821 (made by Shin-Etsu Chemical) *2 | | — | — | — | — | — | — |
| | | EB-curing type | UF8001 (made by Kyoeisha Chemical) | | 50 | 50 | — | — | 50 | 50 |
| | | | V4260 (made by Dainippon Ink & Chemicals) | | — | — | 50 | — | — | — |
| | | | UC-203 (made by Kuraray) | | — | — | — | 50 | — | — |
| | | | Methoxytriethyleneglycol acrylate | | 25 | 50 | 25 | 50 | 25 | 25 |
| | | | Isoamyl acrylate | | 25 | — | — | — | 25 | 25 |
| | | | Dimethylaminoethyl methacrylate | | — | — | 25 | — | — | — |
| | | | 2-(perfluorooctyl)ethyl acrylate | | — | — | 5 | — | 5 | — |
| | | | γ-methacryloxypropyl-trimethoxysilane | | — | — | — | — | — | — |
| | | | X-24-8201 (made by Shin-Etsu Chemical) | | — | — | — | — | — | — |
| | | | Printex35 (made by Degussa) | | 30 | 30 | 30 | 30 | 30 | 30 |
| | | Micro-particle | CFB-101-40 (made by Dainippon Ink & Chemicals) | | 10 | 10 | — | — | — | — |
| | | | SS20 (made by Nippon Silica) | | — | — | — | — | 5 | — |
| | | | MX500 (made by Soken Chemical & Engineering) | | — | — | — | — | — | 5 |
| | | | Tospal 2000B (made by GE Toshiba Silicone) | | — | — | — | — | — | — |
| | | | C-1510 (made by Fuji Silysia Chemical) | | — | — | 10 | — | — | — |
| | | | LE-1080 (made by Sumitomo Seika Chemicals) | | — | — | — | 10 | — | — |
| | | | Benzyltributylammonium chloride | | — | — | — | — | — | — |
| | | | Propylene glycol monomethyl ether | | — | — | — | — | — | — |
| | Thickness | | | μm | 16 | 25 | 17 | 30 | 8 | 7 |
| Physical values of roller | Resitance | | | Ω | 6.1E+06 | 3.8E+06 | 5.4E+06 | 4.0E+06 | 7.0E+06 | 7.5E+05 |
| | Surface roughness Rz | | | μm | 4.6 | 3.5 | 7.2 | 8.0 | 3.5 | 6.2 |
| Initial property of developing roller | Charge of toner | | | μC/g | 30 | 31 | 36 | 31 | — | — |
| | Amount of carried toner | | | $mg/cm^2$ | 0.31 | 0.33 | 0.36 | 0.31 | — | — |
| Initial image | Image density | | | | good | good | good | good | good | good |
| | Fog | | | | good | good | good | good | good | good |
| | Difference of density between top and bottom ends | | | | good | good | good | good | good | good |
| | Half-tone spot | | | | good | good | good | good | good | good |
| Toner attachment on surface of developing roller after 10000 sheets were printed | | | | | slightly occur | good | very good | good | — | — |
| Wear of surface of charging roller after 10000 sheets were printed | | | | | — | — | — | — | very good | good |
| Image after 10000 sheets were printed | Image density | | | | good | good | good | good | good | good |
| | Fog | | | | good | good | good | good | very good | very good |
| | Difference of density between top and bottom ends | | | | good | good | good | good | good | good |
| | Half-tone spot | | | | good | good | good | good | good | good |

*1 Fluorine-containing component

*2 Silicon-containing component

TABLE 33

| | | | | | Example J-7 | Example J-8 | Example J-9 | Comparative example J-1 | Comparative example J-2 |
|---|---|---|---|---|---|---|---|---|---|
| Elastic layer | Elastomer | | | | Rubber foam | Silicone | Urethane foam | Urethane foam | Silicone |
| | Thickness | | | mm | 3 | 3 | 3 | 4 | 3 |
| Micro-particle-containing resin coating layer | Formulation of coating liquid | EB non-curable | MODIPER F200 (made by Nippon Oil & Fat) *1 | parts by mass | — | — | 10 | — | — |
| | | | THV220A (made by Sumitomo 3M) *1 | | — | — | — | — | — |
| | | | MODIPER FS700 (made by Nippon Oil & Fat) *2 | | — | — | — | — | — |
| | | | US-270 (made by Toagosei) *2 | | — | — | — | — | — |
| | | | Ethyl silicate 45 (made by Tama Chemicals) *2 | | 10 | — | — | — | — |
| | | | X-22-821 (made by Shin-Etsu Chemical) *2 | | — | 5 | — | — | — |
| | | EB-curing type | UF8001 (made by Kyoeisha Chemical) | | — | — | 50 | 50 | 50 |
| | | | V4260 (made by Dainippon Ink & Chemicals) | | 50 | — | — | — | — |
| | | | UC-203 (made by Kuraray) | | — | 50 | — | — | — |
| | | | Methoxytriethyleneglycol acrylate | | 25 | 25 | 25 | 50 | 25 |
| | | | Isoamyl acrylate | | 25 | 25 | 25 | — | 25 |
| | | | Dimethylaminoethyl methacrylate | | — | — | — | — | — |
| | | | 2-(perfluorooctyl)ethyl acrylate | | — | — | — | — | — |
| | | | γ-methacryloxypropyl trimethoxysilane | | 10 | — | — | — | — |
| | | | X-24-8201 (made by Shin-Etsu Chemical) | | — | 5 | — | — | — |
| | | | Printex35 (made by Degussa) | | 30 | 30 | 30 | 30 | 30 |
| | | Micro-particle | CFB-101-40 (made by Dainippon Ink & Chemicals) | | — | — | 10 | — | — |
| | | | SS20 (made by Nippon Silica) | | — | — | — | — | — |
| | | | MX500 (made by Soken Chemical & Engineering) | | — | — | — | — | — |
| | | | Tospal 2000B (made by GE Toshiba Silicone) | | 5 | 5 | — | — | — |
| | | | C-1510 (made by Fuji Silysia Chemical) | | — | — | — | — | — |
| | | | LE-1080 (made by Sumitomo Seika Chemicals) | | — | — | — | — | — |
| | | | Benzyltributylammonium chloride | | — | 4 | — | — | — |
| | | | Propylene glycol monomethyl ether | | — | 20 | — | — | — |
| | Thickness | | | μm | 7 | 8 | 8 | 18 | 8 |
| Physical values of roller | Resitance | | | Ω | 7.0E+05 | 5.5E+06 | 6.5E+06 | 6.0E+07 | 7.4E+05 |
| | Surface roughness Rz | | | μm | 5.5 | 6.0 | 5.6 | 0.1 | 0.1 |
| Initial property of developing roller | Charge of toner | | | μC/g | — | — | — | 29 | — |
| | Amount of carried toner | | | $mg/cm^2$ | — | — | — | 0.31 | — |
| Initial image | Image density | | | | good | good | good | thin | thin |
| | Fog | | | | good | good | good | good | good |
| | Difference of density between top and bottom ends | | | | good | good | good | good | good |
| | Half-tone spot | | | | good | good | good | fisheye | fisheye |
| Toner attachment on surface of developing roller after 10000 sheets were printed | | | | | — | — | — | much filming | — |
| Wear of surface of charging roller after 10000 sheets were printed | | | | | good | very good | good | — | wear |
| Image after 10000 sheets were printed | Image density | | | | good | good | good | bad | bad |
| | Fog | | | | good | very good | good | very bad | bad |
| | Difference of density between top and bottom ends | | | | good | good | good | bad | bad |
| | Half-tone spot | | | | good | good | good | bad | bad |

*1 Fluorine-containing component

*2 Silicon-containing component

As seen from Tables 32 and 33, since the conductive rollers of Examples have moderate micro-unevenness on their surfaces, the image forming apparatuses incorporated with the conductive rollers as a developing roller and a charging roller can stably form an excellent image for a long time. Moreover, the conductive rollers of Examples do not contaminate a photosensitive drum, since the remaining amount of unreacted compound is sufficiently suppressed in its microparticle-containing resin coating layer.

<K. Fifth Conductive Roller>

Example K-1

A coating liquid for a first resin coating layer according to a formulation shown in Table 34 is applied on an outer peripheral surface of the main body of the roller made in the same manner as in Example G-1 by a roll coater and heat-cured in a convection oven at 100° C. for 1 hour. Then, a coating liquid for a second resin coating layer according to a formulation shown in Table 34 is applied by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic resin coating layer to obtain a developing roller provided with the resin coating layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the developing roller, an image density, whether a half-tone spot and fog occur or not and a difference of a density between a top end and a bottom end are checked (Moreover, the methods for evaluating image, surface roughness and resistance are the same as in Example G-1). These results are shown in Table 34.

Example K-2

A developing roller is made in the same manner as in Example K-1 except that a resin coating layer is formed on the outer peripheral surface of the main body of the roller made in the same manner as in Example G-2 by using a coating liquid according to a formulation shown in Table 34. The properties and performances of the resulting developing roller are shown in Table 34.

Example K-3

A developing roller is made in the same manner as in Example K-1 except that a resin coating layer is formed on the outer peripheral surface of the main body of the roller made in the same manner as in Example G-3 by using a coating liquid according to a formulation shown in Table 34 and curing of the first resin coating layer is performed by the same curing manner as in the second resin coating layer of Example K-1 by ultraviolet rays. The properties and performances of the resulting developing roller are shown in Table 34.

Example K-4

A developing roller is made in the same manner as in Example K-3 except that a resin coating layer is formed on the outer peripheral surface of the main body of the roller made in the same manner as in Example G-4 by using a coating liquid according to a formulation shown in Table 34. The properties and performances of the resulting developing roller are shown in Table 34.

Example K-5

A coating liquid for a first resin coating layer according to a formulation shown in Table 34 is applied on an outer peripheral surface of the main body of the roller made in the same manner as in Example G-5 by a roll coater and heat-cured in a convection oven at 100° C. for 1 hour. Then, a coating liquid for a second resin coating layer according to a formulation shown in Table 34 is applied by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic resin coating layer to obtain a charging roller provided with the resin coating layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the charging roller, an image density, whether a half-tone spot and fog occur or not and a difference of a density between a top end and a bottom end are checked (Moreover, the methods for evaluating image, surface roughness and resistance are the same as in Example G-1). These results are shown in Table 34.

Example K-6

A charging roller is made in the same manner as in Example K-5 except that a resin coating layer is formed on the outer peripheral surface of the main body of the roller made in the same manner as in Example G-6 by using a coating liquid according to a formulation shown in Table 35. The properties and performances of the resulting charging roller are shown in Table 35.

Example K-7

A charging roller is made in the same manner as in Example K-5 except that a resin coating layer is formed on the outer peripheral surface of the main body of the roller made in the same manner as in Example G-7 by using a coating liquid according to a formulation shown in Table 35 and curing of the first resin coating layer is performed by the same curing manner as in the second resin coating layer of Example K-5 by ultraviolet rays. The properties and performances of the resulting charging roller are shown in Table 35.

Example K-8

A charging roller is made in the same manner as in Example K-7 except that a resin coating layer is formed on the outer peripheral surface of the main body of the roller made in the same manner as in Example G-8 by using a coating liquid according to a formulation shown in Table 35. The properties and performances of the resulting charging roller are shown in Table 35.

Comparative Example K-1

A developing roller is made in the same manner as in Example K-1 except that a resin coating layer is only formed by using a coating liquid according to a formulation shown in Table 35. The properties and performances of the resulting developing roller are shown in Table 35.

Comparative Example K-2

A charging roller is made in the same manner as in Example K-8 except that a resin coating layer is formed by using a coating liquid according to a formulation shown in Table 35. The properties and performances of the resulting charging roller are shown in Table 35.

TABLE 34

| | | | | | Example K-6 | Example K-7 | Example K-8 | Comparative example K-1 | Comparative example K-2 |
|---|---|---|---|---|---|---|---|---|---|
| Elastic layer | Elastomer | | | | Rubber foam | Rubber | Silicone foam | Urethane | Silicone |
| | Thickness | | | mm | 3 | 3 | 3 | 4 | 3 |
| First resin coating layer | Formulation of coating liquid | EB non-curable | OD-E-198-50 (made by Dainippon Ink & Chemicals) | parts by mass | — | — | — | — | — |
| | | | CE8300 (made by Dainippon Ink & Chemicals) | | — | — | — | — | — |
| | | | CR latex | | 100 | — | — | — | — |
| | | | Ketjen Black (made by Mitsubishi Chemical) | | 4 | — | — | — | — |
| | | | CFB-101-40 (made by Dainippon Ink & Chemicals) | | — | — | — | — | — |
| | | EB-curing type | UF8001 (made by Kyoeisha Chemical) | | — | 50 | 50 | — | — |
| | | | Methoxytriethyleneglycol acrylate | | — | 50 | 50 | — | — |
| | | | Printex35 (made by Degussa) | | — | 40 | 40 | — | — |
| | | | CFB-101-40 (made by Dainippon Ink & Chemicals) | | — | — | 10 | — | — |
| | Volume resistivity | | | Ω · cm | 3.5E+05 | 4.2E+05 | 3.7E+05 | — | — |
| | Thickness | | | μm | 33 | 42 | 32 | — | — |
| Second resin coating layer | Formulation of coating liquid | EB non-curable | MODIPER F200 (made by Nippon Oil & Fat) *1 | parts by mass | — | — | — | — | — |
| | | | THV220A (made by Sumitomo 3M) *1 | | — | — | — | — | — |
| | | | MODIPER FS700 (made by Nippon Oil & Fat) *2 | | — | — | — | — | — |
| | | | US-270 (made by Toagosei) *2 | | 10 | — | — | — | — |
| | | | Ethyl silicate 45 (made by Tama Chemicals) *2 | | — | 10 | — | — | — |
| | | | X-22-821 (made by Shin-Etsu Chemical) *2 | | — | — | 5 | — | — |
| | | EB-curing type | UF8001 (made by Kyoeisha Chemical) | | 50 | — | — | 50 | 50 |
| | | | V4260 (made by Dainippon Ink & Chemicals) | | — | 50 | — | — | — |
| | | | UC-203 (made by Kuraray) | | — | — | 50 | — | — |
| | | | Methoxytriethyleneglycol acrylate | | 25 | 25 | 25 | 50 | 25 |
| | | | Isoamyl acrylate | | 25 | 25 | 25 | — | 25 |
| | | | Dimethylaminoethyl methacrylate | | — | — | — | — | — |
| | | | 2-(perfluorooctyl)ethyl acrylate | | — | — | — | — | — |
| | | | γ-methacryloxypropyl trimethoxysilane | | — | 10 | — | — | — |
| | | | X-24-8201 (made by Shin-Etsu Chemical) | | — | — | 5 | — | — |
| | | | Printex35 (made by Degussa) | | — | — | — | 30 | 30 |
| | | Micro-particle | CFB-101-40 (made by Dainippon Ink & Chemicals) | | — | — | — | 10 | — |
| | | | SS20 (made by Nippon Silica) | | 5 | 5 | — | — | — |
| | | | Benzyltributylammonium chloride | | — | — | 4 | — | — |
| | | | Propylene glycol monomethyl ether | | — | — | 20 | — | — |
| | Volume resistivity | | | Ω · cm | 5.2E+14 | 3.2E+14 | 8.2E+13 | 3.2E+06 | 4.2E+06 |
| | Thickness | | | μm | 2 | 3 | 2 | 16 | 7 |
| Physical values of roller | Resitance | | | Ω | 8.5E+05 | 7.5E+05 | 3.5E+05 | 5.8E+06 | 5.6E+05 |
| | Surface roughness Rz | | | μm | 4.2 | 5.5 | 6.0 | 5.2 | 0.2 |
| Initial property of developing roller | Charge of toner | | | μC/g | — | — | — | 20 | — |
| | Amount of carried toner | | | $mg/cm^2$ | — | — | — | 0.31 | — |
| Initial image | Image density | | | | good | good | good | thin | thin |
| | Fog | | | | good | good | good | good | good |
| | Difference of density between top and bottom ends | | | | good | good | good | good | good |
| | Half-tone spot | | | | good | good | good | fisheye | fisheye |
| Toner attachment on surface of developing roller after 10000 sheets were | | | | | — | — | — | much | — |
| Wear of surface of charging roller after 10000 sheets were printed | | | | | good | good | very good | — | wear |
| Image after 10000 sheets were printed | Image density | | | | good | good | good | bad | bad |
| | Fog | | | | very good | good | very good | very bad | bad |
| | Difference of density between top and bottom ends | | | | good | good | good | bad | bad |
| | Half-tone spot | | | | good | good | good | bad | bad |

*1 Fluorine-containing component

*2 Silicon-containing component

TABLE 35

| | | | | | Example L-1 | Example L-2 | Example L-3 | Example L-4 | Example L-5 |
|---|---|---|---|---|---|---|---|---|---|
| Elastic layer | Elastomer | | | | Urethane foam | Rubber | Rubber foam | Solid urethane | Urethane foam |
| | Thickness | | | mm | 4 | 4 | 4 | 4 | 3 |
| Micro-particle-containing resin coating layer | Formulation of coating liquid | EB non-curable | OD-E-198-50 (made by Dainippon Ink & Chemicals) | parts by mass | 100 | — | — | — | 100 |
| | | | CE8300 (made by Dainippon Ink & Chemicals) | | — | 100 | — | — | — |
| | | | CR latex | | — | — | — | — | — |
| | | | Ketjen Black (made by Mitsubishi Chemical) | | 3 | 3 | — | — | 3 |
| | | EB-curing type | UF8001 (made by Kyoeisha Chemical) | | — | — | 50 | 50 | — |
| | | | Methoxytriethyleneglycol acrylate | | — | — | 50 | 50 | — |
| | | | Printex35 (made by Degussa) | | — | — | 30 | 30 | — |
| | | Micro-particle | CFB-101-40 (made by Dainippon Ink & Chemicals) | | 10 | 10 | — | — | — |
| | | | SS20 (made by Nippon Silica) | | — | — | 5 | — | — |
| | | | MX500 (made by Soken Chemical & Engineering) | | — | — | 5 | 10 | — |
| | | | Tospal 2000B (made by GE Toshiba Silicone) | | — | — | — | — | 10 |
| | | | C-1510 (made by Fuji Silysia Chemical) | | — | — | — | — | — |
| | | | LE-1080 (made by Sumitomo Seika Chemicals) | | — | — | — | — | — |
| | Thickness | | | μm | 15 | 18 | 16 | 14 | 15 |
| Protective layer | Formulation of coating liquid | EB non-curable | MODIPER F200 (made by Nippon Oil & Fat) *1 | parts by mass | — | 10 | — | — | 5 |
| | | | THV220A (made by Sumitomo 3M) *1 | | — | — | 10 | — | — |
| | | | MODIPER FS700 (made by Nippon Oil & Fat) *2 | | — | — | — | 10 | — |
| | | | US-270 (made by Toagosei) *2 | | — | — | — | — | — |
| | | | Ethyl silicate 45 (made by Tama Chemicals) *2 | | — | — | — | — | — |
| | | | X-22-821 (made by Shin-Etsu Chemical) *2 | | — | — | — | — | — |
| | | EB-curing type | UF8001 (made by Kyoeisha Chemical) | | 50 | 50 | — | — | 50 |
| | | | V4260 (made by Dainippon Ink & Chemicals) | | — | — | 50 | — | — |
| | | | UC-203 (made by Kuraray) | | — | — | — | 50 | — |
| | | | Methoxytriethyleneglycol acrylate | | 25 | 50 | 25 | 50 | 25 |
| | | | Isoamyl acrylate | | 25 | — | — | — | 25 |
| | | | Dimethylaminoethyl methacrylate | | — | — | 25 | — | — |
| | | | 2-(perfluorooctyl)ethyl acrylate | | — | — | 5 | — | 5 |
| | | | γ-methacryloxypropyltrimethoxysilane | | — | — | — | — | — |
| | | | X-24-8201 (made by Shin-Etsu Chemical) | | — | — | — | — | — |
| | | | Printex35 (made by Degussa) | | 30 | 30 | 30 | 30 | 30 |
| | | Micro-particle | CFB-101-40 (made by Dainippon Ink & Chemicals) | | — | — | — | — | — |
| | | | SS20 (made by Nippon Silica) | | — | — | — | — | — |
| | | | Benzyltributylammonium chloride | | — | — | — | — | — |
| | | | Propylene glycol monomethyl ether | | — | — | — | — | — |
| | Thickness | | | μm | 10 | 9 | 11 | 8 | 7 |
| Physical values of roller | Resitance | | | Ω | 6.2E+06 | 5.5E+06 | 4.7E+06 | 6.8E+06 | 4.7E+05 |
| | Surface roughness Rz | | | μm | 6.0 | 5.3 | 6.3 | 5.2 | 5.6 |
| Initial property of developing roller | Charge of toner | | | μC/g | 36 | 30 | 32 | 30 | — |
| | Amount of carried toner | | | $mg/cm^2$ | 0.25 | 0.31 | 0.32 | 0.3 | — |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner attachment on surface of developing roller after 10000 sheets were printed | | | | | good | good | very good | good | — |
| Wear of surface of charging roller after 10000 sheets were printed | | | | | — | — | — | — | good |
| Image after 10000 sheets were printed | Image density | | | | good | good | good | good | good |
| | Fog | | | | good | good | very good | good | very good |
| | Difference of density between top and bottom ends | | | | good | good | good | good | good |
| | Half-tone spot | | | | good | good | good | good | good |

*1 Fluorine-containing component

*2 Silicon-containing component

As seen from Tables 34 and 35, since the conductive rollers of Examples are excellent in charging property to toner, the image forming apparatuses incorporated with the conductive rollers as a developing roller and a charging roller can stably form an excellent image for a long time. Moreover, the conductive rollers of Examples do not contaminate a photosensitive drum, since the remaining amount of unreacted compound is sufficiently suppressed in its second resin coating layer.

<L. Sixth Conductive Roller>

Example L-1

A coating liquid for a microparticle-containing resin coating layer according to a formulation shown in Table 36 is applied on an outer peripheral surface of the main body of the roller made in the same manner as in Example G-1 by a roll coater and heat-cured in a convection oven at 100° C. for 1 hour. Then, a coating liquid for a protective layer according to a formulation shown in Table 36 is applied by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic protective layer to obtain a developing roller provided with the microparticle-containing resin coating layer and the protective layer on the outer peripheral surface of the main body of the roller. A charge of toner and an amount of carried toner of the resulting developing roller are evaluated according to a known method. Also, the developing roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the developing roller, an image density, whether a half-tone spot and fog occur or not and a difference of a density between a top end and a bottom end are checked (Moreover, the methods for evaluating image, surface roughness and resistance are the same as in Example G-1). These results are shown in Table 36.

Example L-2

A developing roller is made in the same manner as in Example L-1 except that a resin coating layer is formed on the outer peripheral surface of the main body of the roller made in the same manner as in Example G-2 by using a coating liquid according to a formulation shown in Table 36. The properties and performances of the resulting developing roller are shown in Table 36.

Example L-3

A developing roller is made in the same manner as in Example L-1 except that a microparticle-containing resin coating layer and a protective layer are formed on the outer peripheral surface of the main body of the roller made in the same manner as in Example G-3 by using a coating liquid according to a formulation shown in Table 36 and curing of the microparticle-containing resin coating layer is performed by the same curing manner as in the protective layer of Example L-1 by ultraviolet rays. The properties and performances of the resulting developing roller are shown in Table 36.

Example L-4

A developing roller is made in the same manner as in Example L-3 except that a coating liquid according to a formulation shown in Table 36 is used on the outer peripheral surface of the main body of the roller made in the same manner as in Example G-4. The properties and performances of the resulting developing roller are shown in Table 36.

Example L-5

A coating liquid for a microparticle-containing resin coating layer according to a formulation shown in Table 36 is applied on an outer peripheral surface of the main body of the roller made in the same manner as in Example G-5 by a roll coater and heat-cured in a convection oven at 100° C. for 1 hour. Then, a coating liquid for a protective layer according to a formulation shown in Table 36 is applied by a roll coater, electron beam is then irradiated on the roller under conditions that an accelerating voltage is 30 kV, a lamp current is 300 μA and an irradiation distance is 100 mm, a pressure of nitrogen atmosphere is 760 Torr and irradiation period is 1 minute by using Min-EB instrument manufactured by Ushio, Inc. while the roller is rotated, and as a result, the coating liquid is immediately cured to form an elastic protective layer to obtain a charging roller provided with the microparticle-containing resin coating layer and the protective layer on the outer peripheral surface of the main body of the roller. The resulting charging roller is evaluated according to a known method. Also, the charging roller is incorporated into an image forming apparatus, and an image density, whether a half-tone spot and fog occur or not and a difference of a density between a top end and a bottom end are evaluated according to a known method. Furthermore, after 10000 sheets were printed, toner attachment on the surface of the charging roller, an image density, whether a half-tone spot and fog occur or not and a difference of a density between a top end and a bottom end are checked (Moreover, the methods for evaluating image, surface roughness and resistance are the same as in Example G-1). These results are shown in Table 36.

Example L-6

A charging roller is made in the same manner as in Example L-5 except that a microparticle-containing resin coating layer and a protective layer are formed on the outer peripheral surface of the main body of the roller made in the same manner as in Example G-6 by using a coating liquid according to a formulation shown in Table 37. The properties and performances of the resulting charging roller are shown in Table 37.

Example L-7

A charging roller is made in the same manner as in Example L-5 except that a microparticle-containing resin coating layer and a protective layer are formed on the outer peripheral surface of the main body of the roller made in the same manner as in Example G-7 by using coating liquids according to formulations shown in Table 37 and curing of the microparticle-containing resin coating layer is performed by the same curing manner as in the protective layer of Example L-5 by ultraviolet rays. The properties and performances of the resulting charging roller are shown in Table 37.

Example L-8

A charging roller is made in the same manner as in Example L-7 except that a microparticle-containing resin coating layer and a protective layer are formed on the outer peripheral surface of the main body of the roller made in the same manner as in Example G-8 by using a coating liquid according to a formulation shown in Table 37. The properties and performances of the resulting charging roller are shown in Table 37.

Comparative Example L-1

A developing roller is made in the same manner as in Example L-1 except that a resin coating layer is only formed by using a coating liquid according to a formulation shown in Table 37. The properties and performances of the resulting developing roller are shown in Table 37.

Comparative Example L-2

A charging roller is made in the same manner as in Example L-8 except that a resin coating layer is formed by using a coating liquid according to a formulation shown in Table 37. The properties and performances of the resulting charging roller are shown in Table 37.

TABLE 36

| | | | | | Example L-1 | Example L-2 | Example L-3 | Example L-4 | Example L-5 |
|---|---|---|---|---|---|---|---|---|---|
| Elastic layer | Elastomer | | | | Urethane foam | Rubber | Rubber foam | Solid urethane | Urethane foam |
| | Thickness | | | mm | 4 | 4 | 4 | 4 | 3 |
| Micro-particle-containing resin coating layer | Formulation of coating liquid | EB non-curable | OD-E-198-50 (made by Dainippon Ink & Chemicals) | parts by mass | 100 | — | — | — | 100 |
| | | | CE8300 (made by Dainippon Ink & Chemicals) | | — | 100 | — | — | — |
| | | | CR latex | | — | — | — | — | — |
| | | | Ketjen Black (made by Mitsubishi Chemical) | | 3 | 3 | — | — | 3 |
| | | EB-curing type | UF8001 (mude by Kyoeisha Chemical) | | — | — | 50 | 50 | — |
| | | | Methoxytriethyleneglycol acrylate | | — | — | 50 | 50 | — |
| | | | Printex35 (made by Degussa) | | — | — | 30 | 30 | — |
| | | Micro-particle | CFB-101-40 (made by Dainippon Ink & Chemicals) | | 10 | 10 | — | — | — |
| | | | SS20 (made by Nippon Silica) | | — | — | 5 | — | — |
| | | | MX500 (made by Soken Chemical & Engineering) | | — | — | 5 | 10 | — |
| | | | Tospal 2000B (made by GE Toshiba Silicone) | | — | — | — | — | 10 |
| | | | C-1510 (made by Fuji Silysia Chemical) | | — | — | — | — | — |
| | | | LE-1080 (made by Sumitomo Seika Chemicals) | | — | — | — | — | — |
| | Thickness | | | µm | 15 | 18 | 16 | 14 | 15 |
| Protective layer | Formulation of coating liquid | EB non-curable | MODIPER F200 (made by Nippon Oil & Fat) *1 | parts by mass | — | 10 | — | — | 5 |
| | | | THV220A (made by Sumitomo 3M) *1 | | — | — | 10 | — | — |
| | | | MODIPER FS700 (made by Nippon Oil & Fat) *2 | | — | — | — | 10 | — |
| | | | US-270 (made by Toagosei) *2 | | — | — | — | — | — |
| | | | Ethyl silicate 45 (made by Tama Chemicals) *2 | | — | — | — | — | — |
| | | | X-22-821 (made by Shin-Etsu Chemical) *2 | | — | — | — | — | 50 |
| | | EB-curing type | UF8001 (made by Kyoeisha Chemical) | | 50 | 50 | — | — | 50 |
| | | | V4260 (made by Dainippon Ink & Chemicals) | | — | — | 50 | — | — |
| | | | UC-203 (made by Kuraray) | | — | — | — | 50 | — |
| | | | Methoxytriethyleneglycol acrylate | | 25 | 50 | 25 | 50 | 25 |
| | | | Isoamyl acrylate | | 25 | — | — | — | 25 |
| | | | Dimethylaminoethyl methacrylate | | — | — | 25 | — | — |
| | | | 2-(perfluorooctyl)ethyl acrylate | | — | — | 5 | — | 5 |
| | | | γ-methacryloxypropyltrimethoxysilane | | — | — | — | — | — |
| | | | X-24-8201 (made by Shin-Etsu Chemical) | | — | — | — | — | — |
| | | | Printex35 (made by Degussa) | | 30 | 30 | 30 | 30 | 30 |
| | | Micro-particle | CFB-101-40 (made by Dainippon Ink & Chemicals) | | — | — | — | — | — |
| | | | SS20 (made by Nippon Silica) | | — | — | — | — | — |
| | | | Benzyltributylammonium chloride | | — | — | — | — | — |
| | | | Propylene glycol monomethyl ether | | — | — | — | — | — |
| | Thickness | | | µm | 10 | 9 | 11 | 8 | 7 |
| Physical values of roller | Resitance | | | Ω | 6.2E+06 | 5.5E+06 | 4.7E+06 | 6.8E+06 | 4.7E+05 |
| | Surface roughness Rz | | | µm | 6.0 | 5.3 | 6.3 | 5.2 | 5.6 |
| Initial property of developing roller | Charge of toner | | | µC/g | 36 | 30 | 32 | 30 | — |
| | Amount of carried toner | | | $mg/cm^2$ | 0.25 | 0.31 | 0.32 | 0.3 | — |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner attachment on surface of developing roller after 10000 sheets were printed | | | | | good | good | very good | good | — |
| Wear of surface of charging roller after 10000 sheets were printed | | | | | — | — | — | — | good |
| Image after | Image density | | | | good | good | good | good | good |
| | Fog | | | | good | good | very good | good | very good |

TABLE 36-continued

| | | Example L-1 | Example L-2 | Example L-3 | Example L-4 | Example L-5 |
|---|---|---|---|---|---|---|
| 10000 sheets were printed | Difference of density between top and bottom ends | good | good | good | good | good |
| | Half-tone spot | good | good | good | good | good |

*1 Fluorine-containing component

*2 Silicon-containing component

TABLE 37

| | | | | | Example L-6 | Example L-7 | Example L-8 | Comparative example L-1 | Comparative example L-2 |
|---|---|---|---|---|---|---|---|---|---|
| Elastic layer | Elastomer | | | | Rubber | Rubber foam | Silicone | Urethane foam | Silicone |
| | Thickness | | | mm | 3 | 3 | 3 | 4 | 3 |
| Micro-particle-containing resin coating layer | Formulation of coating liquid | EB non-curable | OD-E-198-50 (made by Dainippon Ink & Chemicals) | parts by mass | — | — | — | — | — |
| | | | CE8300 (made by Dainippon Ink & Chemicals) | | — | — | — | — | — |
| | | | CR latex | | 100 | — | — | — | — |
| | | | Ketjen Black (made by Mitsubishi Chemical) | | 3 | — | — | — | — |
| | | EB-curing | UF8001 (made by Kyoeisha Chemical) | | — | 50 | 50 | — | — |
| | | | Methoxytriethyleneglycol acrylate | | — | 50 | 50 | — | — |
| | | | Printex35 (made by Degussa) | | — | 30 | 30 | — | — |
| | | Micro-particle | CFB-101-40 (made by Dainippon Ink & Chemicals) | | — | — | — | — | — |
| | | | SS20 (made by Nippon Silica) | | — | 5 | 5 | — | — |
| | | | MX500 (made by Soken Chemical & Engineering) | | — | — | — | — | — |
| | | | Tospal 2000B (made by GE Toshiba Silicone) | | — | — | — | — | — |
| | | | C-1510 (made by Fuji Silysia Chemical) | | 10 | — | 5 | — | — |
| | | | LE-1080 (made by Sumitomo Seika | | — | 5 | — | — | — |
| | Thickness | | | μm | 18 | 15 | 16 | — | — |
| Protective layer | Formulation of coating liquid | EB non-curable | MODIPER F200 (made by Nippon Oil & Fat) *1 | parts by mass | — | — | — | — | — |
| | | | THV220A (made by Sumitomo 3M) *1 | | — | — | — | — | — |
| | | | MODIPER FS700 (made by Nippon Oil & Fat) *2 | | — | — | — | — | — |
| | | | US-270 (made by Toagosei) *2 | | 10 | — | — | — | — |
| | | | Ethyl silicate 45 (made by Tama Chemicals) *2 | | — | 10 | — | — | — |
| | | | X-22-821 (made by Shin-Etsu Chemical) *2 | | — | — | 5 | — | — |
| | | EB-curing type | UF8001 (made by Kyoeisha Chemical) | | 50 | — | — | 50 | 50 |
| | | | V4260 (made by Dainippon Ink & Chemicals) | | — | 50 | — | — | — |
| | | | UC-203 (made by Kuraray) | | — | — | 50 | — | — |
| | | | Methoxytriethyleneglycol acrylate | | 25 | 25 | 25 | 50 | 25 |
| | | | Isoamyl acrylate | | 25 | 25 | 25 | — | 25 |
| | | | Dimethylaminoethyl methacrylate | | — | — | — | — | — |
| | | | 2-(perfluorooctyl)ethyl acrylate | | — | — | — | — | — |
| | | | γ-methacryloxypropyl trimethoxysilane | | — | 10 | — | — | — |
| | | | X-24-8201 (made by Shin-Etsu Chemical) | | — | — | 5 | — | — |
| | | | Printex35 (made by Degussa) | | 30 | 30 | 30 | 30 | 30 |
| | | Micro-particle | CFB-101-40 (made by Dainippon Ink & Chemicals) | | — | — | — | 10 | — |
| | | | SS20 (made by Nippon Silica) | | — | — | — | — | 5 |
| | | | Benzyltributylammonium chloride | | — | — | 4 | — | — |
| | | | Propylene glycol monomethyl ether | | — | — | 20 | — | — |
| | Thickness | | | μm | 6 | 6 | 5 | 6 | 5 |
| Physical values of roller | Resitance | | | Ω | 9.5E+05 | 4.3E+05 | 4.4E+05 | 6.8E+06 | 4.5E+05 |
| | Surface roughness Rz | | | μm | 4.8 | 5.3 | 4.9 | 6.1 | 0.8 |
| Initial property of developing roller | Charge of toner | | | μC/g | — | — | — | 20 | — |
| | Amount of carried toner | | | $mg/cm^2$ | — | — | — | 0.31 | — |
| Initial image | Image density | | | | good | good | good | good | good |
| | Fog | | | | good | good | good | good | good |
| | Difference of density between top and bottom ends | | | | good | good | good | good | good |
| | Half-tone spot | | | | good | good | good | good | good |
| Toner attachment on surface of developing roller after 10000 sheets were | | | | | — | — | — | much | — |

TABLE 37-continued

| | | Example L-6 | Example L-7 | Example L-8 | Comparative example L-1 | Comparative example L-2 |
|---|---|---|---|---|---|---|
| Wear of surface of charging roller after 10000 sheets were printed | | good | good | very good | — | wear |
| Image after 10000 sheets were printed | Image density | good | good | good | bad | bad |
| | Fog | very good | good | very good | very bad | bad |
| | Difference of density between top and bottom ends | good | good | good | bad | bad |
| | Halt-tone spot | good | good | good | bad | bad |

*1 Fluorine-containing component
*2 Silicon-containing component

As seen from Tables 36 and 37, since the conductive rollers of Examples have moderate micro-unevenness on their surfaces and their protective layers prevent the microparticles from rubbing off, the image forming apparatuses incorporated with the conductive roller as a developing roller can stably form an excellent image for a long time. Moreover, the conductive rollers of Examples do not contaminate a photosensitive drum, since the remaining amount of unreacted compound is sufficiently suppressed in its protective layer.

<M. Method for Producing Conductive Roller>

Examples M-1 to M-4

An elastic layer having a total length of 210 mm and composed of an elastomer shown in Table 38 is formed on the outer periphery of the metal shaft having an outer diameter of 6.0 mm and a length of 240 mm. Then, the outer peripheral surface of the elastic layer is subjected to corona treatment under the following conditions.

(A) Conditions of Corona Treatment

Instrument used: manufactured by TANTEC, CORONA GENERATOR MODEL HV05-2

Electrode: electrode having a width of 80 mm

Atmosphere: under atmospheric air

Electric power: 100 W

Time: 10 second

Then, a coating liquid according to a formulation shown in Table 38 is applied on the outer peripheral surface of the elastic layer by a roll coater, ultraviolet rays are irradiated at an irradiation intensity of 260 mW/$cm^2$ and an integrated light amount of 1000 mJ/$cm^2$ by using Unicure UVH-0252C manufactured by Ushio, Inc. while the roller is rotated, and as a result, the coating liquid is immediately cured to form an elastic resin coating layer. A charge of toner, an amount of carried toner, and whether a half-tone spot and fog occur or not of the resulting developing roller are evaluated according to a known method. Furthermore, adhesiveness between the elastic layer and the resin coating layer, and durability are evaluated according to the following methods. These results are shown in Table 38.

(4) Adhesiveness Between the Elastic Layer and the Resin Coating Layer

The adhesiveness between the elastic layer and the resin coating layer is evaluated by the cross-cut scotch tape peeling test according to JIS K5400. The number of square pieces not peeling per 100 square pieces is shown in Table 38.

(5) Durability

The developing roller is incorporated into a laser printer, 10000 sheets are then printed at an image concentration of 1% and it is checked whether the resin coating layer is peeled from the elastic layer in printing.

Comparative Examples M-1 to M-2

A developing roller is made in the same manner as in Example except that the outer peripheral surface of the elastic layer is not subjected to the surface treatment (corona treatment), and adhesiveness between the elastic layer and the resin coating layer, and durability are evaluated. These results are shown in Table 38.

TABLE 38

| | | | | Example M-1 | Example M-2 | Example M-3 | Example M-4 | Comparative example M-1 | Comparative example M-2 | Example M-5 | Example M-6 |
|---|---|---|---|---|---|---|---|---|---|---|---|
| Elastic layer | Elastomer | | | Urethane | Urethane foam | Butadiene rubber | Silicone | Urethane | Silicone | Urethane foam | Urethane |
| | Resistance | | Ωcm | 1.0 × $10^6$ | 1.0 × $10^6$ | 1.0 × $10^6$ | 1.0 × $10^6$ | 1.0 × $10^6$ | 1.0 × $10^6$ | 1.0 × $10^6$ | 1.0 × $10^6$ |
| | Thickness | | mm | 4 | 4 | 4 | 4 | 4 | 4 | 4 | 4 |
| Method for treating surface of elastic layer | | | | Corona treatment | Corona treatment | Corona treatment | Corona treatment | untreated | untreated | Plasma treatment | Plasma treatment |
| Resin coating layer | Formulation of coating liquid | Urethane acrylate oligomer *1 | parts by mass | 70 | 70 | 70 | 70 | 70 | 70 | 70 | 70 |
| | | Reactive diluent *2 | | 30 | 30 | 30 | 30 | 30 | 30 | 30 | 30 |
| | | Tin oxide *3 | | 10 | 10 | 10 | 10 | 10 | 10 | 10 | 10 |
| | | Photo-polymerization initiator *4 | | 5 | 5 | 5 | 5 | 5 | 5 | 5 | — |
| | | Tetrabutyl-ammonium borofluoride | | — | — | — | — | — | — | — | 2 |
| | Resistance | | Ωcm | 6.8 × $10^7$ | 8.2 × $10^7$ | 5.5 × $10^7$ | 7.1 × $10^7$ | 7.3 × $10^7$ | 7.0 × $10^7$ | 8.0 × $10^7$ | 6.5 × $10^7$ |
| | Thickness | | μm | 20 | 20 | 20 | 20 | 20 | 20 | 20 | 20 |

TABLE 38-continued

| | | | Example M-1 | Example M-2 | Example M-3 | Example M-4 | Comparative example M-1 | Comparative example M-2 | Example M-5 | Example M-6 |
|---|---|---|---|---|---|---|---|---|---|---|
| Physical values of developing roller | Resitance | Ω | $3.6 \times 10^7$ | $5.1 \times 10^7$ | $2.0 \times 10^7$ | $4.2 \times 10^7$ | $4.5 \times 10^7$ | $3.7 \times 10^7$ | $4.6 \times 10^7$ | $3.4 \times 10^7$ |
| | Surface roughness Rz | μm | 2.5 | 3.5 | 1.9 | 2.8 | 2.7 | 2.1 | 3.1 | 2.3 |
| | Asker C Hardness | degree | 50 | 50 | 50 | 50 | 50 | 50 | 50 | 50 |
| Initial property of developing roller | Charge of toner | μC/g | −25 | −18 | −21 | −26 | −31 | −22 | −18 | −24 |
| | Amount of carried toner | $mg/cm^2$ | 0.31 | 0.36 | 0.33 | 0.29 | 0.27 | 0.33 | 0.35 | 0.30 |
| Initial image | Image density | | good | good | good | good | good | good | good | good |
| | Half-tone spot | | non | non | non | non | occur on white background | occur on white background | non | non |
| | Fog | | non | non | non | non | non | non | non | non |
| Adhesiveness between elastic layer and resin coating layer | | | 100/100 OK | 100/100 OK | 100/100 OK | 100/100 OK | 80/100 NG | 0/100 NG | 100/100 OK | 100/100 OK |
| Durability | | | OK | OK | OK | OK | peeled when 3000 sheets were printed | peeled when 200 sheets were printed | OK | OK |

*1 Manufactured by Kyoei-Sha Chemical, UF8001
*2 Manufactured by Kyoei-Sha Chemical, MTG-A
*3 Manufactured by ISHIHARA SANGYO KAISYA
*4 1-hydroxycyclohexyl phenyl ketone, manufactured by Ciba-Geigy Specialty Chemicals, IRGACURE 184

As seen from Table 38, the developing rollers having the elastic layer subjected to the surface treatment in Examples M-1 to M-4 have high adhesiveness between the elastic layer and the resin coating layer, and the image forming apparatuses incorporated with the developing roller are excellent in durability. On the other hand, the developing rollers and the image forming apparatuses of Comparative examples M-1 to M-2 are inferior in the durability to those of Examples though there is some difference depending on the kind of elastomer in the elastic layer in the durability.

Example M-5

A developing roller having a high adhesiveness between the elastic layer and the resin coating layer as well as the developing rollers of Examples M-1 to M-4 can be obtained by subjecting to plasma treatment under conditions that atmosphere: nitrogen (1 Torr), electric power: 100 W and time: 30 seconds instead of the corona treatment. Also, an image forming apparatus incorporated with the developing roller are excellent in the durability as well as the image forming apparatuses of Examples M-1 to M-4.

Example M-6

A coating liquid composed of an urethane-based electron beam curing type resin composition comprising 2 parts by mass of tetrabutylammonium borofluoride as an ion conductive agent but not comprising an initiator is applied on the outer peripheral surface of the main body of the roller (comprising the shaft and the elastic layer) made by being subjected to the plasma treatment under the conditions that atmosphere: nitrogen (1 Torr), electric power: 100 W and time: 30 seconds at a thickness of 100 μm by a roll coater, electron beam is then irradiated under conditions that an accelerating voltage is 30 kV, a lamp current is 300 μA and an irradiation distance is 100 mm, atmosphere is 1 Torr and irradiation time is 1 minute by using Min-EB instrument manufactured by Ushio, Inc. while the roller is rotated, and as a result, the coating is immediately cured to form an elastic resin coating layer. Moreover, the coating liquid dose not contain solvent (organic solvent) absolutely. In this case, the developing roller having a high adhesiveness between the elastic layer and the resin coating layer can be also obtained.

The invention claimed is:

1. A developing roller comprising a shaft, an elastic layer formed on the outer periphery of the shaft and at least one resin coating layer formed on the outer peripheral surface of the elastic layer, wherein the resin coating layer comprises at least one selected from the group consisting of an ultraviolet non-curable fluorine-containing resin, an ultraviolet non-curable fluorine-containing compound, an ultraviolet non-curable silicon-containing resin and an ultraviolet non-curable silicon-containing compound, and an ultraviolet-curing type resin, and the resin coating layer is formed by applying a coating liquid comprising at least one selected from the group consisting of the ultraviolet non-curable fluorine-containing resin and compound and silicon-containing resin and compound, and a resin and/or compound having an ultraviolet polymerizable carbon-carbon double bond but not containing fluorine and silicon on the outer peripheral surface of the elastic layer and then curing the resin and/or compound having the ultraviolet polymerizable carbon-carbon double bond but not containing fluorine and silicon by ultraviolet irradiation.

2. A charging roller comprising a shaft, an elastic layer formed on the outer periphery of the shaft and at least one resin coating layer comprising an ultraviolet curing type resin and formed on the outer peripheral surface of the elastic layer, wherein the resin coating layer comprises at least one selected from the group consisting of a fluorine-containing resin, a fluorine-containing compound, a silicon-containing resin and a silicon-containing compound, and the resin coating layer is formed by applying any one of (A) a coating liquid comprising at least one selected from the group consisting of the ultraviolet polymerizable fluorine-containing resin and compound and silicon-containing resin and compound, (B) a coating liquid comprising at least one selected from the group consisting of the ultraviolet non-curable fluorine-containing resin and compound and silicon-containing resin and compound, and an ultraviolet polymerizable resin and/or compound containing no fluorine and silicon and (C) a coating liquid comprising at least one selected from the group consisting of the ultraviolet non-curable fluorine-containing resin and compound and silicon-containing resin and compound, and at least one selected from the group consisting of an ultraviolet polymerizable fluorine-containing resin and compound and silicon-containing resin and compound on the outer peripheral surface of the elastic layer and then curing the ultraviolet polymerizable resin and/or compound by ultraviolet irradiation.

3. A conductive roller comprising a shaft, an elastic layer formed on the outer periphery of the shaft, a first resin coating layer having a volume resistivity of not more than $10^6\Omega\cdot cm$ and formed on the outer peripheral surface of the elastic layer and a second resin coating layer having a volume resistivity of not less than $10^{10}\Omega\cdot cm$ and formed on the outer peripheral surface of the first resin coating layer, wherein the second resin coating layer comprises an ultraviolet-curing type resin, the second resin coating layer comprises at least one selected from the group consisting of a fluorine-containing resin, a fluorine-containing compound, a silicon-containing resin and a silicon-containing compound, and the second resin coating layer is formed by applying any one of (A) a coating liquid comprising at least one selected from the group consisting of the ultra-violet polymerizable fluorine-containing resin and compound and silicon-containing resin and compound, (B) a coating liquid comprising at least one selected from the group consisting of the ultraviolet non-curable fluorine-containing resin and compound and silicon-containing resin and compound, and an ultraviolet polymerizable resin and/or compound containing no fluorine and silicon, and (C) a coating liquid comprising at least one selected from the group consisting of the ultraviolet non-curable fluorine-containing resin and compound and silicon-containing resin and compound, and at least one selected from the group consisting of an ultraviolet polymerizable fluorine-containing resin and compound and silicon-containing resin and compound on the outer peripheral surface of the first resin coating layer and then curing at least any one of the ultraviolet polymerizable resins and compounds by ultraviolet irradiation.

* * * * *